US011885066B2

(12) United States Patent
Sights et al.

(10) Patent No.: US 11,885,066 B2
(45) Date of Patent: **\*Jan. 30, 2024**

(54) RETAIL STRUCTURE WITH SHIPPING CONTAINER SPACE

(71) Applicant: Levi Strauss & Co., San Francisco, CA (US)

(72) Inventors: James Barton Sights, San Francisco, CA (US); Elizabeth O'Neill, Tiburon, CA (US); Jeff Zens, Emeryville, CA (US)

(73) Assignee: Levi Strauss & Co., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,606

(22) Filed: Oct. 25, 2022

(65) Prior Publication Data

US 2023/0085629 A1    Mar. 23, 2023

Related U.S. Application Data

(63) Continuation of application No. 17/064,535, filed on Oct. 6, 2020, now Pat. No. 11,479,907, which is a
(Continued)

(51) Int. Cl.
*E04H 1/12* (2006.01)
*D06M 10/00* (2006.01)
(Continued)

(52) U.S. Cl.
CPC ........... *D06M 10/005* (2013.01); *B65D 88/12* (2013.01); *D06B 11/0093* (2013.01);
(Continued)

(58) Field of Classification Search
CPC ............... E04H 1/12; E04H 2001/1283; E04B 2001/34892
See application file for complete search history.

(56) References Cited

U.S. PATENT DOCUMENTS 7,571,624 B1   8/2009  Clamper
8,151,537 B2 * 4/2012  Pope ..................... E04B 1/3431
                                                                52/67
(Continued)

FOREIGN PATENT DOCUMENTS

TW        200801294 A    1/2008
WO          9405879 A1    3/1994
(Continued)

OTHER PUBLICATIONS

Extended European Search Report for European Application No. 19846466.1 dated May 27, 2022.
(Continued)

*Primary Examiner* — Babajide A Demuren
(74) *Attorney, Agent, or Firm* — Aka Chan LLP

(57) ABSTRACT

A structure has spaces that can accommodate at least two International Organization for Standardization compliant shipping containers. The structure has studs, joists, and rafters connected together above, besides, between, and in front of the spaces for the shipping containers. The structure provides for an attractive outdoor retail space with shading, allowing for signage, decorations, product display, ergonomics, and other retail design features. In an implementation, the structure is for a mobile retail space that is tailored for customizing and manufacture of the customized apparel, especially the laser finishing of products like jeans. The mobile retail space can be relocated to and deployed easily at various events, such as sports events and music festival venues.

32 Claims, 93 Drawing Sheets

Related U.S. Application Data continuation of application No. 16/535,051, filed on Aug. 7, 2019, now Pat. No. 10,793,998.

(60) Provisional application No. 62/715,788, filed on Aug. 7, 2018.

(51) Int. Cl.
*G06Q 30/0601* (2023.01)
*D06B 11/00* (2006.01)
*B65D 88/12* (2006.01)
*E04B 1/00* (2006.01)
*E04B 1/343* (2006.01)
*E04B 1/348* (2006.01)
*D06C 23/02* (2006.01)
*G06T 19/20* (2011.01)

(52) U.S. Cl.
CPC .............. *E04B 1/003* (2013.01); *E04B 1/348* (2013.01); *E04B 1/34321* (2013.01); *E04H 1/12* (2013.01); *G06Q 30/0621* (2013.01); *G06Q 30/0643* (2013.01); *D06C 23/02* (2013.01); *E04B 2001/34892* (2013.01); *E04H 2001/1283* (2013.01); *G06T 19/20* (2013.01); *G06T 2210/16* (2013.01)

(56) References Cited

U.S. PATENT DOCUMENTS

| | | | |
|---|---|---|---|
| 10,352,034 B2 * | 7/2019 | Boyle | E04H 1/02 |
| 2010/0018131 A1 | 1/2010 | Green | |
| 2010/0064600 A1 * | 3/2010 | Napier | E04B 1/3442 52/79.5 |
| 2011/0313811 A1 | 12/2011 | Urban et al. | |
| 2014/0008359 A1 * | 1/2014 | Ferren | E04H 5/02 220/1.5 |
| 2014/0325931 A1 * | 11/2014 | Prodaniuk | E04H 15/36 52/656.9 |
| 2017/0013745 A1 | 1/2017 | Wilcox et al. | |
| 2017/0081867 A1 * | 3/2017 | Wasson | E04H 15/20 |
| 2017/0183862 A1 * | 6/2017 | Sparks | E06B 3/70 |
| 2019/0023236 A1 * | 1/2019 | Webb | H02S 20/23 |
| 2019/0257073 A1 * | 8/2019 | Ledoux | E04B 1/3483 |

FOREIGN PATENT DOCUMENTS

| | | |
|---|---|---|
| WO | 2010128458 A1 | 11/2010 |
| WO | WO/2019/169052 | 9/2019 |

OTHER PUBLICATIONS

International Search Report, PCT Application No. PCT/US2019/045586, dated Nov. 20, 2019, 4 pages.

\* cited by examiner

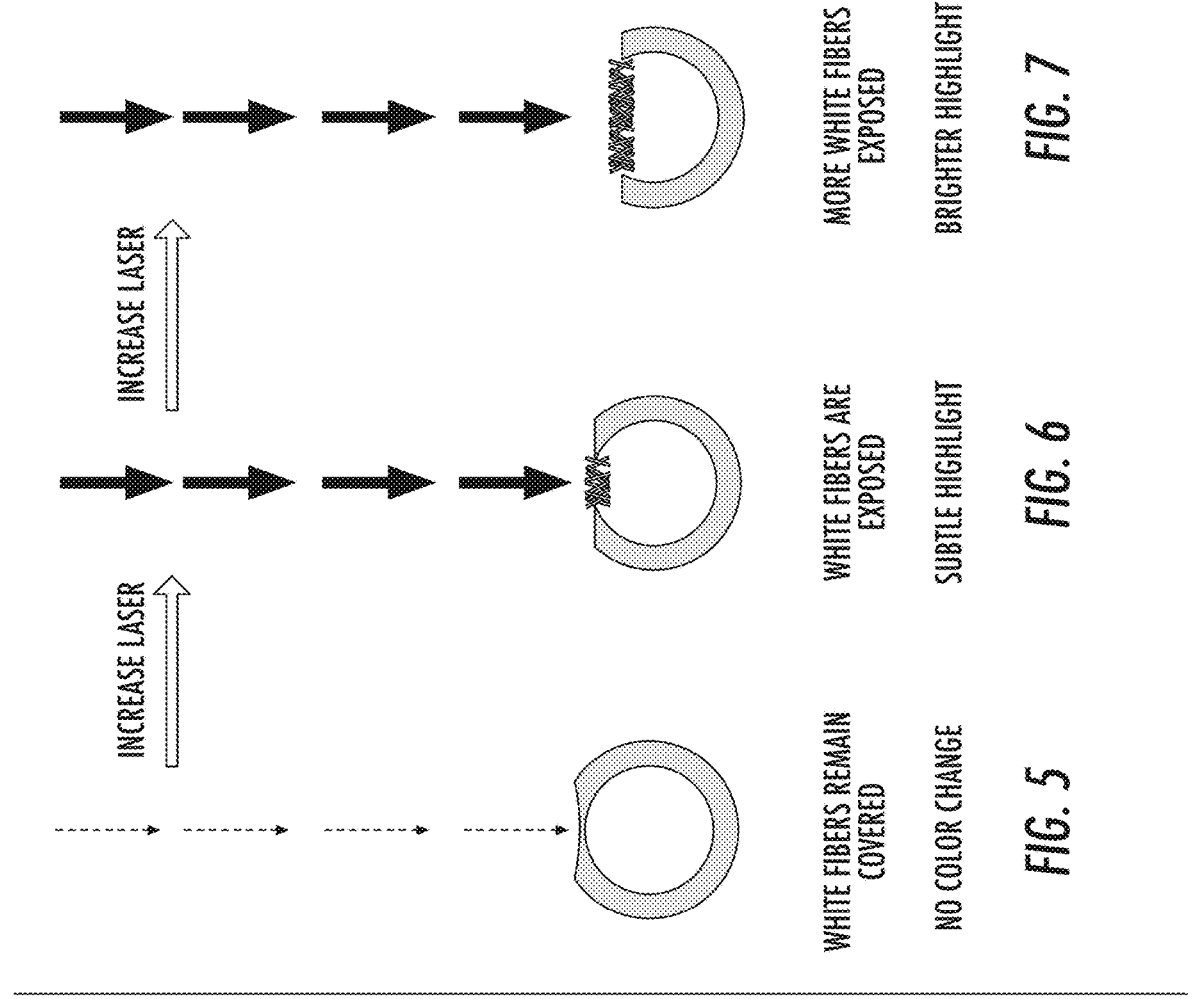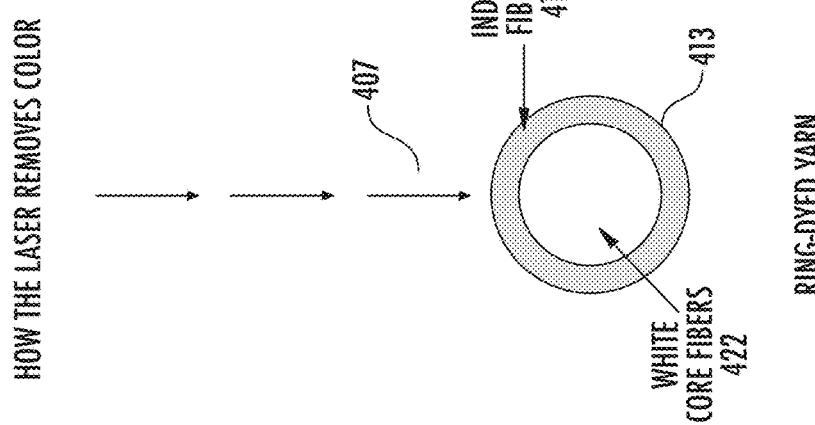

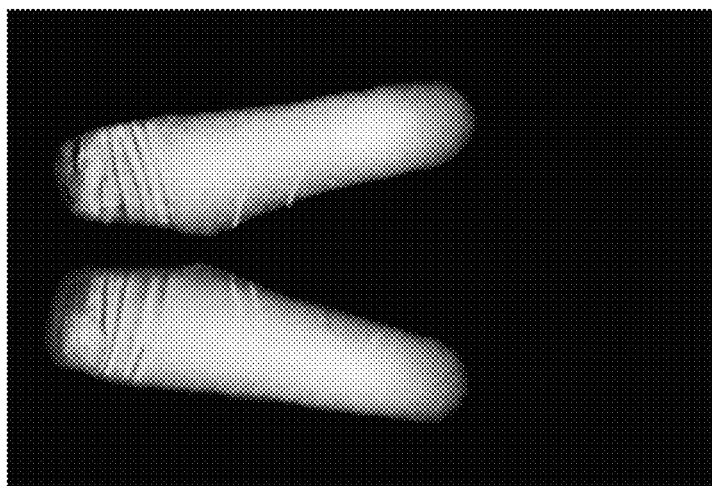
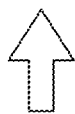
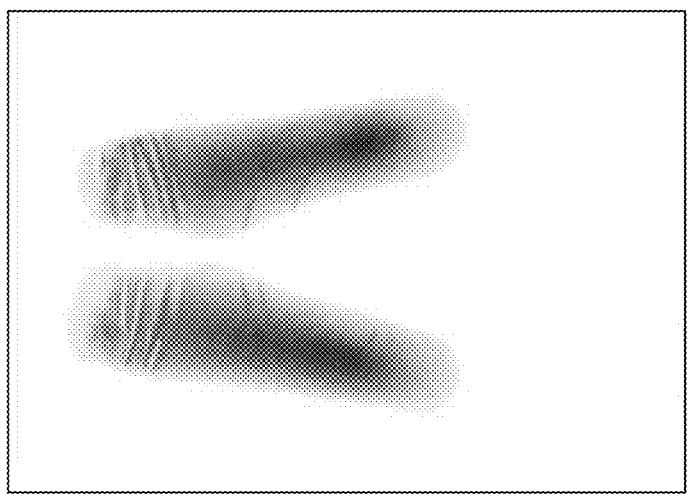
FIG. 20

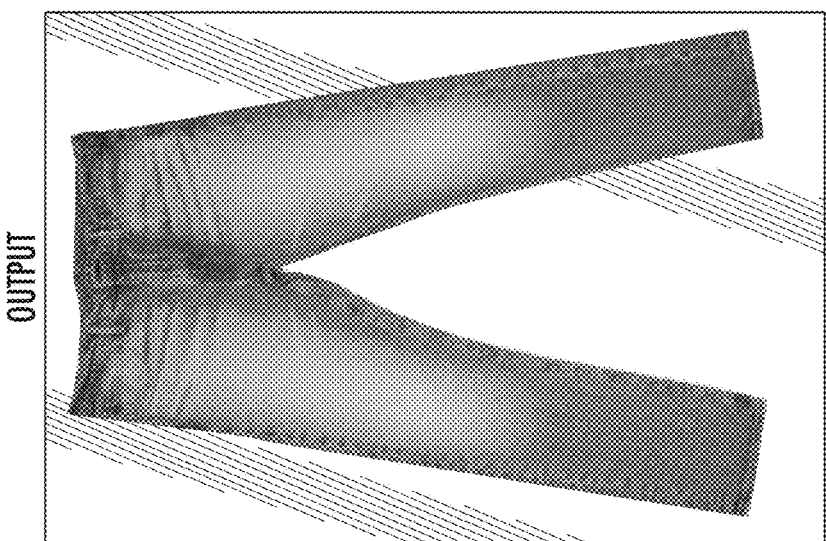
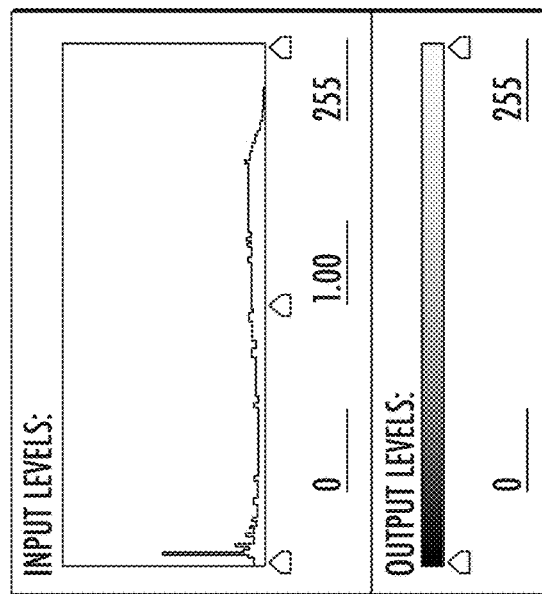
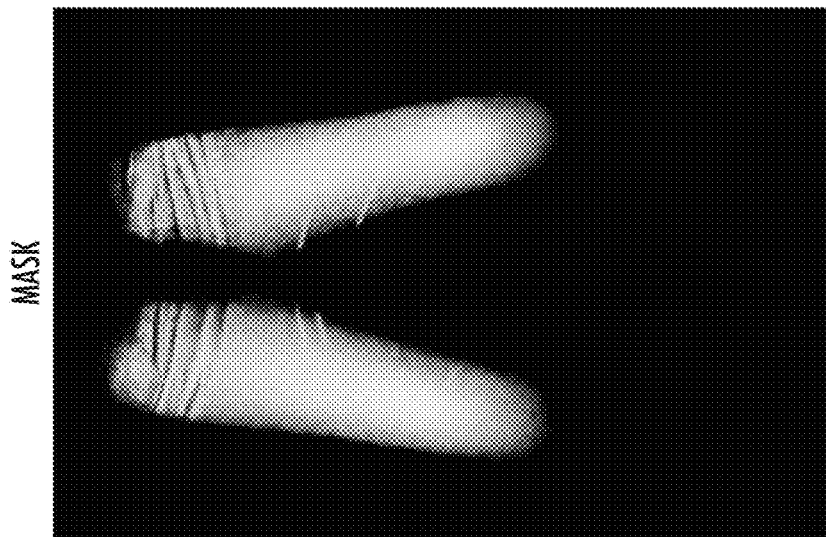
FIG. 23

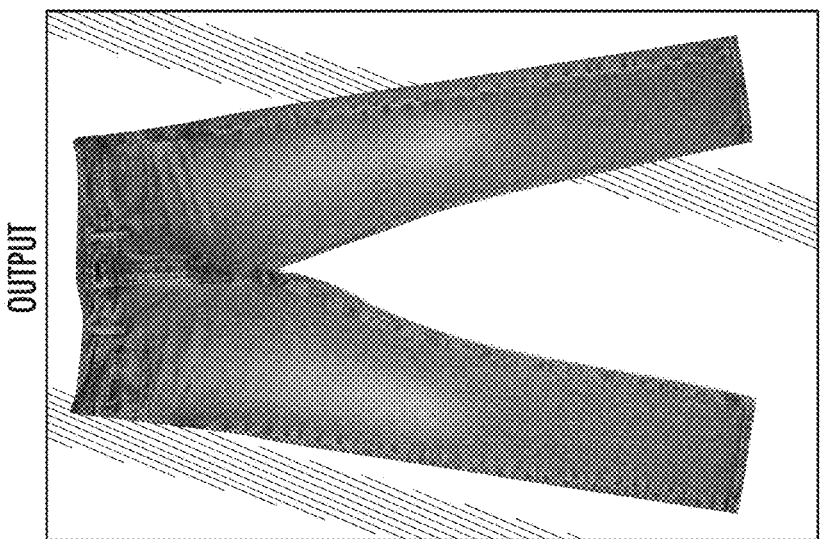
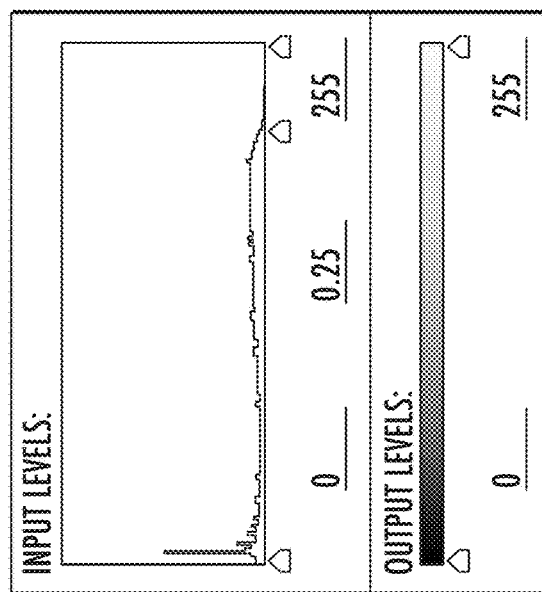
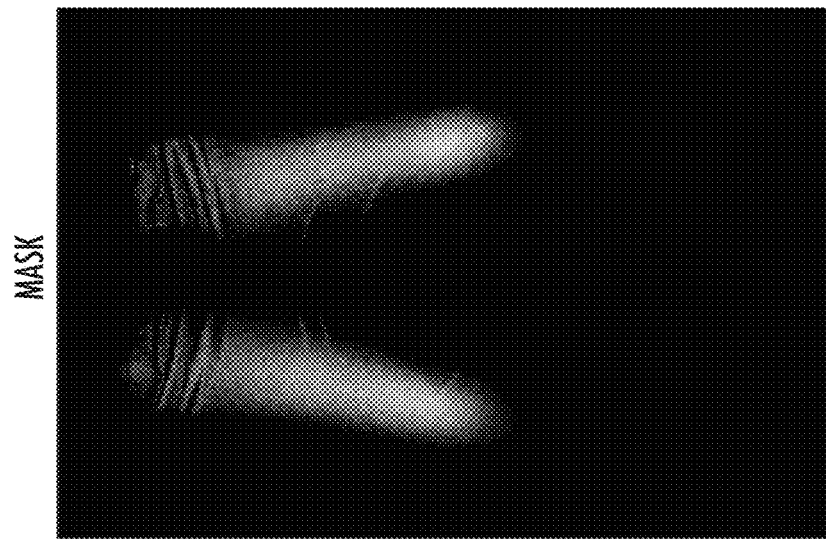
FIG. 24

RETAIL STRUCTURE WITH SHIPPING CONTAINER SPACE

CROSS REFERENCE TO RELATED APPLICATIONS

This patent application is a continuation of U.S. patent application Ser. No. 17/064,535, filed Oct. 6, 2020, issued as U.S. Pat. No. 11,479,907 on Oct. 25, 2022, which is a continuation of U.S. patent application Ser. No. 16/535,051, filed Aug. 7, 2019, issued as U.S. Pat. No. 10,793,998 on Oct. 6, 2020, which claims the benefit of U.S. patent application 62/715,788, filed Aug. 7, 2018. These applications are incorporated by reference along with all other references cited in this application.

BACKGROUND OF THE INVENTION

The present invention relates to apparel manufacturing and, more specifically, to manufacturing using a mobile finishing center finishing center for finishing garments to have a faded, distressed, washed, or worn finish or desired appearance. The mobile finishing center can be driven to a location such as sporting events (e.g., Super Bowl), concerts (e.g., Coachella), or other special event, at which garments can be processed on site.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, crackle, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about 20 to 60 liters of water to finish each pair of jeans.

Therefore, there is a need for a technique for finishing garments that also reduces environmental impact, processing time, and processing costs, while maintaining the look and style of traditional finishing techniques.

BRIEF SUMMARY OF THE INVENTION

A mobile finishing garment center includes an exterior retail space structure that is located above and between shipping containers of the center. The structure may also extend in front of the containers and behind the containers. The structure can be coupled and decoupled from the containers without disassembly of a number of the frame portions included in the structure. Thus, when the garment center is relocated between different locations, the structure may be quickly assembled onto the containers and quickly disassembled for transport. The structure shades the containers and a deck that is located between the containers. The structure can also shade one or more areas near the containers to create an inviting atmosphere for the garment center.

The mobile finishing center includes a laser to finish garments to have a faded, distressed, washed, or worn finish or desired appearance. The mobile finishing center is self-contained and can be driven to a location where consumers can select, view a preview of apparel products, order apparel products, and then the products will be manufactured on site.

A system of the mobile finishing center includes a tool that allows a customer to preview or create new designs for apparel before purchase and before laser finishing. Software and lasers are used in finishing apparel to produce a desired wear pattern or other design. Based on a laser input file with a pattern, a laser will burn or ablate the pattern onto apparel. With the tool, the customer will be able to preview, create, make changes, and view images of a design, in real time, before purchase and burning or ablation by a laser. Input to the tool can include fabric template images, laser input files, and damage input. In an implementation, the customer or another user can also move, rotate, scale, and warp the image input.

In a specific implementation, a system includes a first space. The first space includes dimensions in a first direction, a second direction, and a third direction. A first length of the first space is in the first direction. A first width of the first space is in the second direction. A first height of the first space is in the third direction, the first, second, and third directions are transverse directions. The first length and the first width are a length and a width of a top of a first intermodal shipping container. The first height is a height of the first intermodal shipping container. The first height, the first width, and the first height are compliant with universal shipping container dimensions and configurations dictated by the International Organization for Standardization (ISO).

The system includes a second space. The second space includes dimensions in a fourth direction, a fifth direction, and a sixth direction. A second length of the second space is in the fourth direction. A second width of the second space is in the fifth direction. A second height of the second space is in the sixth direction, the fourth, fifth, and sixth directions are transverse directions. The second length and the second width are a length and a width of a top of a second intermodal shipping container. The second height is a height of the second intermodal shipping container. The second length, the second width, and the second height are compliant with universal shipping container dimensions and configurations dictated by the International Organization for Standardization (ISO).

The system includes a first joist, above the first space. The first joist extends at least the first length in the first direction along a first edge of the first space, overlapping the first space, and extends a first extended length beyond a front edge of the first space. The system includes a second joist, above the first space. The second joist extends at least the first length in the first direction along a second edge of the first space, overlapping the first space, and extends a second extended length beyond the front edge of the first space. The system includes a third joist, coupled between the first and second joists, along the front edge of the first space. The system includes a fourth joist, coupled between the first and second joists, along a back edge of the first space. The system includes a fifth joist, above the first space and above the second joist. The fifth joist extends at least the first length in the first direction along the second edge of the first space, overlapping the second joist, and extends a third extended length beyond the front edge of the first space.

The system includes a sixth joist, above the second space. The sixth joist extends at least the second length in the fourth direction along a first edge of the second space, overlapping the second space, and extends a fourth extended length beyond a front edge of the second space. The system includes a seventh joist, above the second space. The seventh joist extends at least the second length in the fourth direction along a second edge of the second space, overlapping the second space, and extends an fifth extended length beyond the front edge of the second space. The system includes an eighth joist, coupled between the sixth and seventh joists, along the front edge of the second space. The system includes a ninth joist, coupled between the sixth and seventh joists, along a back edge of the second space. The system includes a tenth joist, above the second space and above the seventh joist. The tenth joist extends at least the second length in the first direction along the first edge of the second space, overlapping the seventh joist, and extends in a sixth extended length beyond the front edge of the second space.

The system includes a first plurality of studs coupled to the first and second joists in a region beyond the front edge of the first space. The first plurality of studs extends in the third direction. The system includes a second plurality of studs coupled to the sixth and seventh joists in a region beyond the front edge of the second space. The second plurality of studs extends in the sixth direction. The system includes a third plurality of studs coupled between the second and fight joists, and a fourth plurality of stud coupled between the seventh and tenth joists.

The mobile finishing center allows customers to see, select, customize, and order apparel products. The laser will laser finish an ordered garment (e.g., jeans) to have a faded, distressed, washed, damaged, or worn finish or other desired appearances. The garment may be washed and dried and available for the customer in a relatively short time. For example, an order made at the beginning of a football game can be ready for pick up during half time or at the end of the game. In a specific implementation, an order is ready for pick up about an hour after the order is made.

The containers of the finishing center are mobile and can be driven by truck or shipped by rail or ship to any desired location for any desired event. After arriving at a location, the containers are set up and connected to an electricity source (e.g., power line, electric generator, batteries, or solar panels). Then the finishing center can accept customers' orders and will manufacture finished garments, which will be ready in a short time period.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 4 shows a laser beam striking a ring-dyed yarn having indigo-dyed fibers and white core fibers.

FIG. 5 shows the laser using a first power level setting or first exposure time setting, or a combination of these, to remove some of the dyed fibers, but not revealing any of the white core fibers.

FIG. 6 shows the laser using a second power level setting or second exposure time setting, or a combination of these, to remove more of the dyed fibers than in FIG. 5.

FIG. 7 shows the laser using a third power level setting or third exposure time setting, or a combination of these, to remove even more of the dyed fibers than in FIG. 6.

FIG. 20 shows a laser pattern mask that is created from a laser input file.

FIGS. 23-24 shows examples of two different adjustments or settings for a bright point operation.

FIG. 31 shows a screen showing additional patterns or artwork, in addition to, for example, logos, the user can select from.

FIG. 35 shows a screen showing back of a trucker jacket, where an option for overdye is turned off and post-wash bleach is turned on.

FIG. 90B shows a front view of a three-dimensional model, which the shadow neutral texture will be applied or mapped to.

FIG. 90D shows a back or rear view of the three-dimensional model, which the shadow neutral texture will be applied or mapped to.

DETAILED DESCRIPTION OF THE INVENTION

Figure 1:
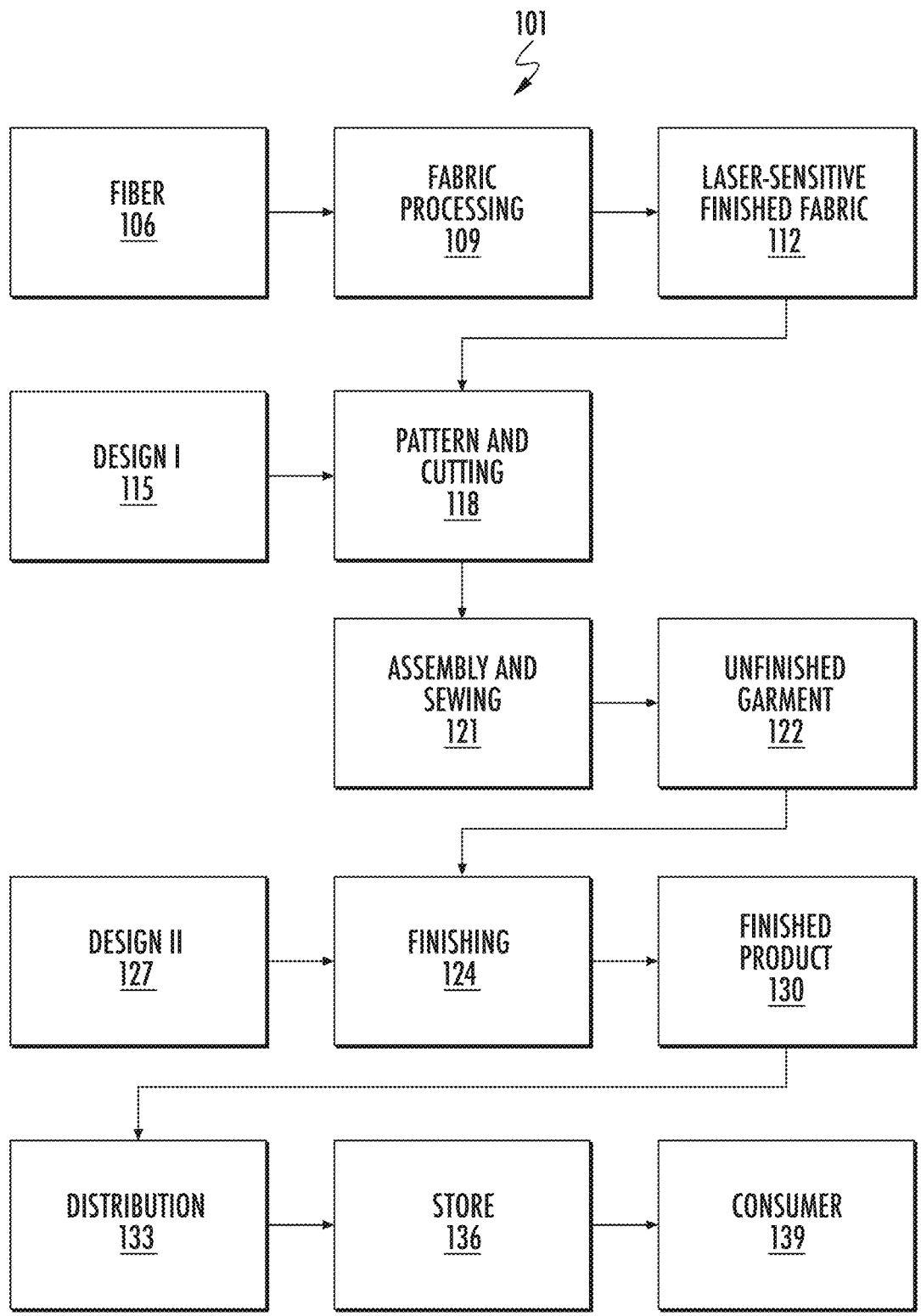
FIG. 1 shows a process flow for manufacturing apparel such as jeans, where garments are finished using a laser.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandex), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including non-denim products and products made from knit materials. Some examples include T-shirts, sweaters, coats, sweatshirts (e.g., hoodies), casual wear, athletic wear, outerwear, dresses, eveningwear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and receive additional finishing 124. The additional finishing may include laser finishing, tinting, washing, softening, and fixing. For distressed denim products, the laser finishing can include using a laser to produce a wear pattern according to a design 127 (design II). Some additional details of laser finishing are described in U.S. patent application 62/377,447, filed Aug. 19, 2016, and Ser. No. 15/682,507, filed Aug. 21, 2017, issued as U.S. Pat. No. 10,051,905 on Aug. 21, 2018, are incorporated by reference along with all other references cited in this application. U.S. patent applications 62/636,108, filed Feb. 27, 2018, and 62/715,788, filed Aug. 7, 2018, describe some specific implementations of a brief builder application and are incorporated by reference.

Design 127 (design II) is for post-assembly aspects of a garment while design 115 is for preassembly aspects of a garment. After finishing 124, a finished product 130 (e.g., a pair of jeans) is complete and ready for sale. The finished product can be inventoried and distributed 133, delivered to stores 136, and sold to consumers or customers 139. The finished product can alternatively be sold to a customer at a mobile finishing center where the customer orders the jeans and selects a laser finishing pattern for application for the jeans at the mobile finishing center and delivery at the center. Laser finishing facilitates the consumer buying and wearing worn blue jeans without having to wear the jeans themselves to achieve the worn blue jeans appearance. Achieving a worn blue jeans appearance through wear usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit), and the like.

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
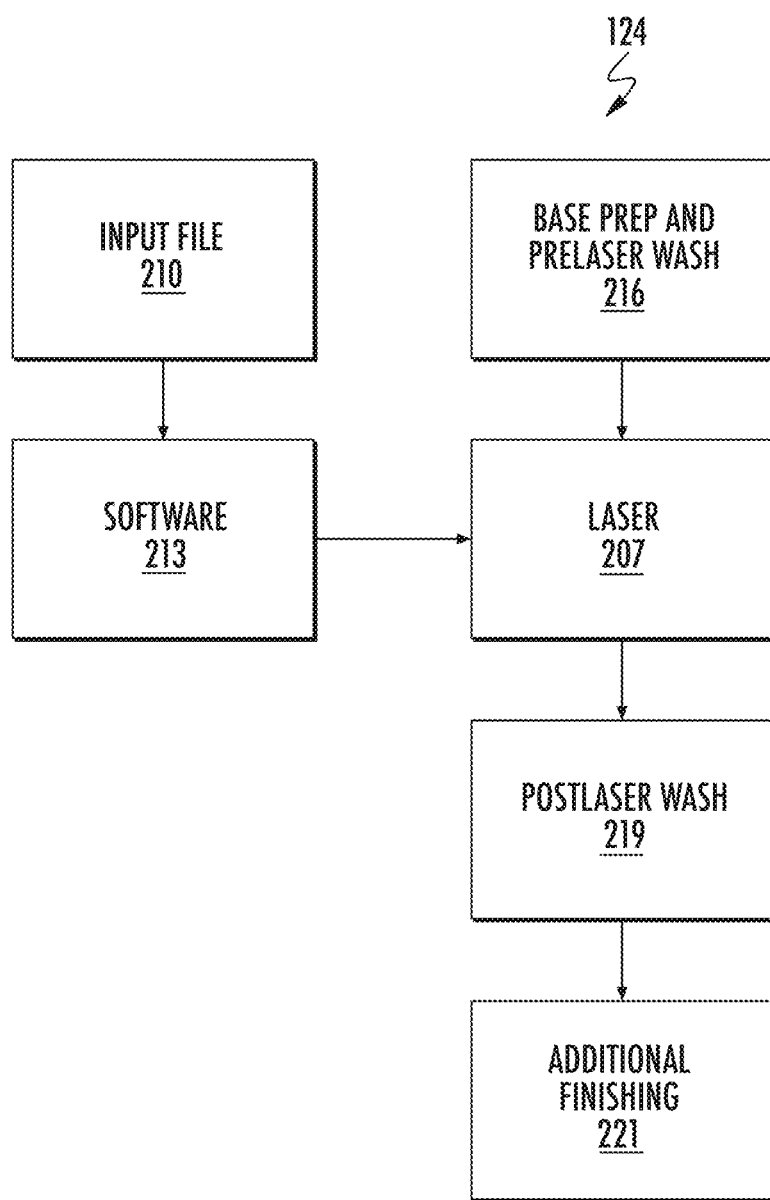
FIG. 2 shows a finishing technique that includes the use of a laser.

FIG. 2 shows a finishing technique that includes the use of a laser 207. A laser is a device that emits light through a process of light amplification based on the stimulated emission of electromagnetic radiation from lasing elements (e.g., gas molecules, atoms in a crystal lattice, or organic molecules). Lasers are used for bar code scanning, medical procedures such as corrective eye surgery, and industrial applications such as cutting and welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or other characteristics. Some aspects of the laser that can be controlled include the duty cycle, frequency, marking or burning speed, ablation speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," "burns," or "ablates" a wear pattern (specified by input file 210) onto the garment. The fabric that is exposed to the laser beam (e.g., infrared beam) changes color, lightening the fabric at a specified position by a certain amount based on the laser power, time of exposure, waveform used, or any combination of these laser features. The laser light emitted by a laser is directed from position to position until the wear pattern is completely printed on the garment.

In a specific implementation, the laser beam has a resolution of about 34 dots per inch (dpi), which on the garment is about 0.7 millimeters per pixel. The technique described in this patent is not dependent on the laser beam's resolution, and will work with lasers have more or less resolution than 34 dots per inch. For example, the laser beam can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution of the laser beam can be increased. In an implementation, multiple laser passes are used.

In an implementation, jeans are dyed using an indigo dye, which results in a blue colored fabric. The blue color is caused by chromophores trapped in the fabric which reflect light as a blue color. U.S. patent application 62/433,739, filed Dec. 13, 2016, which is incorporated by reference, describes a denim material with enhanced response characteristics to laser finishing. Using a denim material made from indigo ring-dyed yarn, variations in highs and lows in indigo color shading is achieved by using a laser.

Laser finishing can be used on denim and other materials too. Laser finishing can be used to alter the coloration of any material where the sublimation (or decomposition in some cases) temperature of the dye or the material itself is within range of the operating temperatures of the laser during use. Color change is a product of either the removal of dyestuff or the removal of material uncovering material of another color.

Figure 3:
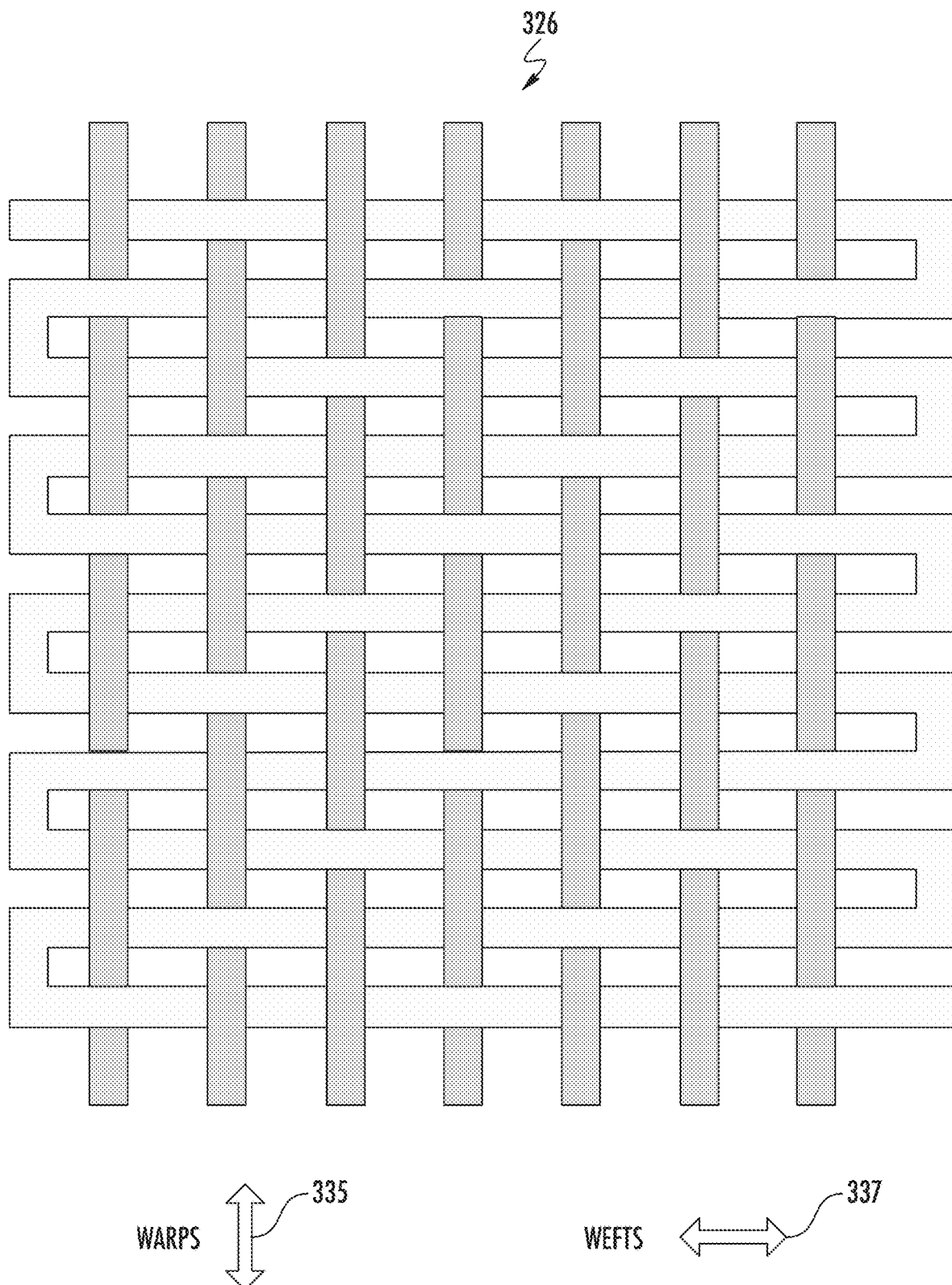
FIG. 3 shows a weave pattern of a denim fabric.

FIG. 3 shows a weave pattern of a denim fabric 326. A loom does the weaving. In weaving, warp is the lengthwise or longitudinal yarn or thread in a roll, while weft or woof is the transverse thread. The weft yarn is drawn through the warp yarns to create the fabric. In FIG. 3, the warps extend in a first direction 335 (e.g., north and south) while the wefts extend in a direction 337 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 3 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from a lower right to an upper left. But in other denim weaves, the weft can pass under a different number of warp threads, such as 3, 4, 5, 6, 7, 8, or more. In other implementation, the denim is a 3×1 right hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So, when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo dyed yarn (e.g., blue color) to reveal a lighter color (e.g., white color) of the inner core of the ring-dyed yarn. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed, burned, or ablated via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

FIGS. 4-7 show how the laser alters the color of ring-dyed yarn. FIG. 4 shows a laser beam 407 striking a ring-dyed yarn 413 having indigo-dyed fibers 418 and white core fibers 422. The laser removes the dyed fibers, which can be by vaporizing or otherwise destroying the cotton fiber via heat or high temperature that the laser beam causes.

FIG. 5 shows the laser using a first power level setting or first exposure time setting, or a combination of these, to remove some of the dyed fibers, but not revealing any of the white core fibers. The undyed fibers remain covered. There is no color change.

FIG. 6 shows the laser using a second power level setting or second exposure time setting, or a combination of these, to remove more of the dyed fibers than in FIG. 5. The second power level is greater than the first power level, or the second exposure time setting is greater than the first exposure time setting, or a combination of these. The result is some of the undyed fibers are revealed. There is a color change, subtle highlighting.

FIG. 7 shows the laser using a third power level setting or third exposure time setting, or a combination of these, to remove even more of the dyed fibers than in FIG. 6. The third power level is greater than the second power level, or the third exposure time setting is greater than the second exposure time setting, or a combination of these. The result is more of the undyed fibers are revealed. There is a color change, brighter highlighting.

As shown in FIG. 2, before laser 207, the fabric can be prepared 216 for the laser, which may be referred to as a base preparation, and can include a prelaser wash. This step helps improves the results of the laser. After the laser, there can be a post-laser wash 219. This wash can clean or remove any residue caused by the laser, such as removing any charring (which would appear as brown or slightly burning). There can be additional finish 221, which may be including tinting, softening, or fixing, to complete finishing.

Figure 8:
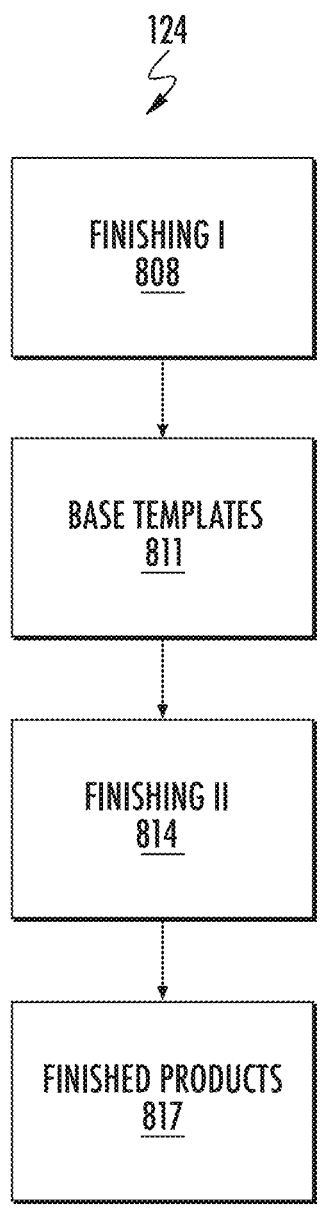
FIG. 8 shows a technique where finishing is divided into two finishing steps, finishing I and finishing II.

FIG. 8 shows a technique where finishing 124 is divided into two finishing steps, finishing I and finishing II. Finishing I 808 is an initial finishing to create base templates 811. With finishing II 814, each base template can be used to manufacture multiple final finishes 817.

Figure 9:
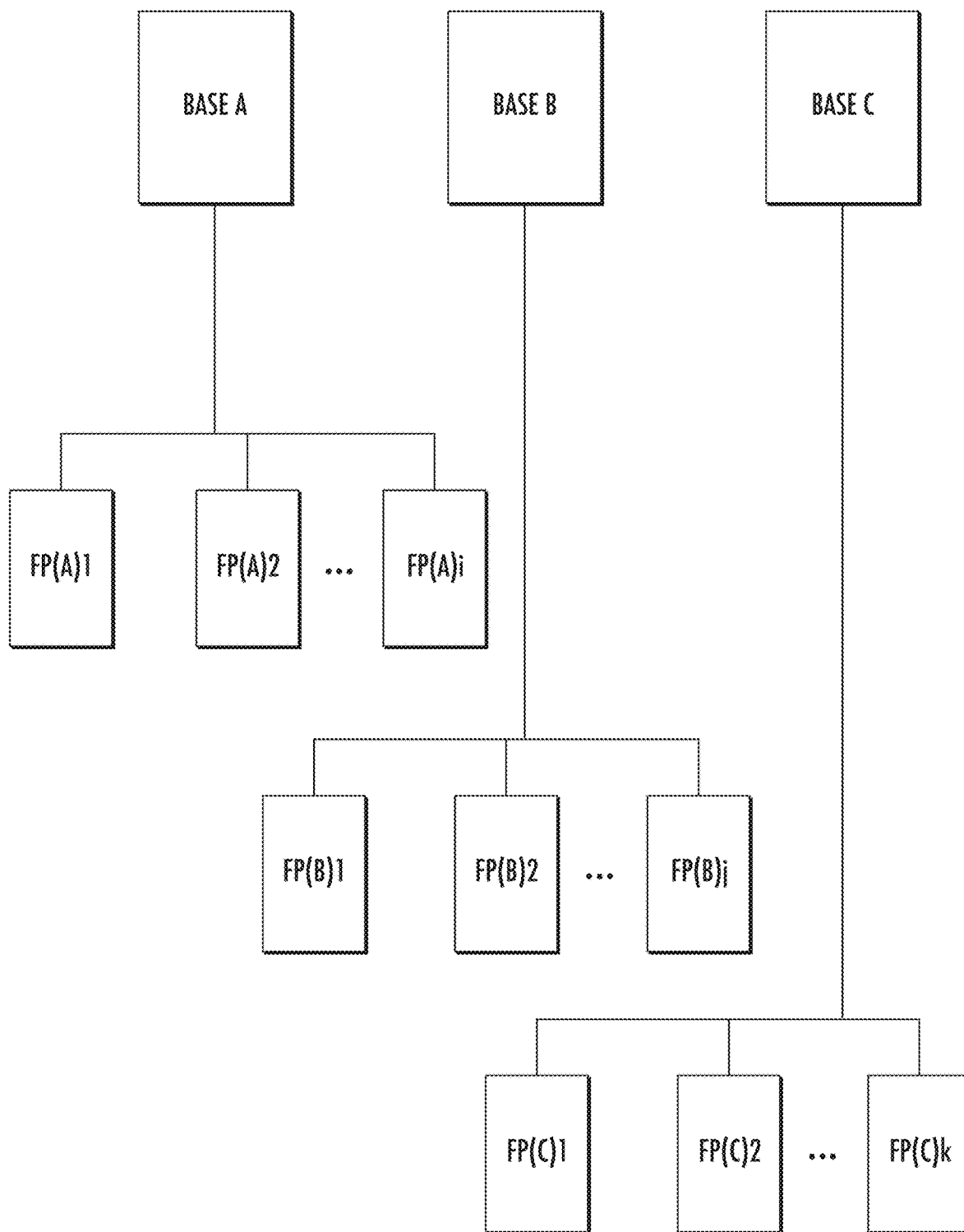
FIG. 9 shows multiple base templates, base A, base B, and base C.

FIG. 9 shows multiple base templates, base A, base B, and base C. These base templates may be referred to as base fit fabrics or BFFs. In an implementation, the base templates can be created during base prep and prelaser wash 216 (see FIG. 2). During finishing I, by using different wash 216 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final product based on base B (e.g., FP(B)1 to FP(B)j, where j is an integer). Base C is lasered with different designs to obtain various final product based on base C (e.g., FP(C)1 to FP(C)k, where k is an integer). Each base can be used to obtain a number of different final designs. For example, the integers i, j, and k can have different values.

As described above and shown in FIG. 2, after finishing II, there can be additional finishing during post-laser wash 219 and additional finishing 221. For example, during the post-laser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each base fit fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabric and finish raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to product any number of different finishes (e.g., eight different finishes), each of which would be considered a different product model.

For example, FP(B)1 can be laser finished using different laser files (e.g., laser file 1, laser file 2, laser file 3, or others) or have different post-laser wash (e.g., post-laser wash recipe 1, post-laser wash recipe 2, post-laser wash recipe 3, or others), or any combination of these. A first product would be base fit fabric FP(B)1 lasered using laser file 1 and washed using post-laser wash recipe 1. A second product would be base fit fabric FP(B)1 lasered using laser file 2 and washed using post-laser wash recipe 1. A third product would be base fit fabric FP(B)1 lasered using laser file 2 and washed using post-laser wash recipe 2. And there can be many more products based on the same base fit fabric. Each can have a different product identifier or unique identifier, such as a different PC9 or nine-digit product code.

With laser finishing, many products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Figure 10:
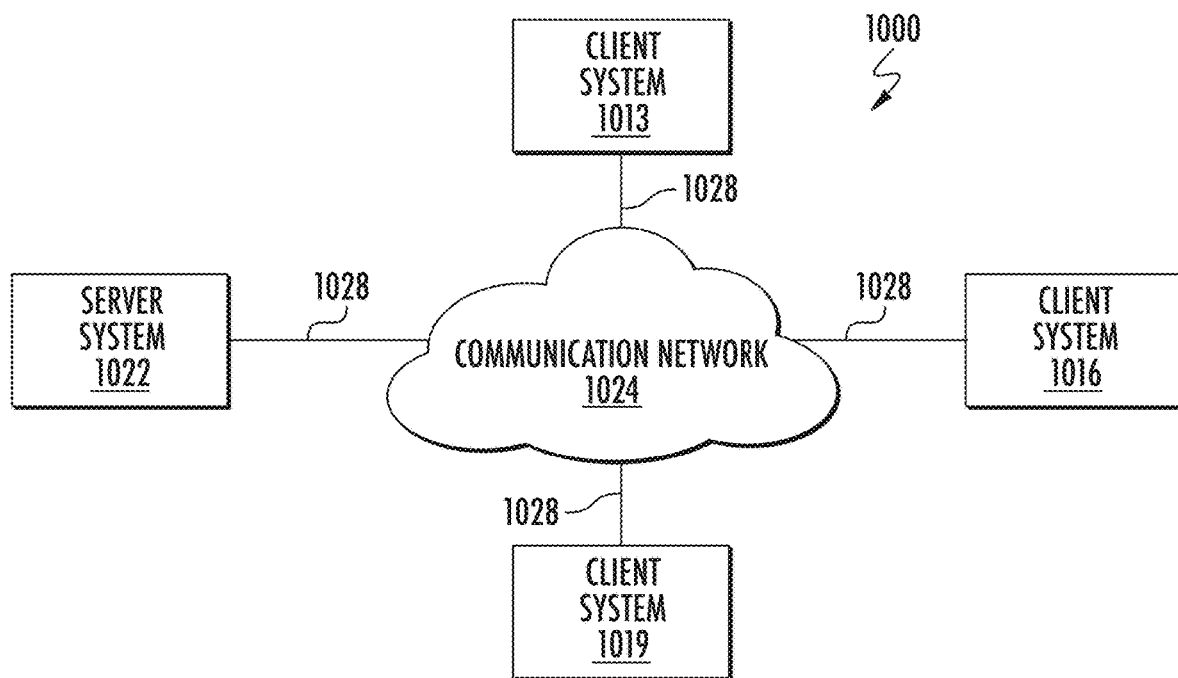
FIG. 10 is a simplified block diagram of a distributed computer network incorporating an embodiment of the present invention.

A system incorporating laser finishing can include a computer to control or monitor operation, or both. FIG. 10 shows an example of a computer that is a component of a laser finishing system. The computer may be a separate unit that is connected to a system, or may be embedded in electronics of the system. In an embodiment, the invention includes software that executes on a computer workstation system or server, such as shown in FIG. 10.

FIG. 10 is a simplified block diagram of a distributed computer network 1000 incorporating an embodiment of the present invention. Computer network 1000 includes a number of client systems 1013, 1016, and 1019, and a server system 1022 coupled to a communication network 1024 via a plurality of communication links 1028. Communication network 1024 provides a mechanism for allowing the various components of distributed network 1000 to communicate and exchange information with each other.

Communication network 1024 may itself be comprised of many interconnected computer systems and communication links. Communication links 1028 may be hardwire links, optical links, satellite or other wireless communications links, wave propagation links, or any other mechanisms for communication of information. Communication links 1028 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 10. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 1000 in FIG. 10 is merely illustrative of an embodiment incorporating the present invention and does not limit the scope of the invention as recited in the claims. One of ordinary skill in the art would recognize other variations, modifications, and alternatives. For example, more than one server system 1022 may be connected to communication network 1024. As another example, a number of client systems 1013, 1016, and 1019 may be coupled to communication network 1024 via an access provider (not shown) or via some other server system.

Client systems 1013, 1016, and 1019 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 1022 is responsible for receiving information requests from client systems 1013, 1016, and 1019, performing processing required to satisfy the requests, and for forwarding the results corresponding to the requests back to the requesting client system. The processing required to satisfy the request may be performed by server system 1022 or may alternatively be delegated to other servers connected to communication network 1024.

Client systems 1013, 1016, and 1019 enable users to access and query information stored by server system 1022. In a specific embodiment, the client systems can run as a standalone application such as a desktop application or mobile smartphone or tablet application. In another embodiment, a "Web browser" application executing on a client system enables users to select, access, retrieve, or query information stored by server system 1022. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 11:
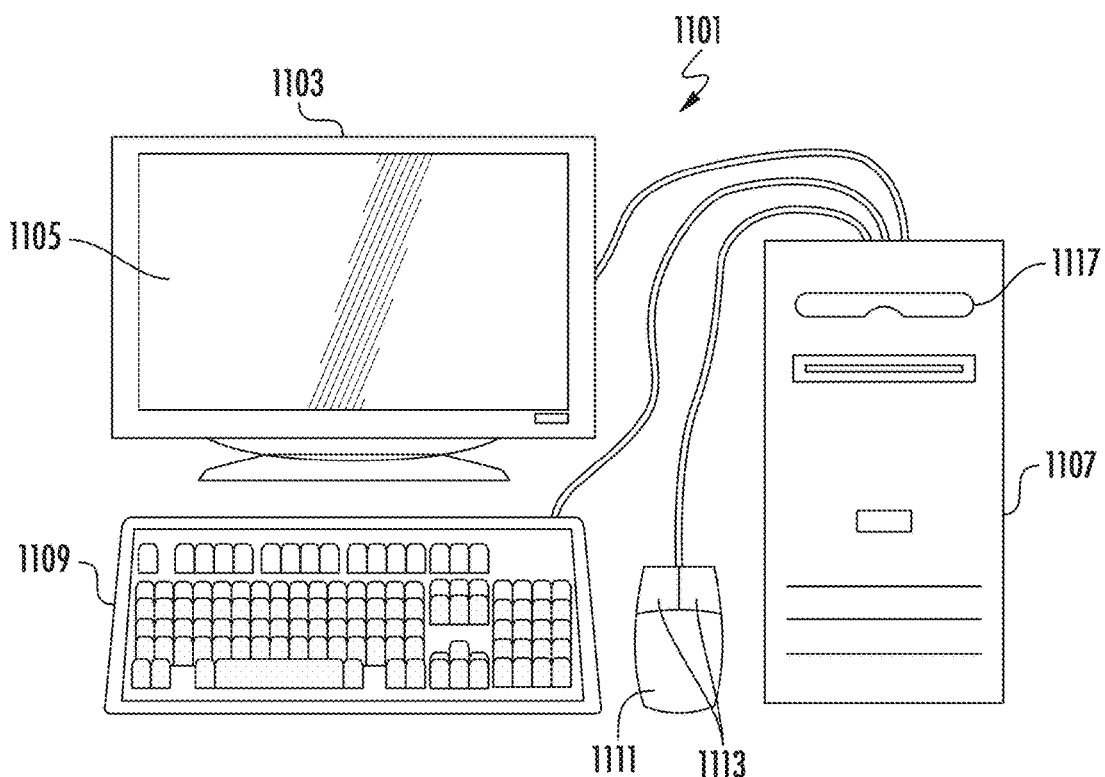
FIG. 11 shows an exemplary client or server system of the present invention.

FIG. 11 shows an exemplary client or server system of the present invention. In an embodiment, a user interfaces with the system through a computer workstation system, such as shown in FIG. 11. FIG. 11 shows a computer system 1101 that includes a monitor 1103, screen 1105, enclosure 1107 (may also be referred to as a system unit, cabinet, or case), keyboard or other human input device 1109, and mouse or other pointing device 1111. Mouse 1111 may have one or more buttons such as mouse buttons 1113.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone X series), Apple iPad (e.g., Apple iPad, Apple iPad Pro, or Apple iPad mini), Apple iPod (e.g., Apple iPod Touch), Samsung Galaxy product (e.g., Galaxy S series product or Galaxy Note series product), Google Nexus and Pixel devices (e.g., Google Nexus series), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 1107 houses familiar computer components, some of which are not shown, such as a processor, memory, mass storage devices 1117, and the like. Mass storage devices 1117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1117. The source code of the software of the present invention may also be stored or reside on mass storage device 1117 (e.g., hard disk, magnetic disk, tape, or CD-ROM). As a further example, code of the invention may be transmitted via wires, radio waves, or through a network such as the Internet.

Figure 12:
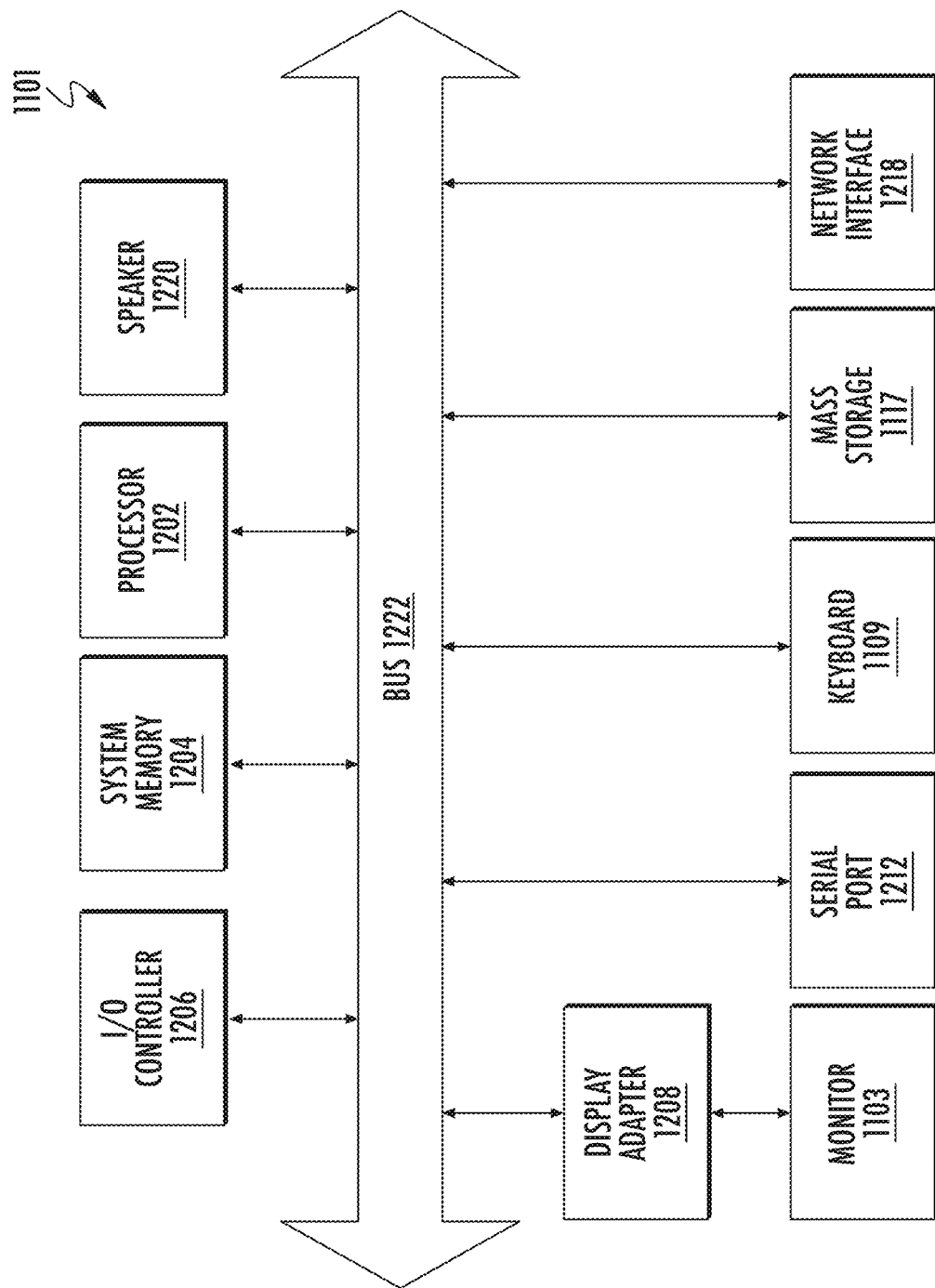
FIG. 12 shows a system block diagram of the computer system shown in FIG. 11 that is used to execute the software of the present invention.

FIG. 12 shows a system block diagram of computer system 1101 used to execute the software of the present invention. As in FIG. 11, computer system 1101 includes monitor 1103, keyboard 1109, and mass storage devices 1117. Computer system 1101 further includes subsystems such as central processor 1202, system memory 1204, input/output (I/O) controller 1206, display adapter 1208, serial or universal serial bus (USB) port 1212, network interface 1218, and speaker 1220. The invention may also be used with computer systems with additional or fewer subsystems. For example, a computer system could include more than one processor 1202 (i.e., a multiprocessor system) or a system may include a cache memory.

Arrows such as 1222 represent the system bus architecture of computer system 1101. However, these arrows are illustrative of any interconnection scheme serving to link the subsystems. For example, speaker 1220 could be connected to the other subsystems through a port or have an internal direct connection to central processor 1202. The processor may include multiple processors or a multicore processor, which may permit parallel processing of information. Computer system 1101 shown in FIG. 12 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Figure 13:
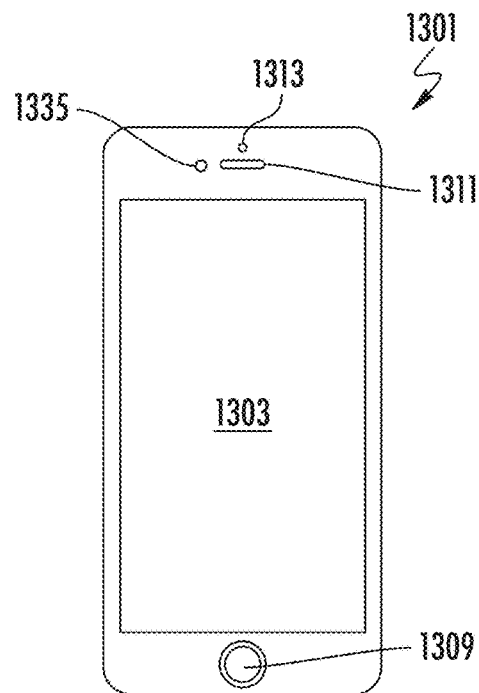
FIGS. 13-14 show examples of mobile devices, which can be mobile clients.
Figure 14:
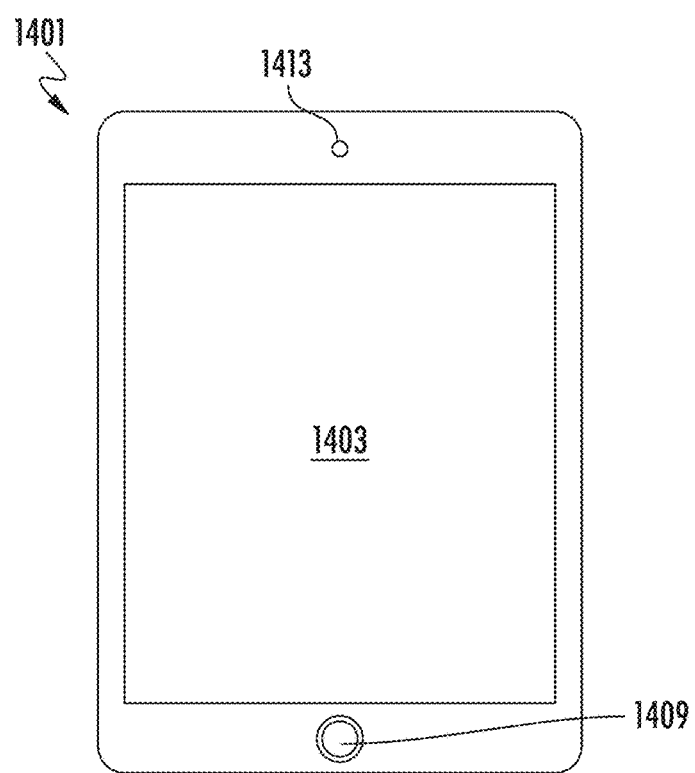

FIGS. 13-14 show examples of mobile devices, which can be mobile clients. Mobile devices are specific implementations of a computer, such as described above. FIG. 13 shows a smartphone device 1301, and FIG. 14 shows a tablet device 1401. Some examples of smartphones include the Apple iPhone, Samsung Galaxy, and Google Nexus family of devices. Some examples of tablet devices include the Apple iPad, Apple iPad Pro, Samsung Galaxy Tab, and Google Nexus family of devices.

Smartphone 1301 has an enclosure that includes a screen 1303, button 1309, speaker 1311, camera 1313, and proximity sensor 1335. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 1309 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 1401 is similar to a smartphone. Tablet 1401 has an enclosure that includes a screen 1403, button 1409, and camera 1413. Typically the screen (e.g., touch screen) of a tablet is larger than a smartphone, usually 7, 8, 9, 10, 12, 13, or more inches (measured diagonally).

Figure 15:
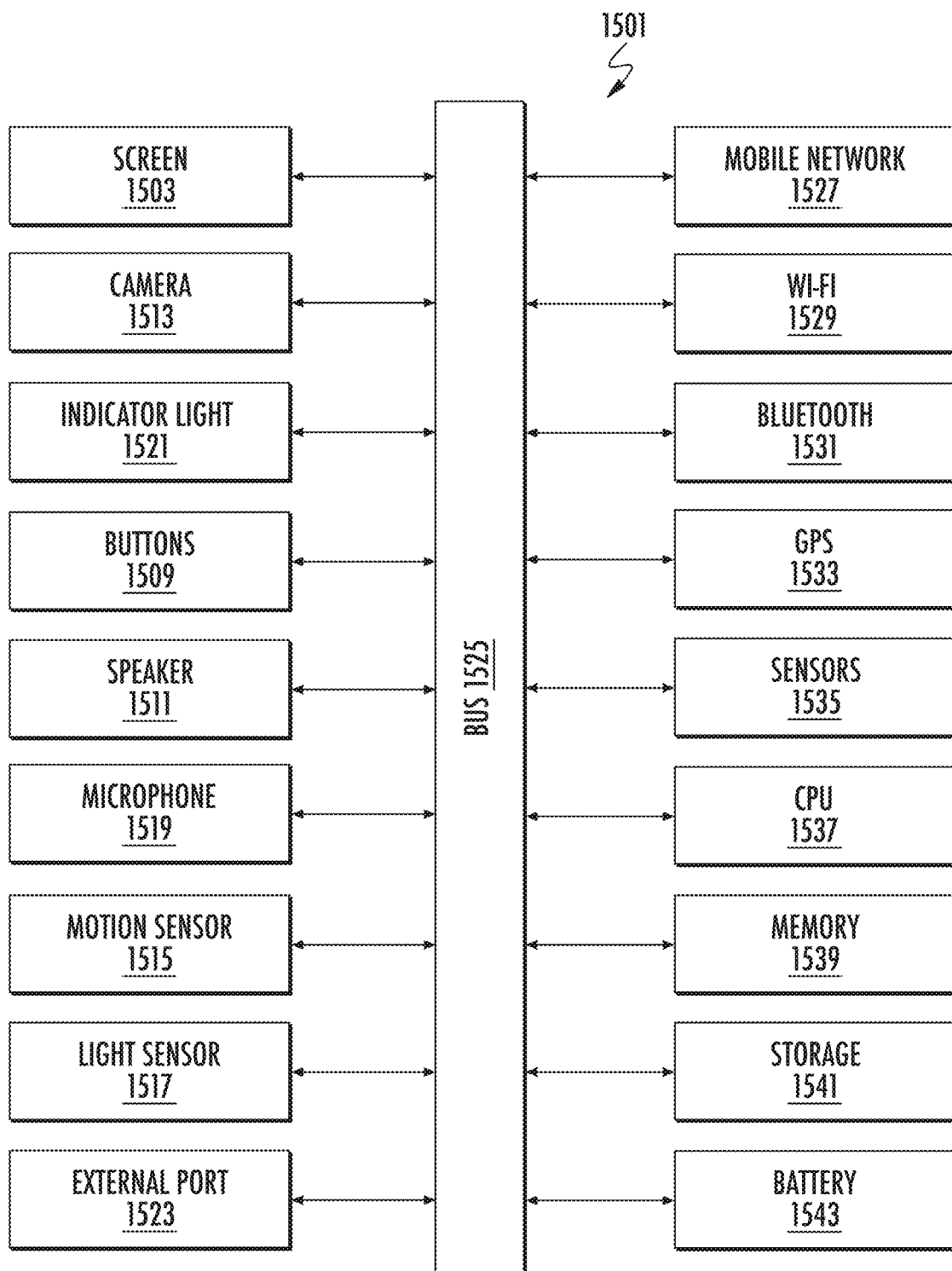
FIG. 15 shows a system block diagram of a mobile device.

FIG. 15 shows a system block diagram of mobile device 1501 used to execute the software of the present invention. This block diagram is representative of the components of smartphone or tablet device. The mobile device system includes a screen 1503 (e.g., touch screen), buttons 1509, speaker 1511, camera 1513, motion sensor 1515, light sensor 1517, microphone 1519, indicator light 1521, and external port 1523 (e.g., USB port or Apple Lightning port). These components can communicate with each other via a bus 1525.

The system includes wireless components such as a mobile network connection 1527 (e.g., mobile telephone or mobile data), Wi-Fi 1529, Bluetooth 1531, GPS 1533 (e.g., detect GPS positioning), other sensors 1535 such as a proximity sensor, CPU 1537, RAM memory 1539, storage 1541 (e.g., nonvolatile memory), and battery 1543 (lithium ion or lithium polymer cell). The battery supplies power to the electronic components and is rechargeable, which allows the system to be mobile.

Figure 16:
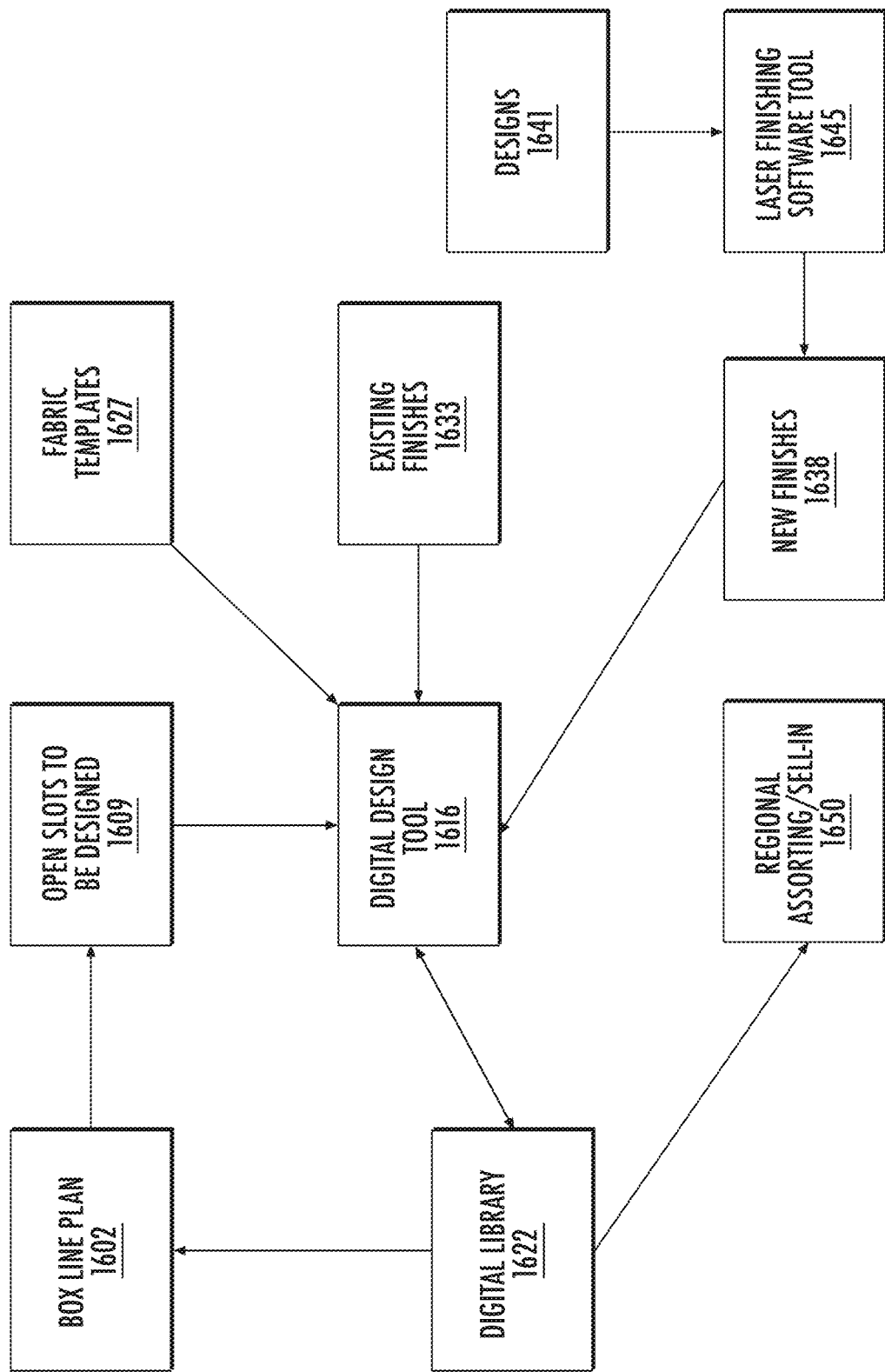
FIG. 16 shows a block diagram of a system for creating, designing, producing apparel products with laser finishing.

FIG. 16 shows a block diagram of a system for creating, designing, producing apparel products with laser finishing. A box line plan 1602 is an internal and interim tool for communication between a merchandising group and design group. Through the box line plan, merchandising can communicate what needs to be designed by the design group. The box line plan can have open slots to be designed 1609.

There is a digital design tool 1616 merchants and design can use to click and drag finish effects (e.g., laser files) and tint casts over images of base washes in order to visualize possible combinations and build the line visually before the garment finish is actually finished by the laser. The visualizations can be by rendering on a computer system, such as using three-dimensional (3D) graphics.

U.S. patent applications 62/433,746, filed Dec. 13, 2016, and Ser. No. 15/841,268, filed Dec. 13, 2017, which are incorporated by reference, describe a system and operating model of apparel manufacture with laser finishing. Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used to produce a multitude of laser finishes. Operational efficiency is improved.

Designers can use the digital design tool to design products that are used to satisfy the requests in open slots 1609. Designs created using the digital design tool can be stored in a digital library 1622. Input to the digital design tool include fabric templates or blanks 1627 (e.g., base fit fabrics or BFFs), existing finishes 1633 (e.g., can be further modified by the tool 1616), and new finishes 1638. New finishes can be from designs 1641 (e.g., vintage design) captured using a laser finish software tool 1645, examples of which are described in U.S. patent applications 62/377,447, filed Aug. 19, 2016, and Ser. No. 15/682,507, filed Aug. 21, 2017. Digital library 1622 can be accessible by the region assorting and sell-in 1650. And the digital library can be used to populate or satisfy the box line plan.

Figure 17:
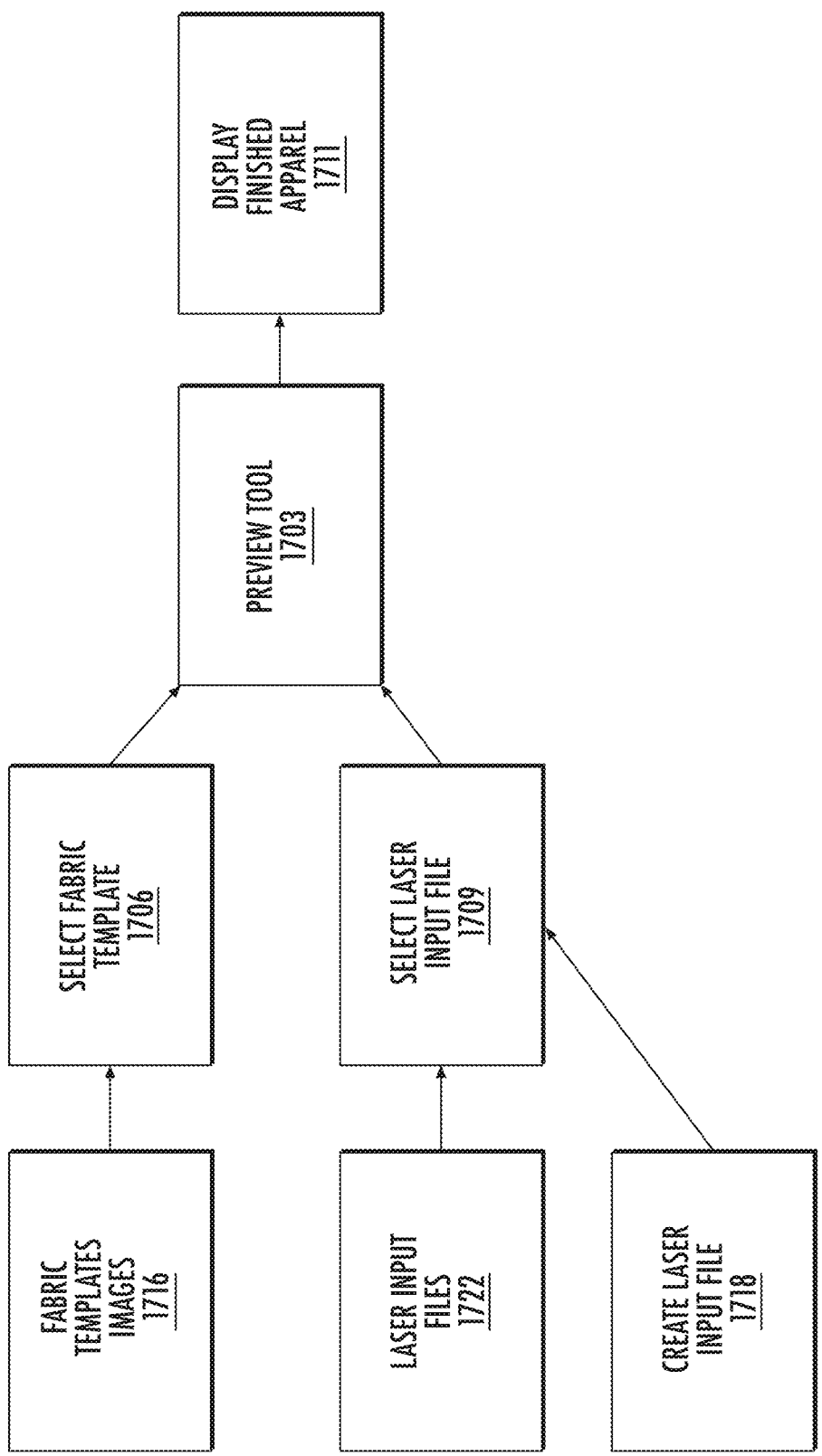
FIG. 17 shows a block diagram of a specific implementation of a digital design tool and a preview tool.

FIG. 17 shows a block diagram of a specific implementation of a digital design tool and a preview tool 1703. Digital design tool 1616 can be representative of a collection of tools, such as an application suite, including desktop or mobile apps, or a combination.

Preview tool 1703 can be a single tool in a toolbox or toolkit used for laser finishing of garments, or the tool can be incorporated as a feature of another tool. The preview tool allows a user such as a clothing designer to preview on a computer screen or to generate a digital representation (e.g., image file, JPEG file, BMP file, TIFF file, GIF file, PNG file, PSD file, or others) of jeans in a selected base fit fabric or fabric template 1706 with a selected laser pattern 1709 (e.g., from a laser input file). With the digital representation, the user will be able to see or preview the jeans in the selected base fit fabric as if it had been burned or ablated with the selected laser input file, without needing to actually laser or burn or ablate the jeans.

Some files are described as being of an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or other display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as bitmap image file or device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

The fabric template can be selected from a library of fabric template images 1716 or may be a new image uploaded or provided by the user. Each fabric template images is an image file of jeans in a base fit fabric or other material. For each jeans model or fit (e.g., models or fits 311, 501, 505, 511, 515, 541, 569, 721, and others), there would be one image in each different material or base fit fabric.

The laser input file can be selected from a library of laser input files 1722 (e.g., files created from vintage jeans or from a group of designers), a file 1718 created by the user, or a file uploaded or provided by the user. For example, the user may have created the laser pattern (contained within a laser input file) manually using a graphical or image editing tool (e.g., Adobe Photoshop and similar photo editing programs). Or the laser pattern may have been created by another, such as selected from a library of laser files. The laser pattern may be generated by a computer or automated process, such as may be used to obtain a laser pattern from vintage jeans. The user will be able to see the results of a burn or ablation, make any manual changes or alterations to the pattern (such as additional changes to a vintage jeans pattern in a digital image file) and preview the results again. The preview tool allows a user to make and see changes, to the user can obtain feedback faster than having to laser jeans to see the results and also avoiding unneeded waste (e.g., preliminary versions of burned or ablated jeans).

Each digital representation can be saved as separate images, and a group or set of the images can be a called brief of collection of jeans. The preview tool can be used for merchandising, such as generating images of a proposed line of products for a particular season, and these images can be shared among members of a team to discuss any additions, changes, or deletions to a collection.

A Table below presents a pseudocode computer program listing of sample software code for a specific implementation of a preview tool 1703 for displaying finished apparel 1711 for a given fabric template input (e.g., base fit fabric image) and laser input file. A specific implementation of the source code may be written in a programming language such as Python. Other programming languages can be used.

TABLE

PREVIEW PATTERN TOOL
SETUP: file selection object

TABLE-continued

```
GET: input file from user selection
ASSIGN: default blur options for high and low settings
ASSIGN: input and conversion dpi settings
FUNCTION: Import File (File List, File Index):
    IMPORT: file being previewed
    COMPUTE AND SET: resolution conversion factor
    CALCULATE: optional resized image for use during preview
    RETURN: input file and resized input file
RUN: Import File (File Fist, File Index)
CREATE: plotting object to display results to user
SETUP: custom colors for preview options
ASSIGN: color and color separation variables
SETUP: graphical user interface interactions buttons, sliders, etc.
FUNCTION: Update (Value):
    READ: current display settings
    CHECK: which user interactions are being changed
    ASSIGN: operation variable value
    PERFORM: user specified operation
    REDRAW: plot of image preview to user
FUNCTION: Reset (Event):
    RESET: all default settings for image preview
FUNCTION: Change Color (color):
    SET: color of base color for preview
    REDRAW: plot of image preview to user
PLOT: current state of file object
```

A specific version of the preview tool overlays a fabric template input file and a laser input file, and then generates an image to display them together as a representation of the laser-finished apparel. The laser input file is aligned to the garment in the fabric template input file, so that the positioning of features in the laser input file are at appropriate positions or places on the garment. The alignment may be by using alignment marks that are in the input files. The alignment may be an automated alignment or scaling, or a combination.

Brightness, intensity, opacity, blending, transparency, or other adjustable parameters for an image layer, or any combination of these, are selected or adjusted for the laser input file, so that when the laser input file is overlaid above the fabric template image, the look of the garment will appear of simulate the look of a garment had been burned or ablated by a laser using that laser input file.

Adjustable parameters such as opacity can be used to blend two or more image layers together. For example, a layer's overall opacity determines to what degree it obscures or reveals the layer beneath it. For example, a layer with 1 percent opacity appears nearly transparent, while one with 100 percent opacity appears completely opaque.

Further, a dots per inch (dpi) of the combined image can be adjusted to more properly simulate the look of a garment more closely with a burned or ablated garment. Dots per inch refers to the number of dots in a printed inch. The more dots, the higher the quality of the print (e.g., more sharpness and detail). By reducing the dpi of the image, this will reduce the image quality, resulting a blurring of the image. In an implementation, the preview tool reduces a dpi of the combined image, to be of less dpi than the fabric template input file or the laser input file. By blurring the preview image, this results in improved simulation that corresponds better to a burned or ablated laser garment. When burning or ablated a garment, the garment material or fabric typically limits the resolution of the result to less than that of the input file.

In an implementation, the dpi of the laser input file is about 72 dpi, while the dpi of the preview image is about 34 dpi. In an implementation, the dpi of the fabric template input file and laser input file are about 36 dpi or above, while the dpi of the preview image is about 36 dpi or lower.

Figure 18:
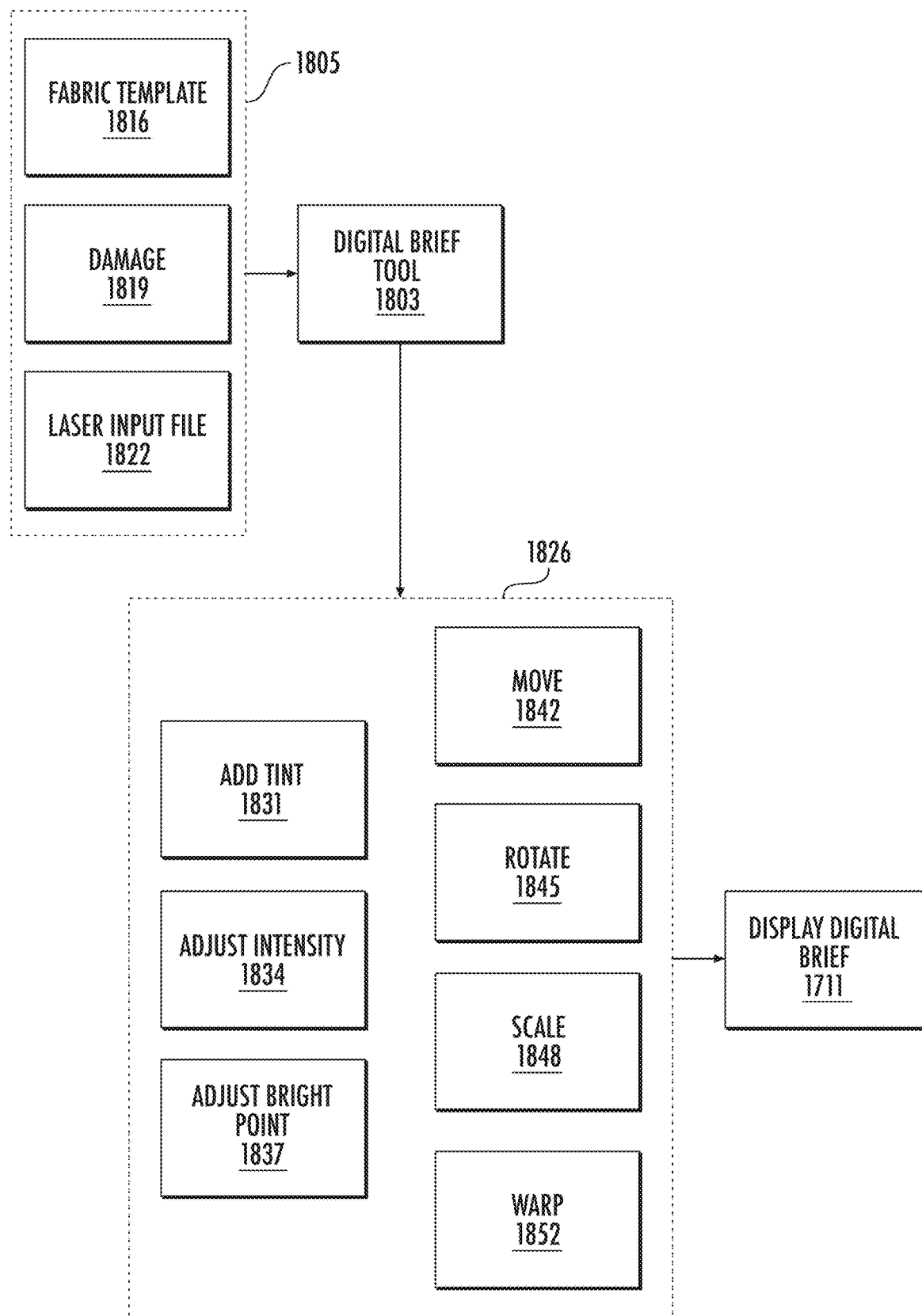
FIG. 18 shows a block diagram of a digital brief tool that provides a real-time preview of an appearance of pair of jeans when a finishing pattern is applied by burning or ablating using a laser input file.

FIG. 18 shows a block diagram of a digital brief tool 1803, which also like preview tool 1703, provides a real-time preview of an appearance of pair of jeans when a finishing pattern is applied by burning or ablated using a laser input file. The digital brief tool has additional features to allow more flexible designing of jeans.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

The digital brief tool takes as input three types of digital assets 1805, fabric template input 1816, damage input 1819 (e.g., damage input file), and laser input file 1822. Fabric template input 1816 and laser input file 1822 are similar to the inputs for the preview tool. Damage input 1819 is an image of damage (e.g., holes, rips, shredded regions, or openings of various shapes and sizes) that can be burned or ablated by a laser into jeans. The digital brief tool overlays the damage and laser input files over the fabric template.

The user selects a fabric template input, which an image of a jeans style in a particular base fit fabric. The user can optionally select one or more damage inputs. If a damage input is selected, the damage input will be a layer that overlays the fabric template layer. As for the preview tool, the user selects a laser input file with laser pattern and overlays the fabric template layer. As the user selects the inputs, the user will be able to see in real time the inputs and any changes or updates in a preview image or brief.

After the inputs are selected, the user can select and perform one or more operations 1826 on the inputs using the digital brief tool. These operations including adding tint 1831, adjusting intensity 1834, adjusting bright point 1837, move digital asset 1842, rotate digital asset 1845, scale digital asset 1848, and warp digital asset 1852. As the user selects and performs one or more operations, the user will be able to see in real time the changes or updates in the preview image or brief.

After the fabric template input, the user can add tinting 1831. Tinting will adjust the hue of the color of the fabric template input. Tinting is representative of the tinting which can be added during the post-laser wash or finishing II, described above. The user will be able to select a tint color, and this tint color will be blended with the existing color of the fabric template input. The amount or intensity of the tinting can be increased or decreased, such as by using a slider bar.

The user can adjust intensity 1834. In an implementation, intensity adjusts a weight matrix by a percentage of each value in the array. In an implementation, intensity (or brightness) adjusts an opacity of a generated adjustment layer (see hue saturation lightness adjustment layer described below). The greater the opacity, the more opaque this layer will appear in the preview or brief image. The less the opacity, the less opaque this layer will appear in the preview or brief image; the layer will appear more transparent so that the layer beneath will show through more.

When increasing brightness, the opacity of the adjustment layer increases, and since the adjustment layer is above the fabric template input, the generated adjustment layer will become more prominent or visible, thus making this layer (which has the wear pattern) brighter. Similarly, when decreasing brightness, the opacity of the adjustment layer decreases, the generated adjustment layer will become less prominent or visible, thus making this layer (which has the wear pattern) less bright or fainter. The amount of the intensity can be increased or decreased, such as by using a slider bar.

The user can adjust bright point 1837. Bright point adjusts the effect of the laser input file on the fabric template input. In an implementation, bright point adjustment changes a midpoint of a grayscale, creating a piecewise linear mapping of the pattern file.

Increasing the bright point will increase an effect of the laser pattern (e.g., causing greater laser pattern highlights) in the laser input file on the fabric template input, while decreasing the bright point does the opposite (e.g., diminishing laser pattern highlights). The bright point adjustment can be analogous to changing a pixel time or the time that the laser stays at a particular position for a given input from the laser input file. The amount of the bright point can be increased or decreased, such as by using a slider bar.

The user can move 1842 or reposition a selected digital asset. For example, a damage input (or fabric template or laser file) may be moved to a position desired by the user. The user can rotate 1845 a selected digital asset. For example, a damage input (or fabric template or laser file) may be rotated to any angle relative to the other layers as desired by the user.

The user can scale 1848 a selected digital asset. This scaling can be locked, maintaining the original aspect ratio of the digital asset, or can be unlocked, such that the user can change the aspect ratio. The user can warp 1852 a selected digital asset. With warping, the user can adjust an aspect ratio of a portion of the digital asset differently from another portion. For example, one portion of a damage input (or fabric template or laser file) can be squished (e.g., right and left edges of image pushed toward each other) while another portion is expanded (e.g., right and left edges of image pulled away from each other).

After the user has performed selected operations 1826, the digital brief tool shows an image of the jeans with the laser finishing pattern, including any tinting, damage, or other adjustments, as created by the user. This image can be saved and viewed again later. A user can create multiple designs, and these can be saved together as part of a collection.

Figure 19:
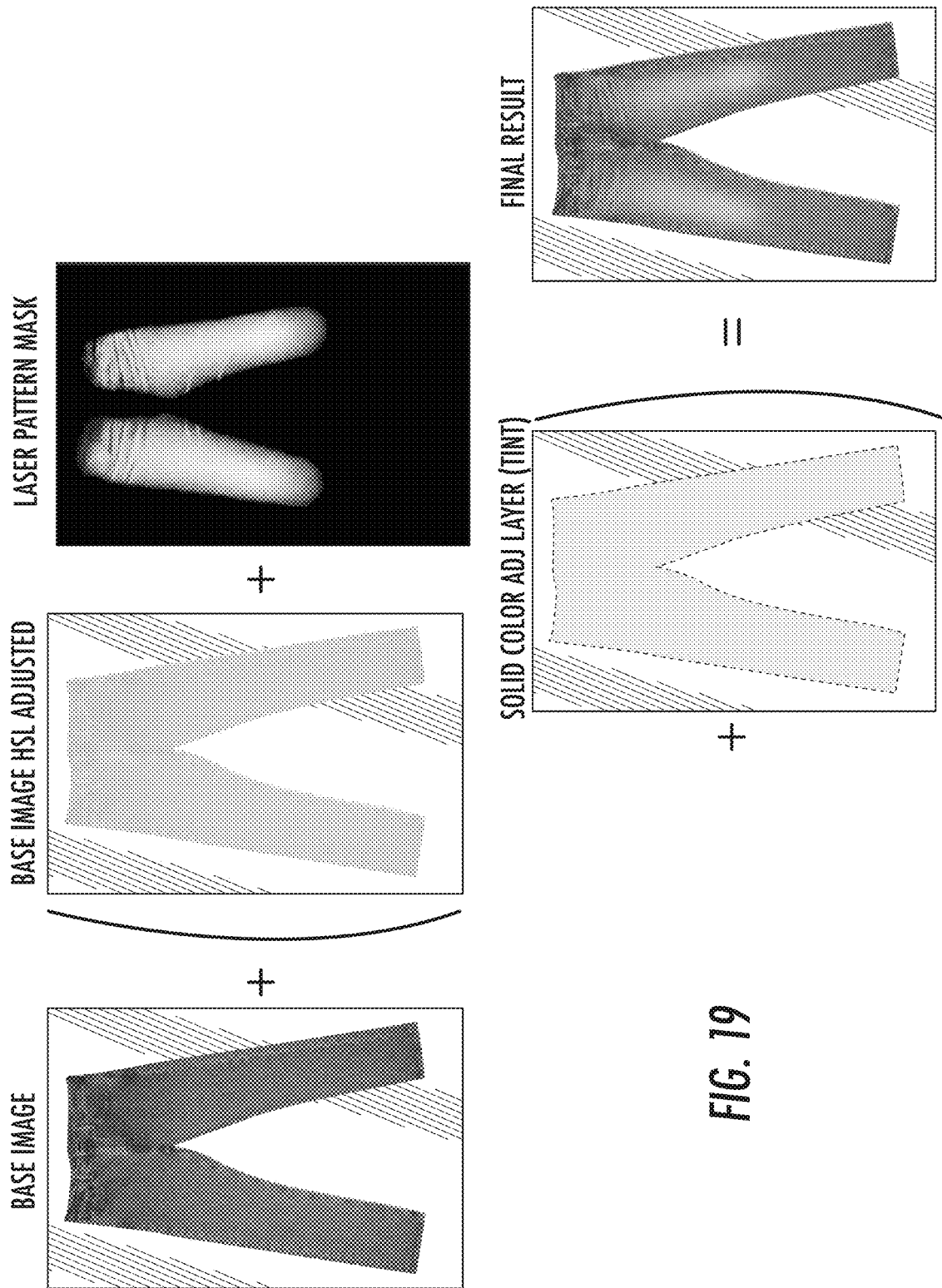
FIG. 19 shows a technique of generating a preview of a finished image using a digital brief tool.

FIG. 19 shows a technique of generating a preview of a finished image using a digital brief tool. A base image (or fabric template input) is selected. A hue saturation lightness (HSL) adjustment layer is created or generated for the selected base image. The HSL adjustment layer can be the base layer with an adjustment for hue saturation lightness. When tinting is selected, a solid color adjustment layer is created or generated.

To obtain a final result, which is the final image of the jeans with laser finishing pattern, a laser pattern mask is combined with the base image and HSL adjustment layer. A resulting combination will be based on intensity and bright point settings.

The laser pattern mask is a negative image or reverse image of the laser input file. For the laser input file, during laser burning or ablating, a white pixel means the pixel is not lasered (which results in the original indigo color of the fabric), and a black pixel means the pixel will be lasered at highest level (which results in the whitest color that can be achieved on the fabric). In an implementation, the laser input file has 256 levels of gray, and for levels between 0 (e.g., black) and 255 (e.g., white), then the amount of laser burning or laser ablating will be proportionally somewhere in between.

FIG. 20 shows a laser pattern mask that is created from a laser input file. The digital brief tool creates the laser pattern mask from the laser input file by reversing the laser input file. So, for the laser pattern mask, a black pixel means the pixel is not lasered (which results in the original indigo color of the fabric), and a white pixel means the pixel will be lasered at highest level (which results in the whitest color that can be achieved on the fabric).

Figure 21:
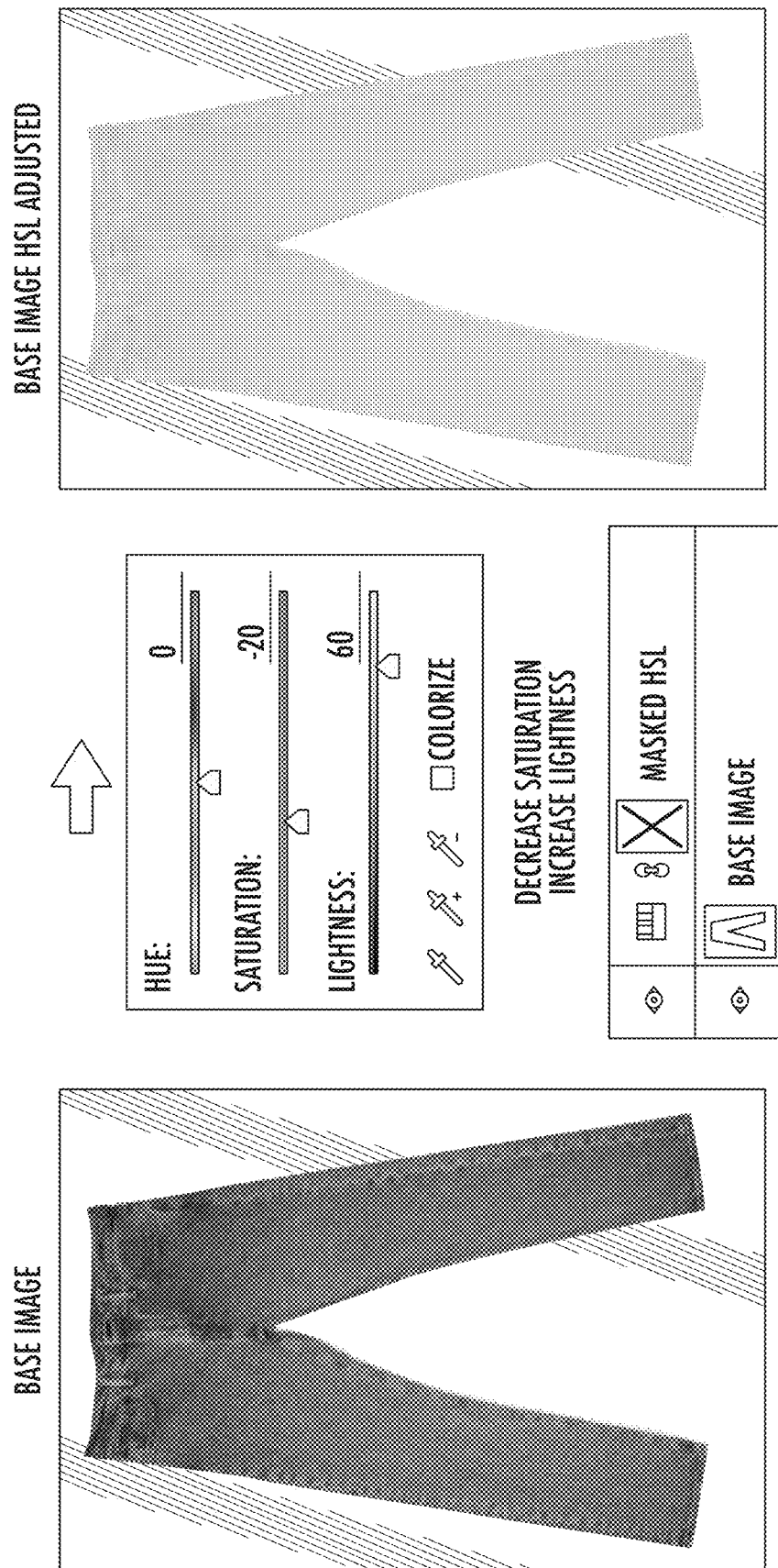
FIG. 21 shows an HLS adjustment layer that is created from the base image.

FIG. 21 shows an HLS adjustment layer that is created from the base image. The HLS adjustment layer (or adjustment layer) is like a bleaching layer, which is an image of what the jeans would appear like if the jeans were fully bleached or lasered. This layer is created by taking the base image and adjusting its hue, saturation, and lightness. In an implementation, for this layer, the saturation is reduced compared to the base layer, and the lightness is increased compared to the base layer. And the hue is not adjusted compared to the base layer.

A technique of the digital brief tool is to combine the base image and adjustment layer based on the laser pattern mask. For a black pixel in the laser pattern mask, the base layer will fully pass (and none of the adjustment layer) through to the final result image. For a white pixel in the laser pattern mask, the adjustment layer (and none of the base layer) will fully pass through to the final result image. For gray pixel values, then a percentage of the base layer and adjustment layer will pass through to the final result image. For example, for a value in the layer pattern mask, 90 percent of the base layer and 10 percent of the adjustment layer pass through to the final result image.

Figure 22:
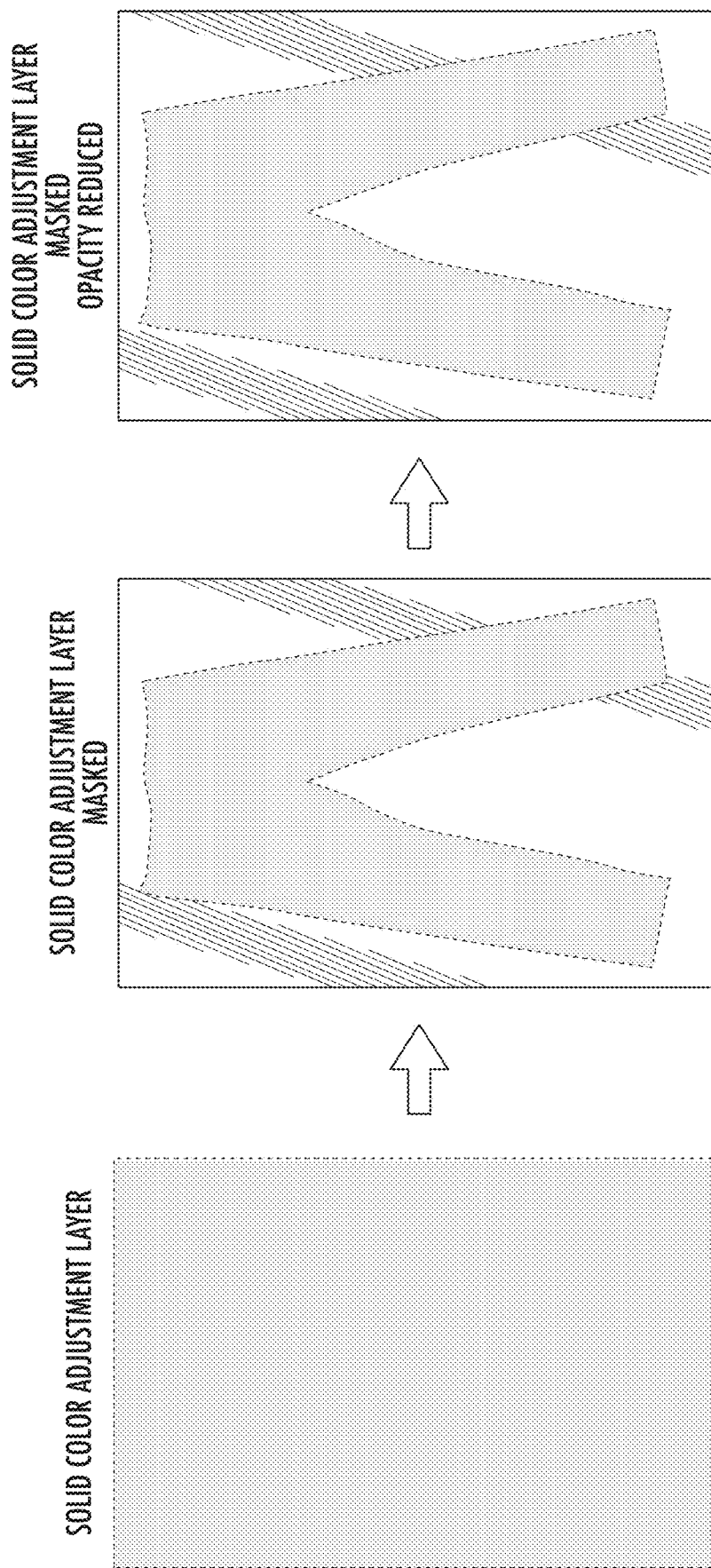
FIG. 22 shows a technique of creating a masked solid color adjustment layer.

FIG. 22 shows a technique of creating a masked solid color adjustment layer. The digital brief tool creates the solid color adjustment layer by creating a layer of a solid color, mask this layer based on the base image, and then create masked solid color adjustment layer. An opacity of the masked solid color adjustment layer can be reduced, so that when combined with the based image, the base image will pass through with some tinting contributed by the masked solid color adjustment layer.

FIGS. 23-24 shows examples of two different adjustments or settings for a bright point operation. Adjusting bright point adjusts a rate of transition from middle gray to white on the layer mask.

Figure 25:
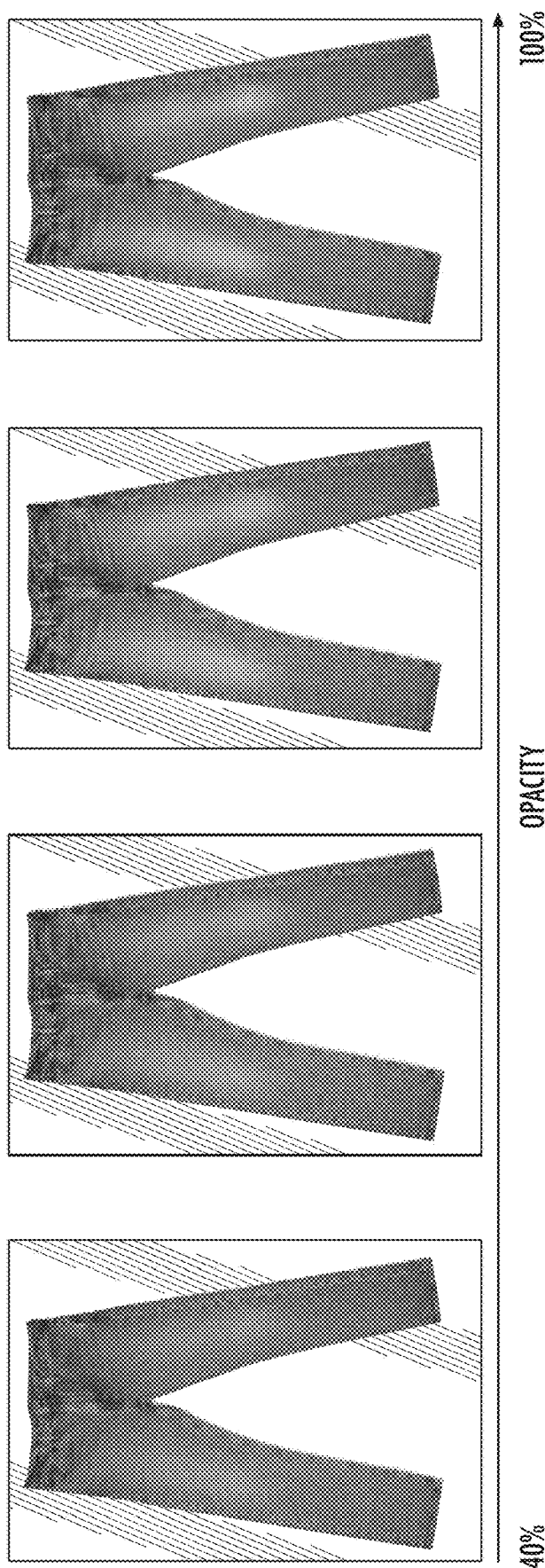
FIG. 25 shows adjustment of intensity.

FIG. 25 shows adjustment of intensity. The intensity adjustment adjusts an opacity (e.g., 40 percent to 100 percent) of an HSL adjustment layer. At 100 percent, the HSL adjustment layer will be fully opaque, and the wear pattern will be very prominent in the brief image or preview.

Figure 26:
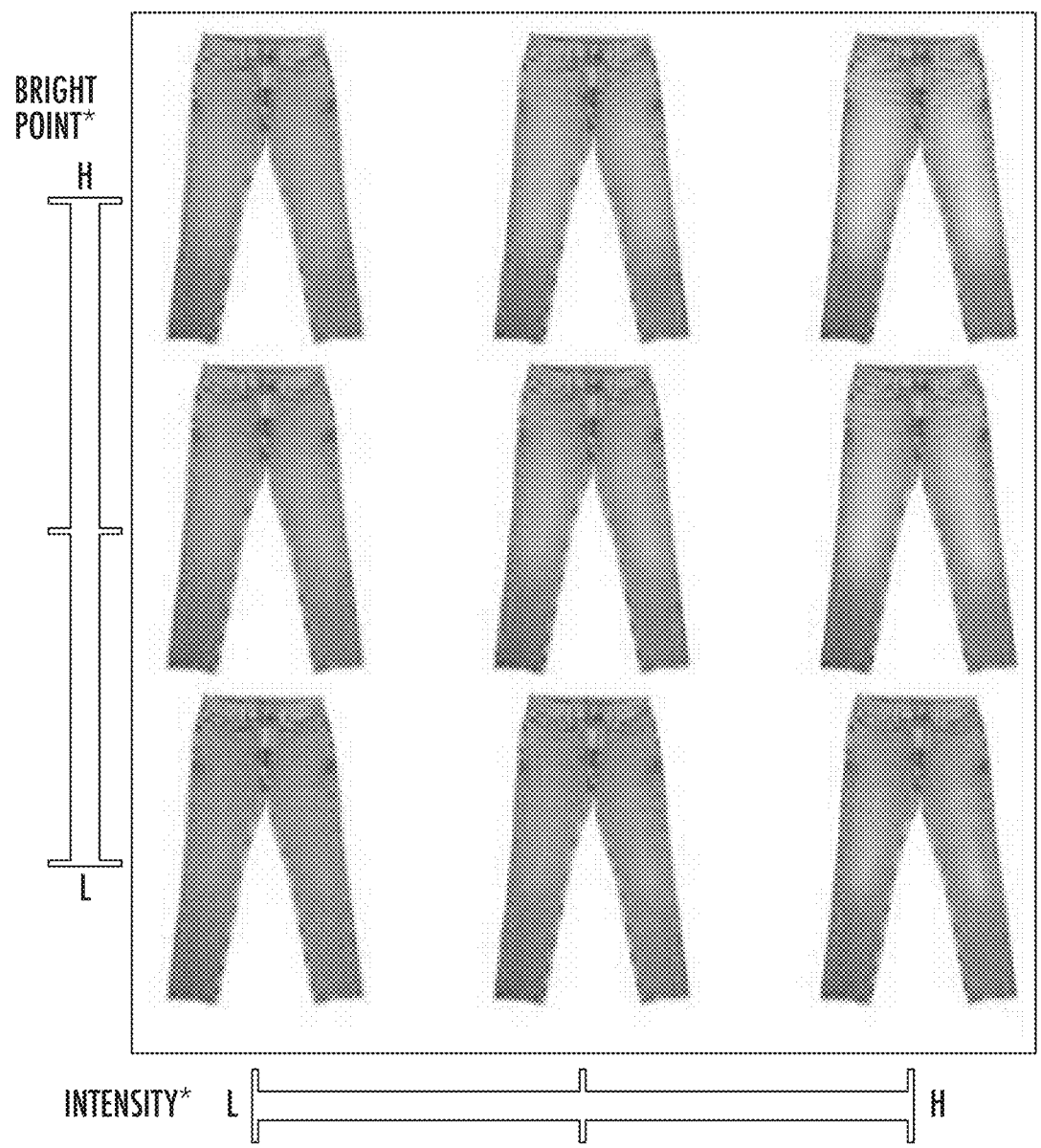
FIG. 26 shows an array of images showing the effects of adjustments in bright point and intensity.

FIG. 26 shows an array of images showing the effects of adjustments in bright point and intensity. Intensity changes are shown in an X or row direction, while bright point changes are shown in a Y or column direction.

For first jeans in the first column (from a left of the array), third row (from a top of the array), the bright point and intensity are both L, indicating the least amount of bright point and intensity. For second jeans in the second column, third row, these jeans have a bright point of L and an intensity between L and H. The wear pattern of the second jeans is more visible than that for the third jeans. For third jeans in the third column, third row, these jeans have a bright point of L and an intensity of H, indicating the greatest amount of intensity. The wear pattern of the third jeans is more visible than that for the second jeans.

For fourth jeans in the third column, second row, these jeans have a bright point between L and H, and an intensity of H. The size or area of the wear pattern of the fourth jeans is larger than that for the third jeans. For fifth jeans in the third column, first row, these jeans have a bright point of H and an intensity of H. The size or area of the wear pattern of the fifth jeans is larger than that for the fourth jeans.

In an implementation, one or more of the base image, the HSL adjustment layer, the laser pattern mask, the solid color adjustment layer (opacity adjusted and non-opacity adjusted), and the final result image are three-dimension images that show how a garment being customized appears in three-dimension at eat of the steps at with image information for these images is combines. Adjustment to the bright point and intensity may be made to intermediary three-dimensional images of garment or final three-dimension images of garments.

Figure 27:
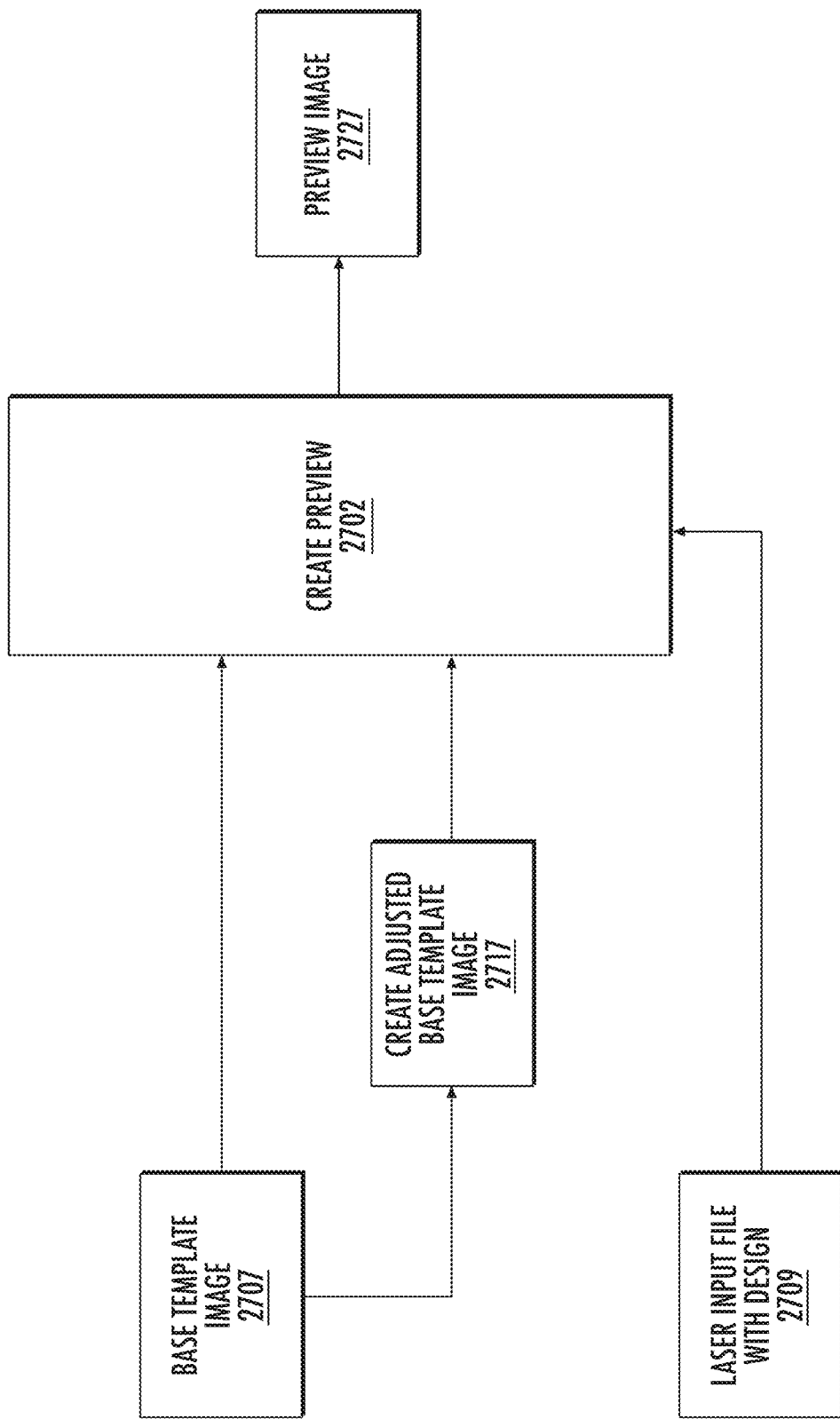
FIG. 27 shows a block diagram of a technique of generating a preview of a laser-finishing pattern on a garment, such as jeans.

FIG. 27 shows a block diagram of a technique of generating a preview of a laser-finishing pattern on a garment, such as jeans. Inputs to a create preview image process 2702 include a base template image 2707 and laser input file 2709. The base template image is used to create an adjusted base template image 2717, which is also input to the create preview image process. These create preview image process uses these three inputs to create a preview image 2727, which can be displayed on a computer screen for the user.

The adjusted base template image is created from the base template image by adjusting its hue, saturation, or lightness, or any combination of these. Compared to the original base template image, the adjusted base template image will appear washed out or bleached. In other words, the adjusted base template image will appear as if the garment in the base template image were fully bleached or lasered. The adjusted base template image can be an HLS adjustment layer as discussed above.

For a specific implementation of a laser, a specification for the laser input file is that each pixel is represented by an 8-bit binary value, which represents grayscale value in a range from 0 to 255. A 0 black prints the highest intensity (i.e., creates the most change and will be the lightest possible pixel) and a 255 white does not print at all (i.e., creates the least change or will be the darkest possible pixel).

For a laser input file for this laser implementation, a reverse or negative image of the laser input file is input to the create preview image process. Based on the negative laser input file, to create each pixel in the preview image, the create preview image process will pass pixels of the base template image or the adjusted base template image, or a combination of these.

For the negative laser input file, a black pixel means the pixel (which was a white pixel in the original file) will not be lasered (which results in the original indigo color of the fabric). And a white pixel means the pixel (which was black in the original file) will be lasered at highest level (which results in the whitest color that can be achieved on the fabric). And for gray pixels between black and white, the result will be proportional to the value, somewhere between darkest and lightest colors.

Similarly, to create the preview image, based the negative laser input file, a pixel of a (1) base template image (e.g., unbleached) or (2) adjusted base template image (e.g., bleached) or (3) some mixture or combination of the base template image and adjusted base template image proportional to the grayscale value in the negative laser input file. For example, for a gray value in the negative laser input file, 60 percent of the base layer and 40 percent of the adjustment layer pass through to the preview image.

The above discussion described a laser input file conforming to one type of logic. However, in other implementations of a laser, the values in the laser input file can be the reverse or negative logic compared to that described above. As one of ordinary skill in the art would appreciate, the techniques described in this patent can be modified accordingly to work with negative or positive logic laser input files.

FIGS. 28-43 show a number of screens for the preview tool 1703 or the digital brief tool 1803, such as for Levi's Customization Studio with Project F.L.X. The screens may be displayed on a client system 1301 or 1401 (e.g., smartphone, tablet computer, desktop computer, or other computer systems) or other system on which the preview tool or digital brief tool is operating. In an implementation, the screens may be for a consumer digital brief tool or a consumer preview tool where the consumer digital brief tool and the consumer preview tool have a more restricted feature set compared to a full or general digital brief tool or a full or general preview tool for a garment designer. A user can interact with the tools via the screens using a human interface device, such as keyboard device or touch screen interface of the client system.

In an implementation, the preview tool is a consumer digital brief tool, such as for Levi's Customization Studio with Project F.L.X. The consumer brief tool may be similar to a full or general digital brief tool for a designer, but may have a more restricted feature set. The consumer digital brief tool allows a consumer user to design apparel that may include a laser finish. The consumer digital brief tool can execute on a device such a computer, electronic tablet (e.g., Apple iPad), or smartphone. The user can interact with the tool using a keyboard device or touch screen interface.

The computer system is adapted to store and run computer code for the preview tool, the digital design tool, the consumer digital design tool, or any combination of these tools. That is, the computer system is adapted to store and run computer code for any of the digital brief tool 1803, operations 1805 associated with the digital brief tool, operations 1826 associated with the digital brief tool, the display digital brief 1711, any combination of these modules and operations, or other modules and operations. These software tools are sometimes referred to as software modules or simply modules. The consumer digital brief tool may be operated in a mobile processing system that can be moved from location to location where consumers can order and purchases garments that they consumers customize using the consumer digital brief tool. A number of mobile systems that includes shipping containers are described below.

Figure 28:
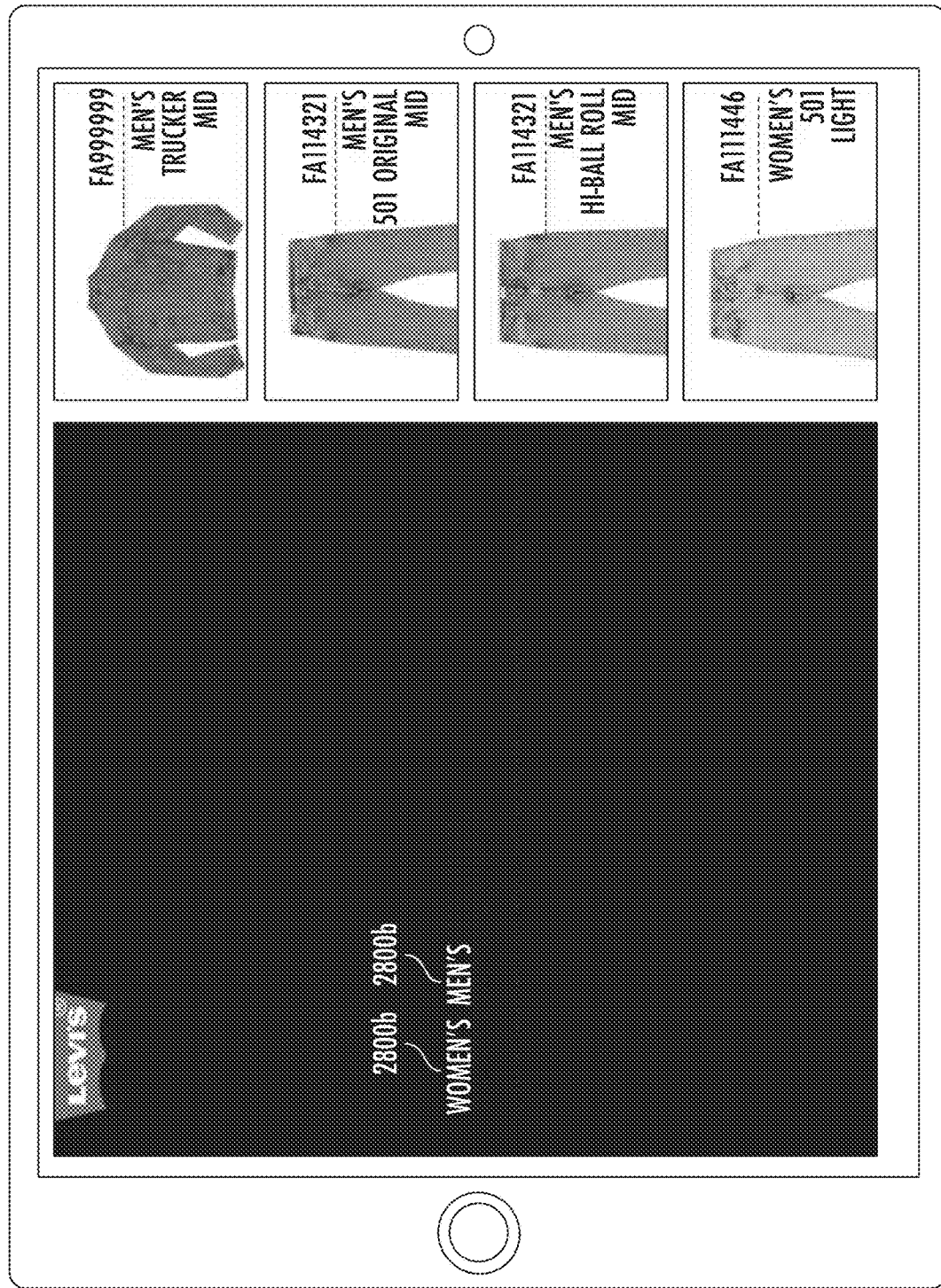
FIGS. 28-29 show screens that includes user selectable options for selecting garments for women or men.
Figure 29:
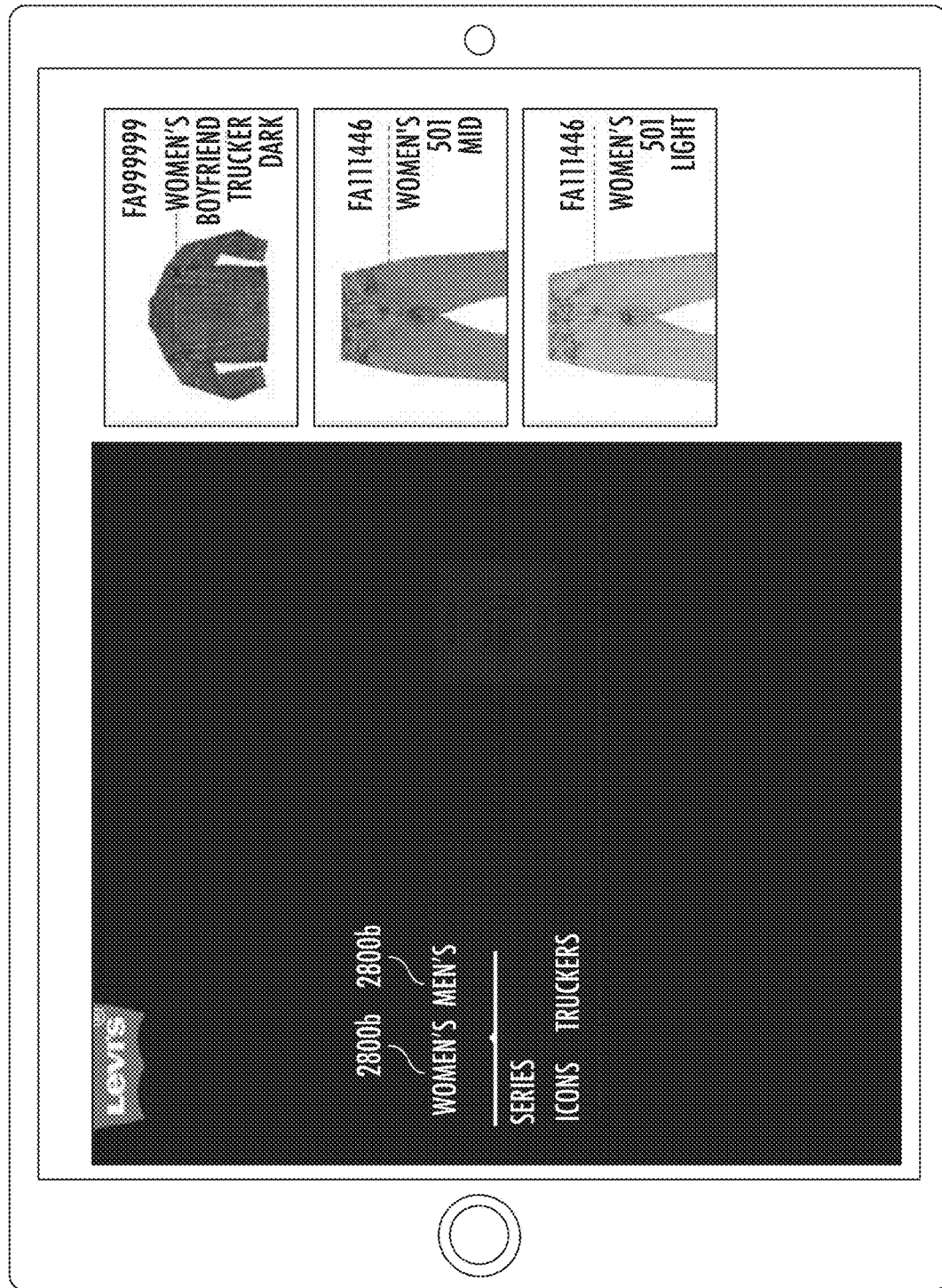

FIGS. 28-29 show screens that include user selectable options 2800a and 2800b for selecting garments for women or men. FIG. 28 shows a screen where garments that can be selected for designing. The garments in the example screen include a trucker jackets and jeans, such as 501 original, hi-ball roll, and 501 light. FIG. 29 shows a screen where garments for women 2800a has been selected and shows various garment that can be selected for customizing. The women's garments in the example screen include a trucker jackets and jeans, such as 501 mid and 501 light. Other garments may be displayed for selection.

Figure 30:
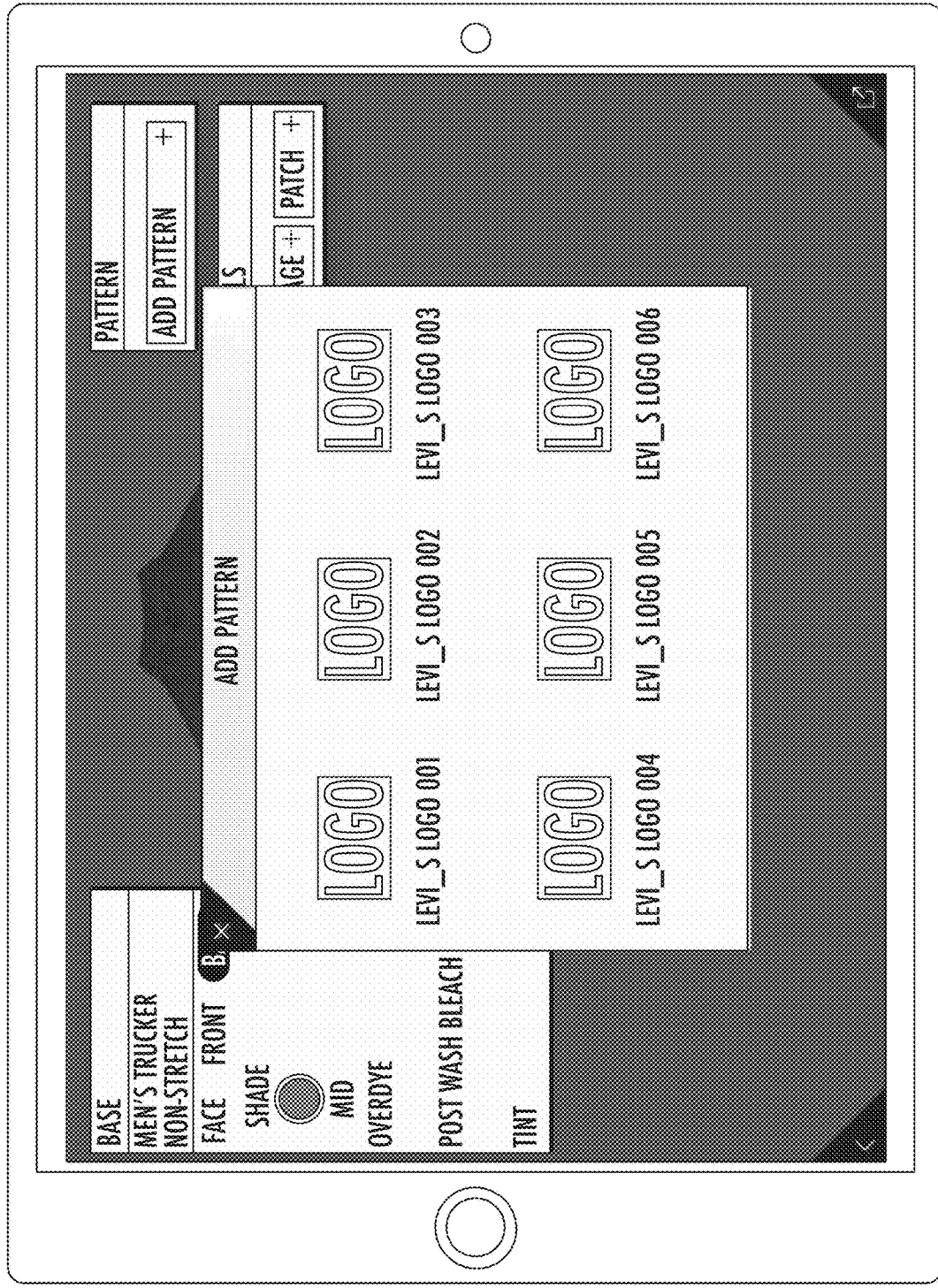
FIG. 30 shows a screen where the user can add a pattern or artwork, such as a logo, to add to a garment.

FIG. 30 shows a screen where the user can add a pattern or artwork, such as a logo, to add to a garment. These pattern or patterns will be applied onto the fabric of the garment by a laser finishing system.

Figure 31:
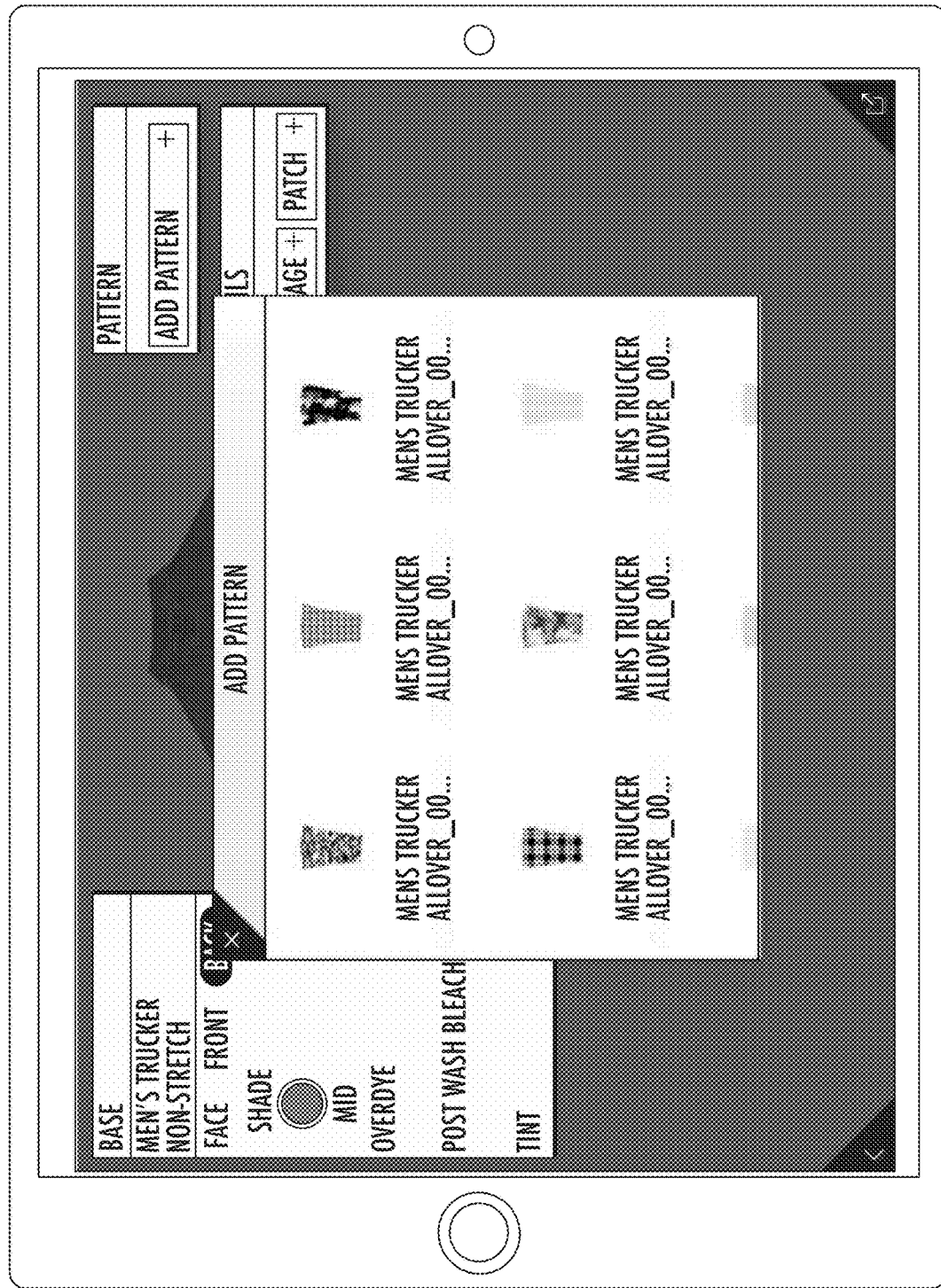

FIG. 31 shows a screen showing additional patterns or artwork, in addition to, for example, logos, the user can select from. For example, these patterns can include camo or camouflage, plaids, stripes, and others. These patterns can be repeated multiple times to extend in multiple directions, to increase the area of coverage on a garment. These pattern or patterns will be applied onto the fabric of the garment by a laser finishing system.

Figure 32:
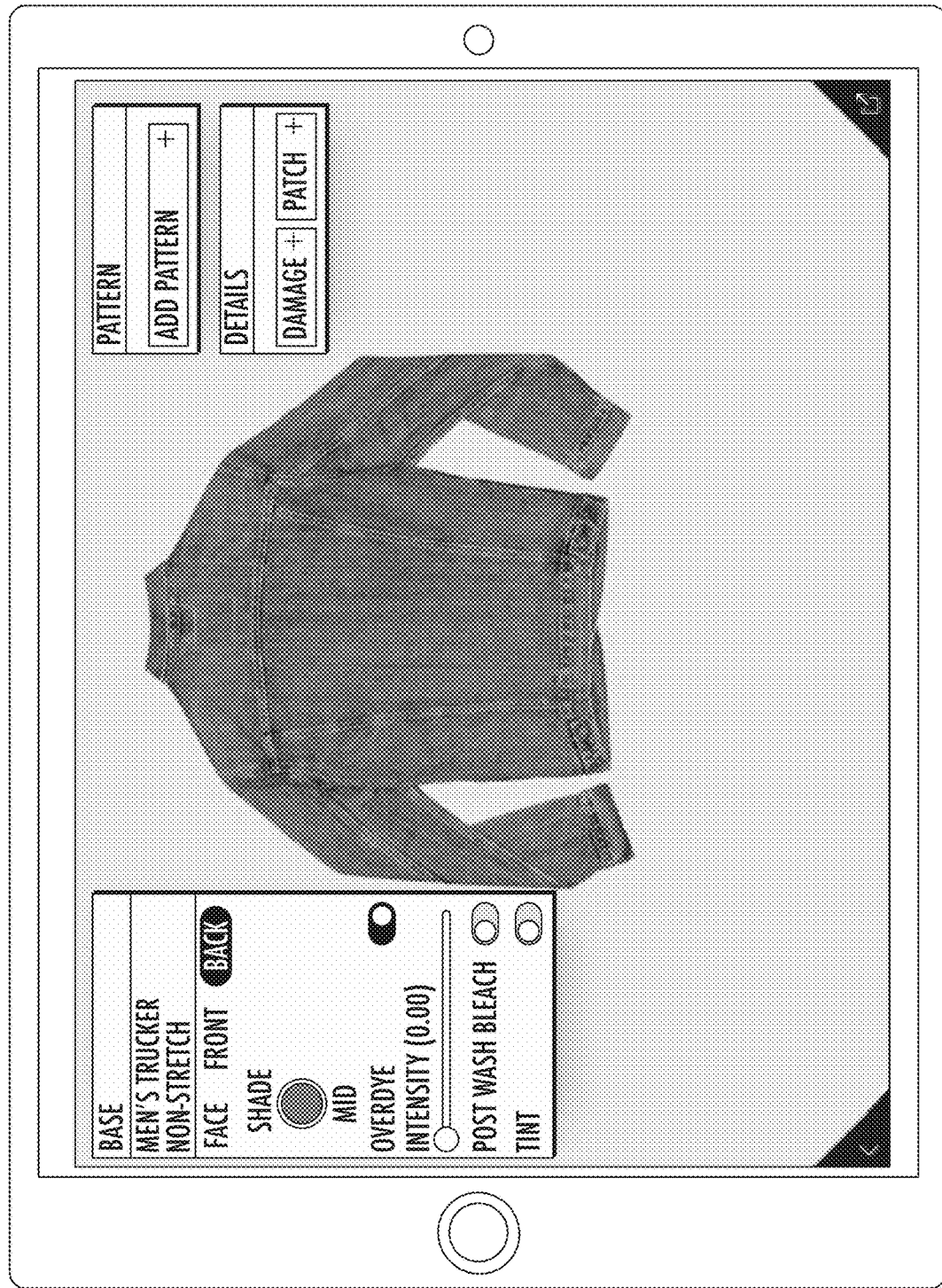
FIG. 32 shows a screen showing a back of a trucker jacket.

FIG. 32 shows a screen showing a back of a trucker jacket. The user can select to view the front or back by selecting the appropriate button in an editing window or interface. Using the consumer digital brief tool, the user is able to see the back side of the garment, for both tops and bottoms. The system can store images in pairs. The user can select the back to digitally flip the garment over.

In the editing interface, the user can make selections as to a shade, overdye, intensity (e.g., a slider bar), post-wash bleach, and tint. In FIG. 32, the user has selected overdye and an intensity of 0.00. As the user makes these selections, the resulting changes to the garment are shown to the user in real time to the user.

Figure 33:
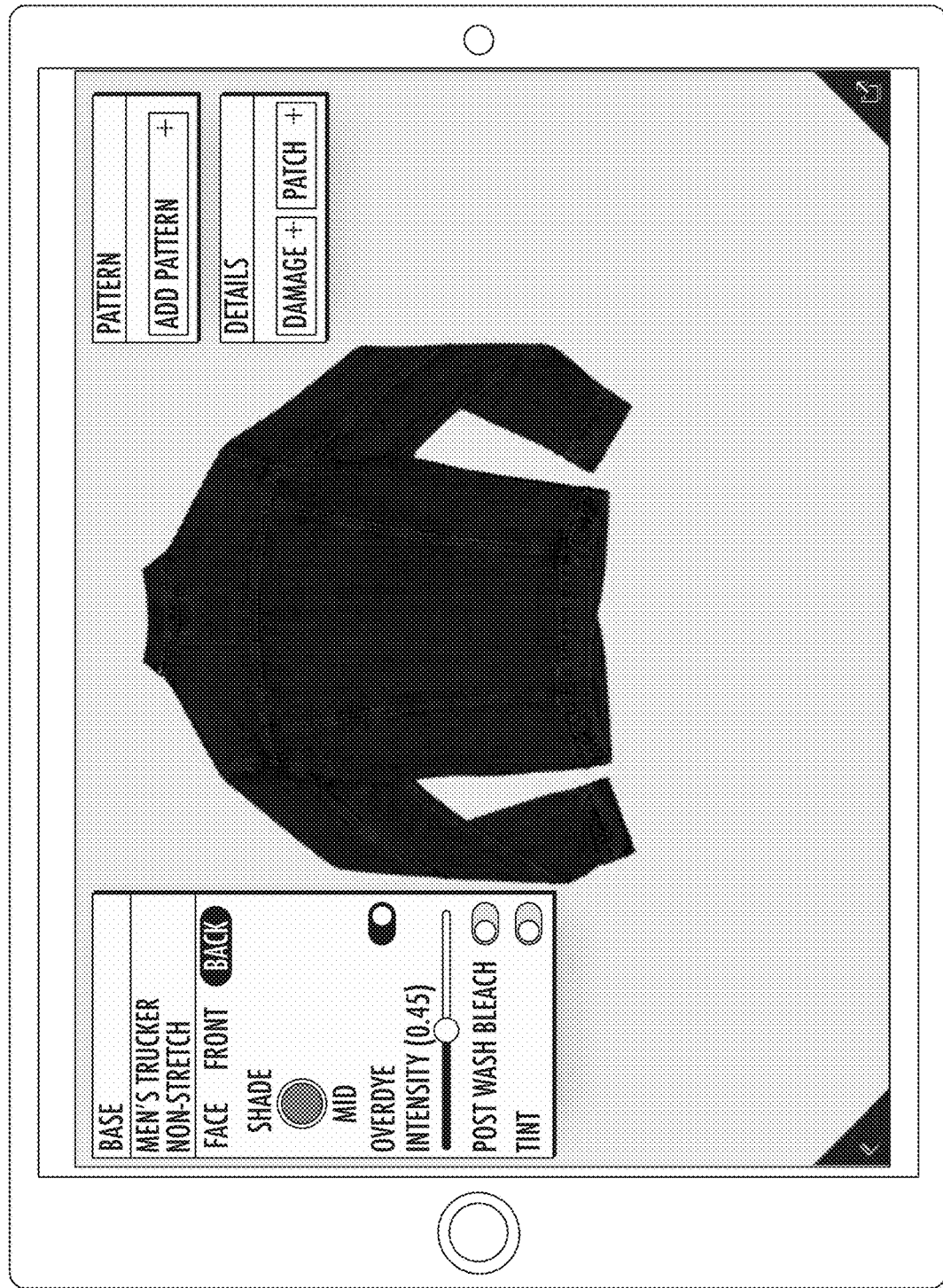
FIG. 33 shows a screen showing a back of a trucker jacket, where overdye is selected and a slider bar for the intensity the shade has been adjusted to 0.45.

FIG. 33 shows a screen showing a back of a trucker jacket, where overdye is selected and a slider bar for the intensity the shade has been adjusted to 0.45. This increases an intensity of the shade, so that the indigo will be a deeper shade. The change in coloration of the back of the trucker jacket is displayed in real time on the screen to the user, as the user adjusts the slider.

Figure 34:
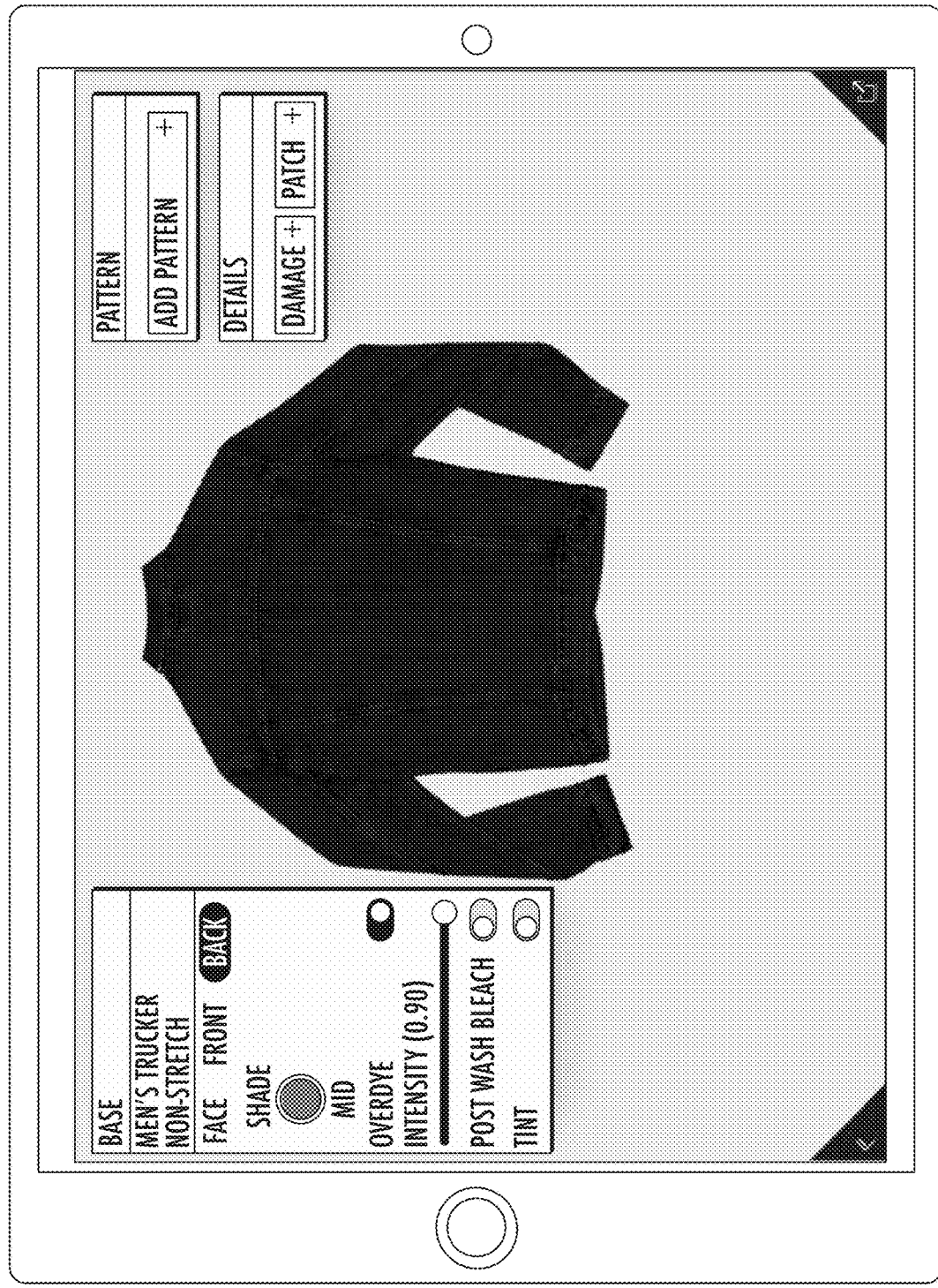
FIG. 34 shows a screen showing a back of a trucker jacket, where overdye is selected and the slider bar for the intensity the shade has been adjusted to 0.90.

FIG. 34 shows a screen showing a back of a trucker jacket, where overdye is selected and the slider bar for the intensity the shade has been adjusted to 0.90. The coloration of the trucker jacket is the deepest shade of indigo that is permitted by the tool. The change in coloration of the back of the trucker jacket is displayed in real time on the screen to the user, as the user adjusts the slider.

Figure 35:
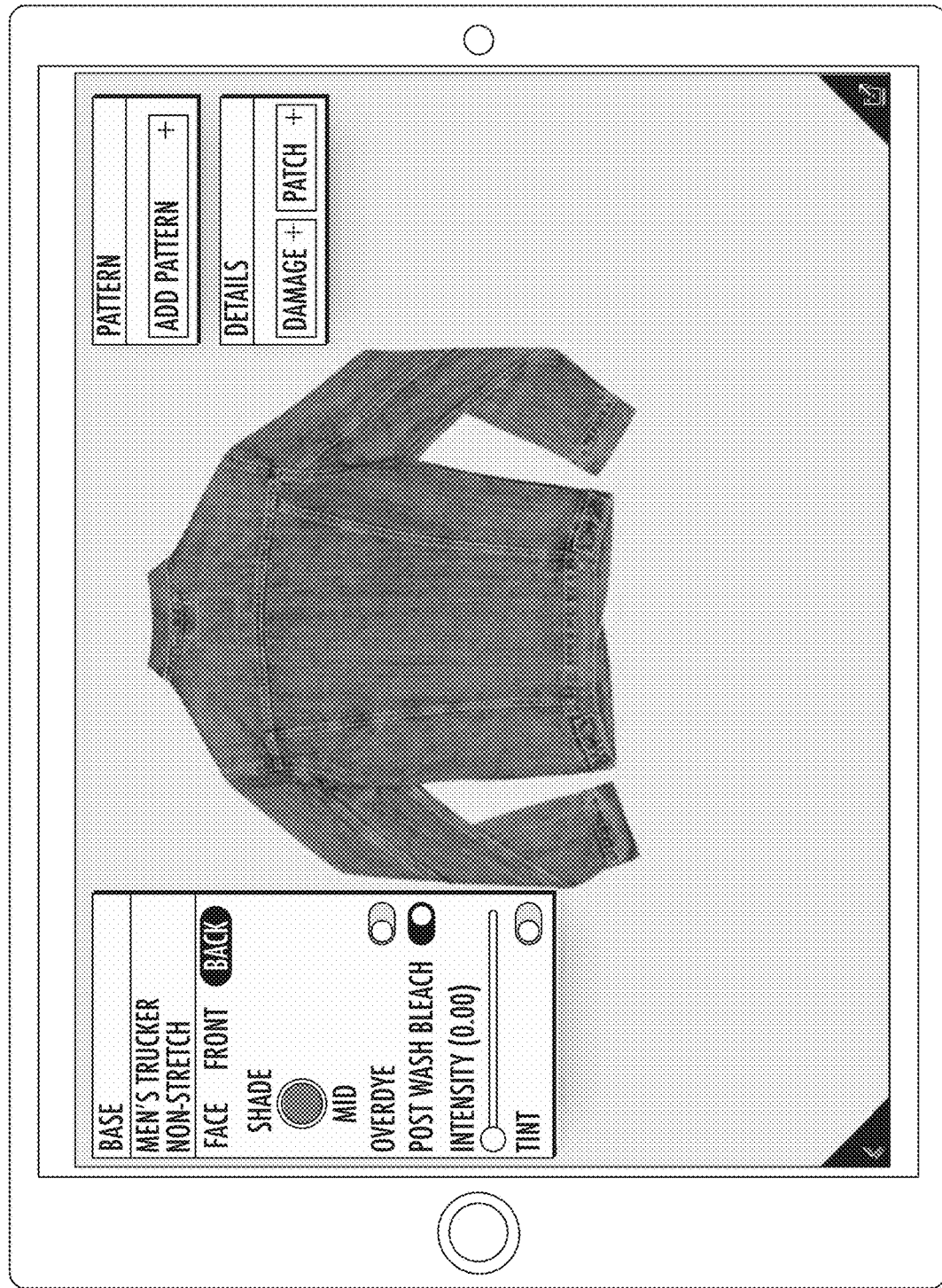

FIG. 35 shows a screen showing back of a trucker jacket, where an option for overdye is turned off and post-wash bleach is turned on. The coloration of the trucker jacket is adjusted in real time, showing the how the back of the jacket will appear after manufacture.

Figure 36:
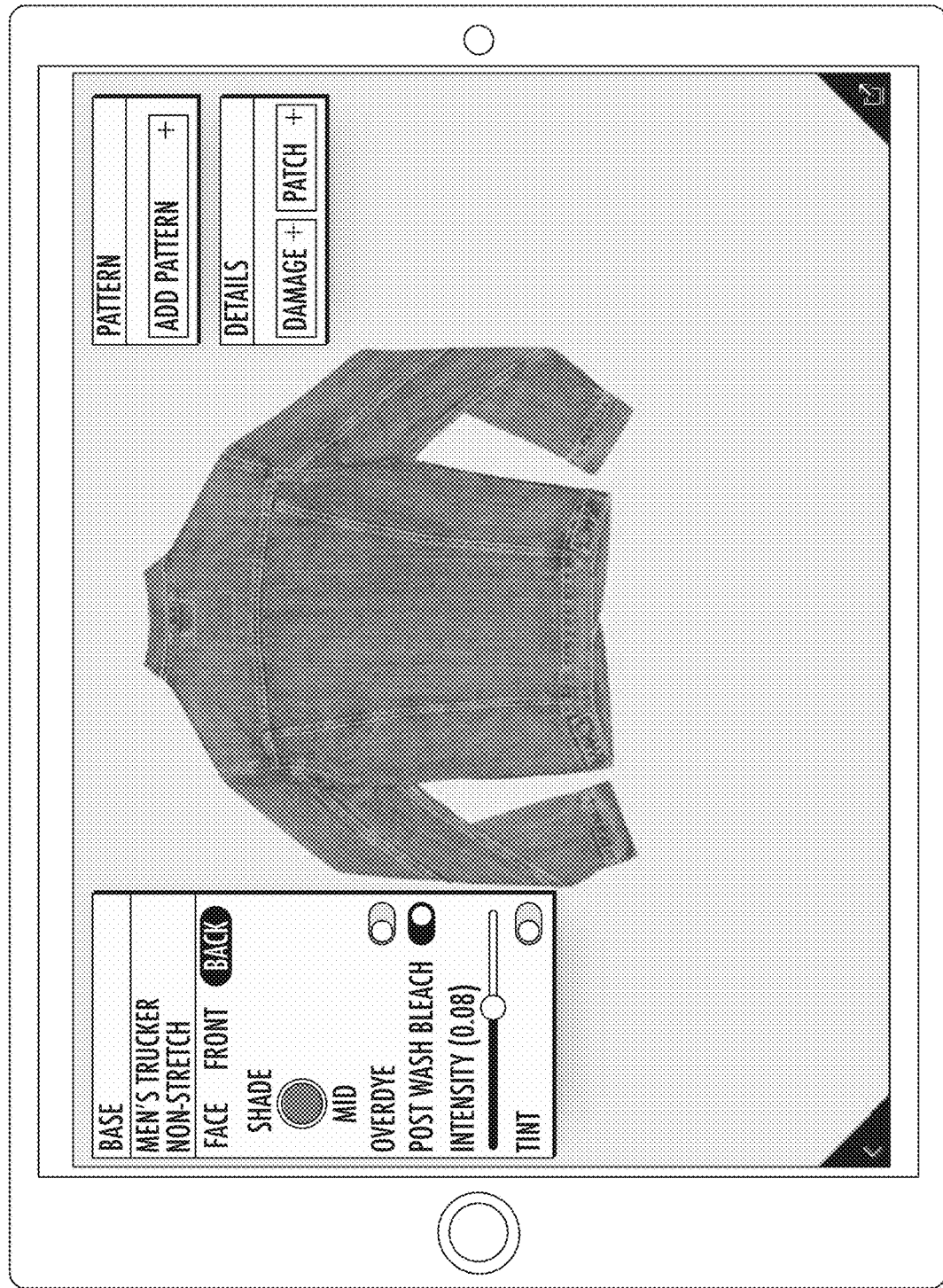
FIG. 36 shows a screen showing back of a trucker jacket, where an option for post-wash bleach is turned on and the intensity the shade has been adjusted to 0.08.

FIG. 36 shows a screen showing a back of a trucker jacket, where an option for post-wash bleach is turned on and the intensity the shade has been adjusted to 0.08. The coloration of the trucker jacket is adjusted in real time, showing the how the back of the jacket will appear after manufacture.

Figure 37:
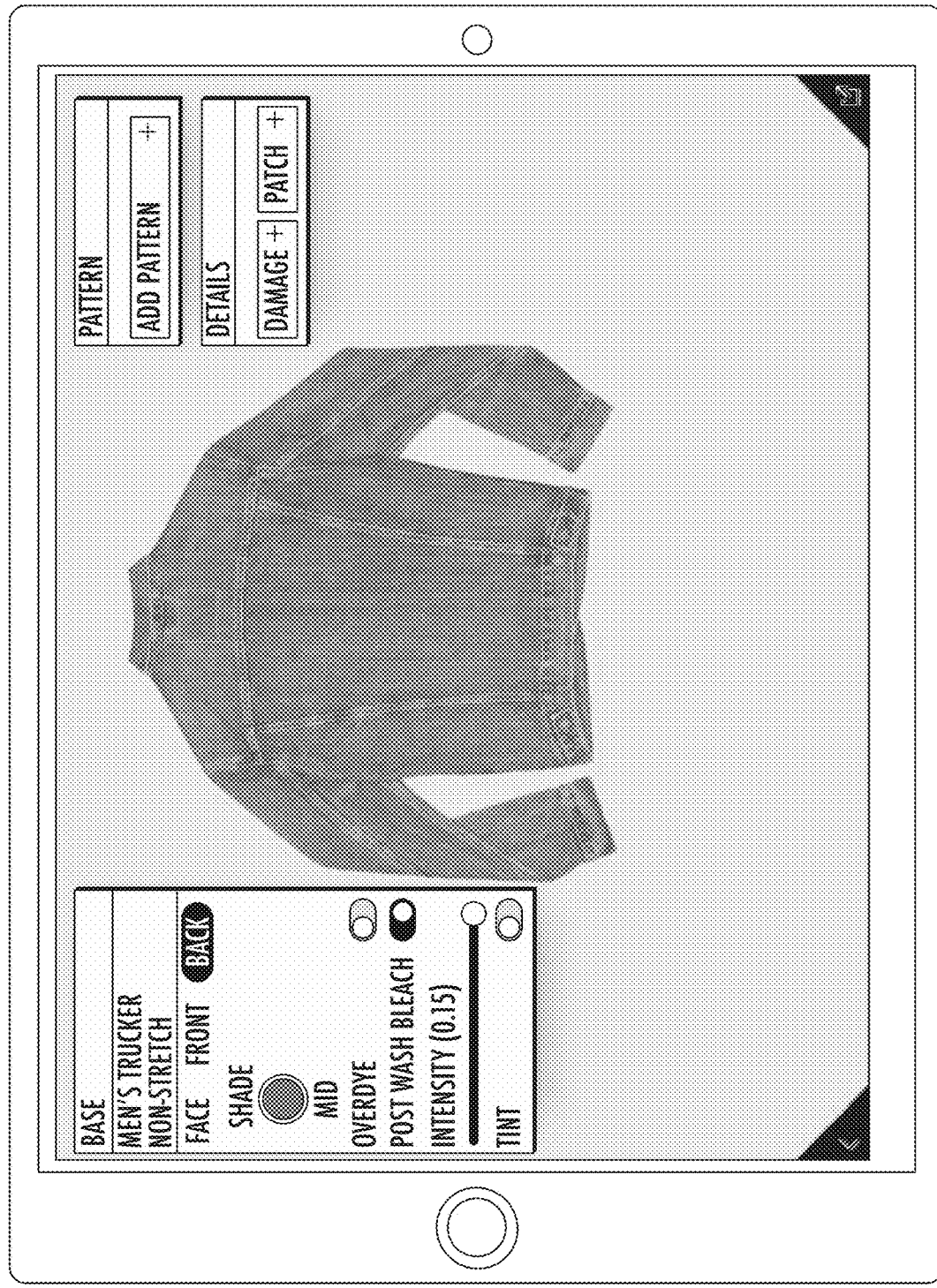
FIG. 37 shows a screen showing back of a trucker jacket, where an option for post-wash bleach is turned on and the intensity the shade has been adjusted to 0.15.

FIG. 37 shows a screen showing a back of a trucker jacket, where an option for post-wash bleach is turned on and the intensity the shade has been adjusted to 0.15. The coloration of the trucker jacket is adjusted in real time, showing the how the back of the jacket will appear after manufacture.

Figure 38:
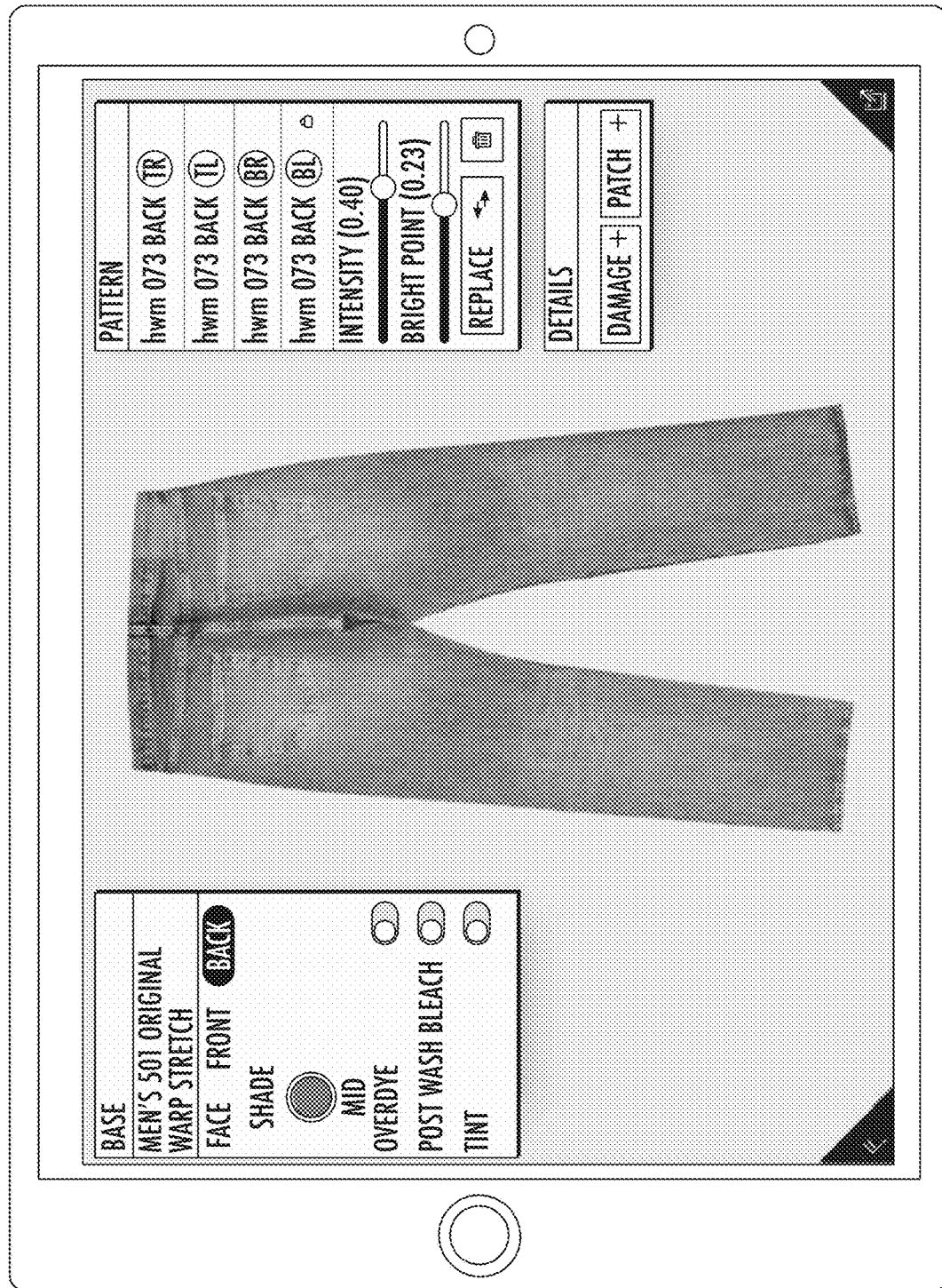
FIG. 38 shows a screen showing back of a pair of jeans where patterns hwm 073 back TR, hwm 073 back TL, hwm 073 back BR, and hwm 073 back BL have been applied.

FIG. 38 shows a screen showing back of a pair of jeans where patterns hwm 073 back TR, hwm 073 back TL, hwm 073 back BR, and hwm 073 back BL have been applied. A selected intensity is 0.40 and bright point is 0.23. The coloration of the jeans and patterns are adjusted and applied in real time, showing the how the back of the jeans will appear after manufacture.

Figure 39:
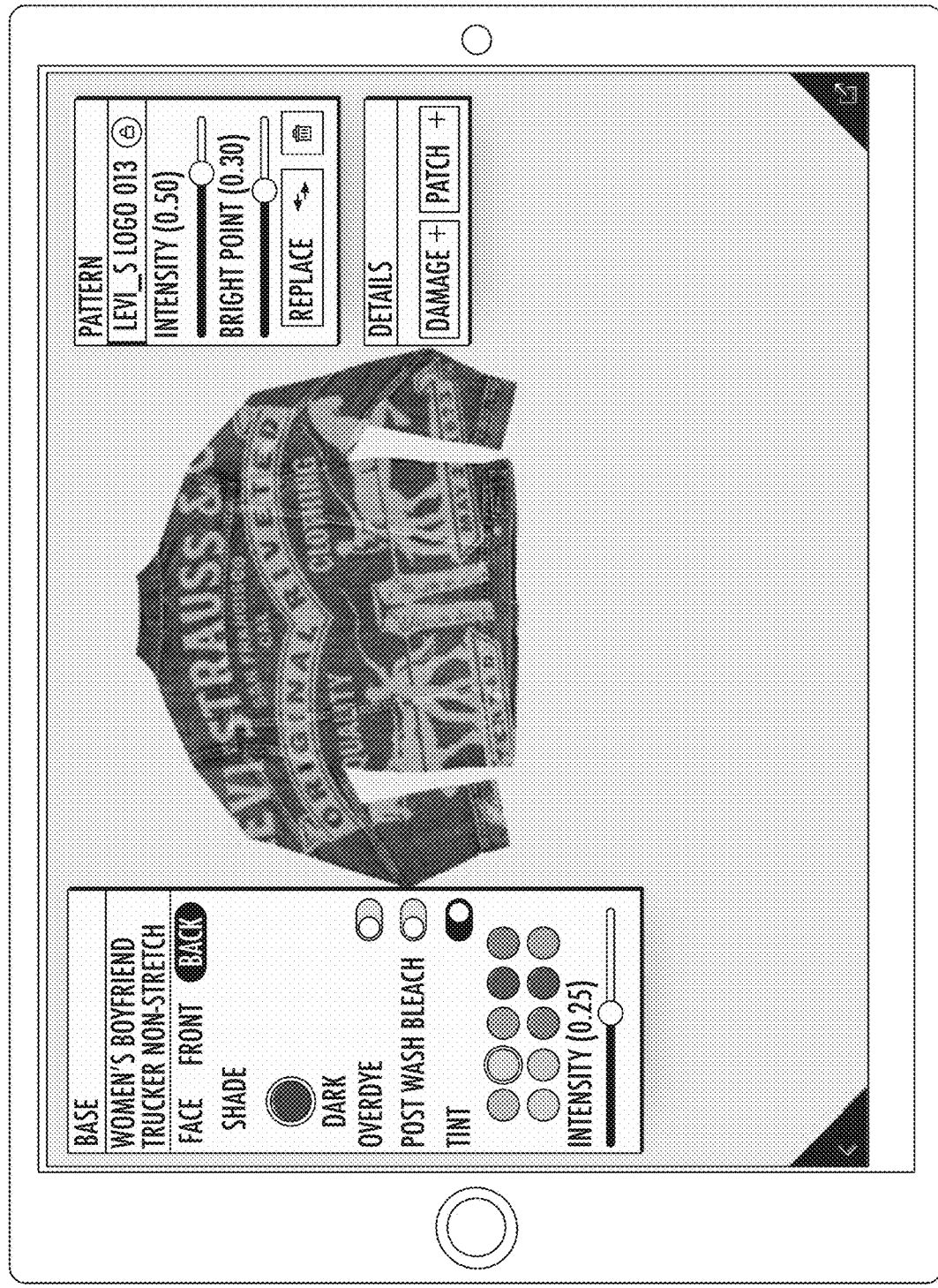
FIG. 39 shows a screen showing back of a trucker jacket, where a pattern LEVI_S LOGO 013 has been applied.

FIG. 39 shows a screen showing back of a trucker jacket, where a pattern LEVI_S LOGO 013 has been applied. A selected intensity is 0.50 and bright point is 0.30. A tint option is turned on, and a particular tint shade is selected (e.g., indicated by a circle around a shade circle) with an intensity of 0.25. The coloration of the jacket and pattern are adjusted and applied in real time, showing the how the back of the jacket will appear after manufacture.

Figure 40:
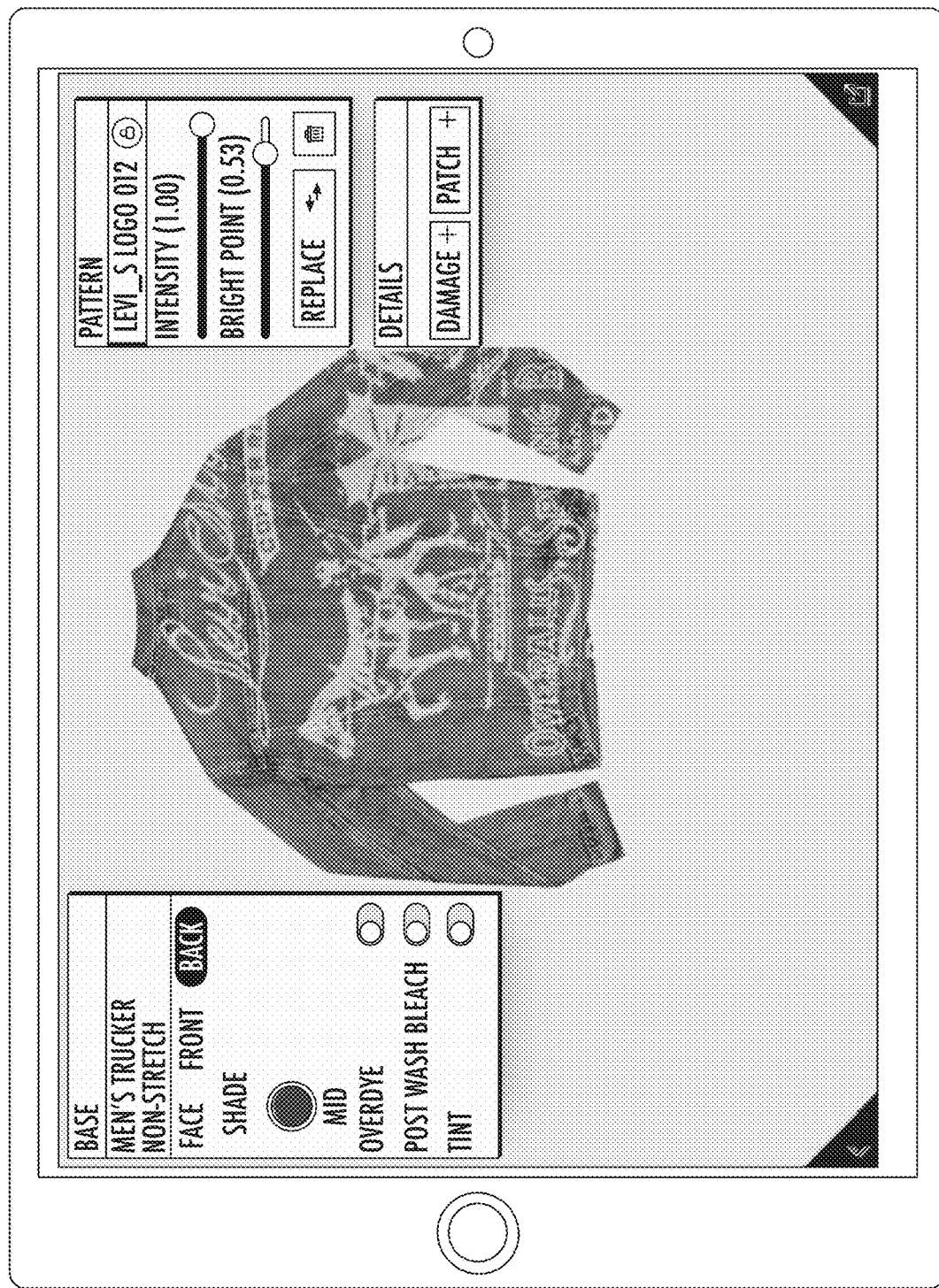
FIG. 40 shows a screen showing back of a trucker jacket, where a pattern LEVI_S LOGO 012 has been applied.

FIG. 40 shows a screen showing back of a trucker jacket, where a pattern LEVI_S LOGO 012 has been applied. A selected intensity is 1.00 and bright point is 0.53. The coloration of the jacket and pattern are adjusted and applied in real time, showing the how the back of the jacket will appear after manufacture.

Figure 41:
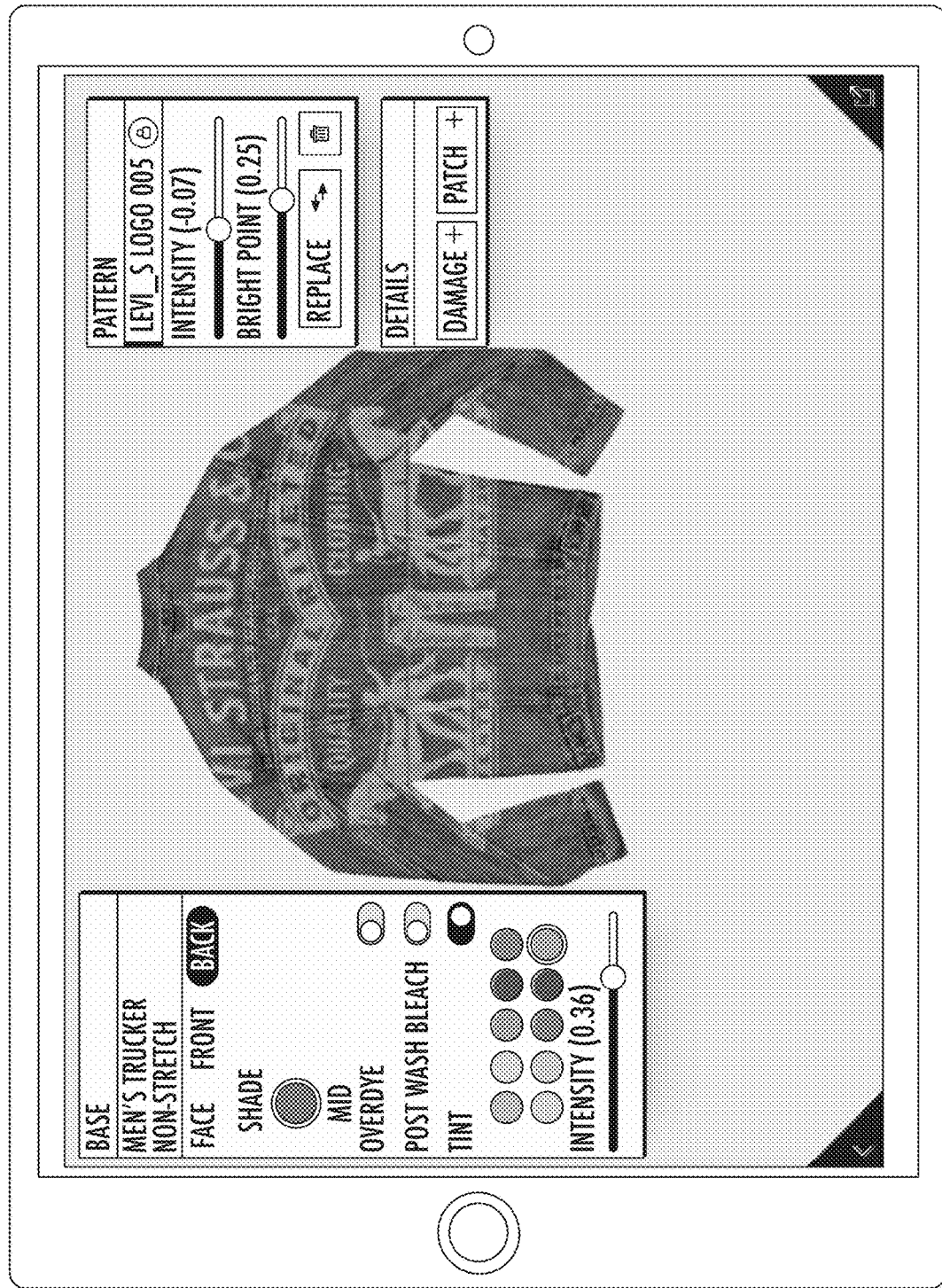
FIG. 41 shows a screen showing back of a trucker jacket, where a pattern LEVI_S LOGO 005 has been applied.

FIG. 41 shows a screen showing back of a trucker jacket, where a pattern LEVI_S LOGO 005 has been applied. A selected intensity is −0.07 and bright point is 0.25. A tint option is turned on, and a particular tint shade is selected (e.g., indicated by a circle around a shade circle) with an intensity of 0.36. The coloration of the jacket and pattern are adjusted and applied in real time, showing the how the back of the jacket will appear after manufacture.

Figure 42:
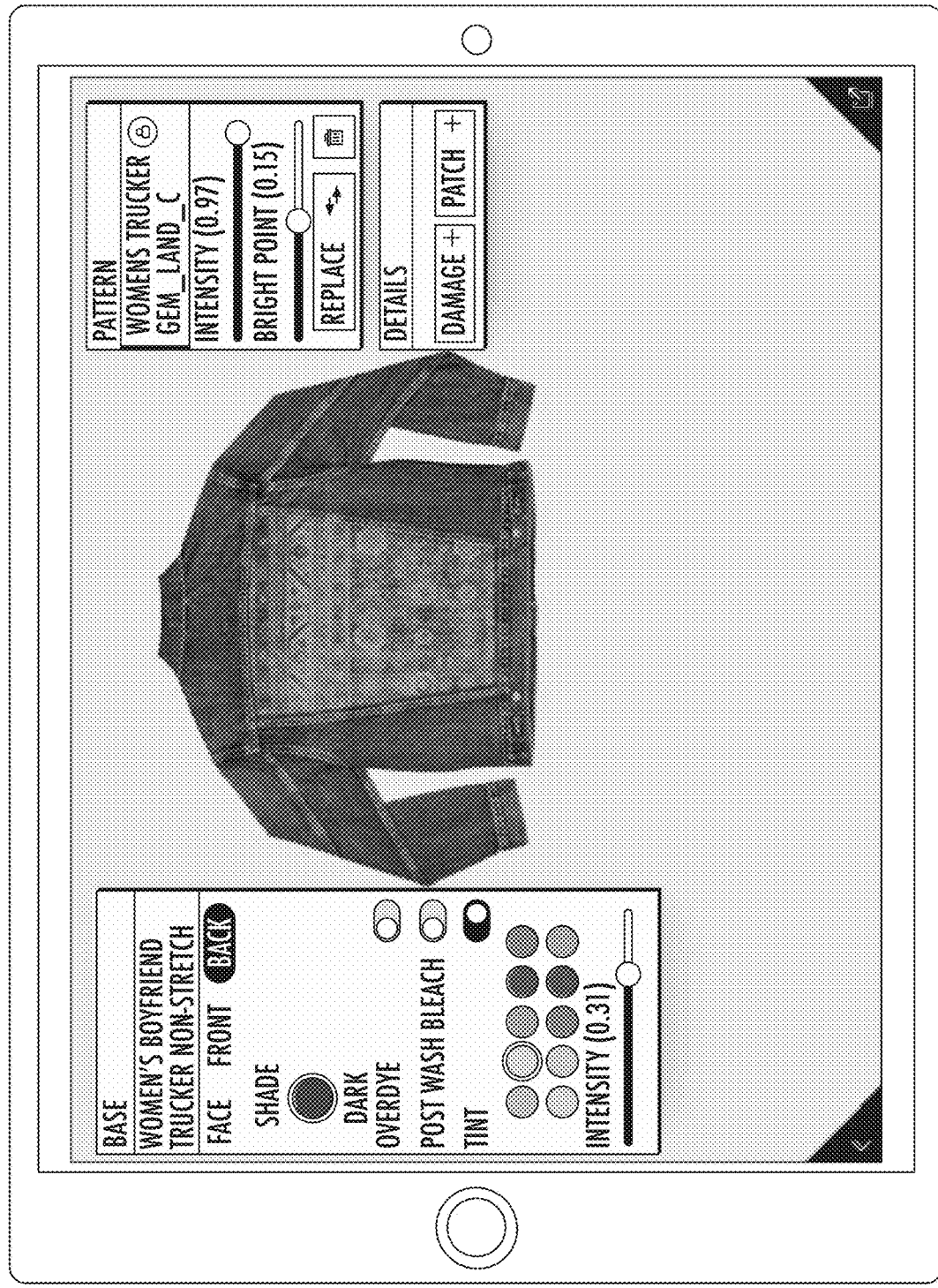
FIG. 42 shows a screen showing back of a trucker jacket, where a pattern Women's Trucker GEM_LAND_C has been applied.

FIG. 42 shows a screen showing back of a trucker jacket, where a pattern Women's Trucker GEM_LAND_C has been applied. A selected intensity is 0.97 and bright point is 0.15. A tint option is turned on, and a particular tint shade is selected (e.g., indicated by a circle around a shade circle) with an intensity of 0.31. The coloration of the jacket and pattern are adjusted and applied in real time, showing the how the back of the jacket will appear after manufacture.

Figure 43:
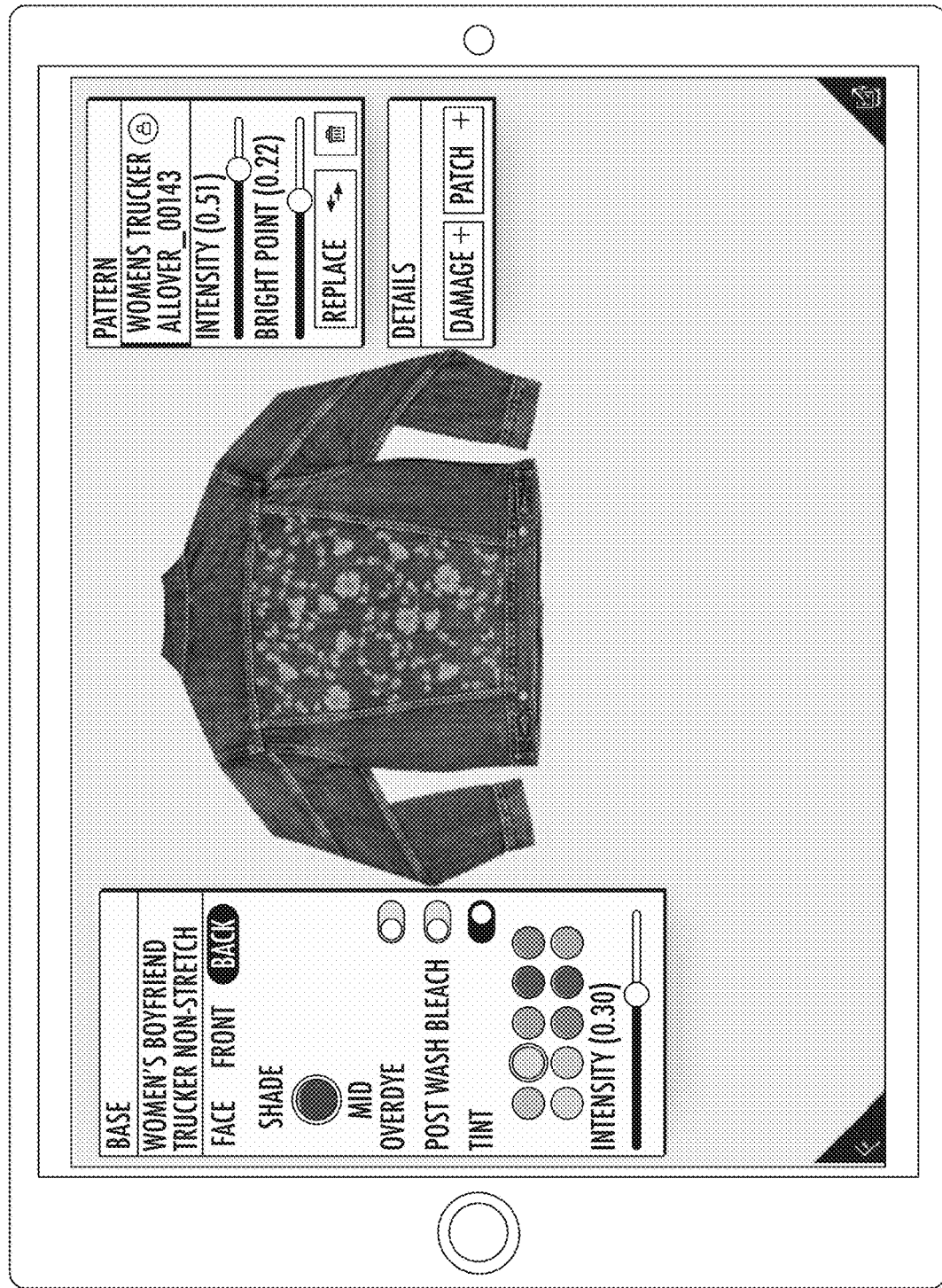
FIG. 43 shows a screen showing back of a trucker jacket, where a pattern Women's Trucker ALLOVER_00143 has been applied.

FIG. 43 shows a screen showing back of a trucker jacket, where a pattern Women's Trucker ALLOVER_00143 has been applied. A selected intensity is 0.51 and bright point is 0.22. A tint option is turned on, and a particular tint shade is selected (e.g., indicated by a circle around a shade circle) with an intensity of 0.30. The coloration of the jacket and pattern are adjusted and applied in real time, showing the how the back of the jacket will appear after manufacture.

Figure 44:
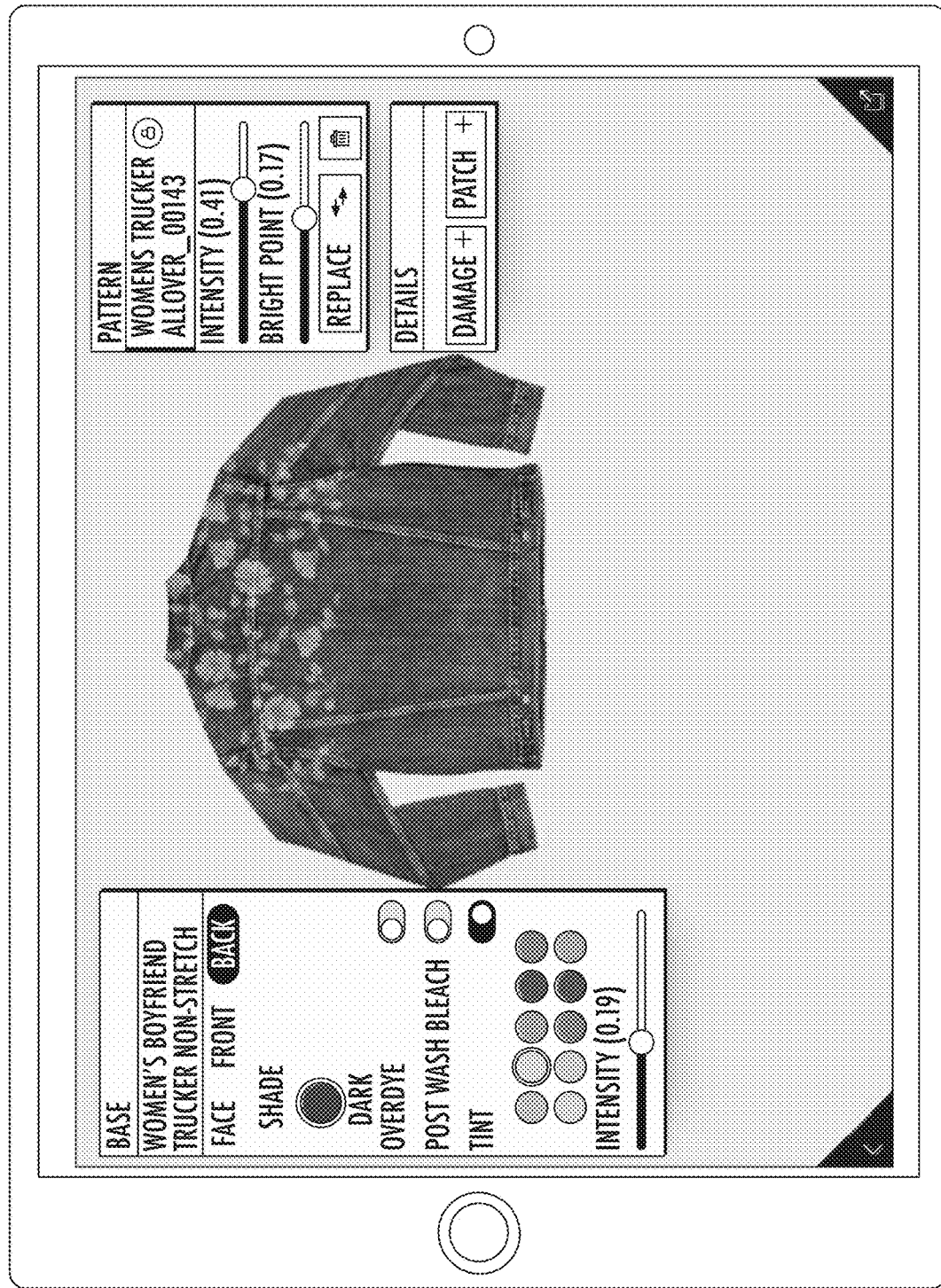
FIG. 44 shows a screen showing back of a trucker jacket, where a pattern Women's Trucker ALLOVER_00143 has been applied.

FIG. 44 shows a screen showing back of a trucker jacket, where a pattern Women's Trucker ALLOVER_00143 has been applied. A selected intensity is 0.41 and bright point is 0.17. A tint option is turned on, and a particular tint shade is selected (e.g., indicated by a circle around a shade circle) with an intensity of 0.19. The coloration of the jacket and pattern are adjusted and applied in real time, showing the how the back of the jacket will appear after manufacture.

Some additional features of the consumer digital brief tool include patches. Patch images are processed in a similar way as damages (discussed elsewhere), where the image is overlaid onto the base garment, rather than processed like a laser file. Overlaid design features include: damages, patches, hem treatments. As shown above, Levi's logos can be added as "laser patches." These images are processed in a similar way as laser patterns, but they are not wear patterns. These images are of logos, shapes, textures, or any artistic design that does create the look of natural worn denim.

The tools also allow further wet processing including tinting, overdye and post-wash bleach. Overdye is similar to tint, but a heavier effect. Tint is subtle while overdye allows a user to change the color more dramatically. For post-wash bleach, the garment can be slightly bleached during the post-wash. This functionality allows the user to lighten the image in order to visualize this effect.

A brief description of the FIGS. 28-44 follows. FIG. 28: Menu showing men's and women's bottoms and tops. FIG. 29: Selected women's shows bottoms and truckers menu items on left. FIG. 30: "laser patches" menu (1/2). FIG. 31: "laser patches" menu (2/2). FIG. 32: Overdye intensity—0. FIG. 33: Overdye intensity—half. FIG. 34: Overdye intensity—full. FIG. 35: Post-wash bleach—0. FIG. 36: Post-wash bleach—half. FIG. 37: Post-wash bleach—full. FIG. 38: Garment "flipped" to the back. Back seat image and appropriate pattern selection. FIG. 39: Example of denim top with laser patch, and tint (1/5). FIG. 40: Example of denim top with laser patch. FIG. 41: Example of denim top with laser patch, and tint (2/5). FIG. 42: Example of denim top with laser patch, and tint (3/5). FIG. 43: Example of denim top with laser patch, and tint (4/5). FIG. 44: Example of denim top with laser patch, and tint (5/5).

In am implementation, each of the garment preview images shown in FIGS. 38-44 is a three-dimensional garment preview image. The three-dimensional garment preview images allow a user to see how the customized garments will appear on their body. In an implementation, the garment preview images and the three-dimensional garment preview images are rotatable. Thus, a user can see how the garment will appear on their body from more than one point of view (e.g., angles of rotation), such as two or more points of view.

Figure 45:
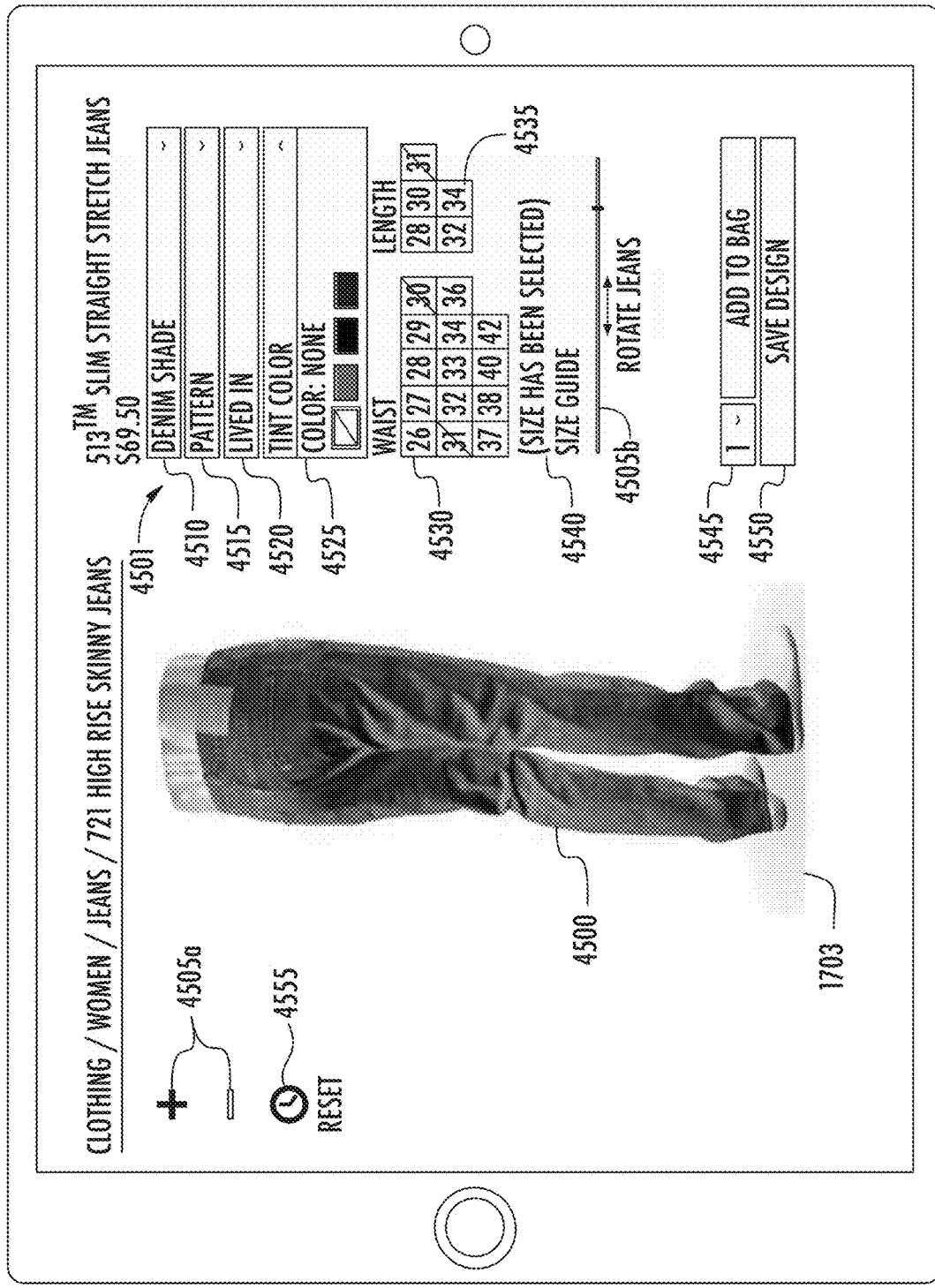
FIGS. 45-46 show a computer system 1301 or 1401 (e.g., a smartphone or tablet computer) operating the preview tool 1703, the digital brief tool 1803, or the consumer digital brief tool, or any combination of these tools.
Figure 46:
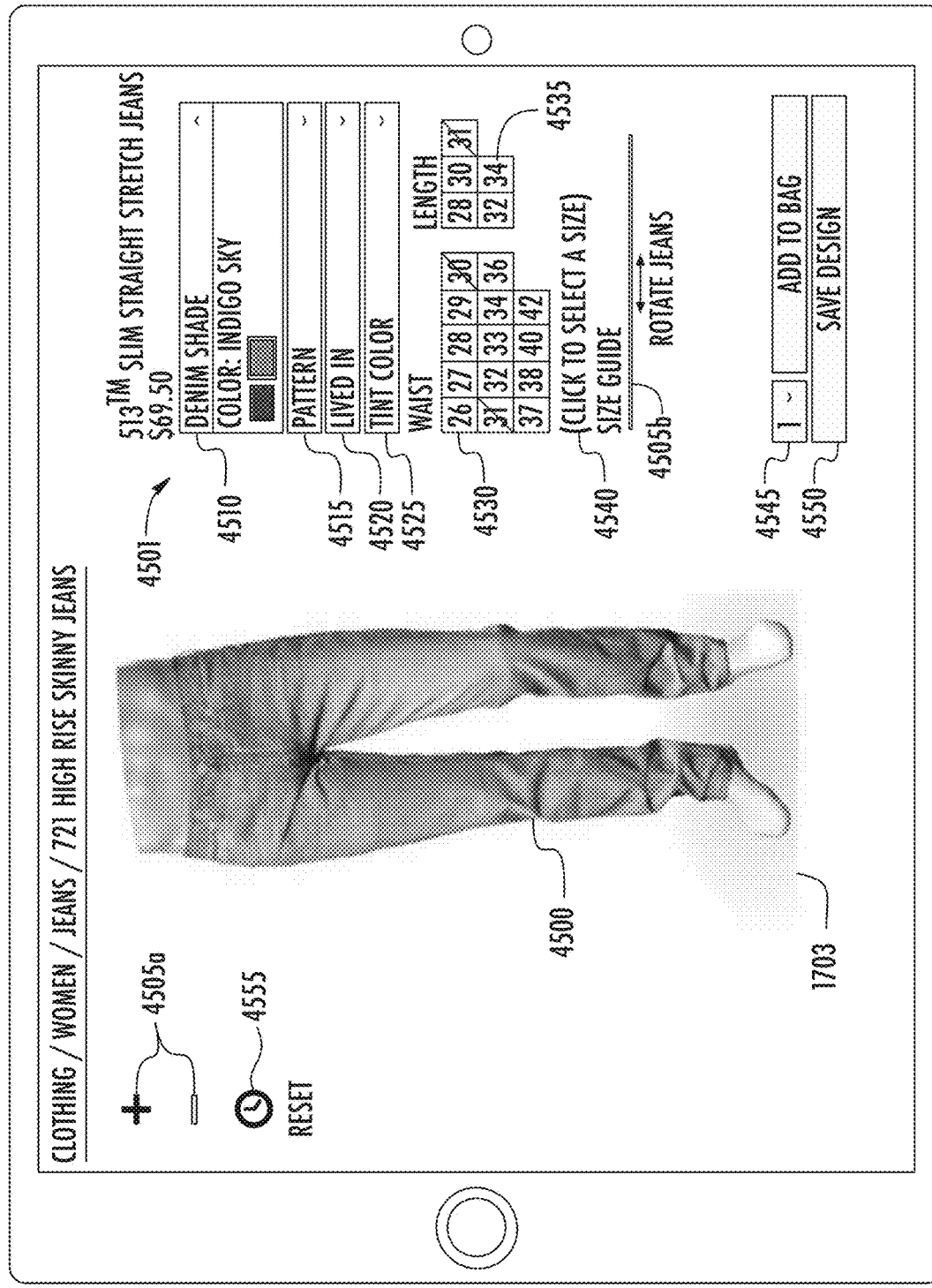

FIGS. 45-46 show a computer system 1301 or 1401 (e.g., a smartphone or tablet computer) operating the preview tool 1703, the digital brief tool 1803, or the consumer digital brief tool, or any combination of these tools. The computer system is adapted to store and run software modules code for any combination of software tools described above, such as the software tools shown in FIGS. 16-18. These software tools are sometimes referred to as software modules or simply modules. The following describes modules, user interface screens, and other parts of the preview tool. However, any of the following description may apply to the digital brief tool or the consumer digital brief tool.

In an implementation, the preview tool includes a menu 4501 for order options. Order options that are displayed in the menu can be selected by a customer, via a touch screen of the computer system, a human interaction device, or others.

In an implementation, the preview tool displays a garment preview image 4500 of the preview tool in combinations with the order options displayed in the menu 4501. The garment preview image may be a base garment image having user selected options. The order options may include options provided by the preset design tool 805, the custom design tool 815, and the sizing tool 810. The preview tool interface can be adapted to update the base garment image as various order options are selected from the menu. While the base garment image is jeans, the image can be any selected garment, bag, or others.

The garment preview image shows the garment in a three-dimensional view. The three-dimensional view of the garment preview image shows how a garment that is being customized using the preview tool will appear on the user's body when the user purchases and wears the garment. In an implementation, the garment preview image in the three-dimension view is a pare of jeans, but can be any garment, such as a jacket, shorts, shirts, hat, backpack, scarf, hat, or other garment items.

In an implementation, the garment preview image is rotatable and each of the rotated view of the garment preview image is a three-dimensional image. The multiple three-dimensional view of the preview garment image allows the user to see how the garment will appear on the user's body from multiple viewpoints (e.g., multiple angles of rotation).

All customization applied to a garment that are selected by a user are shown in the three-dimensional view of the garment preview image. Thus, a user will not only see how the garment will appear on their body in three-dimension, a user will all see how each customization will appear on the garment in three-dimensions on the user's body. A two-dimensional, in comparison with a three-dimensional view, does not allow a user to see how a garment will actually appear on their body and does not allow a user to see how their selected customizations of a garment will appear on their body.

In an implementation, the preview tool includes one or more options for displaying the front and back of the base garment image or for smooth rotation of the garment image for viewing from more view than front and back. The front and back view of jeans 4500 are both shown in a three-dimensional view so that a user can see how the jeans will appear on their body in three-dimensions. The smooth rotated views are also three-dimensional view. The preview tool may allow the garment to be "clicked" on using a human interface device to rotate the garment between front and back. In an implementation, the preview tool includes a front select button ("+") and a back select button ("−") 4505*a* that allow for selection of a front view of a garment and a back view of a garment. In an implementation, the preview tool includes a slider bar 4505*b* or another tool that allows for rotations of a garment displayed by the preview tool. The slider tool may allow for a number of angled views to be displayed, such as more than two views (e.g., front and back). For example, the slider tool may allow for 360 rotated views (e.g., a view for every angle of rotation from 0 degrees to 360 degrees).

In an implementation, the preview tool includes a user selectable option 4510 for selecting the shade of denim of the base template jeans. The use selectable option may include a dropdown menu. There can be a number of base templates colors to choose from where the base templates have different colors of denim. The colors may include indigo and indigo sky (as indicated on the preview tool shown in FIG. 46), dark dark (e.g., which may be referred to as ddark), dark, medium, light, or other shades. The dropdown menu for denim shape selection may include a graphical indicator (e.g., rectangle around the indigo sky option) that indicates the particular shade of denim is selected. Each preview image (e.g., jeans) for the different shades is shown as three-dimensional images. Each preview image includes three-dimensional shadowing for the three dimensional images so that the user can see how the garments look in realistic lighted scene. The shadows rotate with the preview image as the preview image is rotated. Thus, a user can see shadowing on the jeans in three-dimension from multiple viewpoints (e.g., multiple angles of rotation).

The preview tool includes a user selectable option 4515 for selecting a finishing pattern that may be formed on a garment, such as jeans. The user selectable option 4515 may include a dropdown menu. A finishing pattern may be applied by the laser of the mobile finishing center 10 to jeans, such as jeans shown in the base template jeans image in the preview tool 1703.

Figure 47:
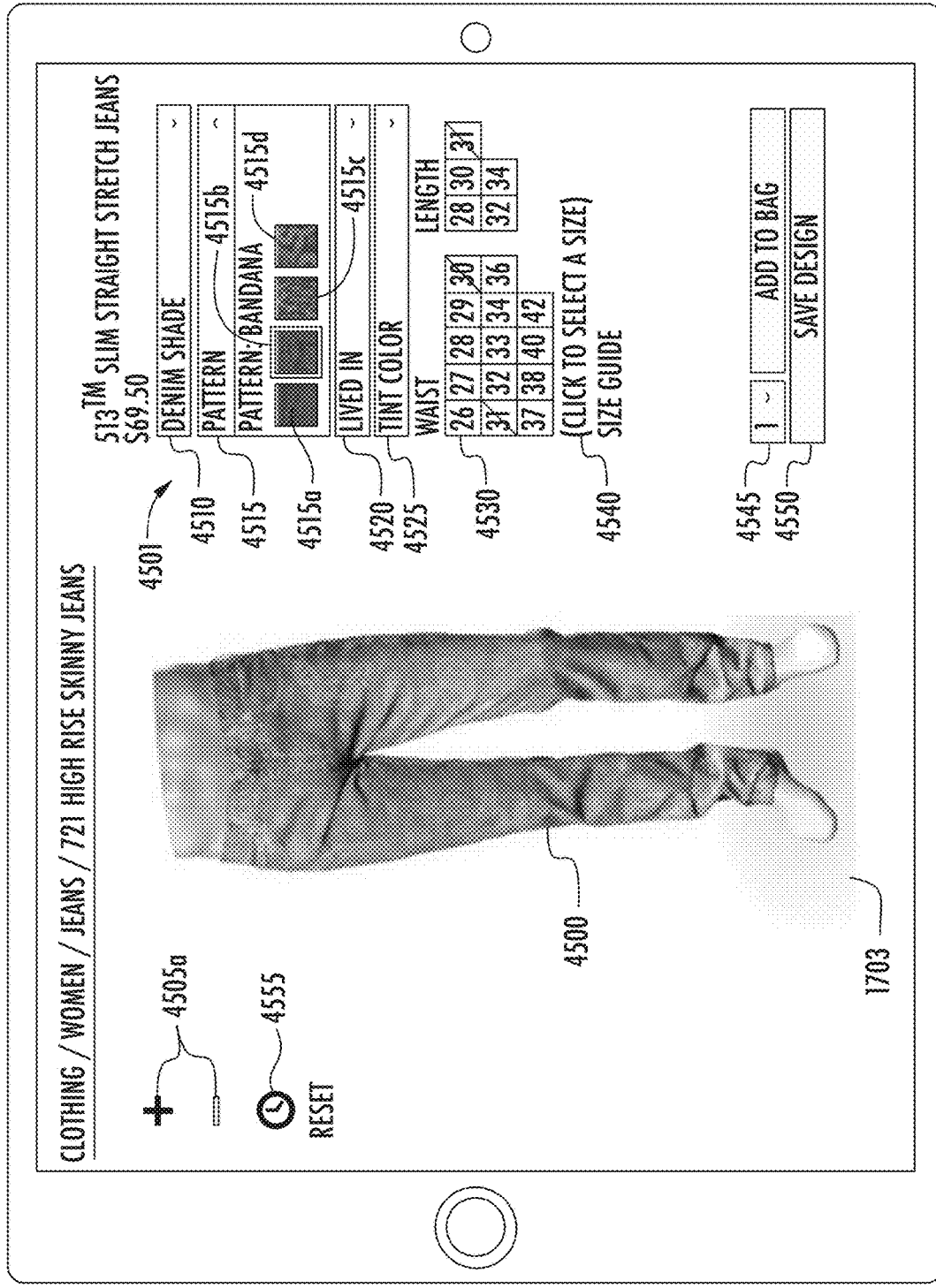
FIG. 47 shows a dropdown menu in a dropdown state when the user-selectable option is selected for the finishing patterns.

FIG. 47 shows a dropdown menu in a dropdown state when the user-selectable option 4515 is selected for the finishing patterns. The finishing patterns may include a wear pattern 4515*a* that is associated with a naturally worn pattern that forms on a garment from extended wear, washing, or both. The finishing patterns may include one or more fanciful design patterns 4515*b*-4515*d*. The design patterns may include a paisley type pattern, also referred to as a bandana pattern 4515*b*. FIG. 47 shows the dropdown menu with the finishing pattern 4515*b* selected and shows the bandana pattern on the previewed jeans. The finishing patterns on the preview images of the garment (e.g., jeans) are shown in three-dimensions. The finishing pattern rotate with the preview image as the preview image is rotated. Thus, a user can see the finishing pattern on the jeans in three-dimension from multiple viewpoints (e.g., multiple angles of rotation).

Figure 48:
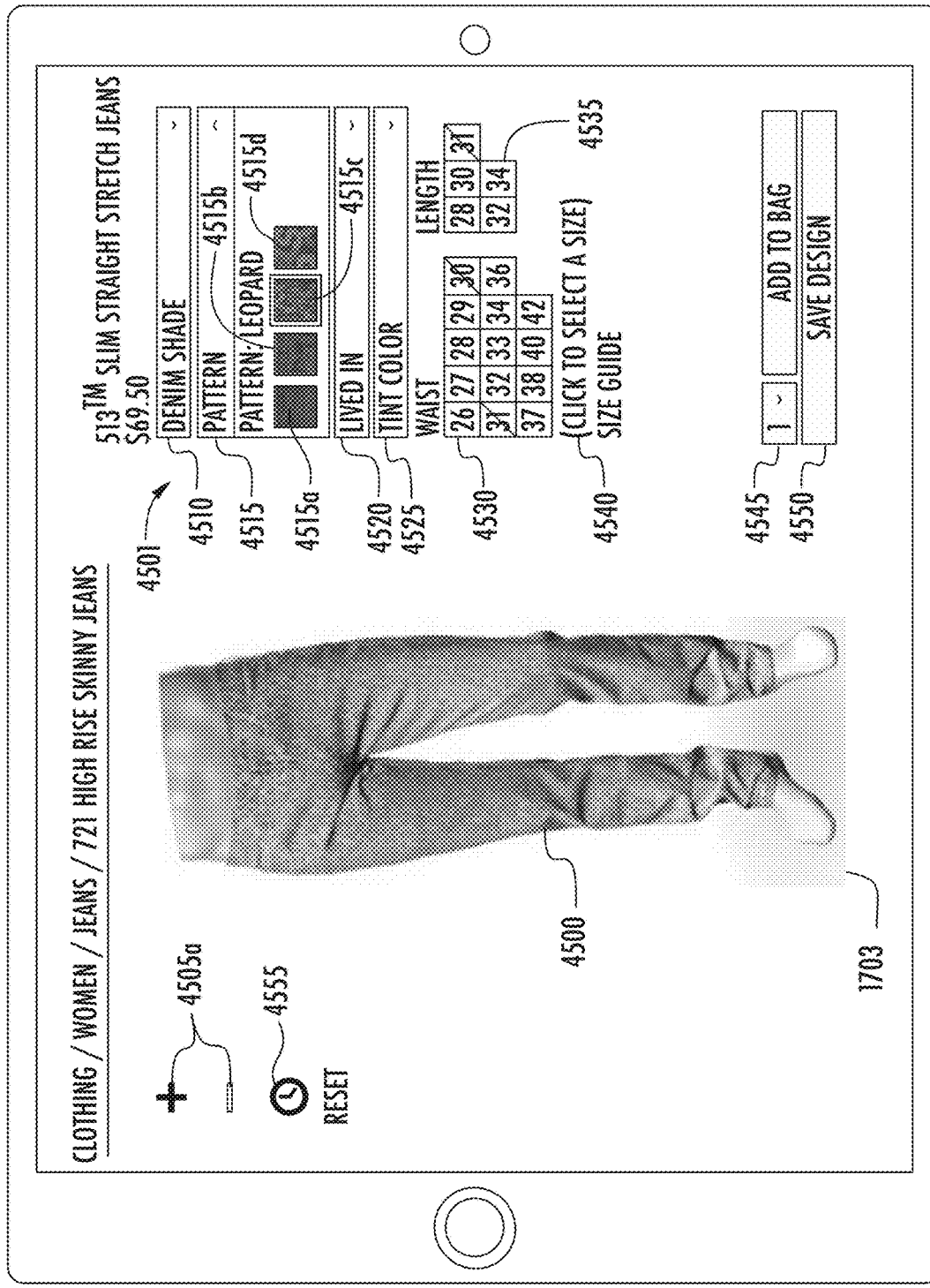
FIG. 48 shows the dropdown menu with the finishing pattern selected and shows the leopard print pattern on the previewed jeans.

The design pattern may include an animal print 4515*c*, such as a leopard pattern. FIG. 48 shows the dropdown menu with the finishing pattern 4515*c* selected and shows the leopard print pattern on the previewed jeans.

The design pattern may include letters, numbers, or other symbols 4515*d* or graphics combined letters, numbers, or other symbols. The dropdown menu for a finishing pattern may include a graphical indicator (e.g., rectangle around the bandana pattern) that indicates the particular finishing pattern is selected.

Additionally, the preview tool may include additional options that allow a user to make other adjustments such, changing an intensity of the pattern, changing a bright point of the pattern, or adding damage to the design. The jeans images and laser finishing patterns may be stored in one or more formatted files in one or more mobile devices operating the digital design tool 800

For any changes the user makes, the user will see changes in the preview image in real-time. The preview shows the user how the jeans will appear after it is manufactured by the mobile finishing center. By selecting different combinations of laser files and base jeans templates, a customer can create numerous different jeans designs and have these manufactured by the mobile finishing center.

Figure 49:
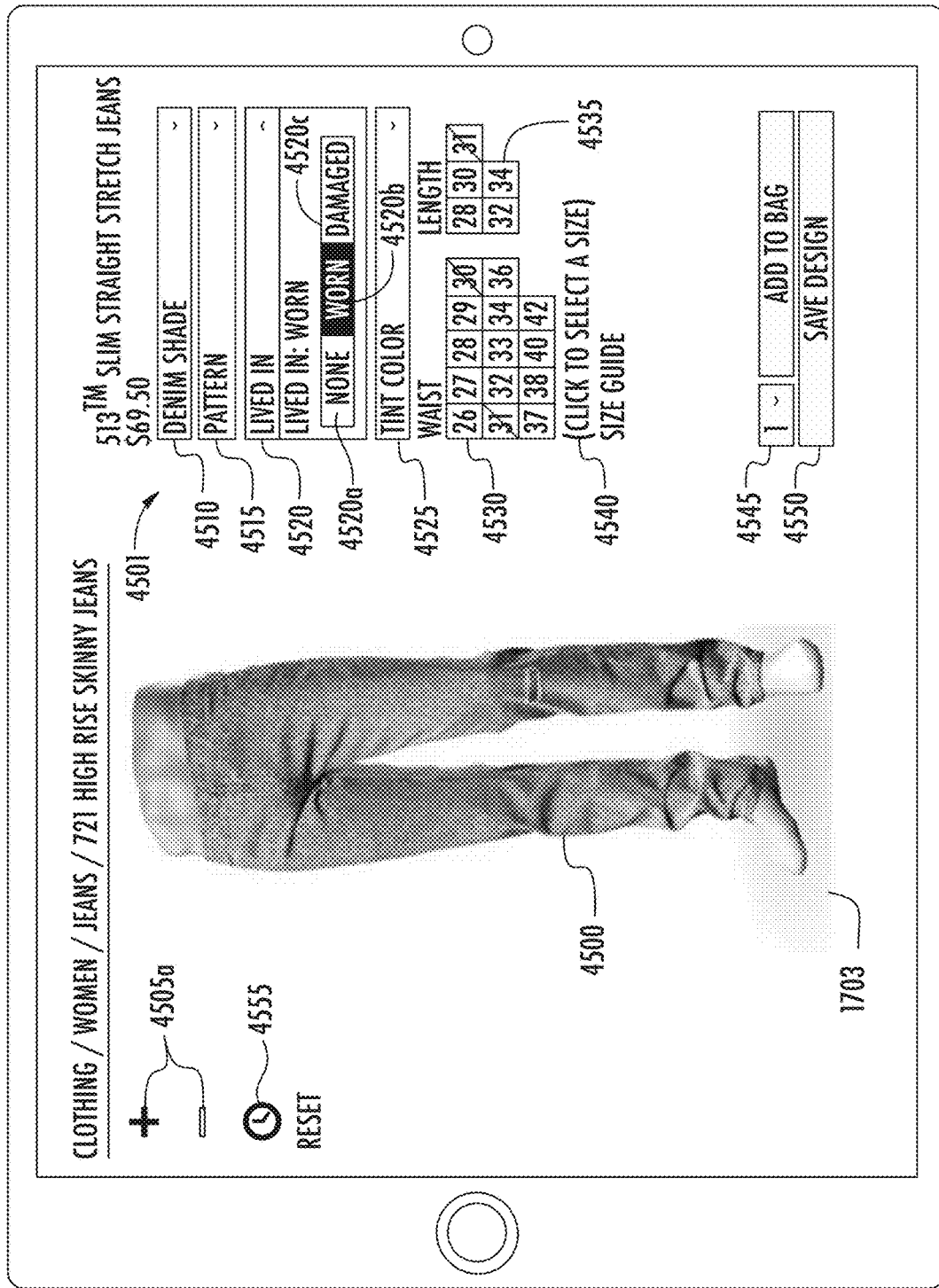
FIG. 49 shows a dropdown menu in a dropdown state when the user-selectable option is selected for the lived in option.

FIG. 49 shows a dropdown menu in a dropdown state when the user-selectable option 4520 is selected for the lived in option. The lived in option includes an option for no lived in appearance 4520*a*, a worn lived in appearance 4520*b*, and a damaged appearance 4520*c*. The preview of the base garment jeans in FIG. 49 is shown with the worn image. Worn includes normal wear, such as on the knee portion of jeans where a person might kneel down and wear their jeans at the knee. Worn may also include locations on a garment where the warp fibers are worn through, but the weft fibers are not worn through. In an implementation, the worn pattern can be moved to various locations on the jeans for example by dragging and dropping with a human input device.

Figure 50:
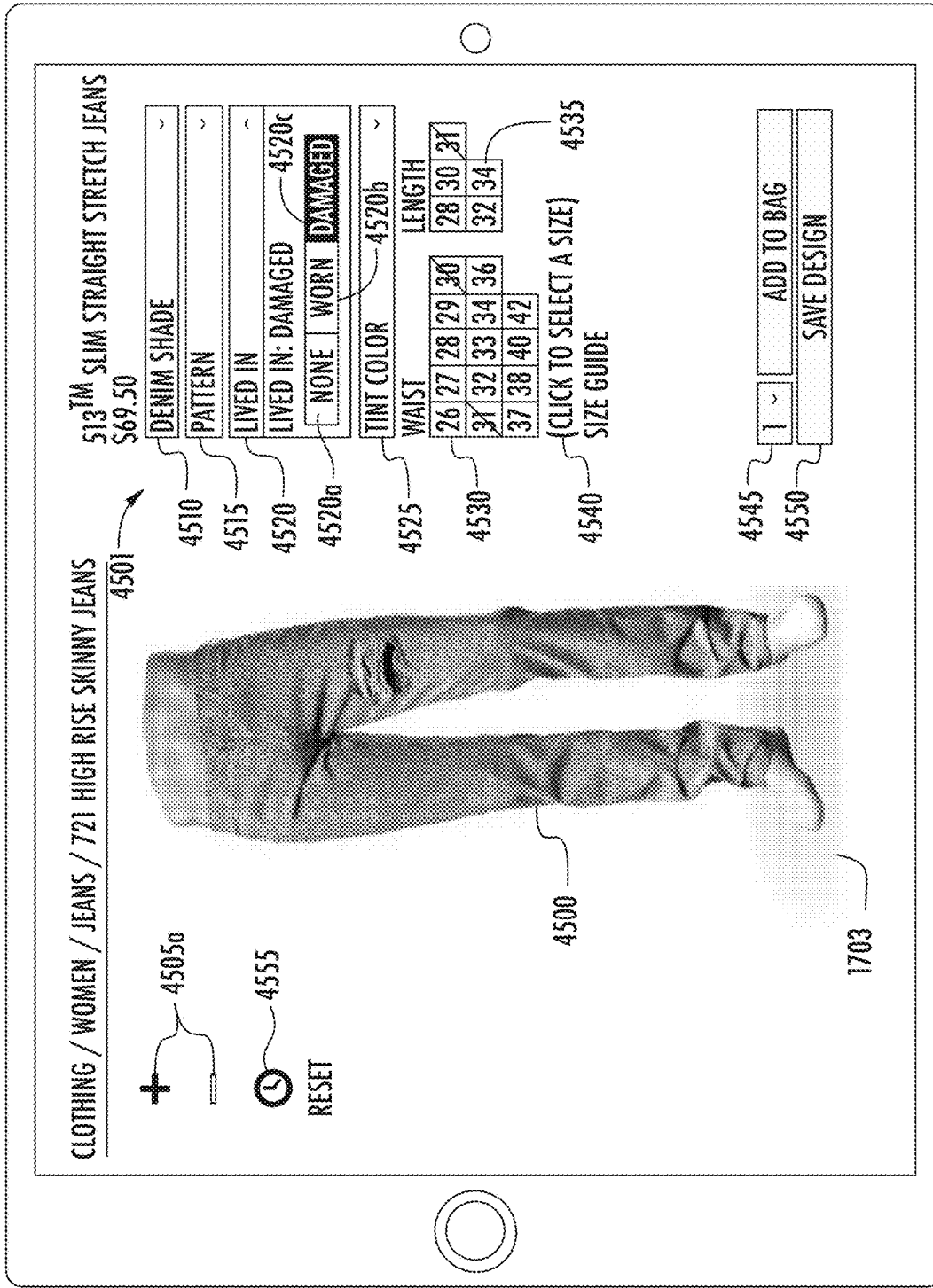
FIG. 50 shows the dropdown menu for the lived in option with the damaged appearance selected.

FIG. 50 shows the dropdown menu for the lived in option with the damaged appearance 4520*c* selected. The preview of the base garment jeans in FIG. 50 is shown with the damage image. Damage may include locations on a garment where the warp and a portion of the weft fibers are both worn through. In an implementation, the damage pattern can be moved to various locations on the jeans for example by dragging and dropping with a human input device.

The wear and damage patterns on the preview images of the garment (e.g., jeans) are shown in three-dimensions. The wear and damage patterns rotate with the preview image as the preview image is rotated. Thus, a user can see the wear and damage patterns on the jeans in three-dimension from multiple viewpoints (e.g., multiple angles of rotation).

Figure 51:
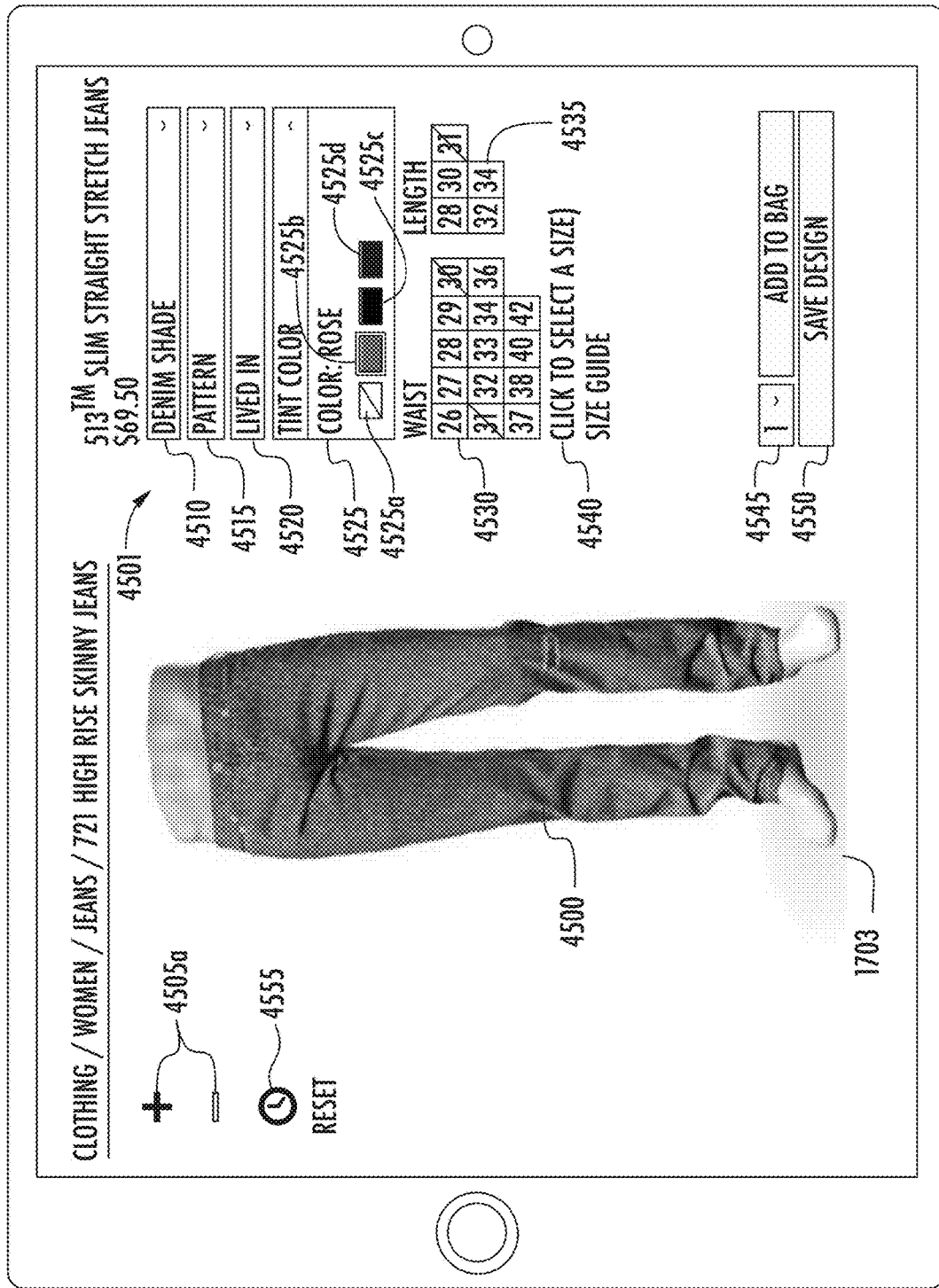
FIG. 51 shows a dropdown menu in a dropdown state when the user-selectable option is selected for a tint color option selected.
Figure 52:
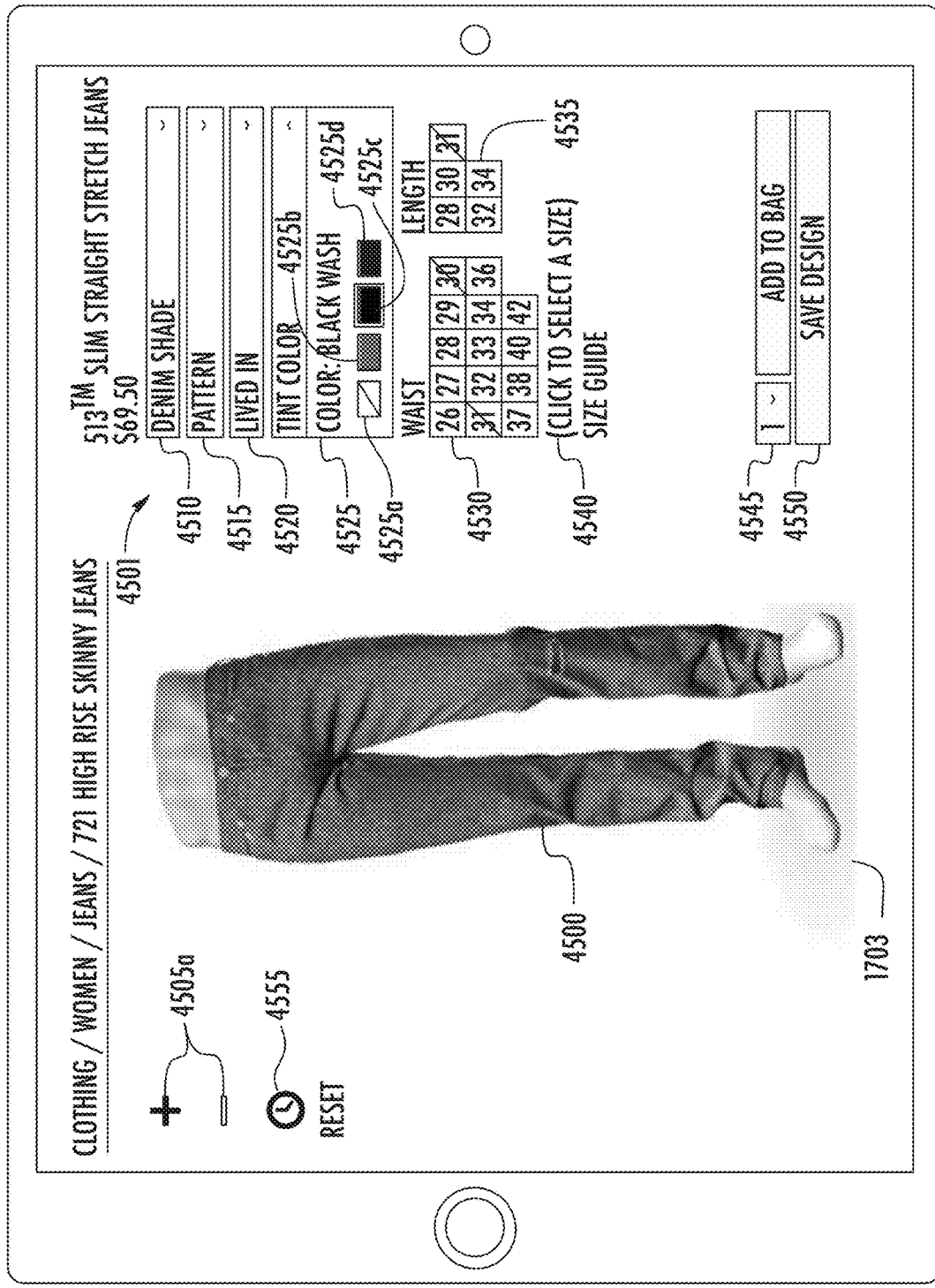
FIG. 52 shows the preview of the base garment jeans with the black tint color selected.
Figure 53:
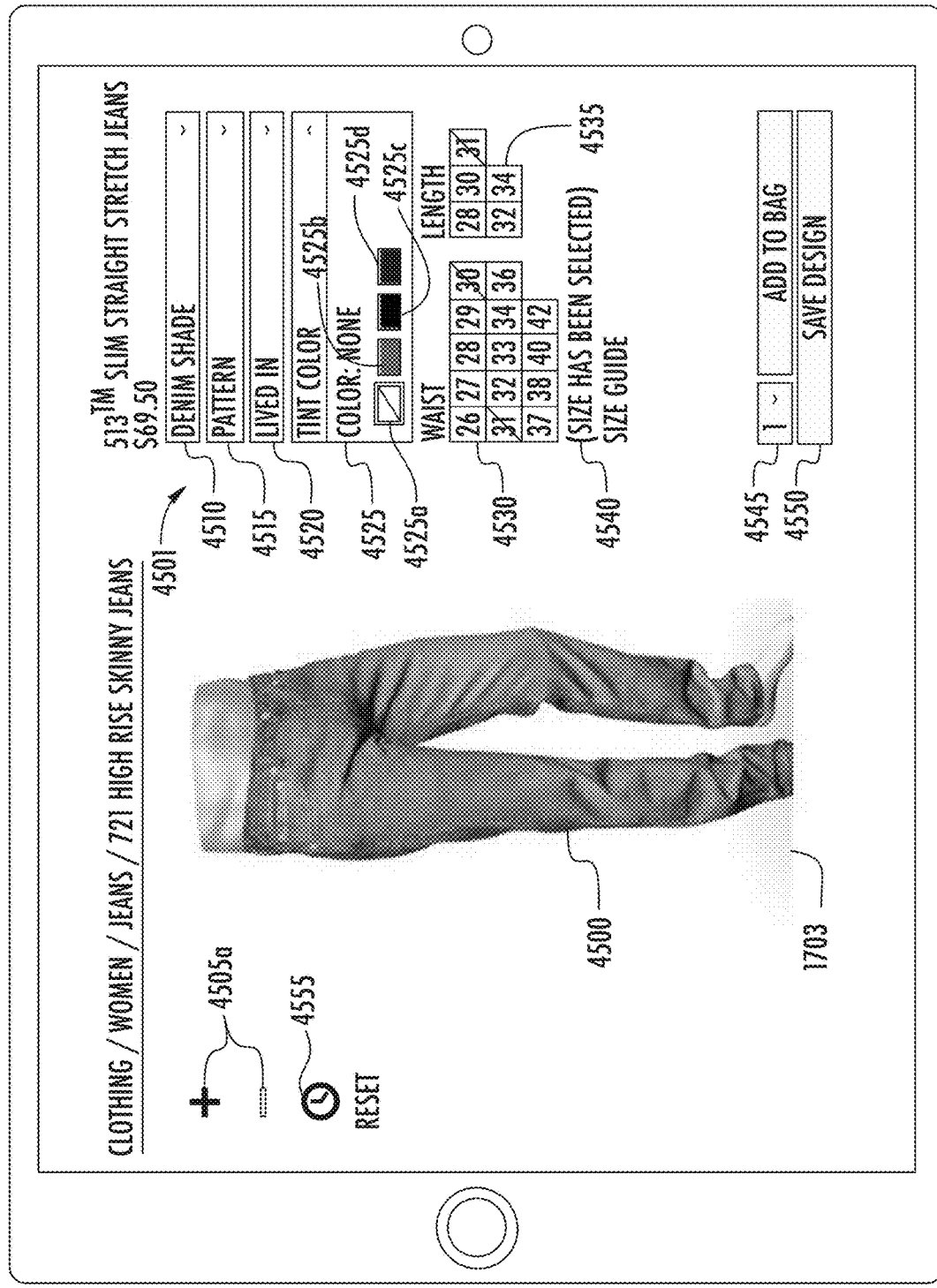
FIG. 53 shows the preview of the base garment jeans with no tint color selected.

FIG. 51 shows a dropdown menu in a dropdown state when the user-selectable option 4525 is selected for a tint color option selected. The tint color option includes options for a number of tints that may be applied to a garment. In the particular implementation shown in FIG. 51, the tint color options include no tint 4525*a*, a rose tint color 4525*b*, a black tint color 4525*c*, and a bright blue tint color 4525*d*. The preview of the base garment jeans in FIG. 51 is shown with the rose tint color 4525*b* selected. FIG. 52 shows the preview of the base garment jeans with the black tint color 4525*c* selected. FIG. 53 shows the preview of the base garment jeans with no tint color 4525*a* selected. FIG. 45 shows a preview of the base garment jeans with no tint color from a back view of the jeans.

The tint of the garment in the preview image is shown in three-dimensions. The tint rotates with the preview image as the preview image is rotated. Thus, a user can see the tint on the jeans in three-dimension from multiple viewpoints (e.g., multiple angles of rotation).

In an implementation, preview tool 1703 includes a menu 4530 for waist sizes for jeans from which a user may select a desired waist size. The preview tool may also include a menu 4535 for inseam length from which a user may select a desired inseam length. The waist and inseam sizes are shown in inches but may be displayed in other units, such as centimeters. The preview tool may include one or more other menus for jeans sizes, such as hip size.

For other types of garments, one menu for garment sizes might be provided by the preview tool. For example, for a shirt, one size menu might be provided by the preview tool where the sizes include extra small, small, medium, large, extra-large, xx-large, xxx-large, other sizes, or any combination of these sizes. In another implementation, three or more menus may be provided for sizing, such as three size menus for shirts that may include menu options for torso length, chest circumference, and sleeve length. The preview tool may also display and provide a link 4540 to another user interface page that includes information for interpreting size information, such as linking torso length, chest circumference, and sleeve length to sizes, such as extra small, small, medium, large, extra-large, xx-large, xxx-large, other sizes.

In an implementation, the preview tool displays a user-selectable screen button 4545 that may be selected to add a specified garment (e.g., jeans with a light indigo color, a bandana pattern, damage, rose tint, 34 inch waist, and 32 inch inseam) to an electronic shopping bag, sometimes referred to an electronic shopping cart. When the specified garment is added to the electronic shipping bag, the digital design tool 800 may display another interface, such as the digital design tool interface 835 (e.g., shown in FIG. 56), where a purchase of the specified garment may be made. After the purchase is made, the garment may be laser processed in the mobile finishing center and the finished garment deliver to a purchaser is a relatively short time, such as half of an hour to three hours (e.g., about the length of a sports match).

In an implementation, the preview tool displays a user-selectable screen button 4550 that may be selected to save a specified garment design. The specified garment design may be stored in the mobile device operating the digital design tool 800, may be stored remotely in a data center, may be stored on a user's own device (e.g., mobile device), or another device. The specified garment design may be recalled from memory to modify the design or to purchase the garment having the design.

In an implementation, the preview tool displays a user-selectable screen button 4555 that may be selected to reset of a specified garment design. A reset design may include a base denim shade, no pattern, no lived in options, no tint, and no size information. After a design is reset, the preview tool displays an essentially blank pallet from which a new design may be specified using the preview tool.

Figure 54:
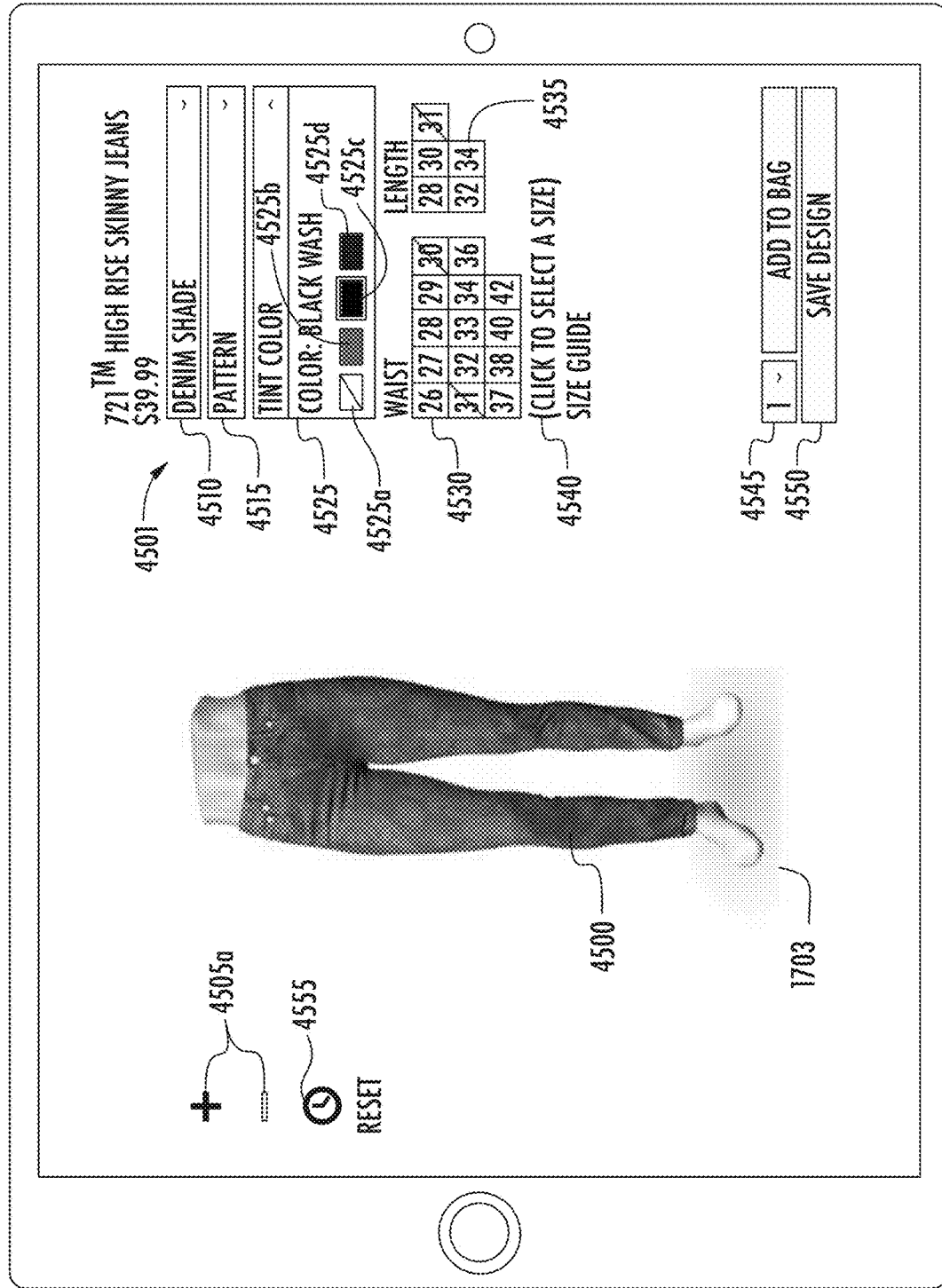
FIGS. 54-55 show the preview tool with a base garment jeans having a number of options selected, such as the bandana finishing pattern and a black tint.
Figure 55:
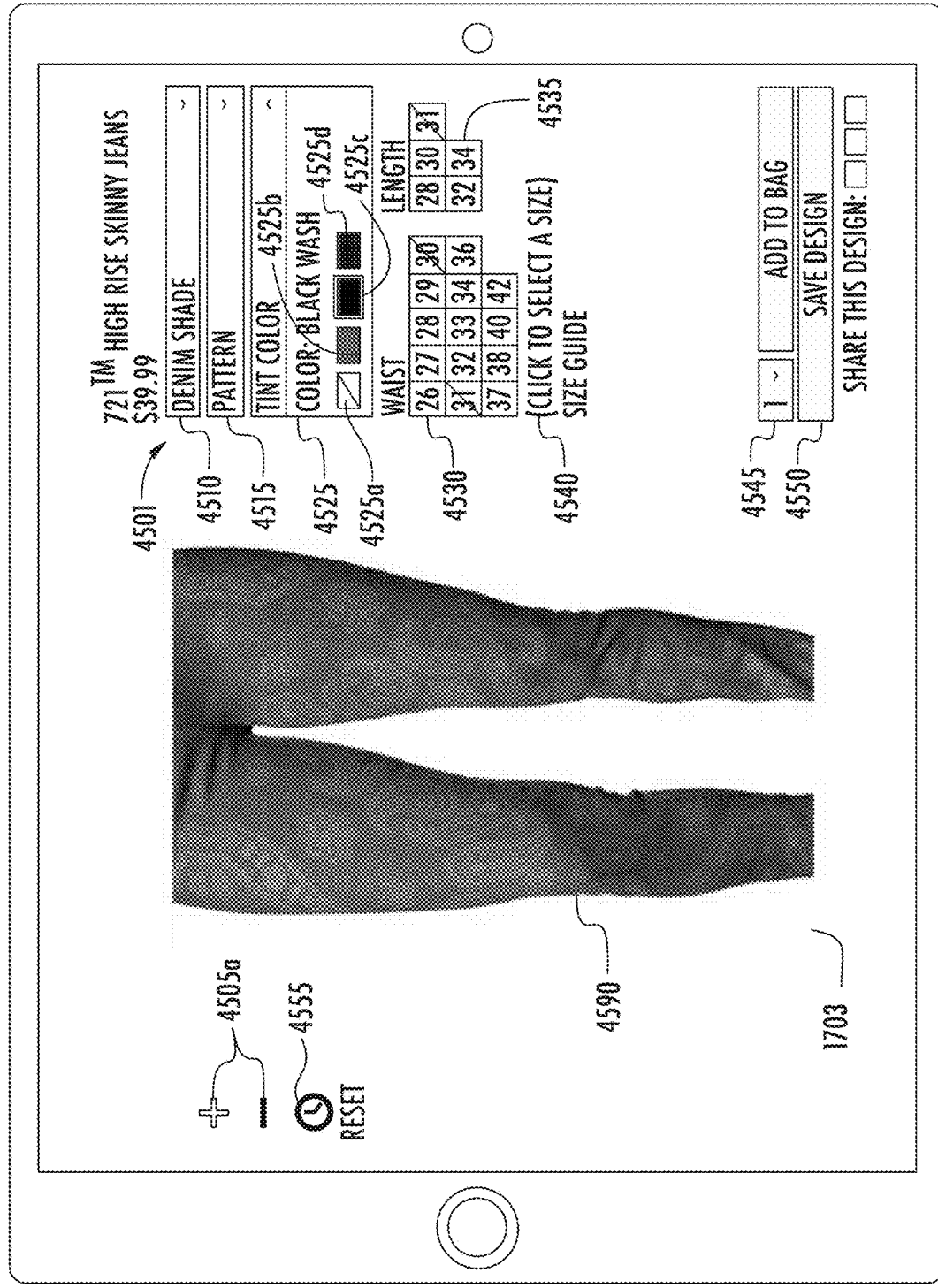

FIGS. 54-55 show the preview tool 1703 with a base garment jeans 4590 having a number of options selected, such as the bandana finishing pattern and a black tint. The base garment jeans 4590 in FIG. 54 is shown having a first magnification and the base garment jeans 4590 is shown in FIG. 55 having a second magnification. The second magnification is larger than the first magnification. In an implementation, screen buttons 4505*a* are adapted for increasing and decreasing the magnification of the displayed base garment jean. The "+" screen button may increase the magnification (e.g., enlarge) of the displayed image of the base garment jeans when selected and the "—" button may decrease the magnification (e.g., shrink) of the displayed image of the base garment jeans when selected. The pattern and tint are magnified and shrunk as the base garment jeans are magnified and shrunk.

The preview images for the garment in the normal size and in the magnified view are both shown in three-dimensions. The normal sized garment and the magnified garment rotate with the preview image as the preview image is rotated. Thus, a user can see the jeans in three-dimension from multiple view points (e.g., multiple angles of rotation) in multiple magnifications.

Figure 56:
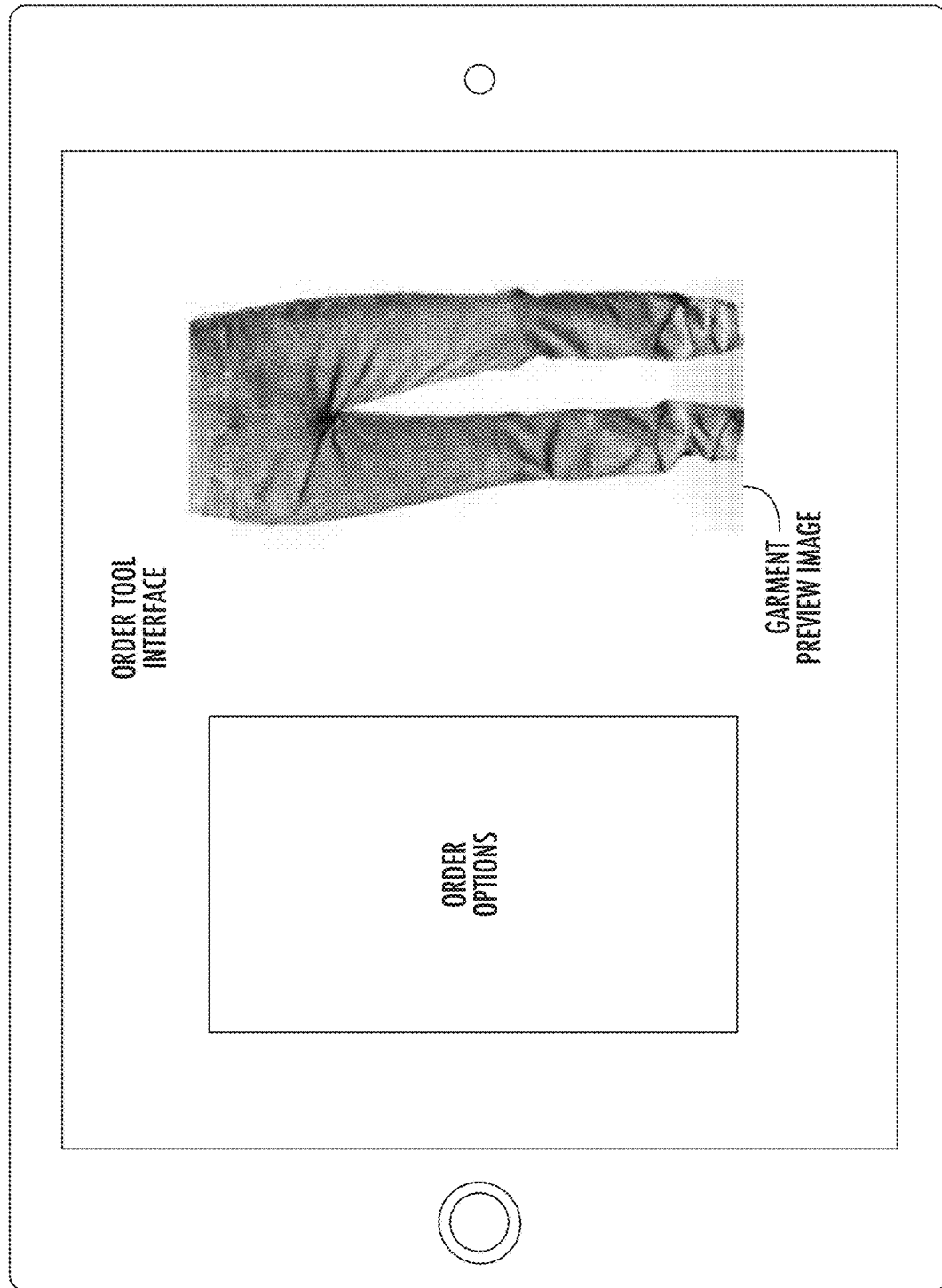
FIG. 56 shows the computer system with an order tool interface of the preview tool displayed on the display of the computer system, in an implementation.

FIG. 56 shows the computer system 1301 or 1401 with an order tool interface of the preview tool 1703 displayed on the display of the computer system, in an implementation. The order tool interface may be displayed after the add to bag option 4545 is selected on the preview tool 1703. The order interface tool includes a menu for order options.

In an implementation, the order tool interface displays a garment image 4590 having the options selected using the preview tool. The order tool interface can be adapted to update the garment image as various order options are selected from the garment. For example, if a preset design with whiskers is selected from the order options, then the garment image (e.g., jeans) is displayed with whiskers. If the present design for whiskers is deselected, then the garment preview image is displayed without whiskers. While the garment preview image is jeans, the image can be any selected garment, bag, or others.

The preview image of the ordered garment is shown in three-dimensions so that the user can see how the customized garment that they are about to purchase will appear on their body in three-dimensions. In an implementation, the preview image of the garment in three-dimension is rotatable on the order tool interface (e.g., curser click on the garment and drag for rotation) and each rotated view of the garment can be a three-dimensional view of the garment.

Figure 57:
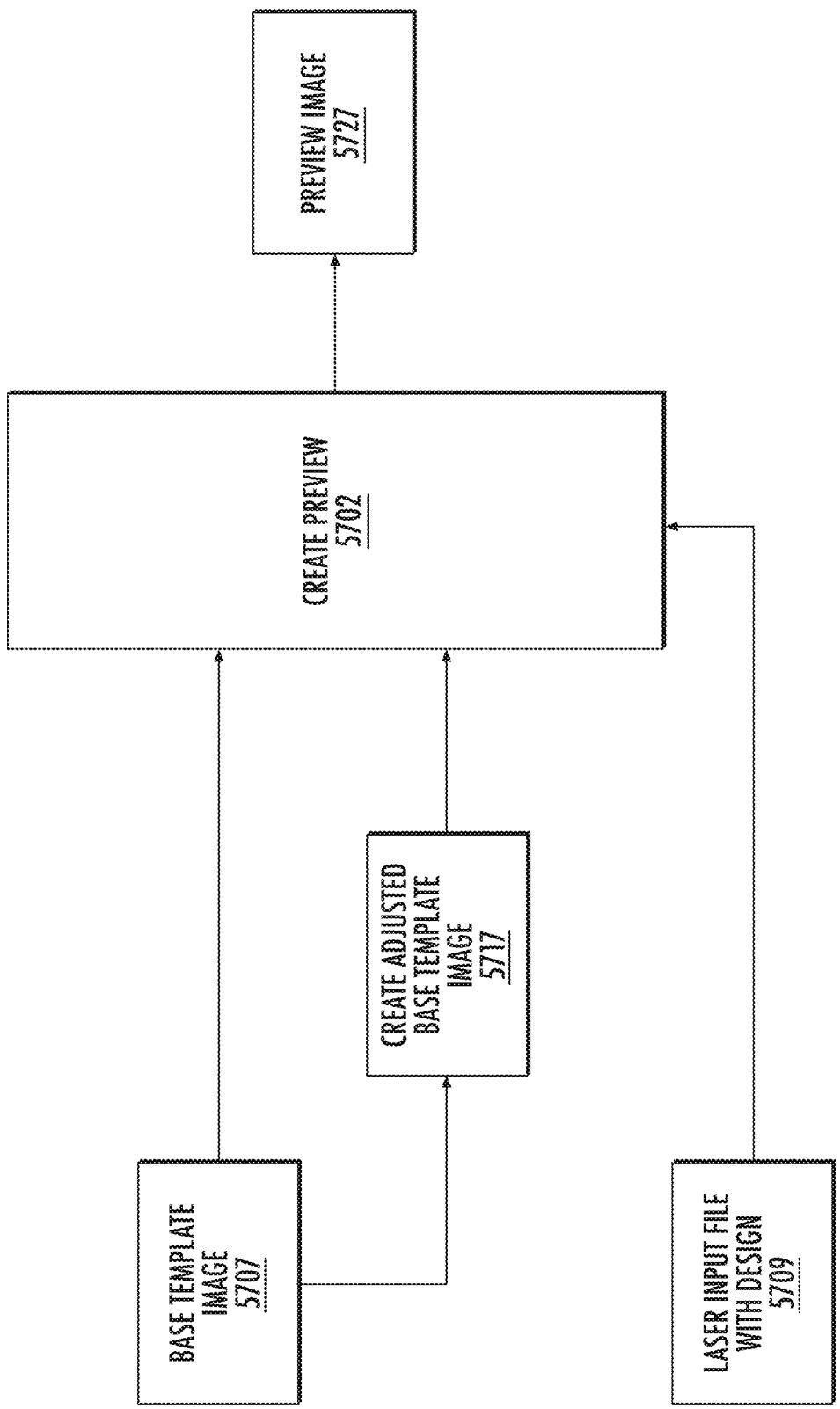
FIG. 57 shows a block diagram of a technique of generating a preview of a laser-finishing pattern on a garment, such as jeans.

FIG. 57 shows a block diagram of a technique of generating a preview of a laser-finishing pattern on a garment, such as jeans. Inputs to a create preview image process 5702 include a base template image 5707 and laser input file 5709. The base template image is used to create an adjusted base template image 5717, which is also input to the create preview image process. These create preview image process uses these three inputs to create a preview image 5727, which can be displayed on a computer screen for the user.

The adjusted base template image is created from the base template image by adjusting its hue, saturation, or lightness, or any combination of these. Compared to the original base template image, the adjusted base template image will appear washed out or bleached. In other words, the adjusted base template image will appear as if the garment in the base template image were fully bleached or lasered. The adjusted base template image can be an HLS adjustment layer as discussed above.

For a specific implementation of a laser, a specification for the laser input file is that each pixel is represented by an 8-bit binary value, which represents grayscale value in a range from 0 to 255. A 0 black prints the highest intensity (i.e., creates the most change and will be the lightest possible pixel) and a 255 white does not print at all (i.e., creates the least change or will be the darkest possible pixel).

For a laser input file for this laser implementation, a reverse or negative image of the laser input file is input to the create preview image process. Based on the negative laser input file, to create each pixel in the preview image, the create preview image process will pass pixels of the base template image or the adjusted base template image, or a combination of these.

For the negative laser input file, a black pixel means the pixel (which was a white pixel in the original file) will not be lasered (which results in the original indigo color of the fabric). And a white pixel means the pixel (which was black in the original file) will be lasered at highest level (which results in the whitest color that can be achieved on the fabric). And for gray pixels between black and white, the result will be proportional to the value, somewhere between darkest and lightest colors.

Similarly, to create the preview image, based the negative laser input file, a pixel of a (1) base template image (e.g., unbleached) or (2) adjusted base template image (e.g., bleached) or (3) some mixture or combination of the base template image and adjusted base template image proportional to the grayscale value in the negative laser input file. For example, for a gray value in the negative laser input file, 60 percent of the base layer and 40 percent of the adjustment layer pass through to the preview image.

The above discussion described a laser input file conforming to one type of logic. However, in other implementations of a laser, the values in the laser input file can be the reverse or negative logic compared to that described above. As one of ordinary skill in the art would appreciate, the techniques described in this patent can be modified accordingly to work with negative or positive logic laser input files.

FIGS. 58-67 show a number of aerial views and a number of planar views a mobile finishing center 10, in an implementation. The mobile processing center can be transported via truck, rail, or ship to various venues where custom garments may be finished and sold. Portions of the mobile finishing center such as decks, steps for the deck, frames, and awnings are removably attached to the mobile finishing center for fast and convenient setup of the center and removal of the center for transport. A deck, frame, and other portions of the center may be slip fit to shipping containers of the mobile finishing center without being disassembled.

Figure 58:
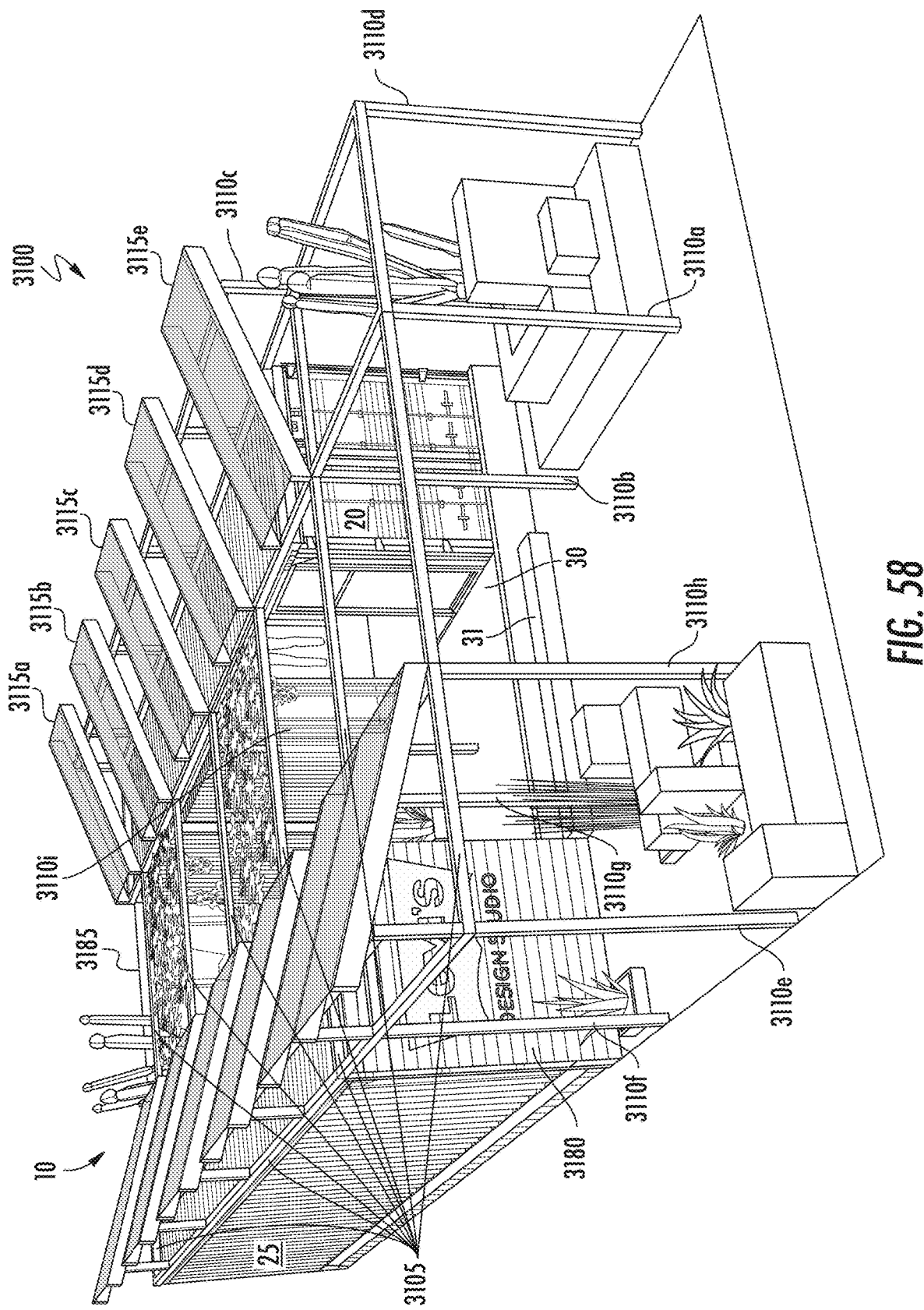
FIG. 58 shows a front left aerial view of the mobile finishing center.
Figure 59:
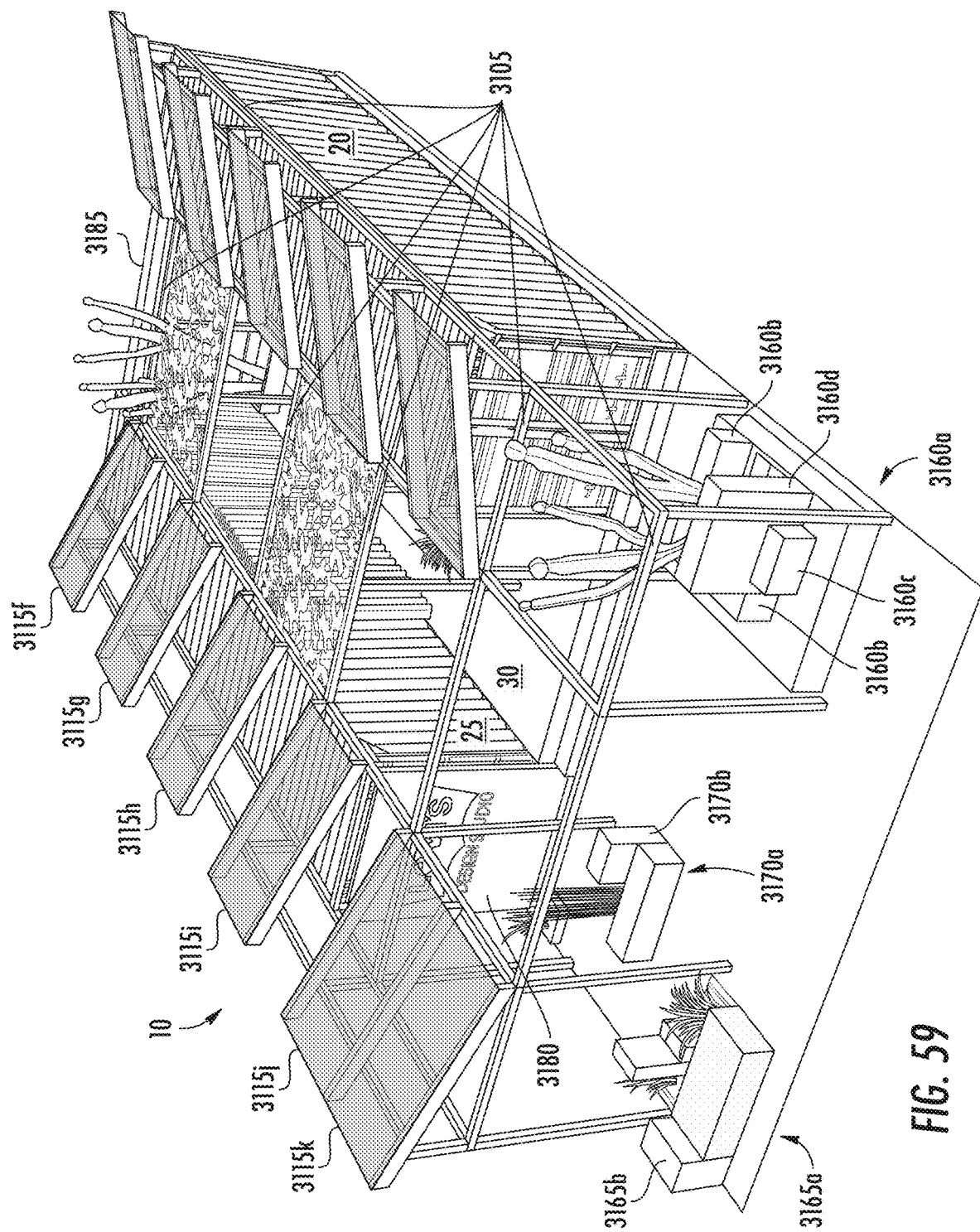
FIG. 59 shows a front right aerial view of the mobile finishing center.
Figure 60:
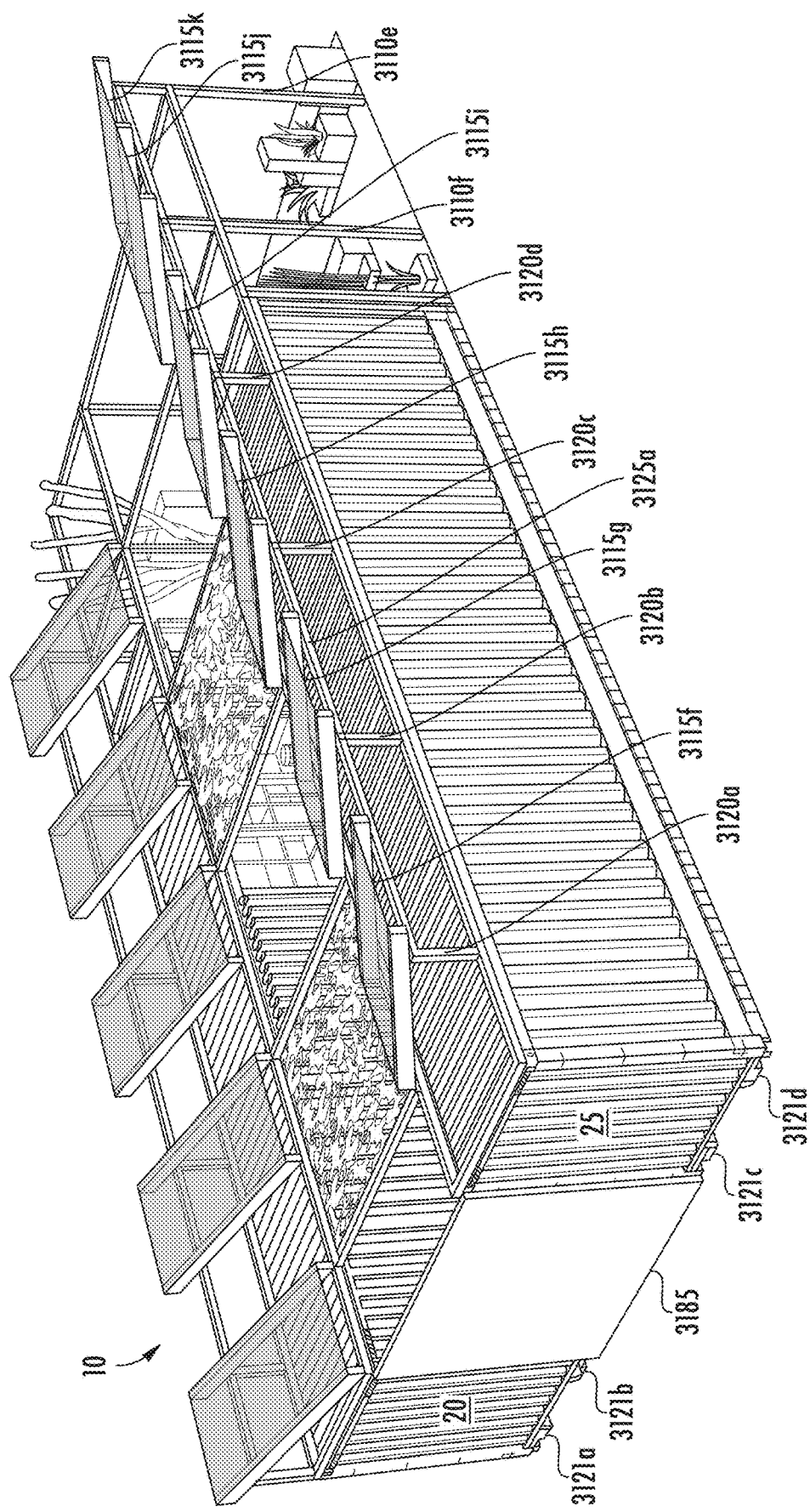
FIG. 60 shows a back left aerial view of the mobile finishing center.
Figure 61:
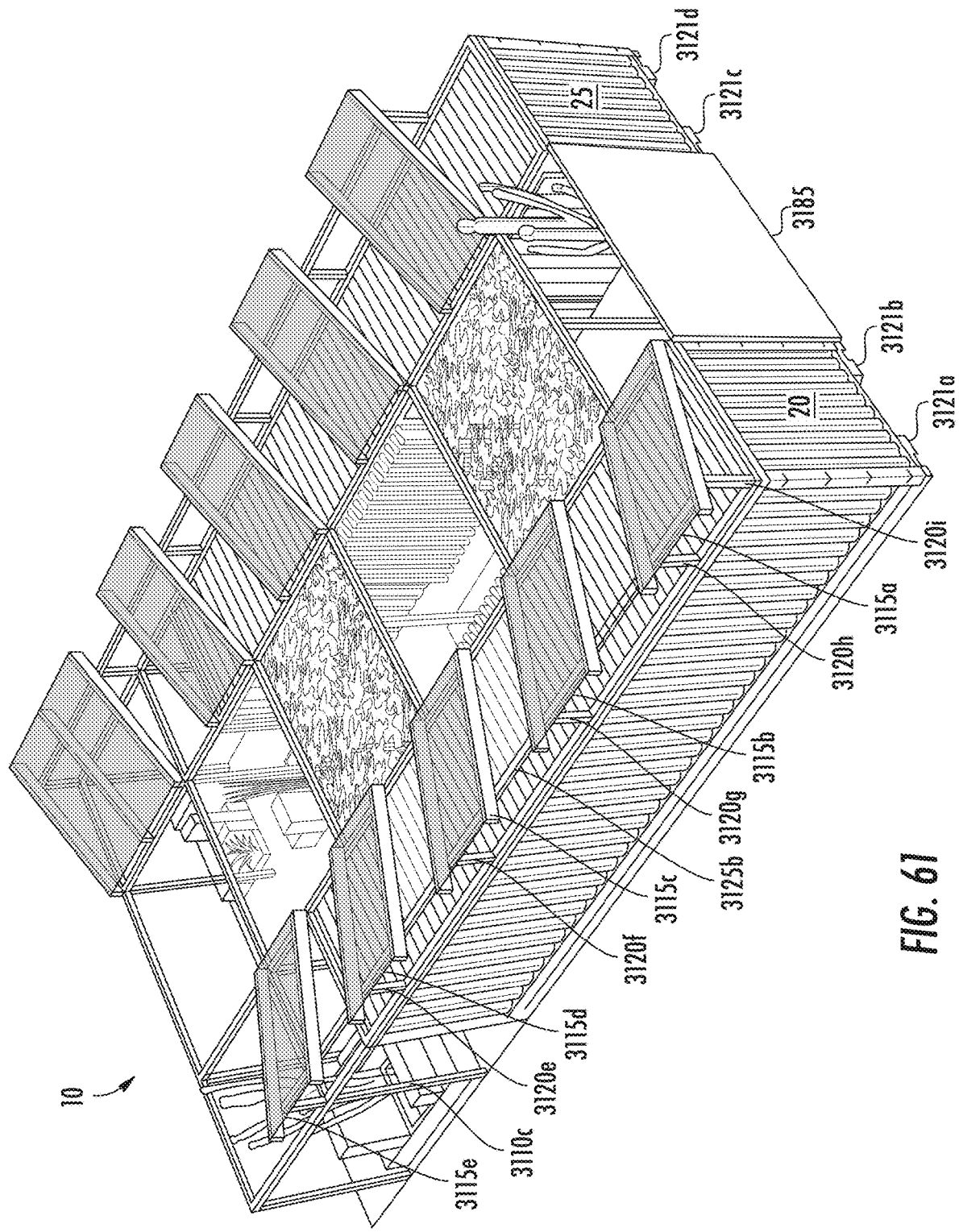
FIG. 61 shows a back right aerial view of the mobile finishing center.
Figure 62:
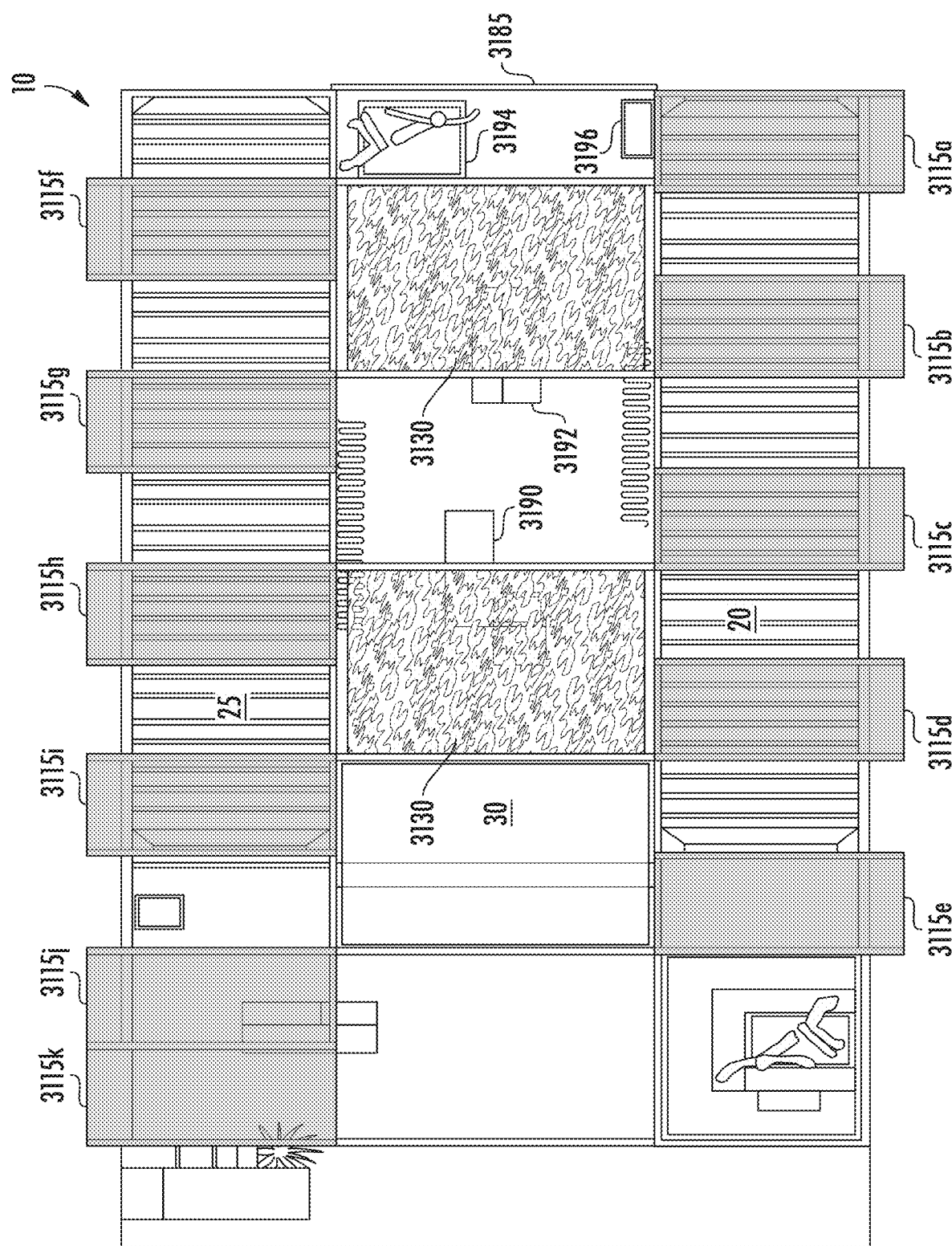
FIG. 62 shows a planar top view of the mobile finishing center.
Figure 63:
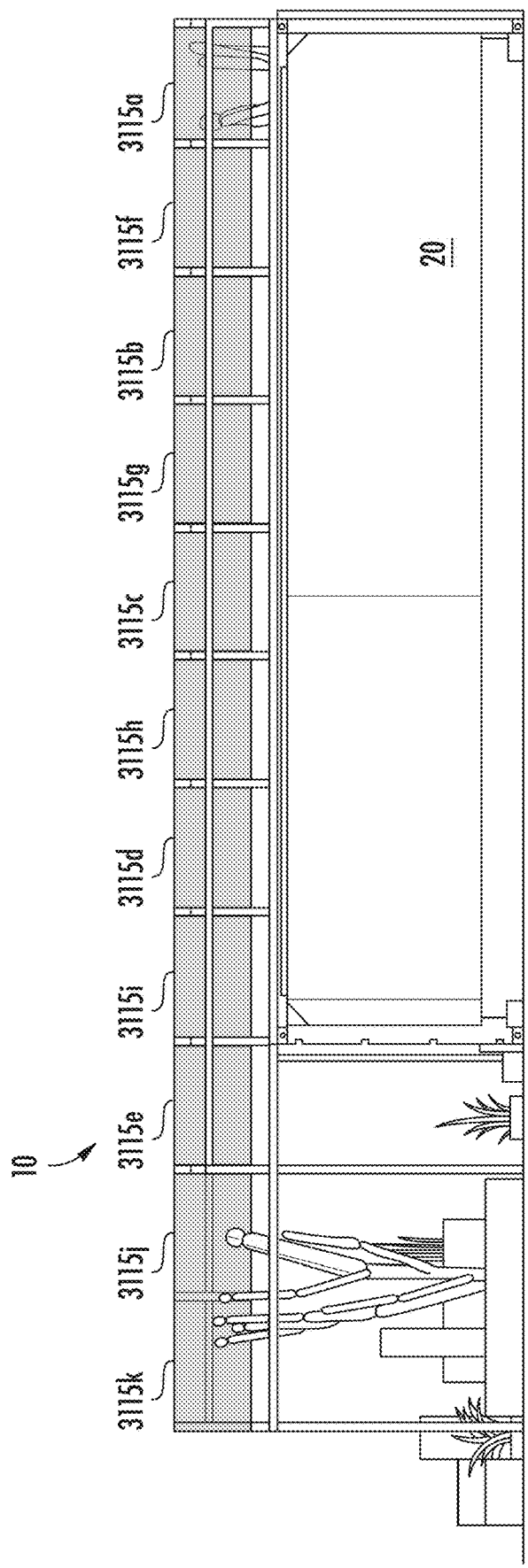
FIG. 63 is a side view of the mobile finishing center.
Figure 64:
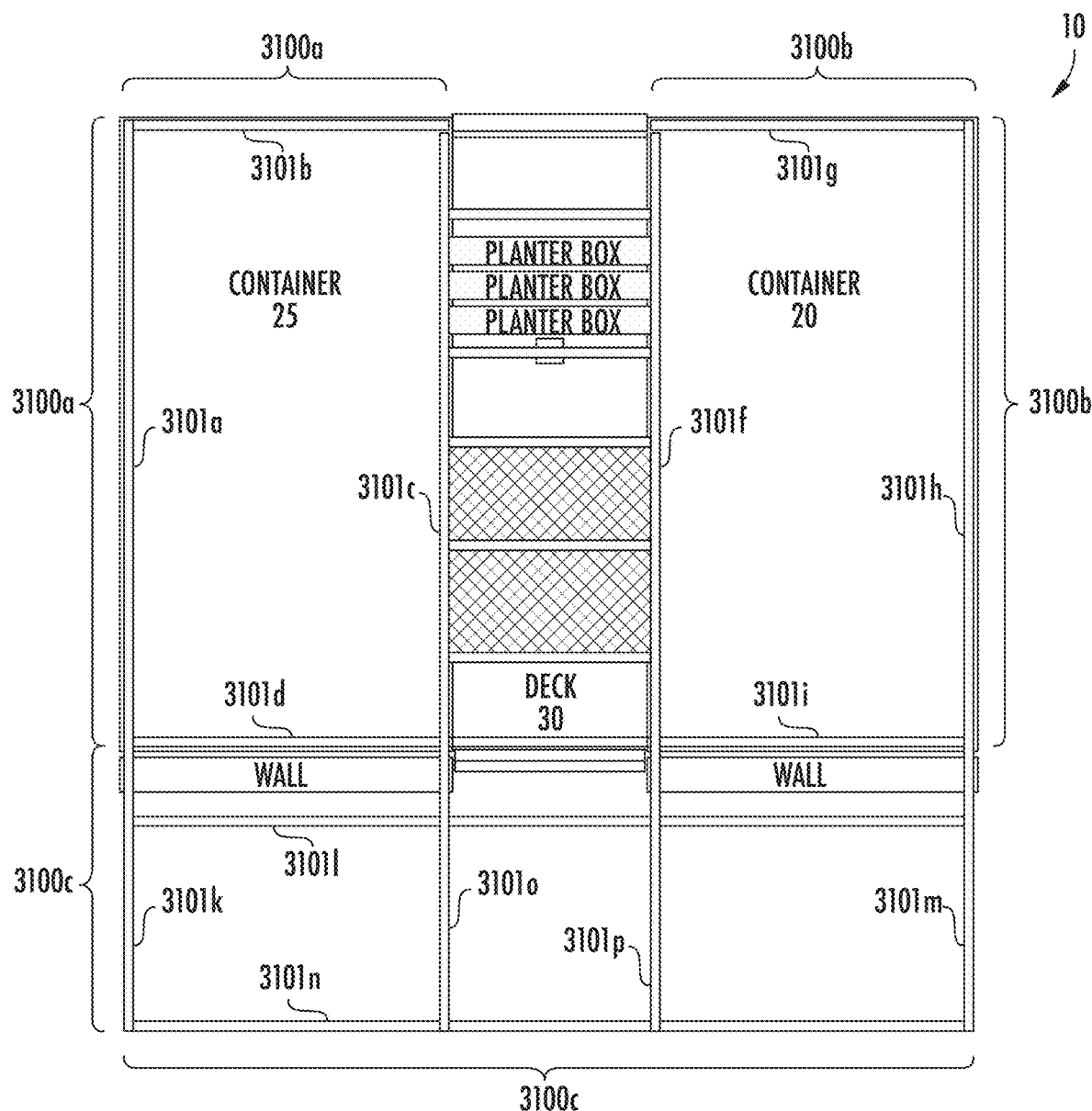
FIGS. 64-67 show a number of planar views of the mobile finishing center.
Figure 65:
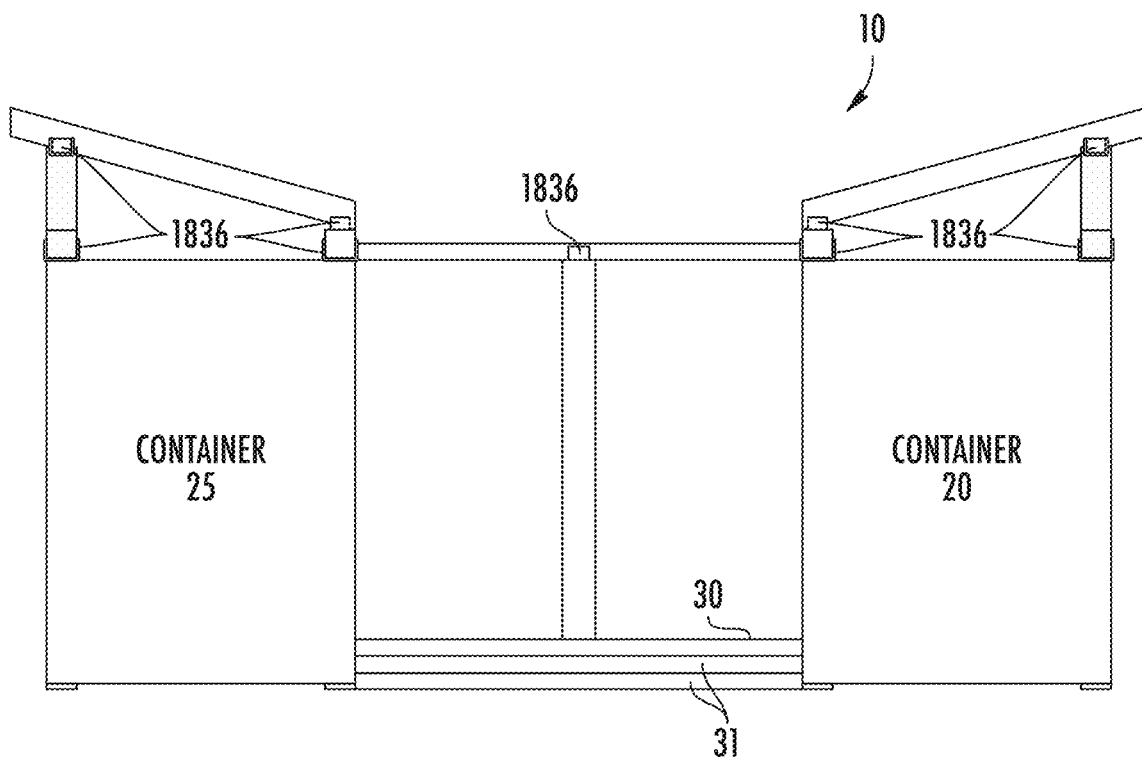
Figure 66:
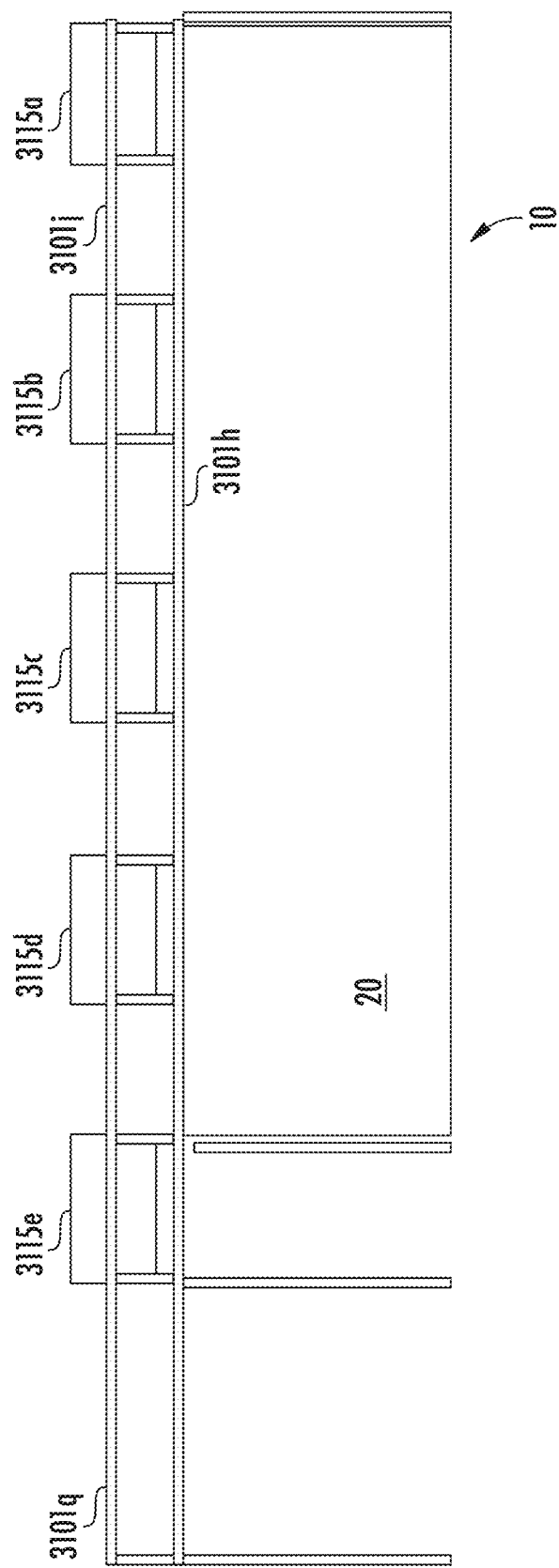
Figure 67:
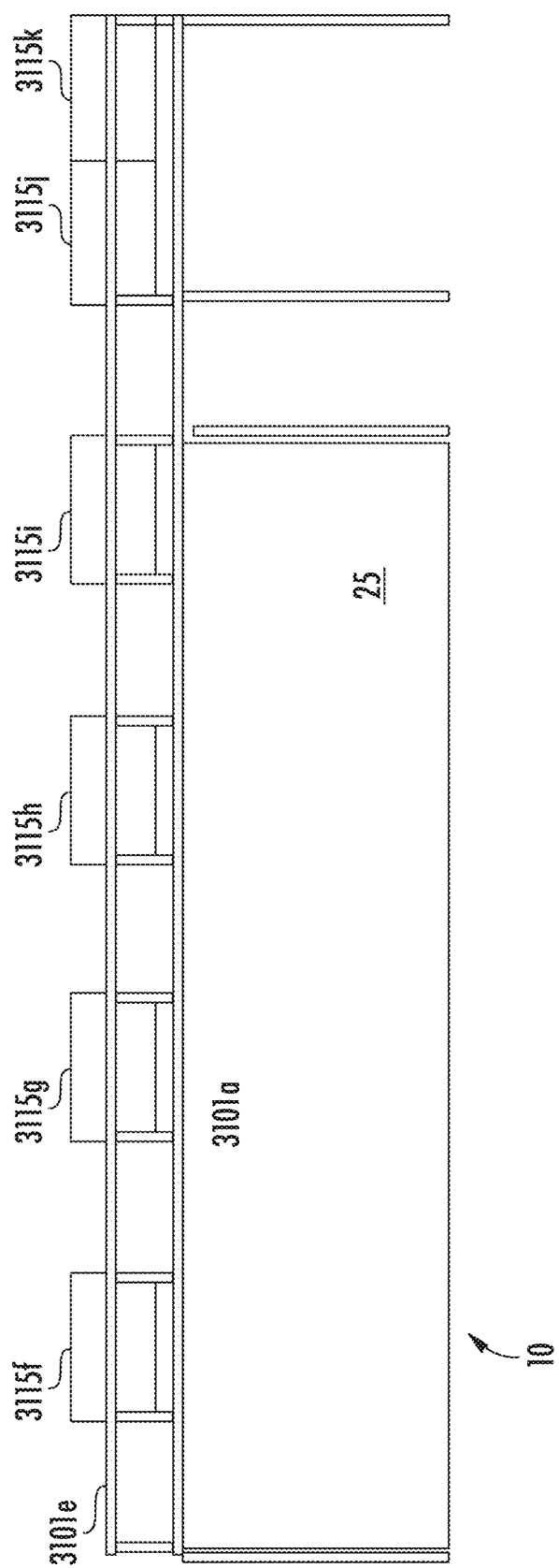

FIG. 58 shows a front left aerial view of the mobile finishing center. FIG. 59 shows a front right aerial view of the mobile finishing center. FIG. 60 shows a back left aerial view of the mobile finishing center. FIG. 61 shows a back right aerial view of the mobile finishing center. FIG. 62 shows a planar top view of the mobile finishing center. FIG. 63 shows a side planar view of the mobile finishing center. FIG. 64 shows another planar top view of the mobile finishing center. FIG. 65 shows a front planar view of the mobile finishing center. FIGS. 66-67 show side planar view of the mobile finishing center. The first and second containers are located in first and second spaces around which various frames, walls, decks, panels, and other structures may be located.

Containers 20 and 25 of the mobile finishing center are connected by a deck 30. The containers may be intermodal shipping containers that are compliant with universal shipping container dimensions and configurations dictated by the International Organization for Standardization (ISO). The shipping containers may have one or more of the standard lengths, heights, and widths specified by the ISO for intermodal shipping containers.

The shipping containers can have standard lengths, such as 2.43 meters (8 feet), 2.99 meters (9 feet 10 inches), 6.06 meters (20 feet), 12.2 meters (40 feet), or other lengths. The shipping containers can have standard widths, such as 2.2 meters (7 feet), 2.44 meters (8 feet), or other widths. The shipping containers can have standard heights, such as 2.27 meters (7.5 feet), 2.59 meters (8.5 feet), 2.89 meters (9.5 feet), or other heights. The standard lengths allow for ease of truck, train, and ship transportation. The deck can have the same length as the containers (e.g., 12.2 meters) or less, such as 11 meters and can have a width of 3.4 meters or other widths.

The containers can be shipping containers that fit onto conventional transportation vehicles for being moved between locations where the mobile finishing center will be used for finishing garments or stored. The shipping containers have standard sizes which allow the containers to be put onto truck trailers for truck transportation on a roadway 35, onto train cars for rail transportation, or onto ships for ship transportation. The containers can be moved by 1, 2, 3, or 4 or more trucks on 1, 2, 3, or 4 or more trailers. The containers can be picked up and removed from the trucks that transport the containers to a location and placed on the ground. The trucks transporting the containers can then be removed from the location, such as to a parking facility 40, to provide for optimum open space near the trailers and to allow the area near the containers and the containers to be more inviting for approach by customers. One or both of the trucks can include one or more storage locations for transporting the deck. Alternatively, the deck can be attached to (e.g., fold up onto) one of the containers for transport.

A deck 30 is connected to one or more steps 31 (sometimes referred to as stairs) located at a front area of the deck and a front area of the containers and between the containers. The steps connect a top of the deck to the ground. In an implementation, the deck is connected to a ramp that connects the ground to a top surface of the deck at the front area of the deck. In an implementation, the deck is connected to a ramp and steps at the front area of the deck where the ramp and steps both connect the ground to a top surface of the deck.

The deck, steps, or ramp may include wood planks (e.g., knotty pine, clear pine, or other woods), plastic planks (e.g., polyvinyl chloride), or other decking material. The wood planks may be 2 inches thick by 4 inches wide (i.e., 2×4s), 2 inches thick by 6 inches wide (i.e., 2×6s), 2 inches thick by 8 inches wide (i.e., 2×8s), or have other thicknesses and widths. The deck may extend from the front of the containers to the back of the containers. The top surface of the deck may be elevated above ground level and be approximately level with the raised interior floors of the containers. The even heights of the top surface of the deck and the floors of the containers allow for easy entrance and exit from the containers and allows for easy transport of garments between the containers.

The mobile finishing center may include a panel that is located in front of the second container 25. The panel may extend from a side of the steps to a side of the second container. The second panel may have a height that is approximately the same height at the top of the deck. The panel may be formed of slats that may be wood, such as 2×6s, 2×8s, or other sizes.

Mobile finishing center 10 may include a frame 3100, in an implementation. Frame 3100 may extend in front of the containers, over the containers, and over the deck. Frame 3100 can be viewed as including three frame sections including a first frame 3100a, 3100b, and 3100c. The first frame 3100a is located above container 25. The second frame 3100b is positioned above container 20. The third frame 3100c is positioned in front of the containers and the deck.

The first frame includes frame joists 3101a-3101e. Frame joists 3101a-3101d may from a rectangular frame section on the top of container 25. Frame joists 3101a, 3101c, and 3101e can be parallel. Short vertical studs 3120a-3120g are connected between frame joists 3101a and 3101e and extend transversely from these frame joists.

The second frame includes frame joists 3101f-3101j. Frame joists 3101f-3101i may from a rectangular frame section on the top of container 20. Frame joists 3101f, 3101h, and 3101j can be parallel. Short vertical studs 3120h-3120e are connected between frame joists 3101f and 3101j and extend transversely from these frame joists. Frame joists 3101a, 3101c, 3101e, 3101f, 3101h, and 3101j can be parallel.

The third frame includes frame joists 3101k-3101r. Frame joists 3101k-3101n form a can form a rectangle. Frame joist 3101k can extend linearly from frame joist 3101a. Frame joist 3101o can extend linearly from frame joist 3101c. Frame joist 3101p can extend linearly from frame joist 3101f. Frame joist 3101m can extend linearly from frame joist 3101h. Frame joist 3101q can extend linearly from frame joist 3101j. Frame joist 3101r can extend linearly from frame joist 3101e. A primary longitudinal axis of the third frame 3101c can be approximately transverse to the primary longitudinal axes of the first frame 3101a and the second frame 3101b.

In an implementation, the first shipping container 20 is located on top of supports (e.g., slats) 3121a and 3121b. The second shipping container 25 is located on top of supports (e.g., slats) 3121c and 3121d. The supports may contact the ground and the bottoms of the shipping containers. The supports may support the bottoms of the shipping containers above the ground. That is, the supports may create space between the ground and the bottoms of the shipping containers. In an implementations, the supports allow the bottom of the shipping containers to contact the ground. The support may be from about 2 inches thick to about 10 inches thick. The supports are sometimes referred to as slats or risers as the supports may raise the bottoms of the containers above the ground. In an implementation, the supports raise the bottoms of the containers above the ground by the thickness of the supports.

Vertical studs 3110a-3110h support the third frame 3101c at a height that is approximately the same as the first frame 3101a and second frame 3101b that are above containers 25 and 20. The length of each of vertical studs 3110a-3110h may be the height of a shipping container plus the height one of the support 3121a-3121d. The frame may include more or fewer vertical studs, for example, depending on the size of the frame structure. Studs are sometimes referred to as posts.

The frame joists are located on the top side edges of the containers may be held in place by brackets, such as "U" shaped brackets. The U brackets may be connected to the metal material of the containers by fasteners, welding, or other connection techniques. In an embodiment, the frame joists are not fastened to the U brackets (e.g., net nailed, screwed, bolted, or others) for easy assembly and disassembly of the frame for movement between venues. In an embodiment, the frame joists are fastened to the U bracket by fasteners, such as nails, bolts, or other types of fasteners. In an implementation, the frame joists are adhered to the U brackets by an adhesive. FIGS. 65, 71, 73, and 84 (described further below) show a number of U brackets 1836 that attached to containers 20 and 25 with the frame joists located in the brackets where the frame joists pieces may not be fastened to the U brackets. The depth of the U brackets may be less than the width of the frame joists located in the brackets or may have the same depth as the widths of the frame joists. The U brackets may be metal bracket, such as steel brackets and may be galvanized for durability.

The frame and studs supporting the frame may be formed of wood (e.g., knotty pine, clear pine, or other woods), plastic planks (e.g., polyvinyl chloride), or other material. The material (e.g., wooden boards) of the frame may be 2 inches thick by 4 inches wide (i.e., 2×4s), 2 inches thick by 6 inches wide (i.e., 2×6s), 2 inches thick by 8 inches wide (i.e., 2×8s), other sizes, or any combination of these sizes. The material (e.g., wooden boards) of the vertical studs and short vertical studs may be 4 inches wide by 4 inches wide (i.e., 4×4s) or other sizes. The material of the lateral supports may be 2 inches thick by 4 inches wide (i.e., 2×4s), 2 inches thick by 6 inches wide (i.e., 2×6s), 2 inches thick by 8 inches wide (i.e., 2×8s), other sizes, or any combination of these sizes.

In an implementation, the four vertical studs 3110*a*, 3110*b*, 3110*c*, and 3110*d* (i.e., a first set of four vertical studs) may be located in front of container 20 and the four vertical studs 3110*e*, 3110*f*, 3110*g*, and 3110*h* (i.e., a second set of four vertical studs) may be located in front of container 25. The separation between vertical studs 3110*a* and 3110*d*, the separation between vertical studs 3110*b* 3110*c*, the separation between vertical studs 3110*e* and 3110*h*, and the separation between vertical studs 3110*f* and 3110*g* may approximately match the width of a container 2.43 meters (i.e., 8 feet), may be wider than the widths of a shipping container, or may be narrower than the width of a shipping container. Vertical studs 3110*a* and 3110*h* and vertical studs 3110*b* and 3110*g* may be respectively separated by the width of the deck (e.g., approximately 3.4 meters), may be separated by a distance greater than the width of the deck, or may be separated by a distance that is less than the width of the deck.

In an implementation, angled shades 3115*a*, 3115*b*, 3115*c*, 3115*d*, and 3115*e* are supported by joists 3101*c* and 3101*e*. Angled shades 3115*f*, 3115*g*, 3115*h*, 3115*i*, 3115*j*, and 3115*k* are supported by joists 3101*f* and 3101*i*. The angled shades are angled at an acute angle with respect to ground, to the tops of the containers, or both. For example, the angled shades may be angled from approximately 5 degrees to approximately 30 degrees with respect to ground, the tops of the containers, or both. The angled shades above the first container may be slanted downward from the right side (away from the deck) of the container to the left side (closest to the deck) of the first container, may be slanted downward from the left side of the container to the left side of the container, may be flat with respect to ground or the tops of the container, or may be any combination of these orientations. The angled shades above the second container may be slanted downward from the right side (away from the deck) of the container to the left side (closest to the deck) of the container, may be slanted downward from the left side of the container to the left side of the first container, may be flat with respect to ground or the tops of the container, or may be any combination of these orientations.

Each angled shades includes a first side rafter and second side rafter. The material of the side rafters may be 2 inches thick by 4 inches wide (i.e., 2×4s), 2 inches thick by 6 inches wide (i.e., 2×6s), 2 inches thick by 8 inches wide (i.e., 2×8s), other sizes, or any combination of these sizes. Each angled shades includes a shade material that is connected to the rafters of the shade. The ends of the rafters are beveled. The bevels may be parallel to the sides of the containers.

Each angled shades includes a shade material that is connected to the first and second rafters supports of the shades. The shade material may be transparent or translucent and let diffuse light pass through the angled shades. The shade material may be polycarbonate, polyvinyl chloride, fabric, netting, a canopy, cloth, or another material. In an specific implementation, the shade material include a top panel, a bottom panel, and a number of ribs connecting to the top and bottom panels forming a number of channels between the top and bottom panels. A shade material may be connected to the rafters via mechanical fasteners, adhesive, or other connecting material. The shade material may include one or more solar panels that are connected to one or more electrical panels of containers 20 and 25 to provide power or supplemental power for the mobile finishing system.

In an implementation, adjacent ones of the angled shades 3115*a*-3115*e* over container 20 are separated by spaces the may be approximately as wide as one of the angled shade. Adjacent ones of the angled shades 3115*f*-3115*j* over container 25 are separated by spaces the may be approximately as wide as one of the angled shade. Adjacent shades 3115*j* and 3115*k* are not separated by a space, in an implementation.

The angled shades 3115*a*-3115*e* over container 20 may be laterally offset with respect to the angled shades 3115*f*-3115*j* over container 25. In an implementation, there is no lateral overlap between the angled shades over containers 20 and 25, which is most easily seen in FIG. 62.

In an implementation, angled shades 3115*j* and 3115*k* are located over the opening between the tops of the second set of vertical studs, and angled shade 3115*e* is located over the opening between the tops of the first set of vertical studs. Angled shades 3115*e*, 3115*j*, 3115*k*, create shade in patio-seating areas located in front of containers 20 and 25.

A number of joists 3105 are connected between joists 3101*c* and 3101*f*. Joists 3105 may connect to joists 3101*c*, 3101*f*, the tops of containers 20 and 25, to the sides of the containers, or any combination of these. Joists 3105 may extend over deck 30. One or more vertical studs, such as vertical stud 3110*i*, may be connected to one or more of joists 3105 and may be on the ground or in a cinder block that is on the ground. The lengths of these vertical studs (plus a cinder block if a cinder block is connected to the stud) may be approximately the height of one of the containers and the height of one of the supports 3121*a*-3121*d* located under the containers.

In an implantation, one or more shades 3130 are located over, inside, or under one or more openings formed by frame joists 3105. The shades may be cargo netting, such as white or green cargo netting. Cargo netting has an open structure allowing air and heat to pass through the netting, while providing shading. The shades may alternatively be transparent or translucent material, such as the material of the angled shades.

In an implementation, the mobile finishing center 10 includes a first seating area located in front of container 20 and a second seating area in front of container 25. The first seating area in front of container 20 includes a bench 3160*a* that has an approximately rectangular shape or an approximately square shape with an angled backrest 3160*b*, a first straight backrest 3160*c*, and a second backrest 3160*d* that has a height that is taller than the first backrest. The backrests may have other shapes. The bench may have a length that is between approximately 6 feet and approximately 8 feet (e.g., 7 feet) and a width that is between approximately 6 feet and approximately 8 feet (e.g., 7 feet). The top seating surface may be between approximately 1.5 feet wide and 2 feet wide. The angled and first backrests may extend approximately 1.5 feet above the top of the seating surface and the second backrest may extend approximately 4 feet above the top of the seating surface. The bench may include a planter located in the opening of the rectangular central opening of the bench.

The second seating area in front of container 25 includes a first bench 3165*a* and a second bench 2170*a*. The first bench is located within an area created by vertical studs 3110*e*-3110*h* and the second bench located is located in front of the vertical studs. The first bench includes a back 3165*b* that extends for a portion of the length of the bench, such approximately half of the length of the bench. The first bench includes a planter located adjacent to back 3165*b*. The second bench includes a back 3170*b* located at an end of the seating area forming a chaise lounge structure. The second bench includes a wall 3170*c* located at an approximately middle section of the seating area. The second bench includes first and second planters located on opposite sides of the wall 3170*c*. The benches may be painted with a color scheme that includes three colors, such as pink, dark blue, and gray.

In an implementation, the mobile finishing center 10 includes a vertical wall 3180 that is located in front of container 25. The front of the wall may include a number of horizontally or vertically oriented slats. The vertical wall may have a back support structure 3180*a* (shown in FIG. 71) that the slats that are connected to for support. The support structure may be wood or steel and may be connected to container 25 or may be free standing. The vertical wall may include a logo or other advertising marks. The material of the laterally oriented slats may be 2 inches thick by 4 inches wide (i.e., 2×4s), 2 inches thick by 6 inches wide (i.e., 2×6s), 2 inches thick by 8 inches wide (i.e., 2×8s), other sizes, or any combination of these sizes.

In an implementation, the mobile finishing center 10 includes a vertical wall 3185 that is located at the back of the deck. Wall 3185 may be connected to containers 20 and 25. Slats of the wall may be laterally or vertically oriented and may be 2 inches thick by 4 inches wide (i.e., 2×4s), 2 inches thick by 6 inches wide (i.e., 2×6s), 2 inches thick by 8 inches wide (i.e., 2×8s), other sizes, or any combination of these sizes. The wall may include a logo, advertising marks, or signage that includes a logo, a logo shape, or other advertising marks.

The deck may include one or more benches 3190 and 3192. The benches may be placed on the deck or attached to the deck so that the benches will not move during transport. The deck may include one or more planters located on the deck.

Figure 68:
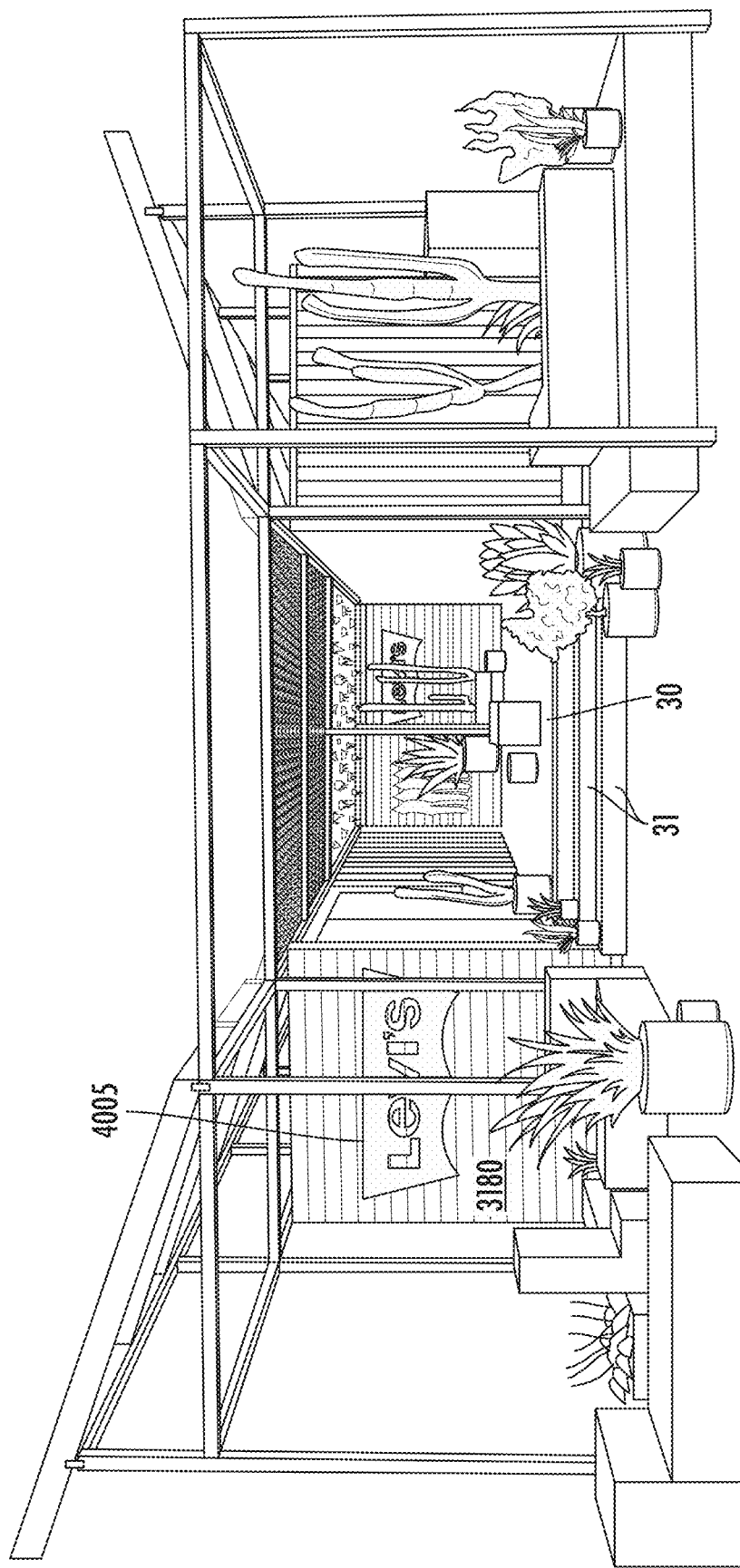
FIG. 68 shows a planer view of the front of the mobile finishing center.

FIG. 68 shows a planer view of the front of the mobile finishing center 10. The figure shows a logo 4005 positioned on vertical wall 3180. The figures also show an implementation where two steps 31 are located in front of deck 30.

Figure 69:
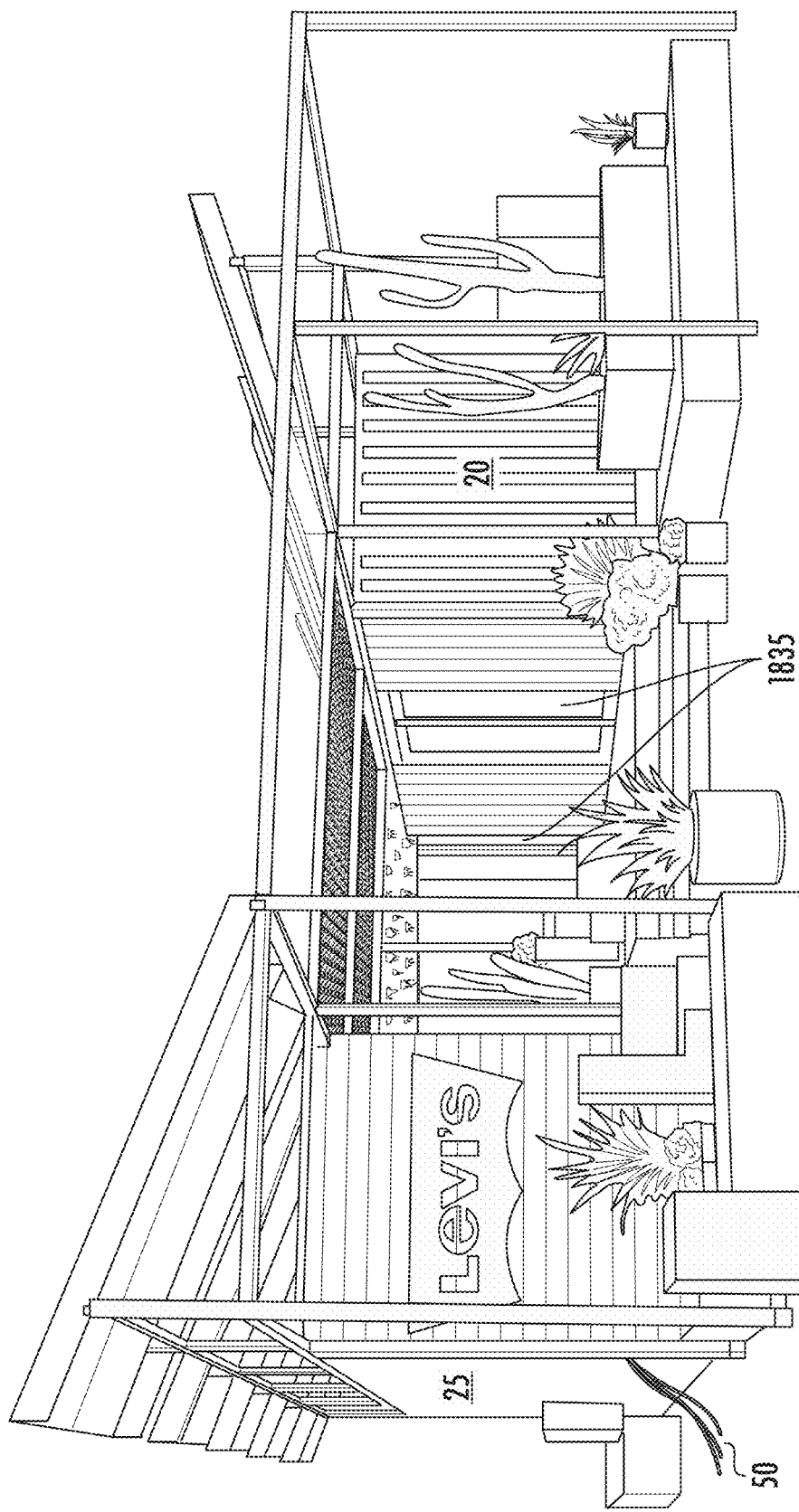
FIG. 69 shows a view of the front of the mobile finishing center from the left side of the center.

FIG. 69 shows a view of the front of the mobile finishing center 10 from the left side of the center. Electrical source 50 for container 25 is shown in the figure on the side of the container, in an implementation. The figure shows doors 1835 (e.g., sliding glass doors) located on the side of container 20.

Figure 70:
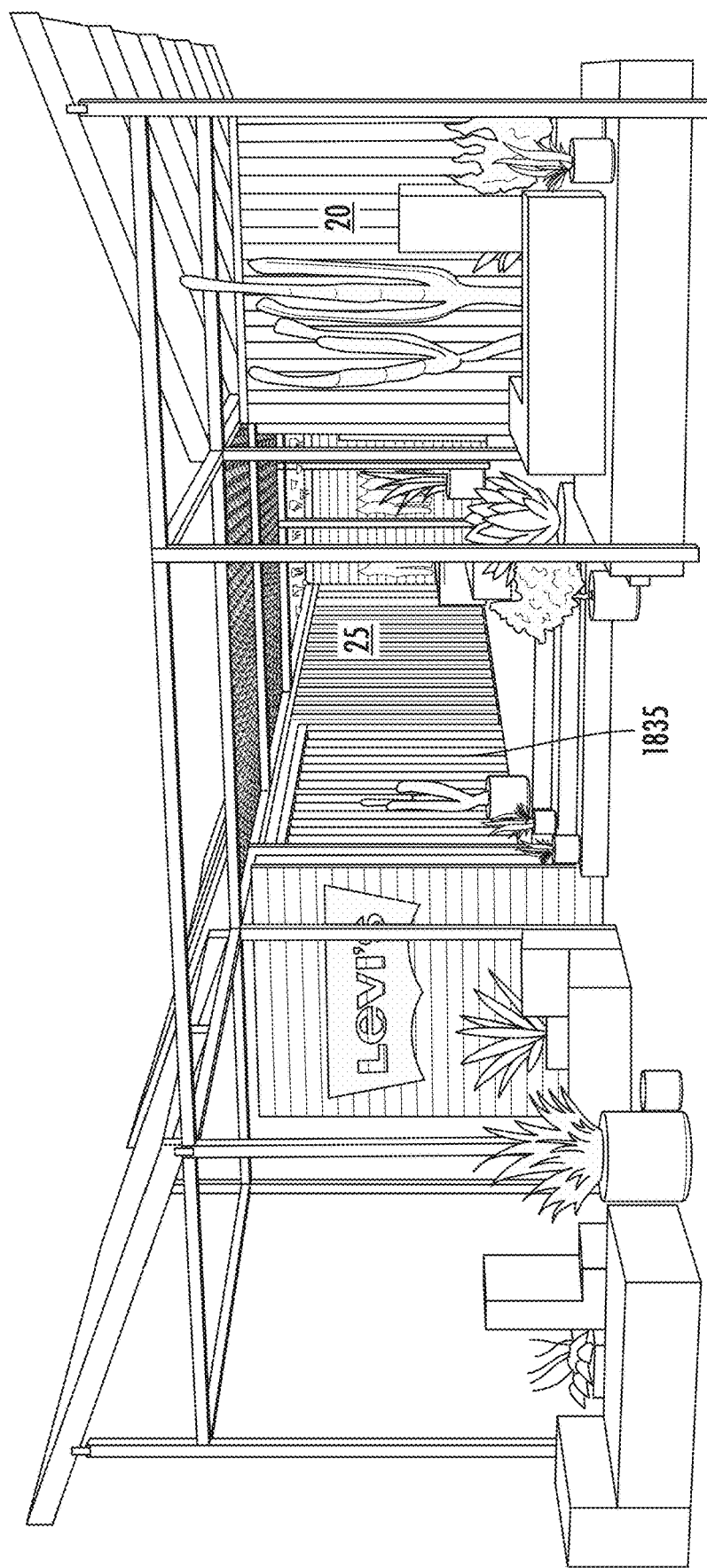
FIG. 70 shows a view of the front of the mobile finishing center from the right side of the center.

FIG. 70 shows a view of the front of the mobile finishing center 10 from the right side of the center. The figure shows a door 1835 (e.g., hinged metal door) located on the side of container 25.

Figure 71:
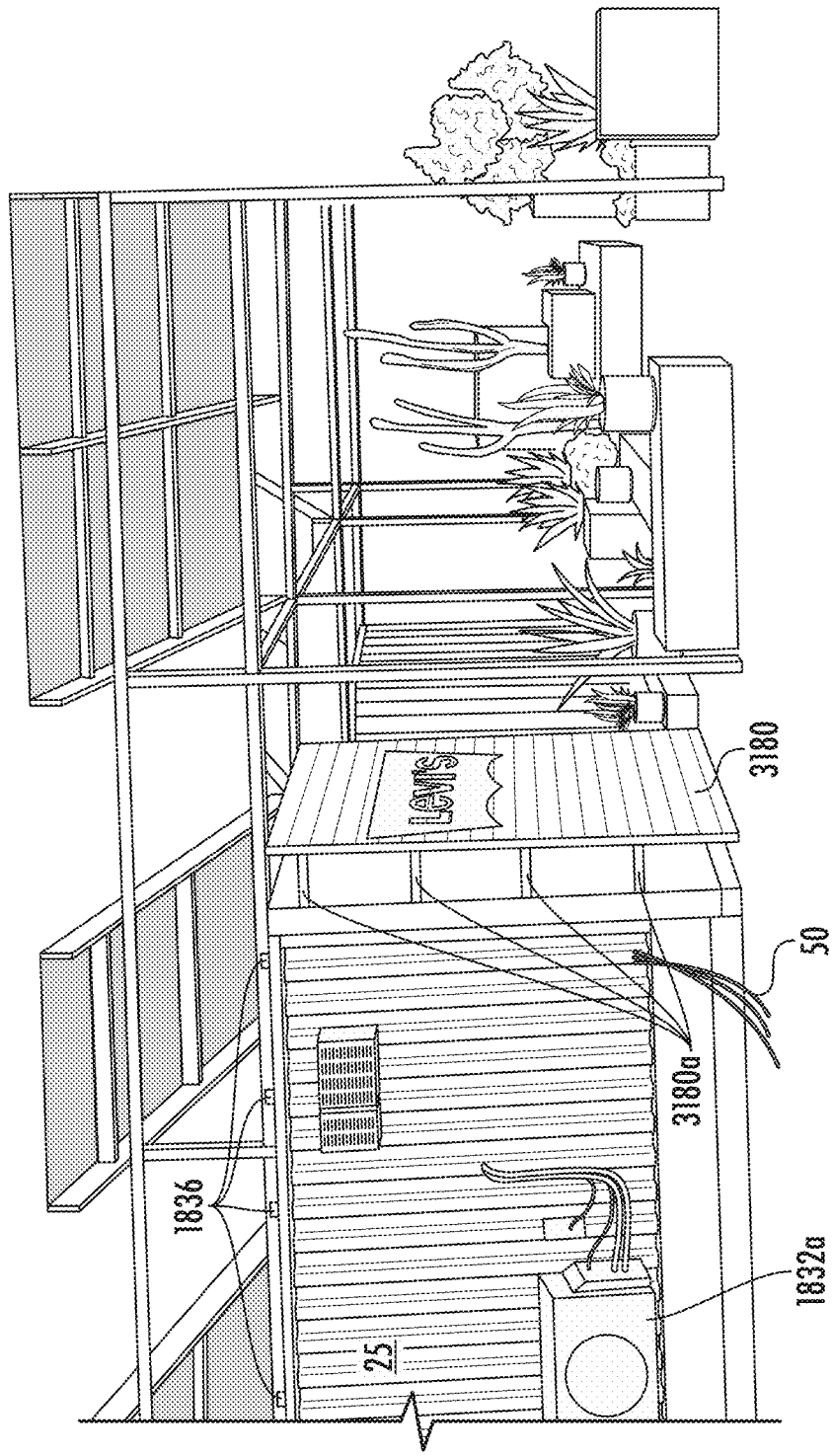
FIG. 71 shows a side view of the front of the mobile finishing center from the left side of the center.

FIG. 71 shows a side view of the front of the mobile finishing center 10 from the left side of the center. Electrical source 50 for container 25 and air conditioning unit 1832*a* are shown in the figure on the side of the container, in an implementation.

Figure 72:
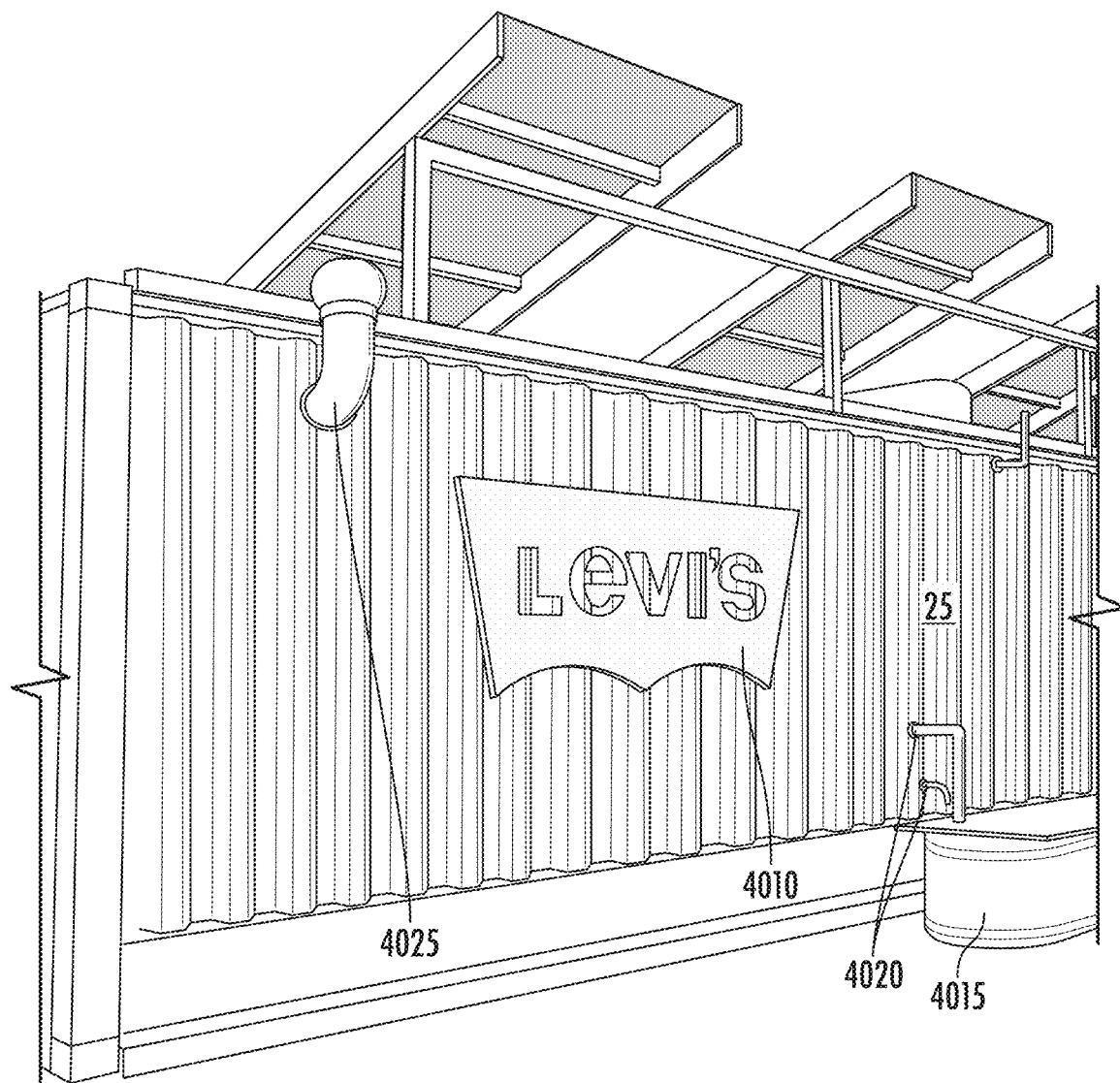
FIGS. 72-73 show a side view of the back of the mobile finishing center from the left side of the center.
Figure 73:
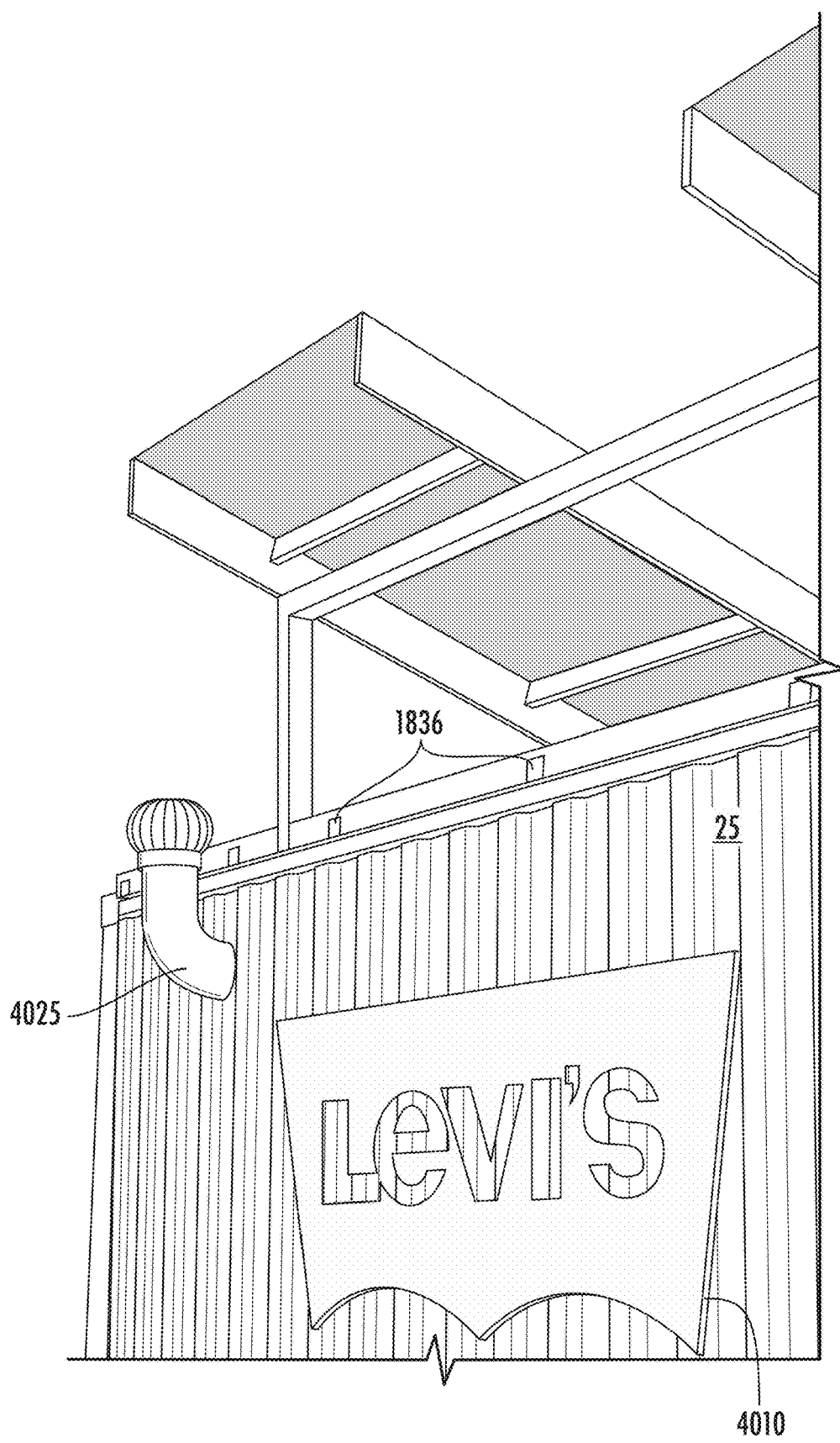

FIGS. 72-73 show a side view of the back of the mobile finishing center 10 from the left side of the center. In an implementation, a sign 4010 is located on a side of container 25. The sign may be wood or other material. Various containers, such as container 4015, may hide equipment, such as water tanks or other equipment. Conduits 4020 may be routed from container 4015, through an outer wall of container 25, and into container 25. The conduits may be water conduits or other conduits. One or more vents 4025 may be connected to the outer wall of container 25 for venting rooms inside the container.

Figure 74:
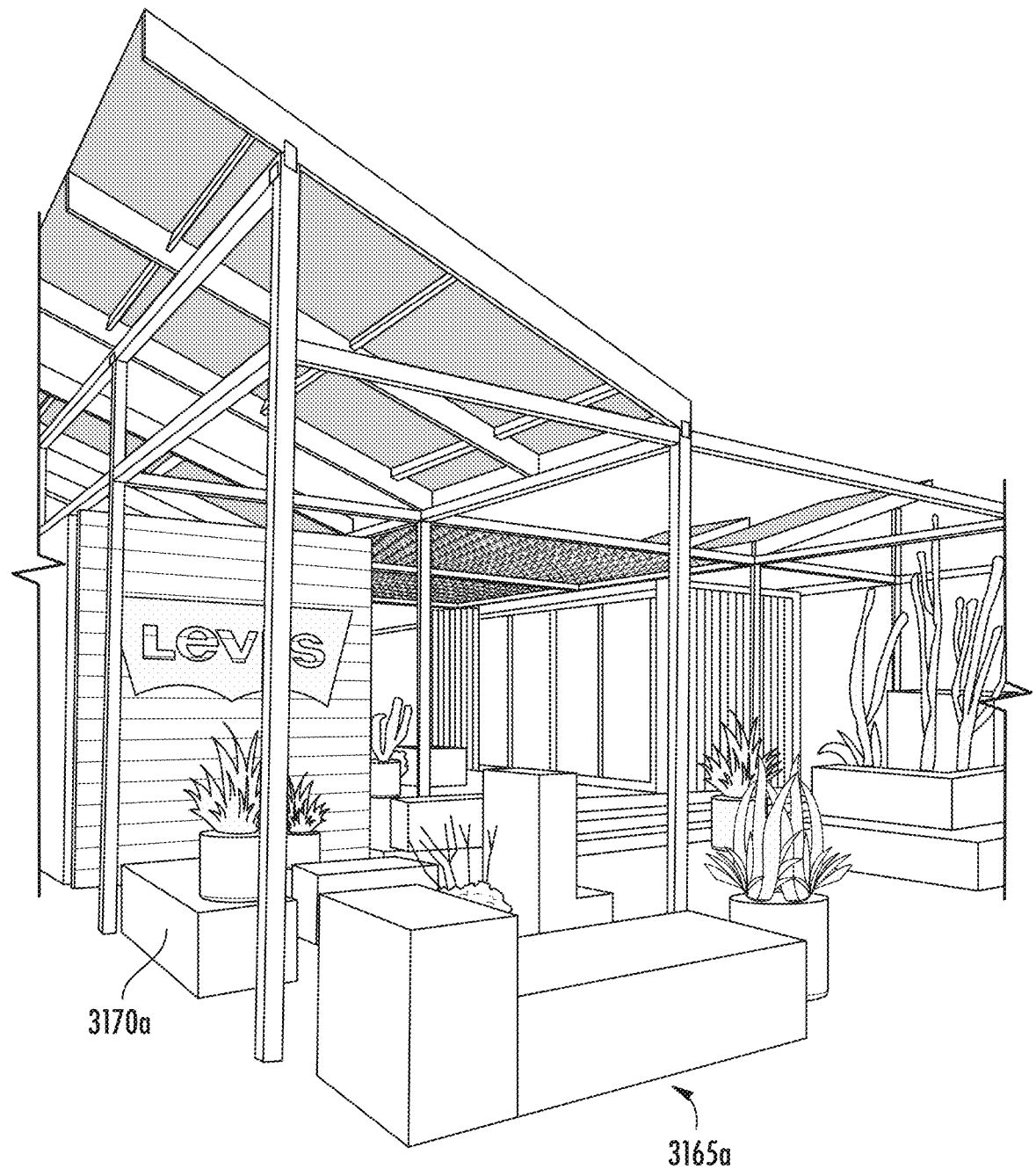
FIG. 74 shows close up views of the benches that are located in front of one of the container.

FIG. 74 shows close up views of the benches 3165*a* and 3170*a* that are located in front the container 25.

Figure 75:
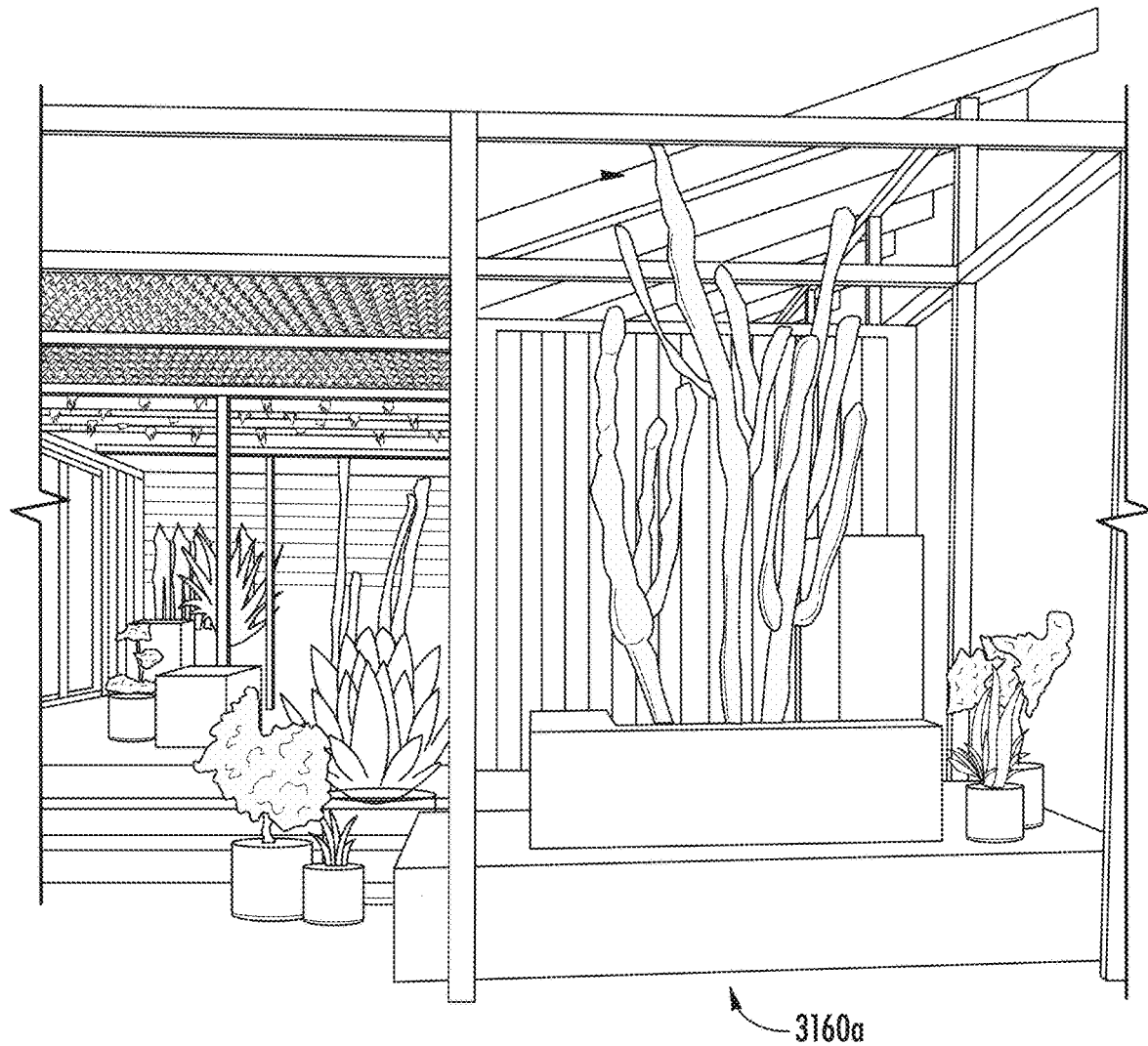
FIG. 75 shows close up views of the benches that are located in front of one of the containers.

FIG. 75 shows close up views of the benches 3160*a* and 3170*a* that are located in front the container 20.

Figure 76:
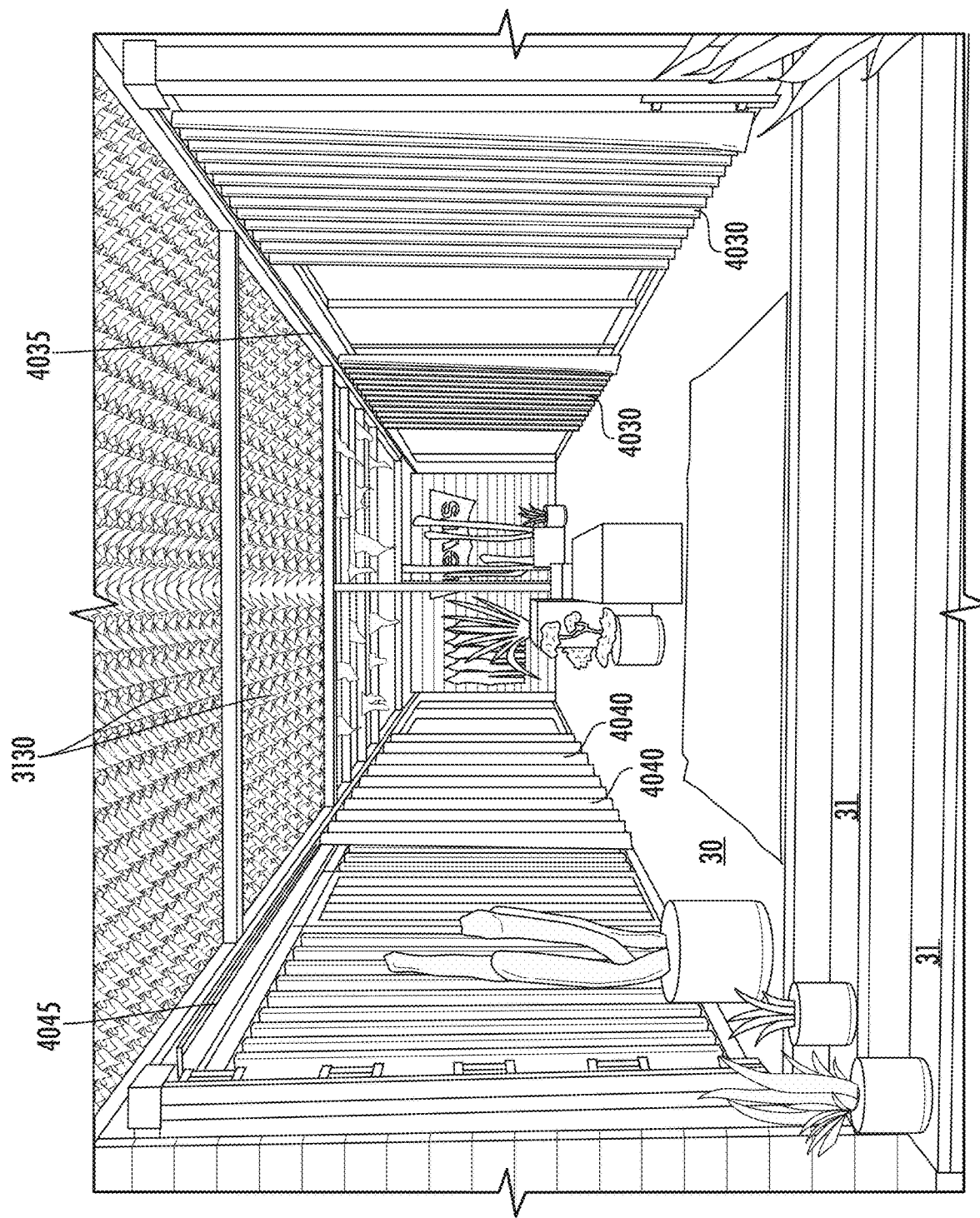
FIG. 76 shows a view of the deck and an upward-facing view of the white cargo netting shades positioned over the deck.

FIG. 76 shows a view of deck 30 and shows the position of the deck between containers 20 and 25. Container 20 includes a number of curtains 4030 that are located outside of the container. The curtains are attached to a curtain rod 4035 that is located at a top of the side of the container. The curtain can slide along the curtain rod to cover and expose the doors and side of the container. Container 25 includes a number of curtains 4040 that are located outside of the container. The curtains are attached to a curtain rod 4045 that is located at a top of the side of the container. The curtains can slide along the curtain rod to cover and expose the doors and side of the container. FIG. 76 also an upward-facing view of shades 3130 where the shades are white color cargo netting.

Figure 77:
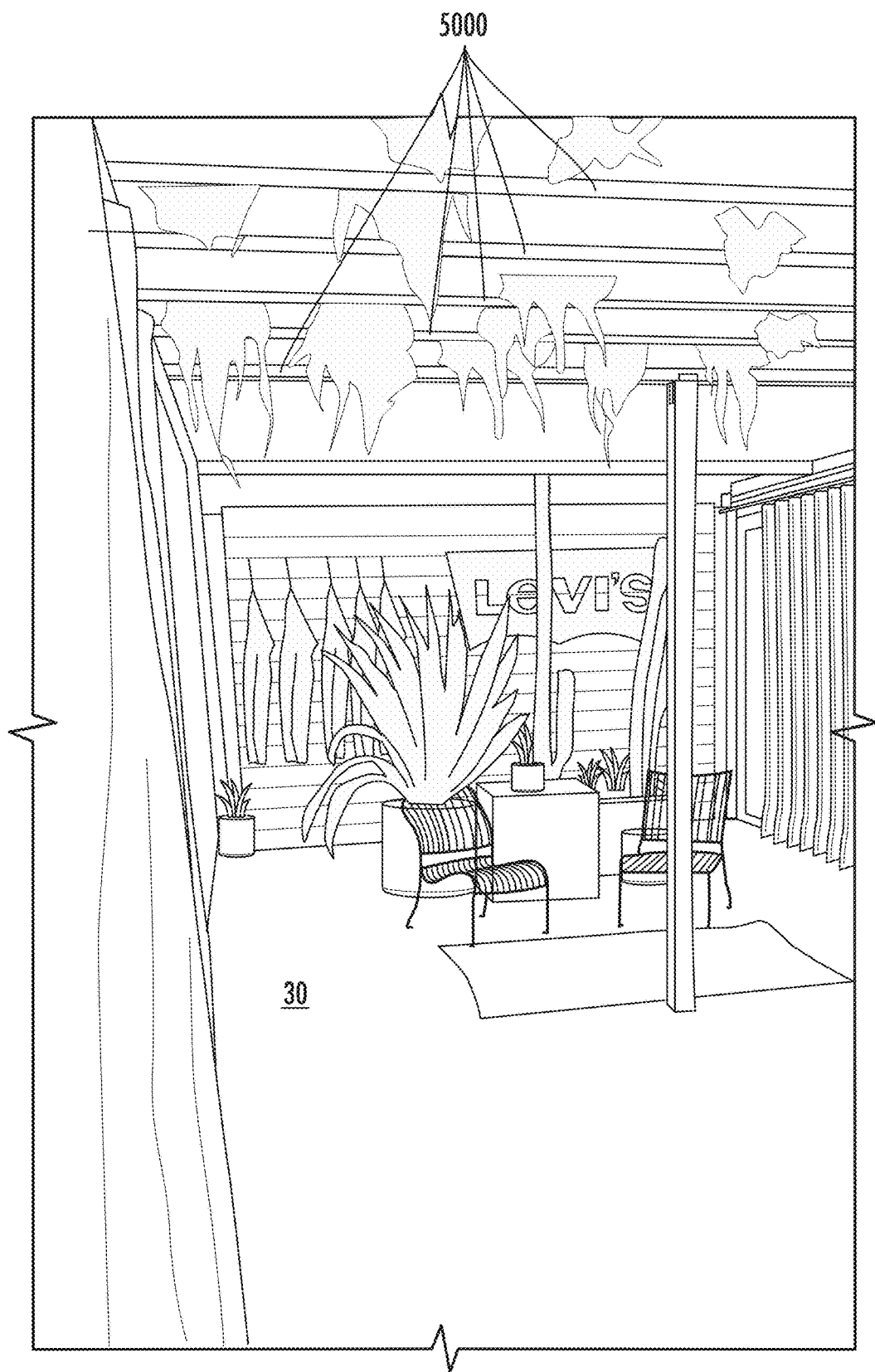
FIG. 77 shows a view of the deck and an upward-facing view of the beams that are connected to and extend between the top sides of the containers and the frames on top of the containers.

FIG. 77 shows a view of deck 30 and an upward-facing view of beams 5000 that are connected to and extend between the top sides of containers 20 and 25. The beams may be hollow along the tops of the beams. The open-topped beams may be planter boxes and plants may be planted in the openings. The mobile finishing center may include 2 or more beams 5000, such as 6 beams.

Figure 78:
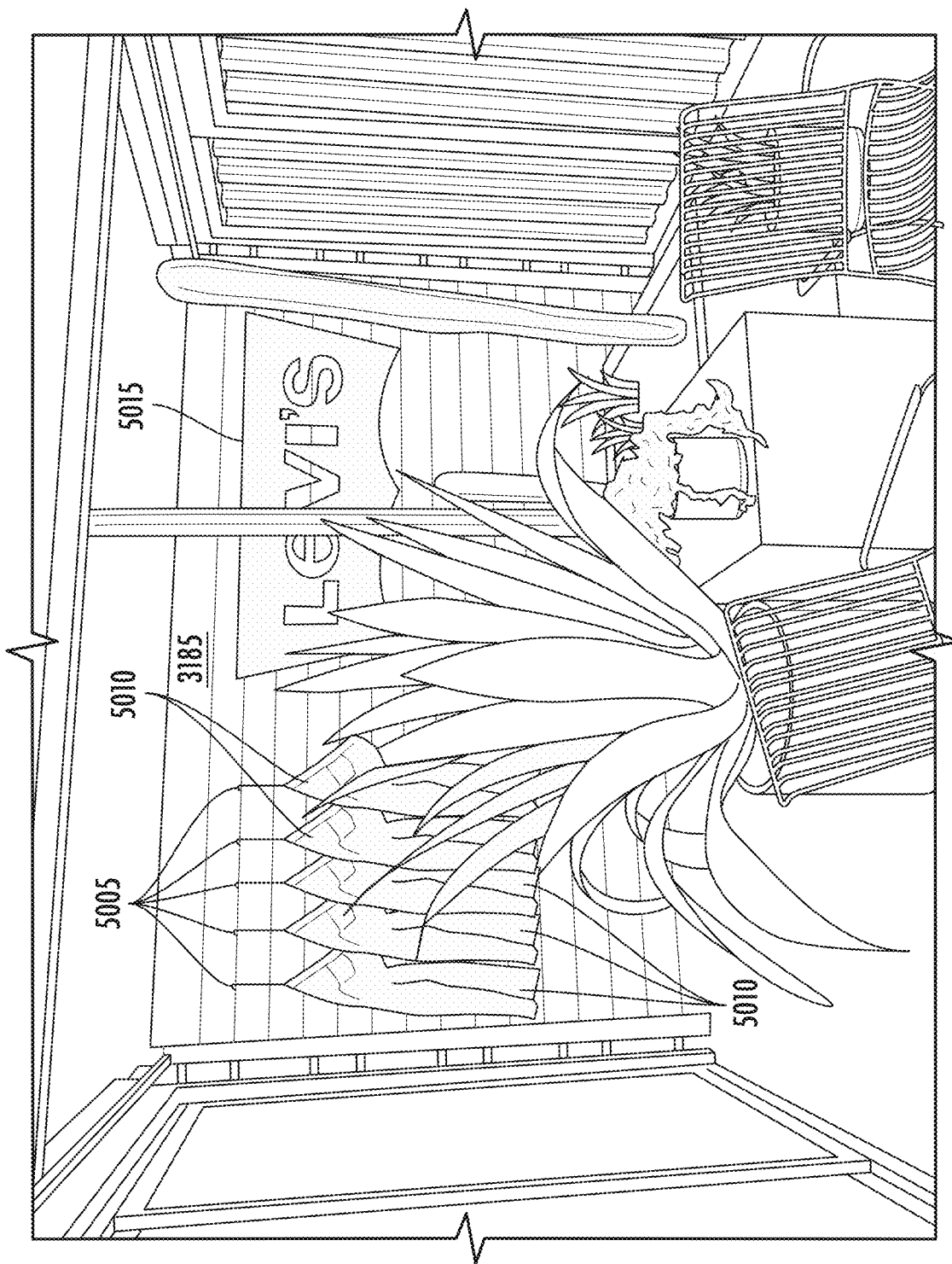
FIGS. 78-79 shows views of the back wall that is positioned between the containers.
Figure 79:
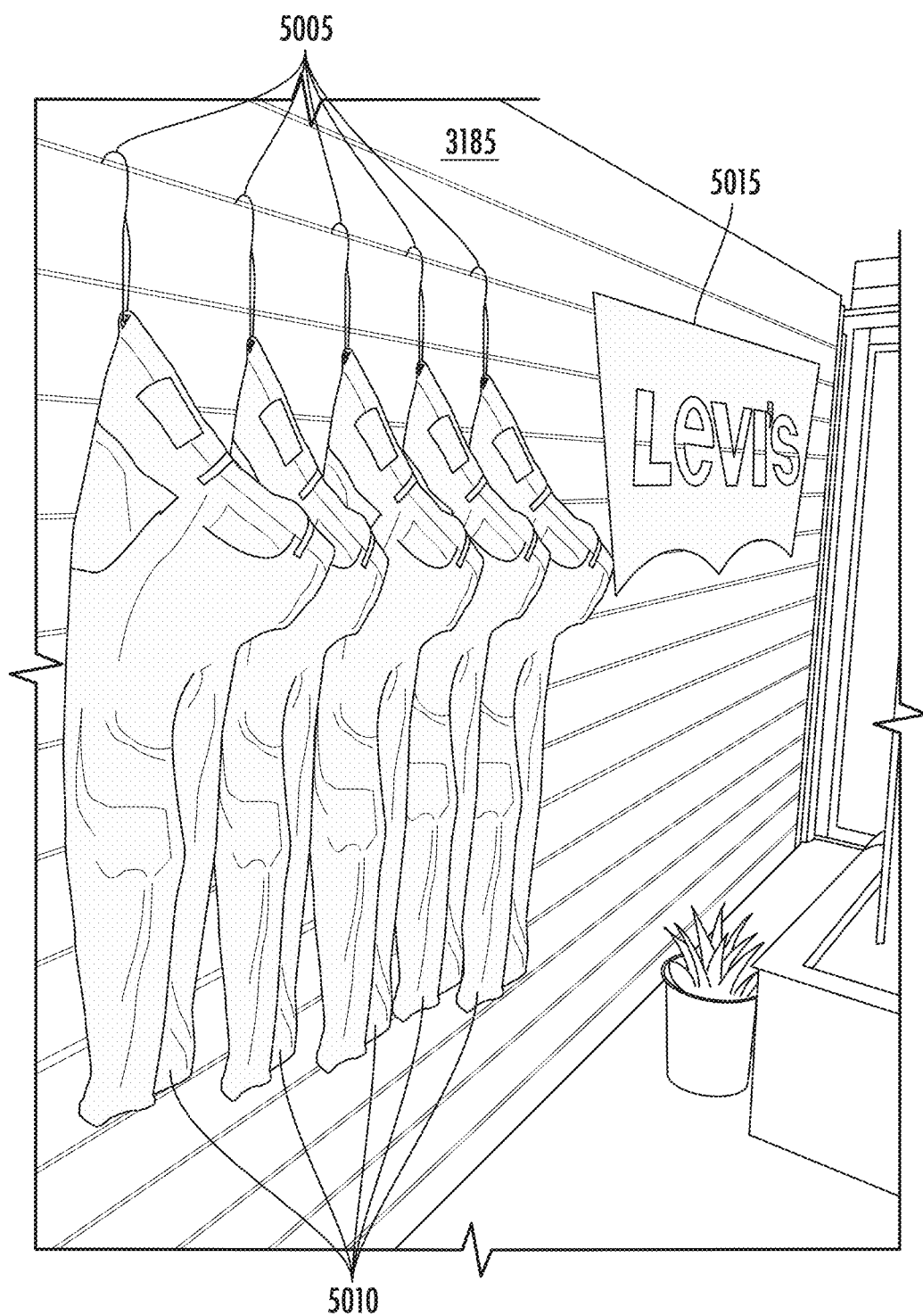
Figure 80:
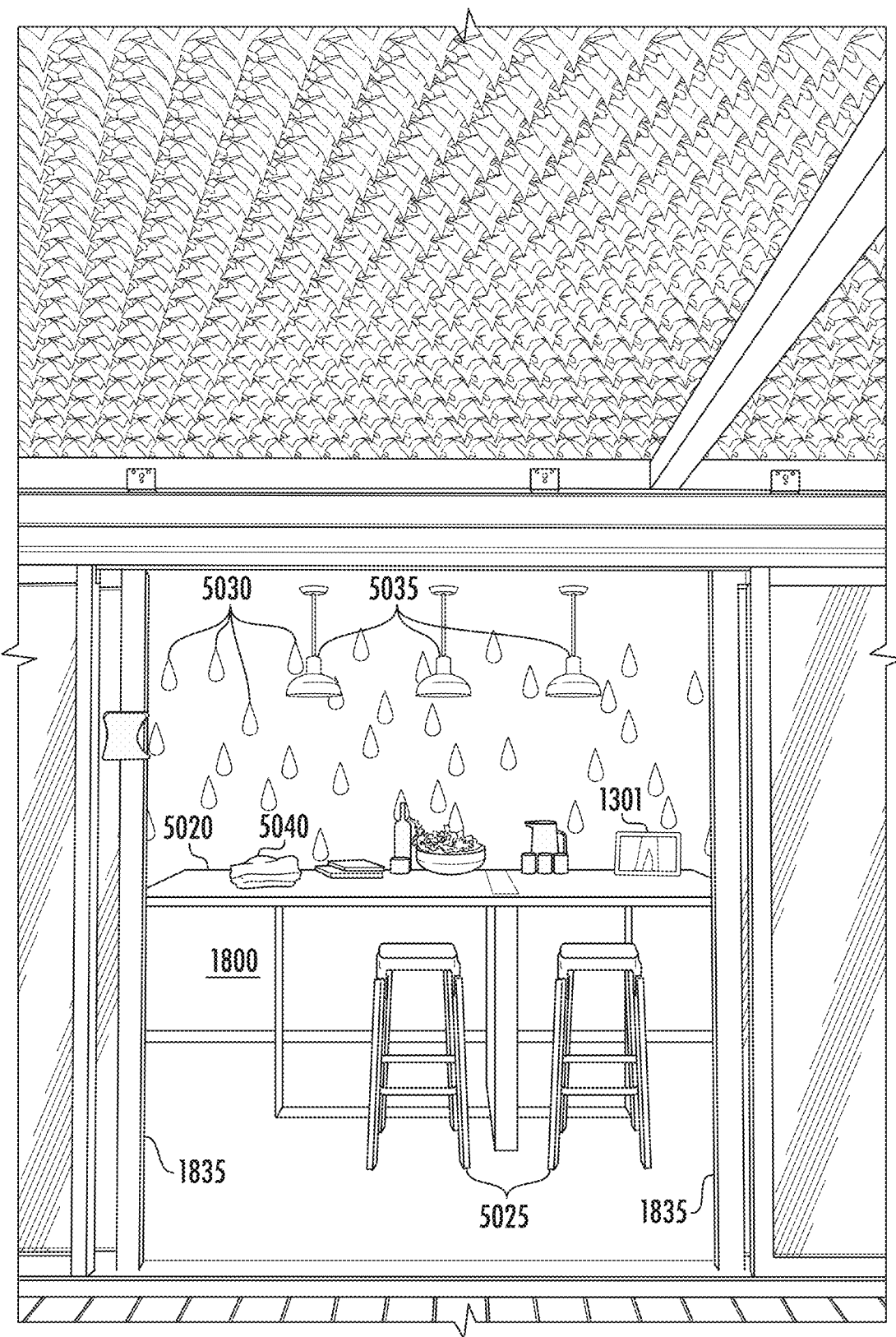
FIGS. 80-83 show exterior and interior views of the garment showroom that is inside one of the containers.

FIGS. 78-79 shows views of back wall 3185. The back wall includes a number of display hooks 5005 where various jeans 5010 are hooked onto the hooks. The hooks and the jeans are a display of the types of jeans that can be laser finished at the mobile finishing center. The back wall may also include a sign 5015 that may be a mirror sign or other sign type.

FIGS. 80-83 show exterior and interior views of showroom 1800. The exterior views show doors 1835 open and shows the openness and the invitingness of customers into the showroom.

Showroom 1835 may include a working table 5020 and may include one or more chairs 5025 for working at the working table. The showroom may include computing system 1301, 1401, or other computing system described in this patent. The computing system may store, run, or both any of the code described in this patent and may operate the methods described in this patent that are associated with the code. One or more walls of the showroom may have denim swatches 5030 connected to the walls. The denim swatches may be swatches of garment that may be purchased and laser finished at the mobile finishing system 10. A portion of the denim swatches may also have the various tint options that are available. The denim swatches may also have portions of laser finishing patterns that are available. The swatches inform a customer or designer the base color of denim of a garment the customer might be purchasing, a tint, a pattern, or any combination of these options.

The showroom may include overhead light 5035 that may be located above the working table. The lights light the room and facilitate the ease of viewing sample garments 5040 that may be displayed on the working table.

The showroom may include a wall rack 5050 having a number of hooks 5055. A number of base garments templates 5060 (e.g., base garment jeans and base garment jackets) may be hung from the hooks. The base garment templates may be for garments that customer may purchase at the mobile finishing center and have laser finished at the center. The style of hooks 5005 and 5055 and the types of garments hung from the hooks may be the same or similar to create a uniform aesthetic.

The showroom may include wall art 5070 that includes a garment 5075, such as jeans. The wall art may be framed in a material (e.g., wood) that is similar to the material of the frame to create a uniform aesthetic. Garment 5075 may be sample jeans that can be purchased and laser finished at the mobile finishing center or may be historic jeans that provide a sense of history and nostalgia that in-turn creates an inviting ambiance for customers at the center.

Figure 81:
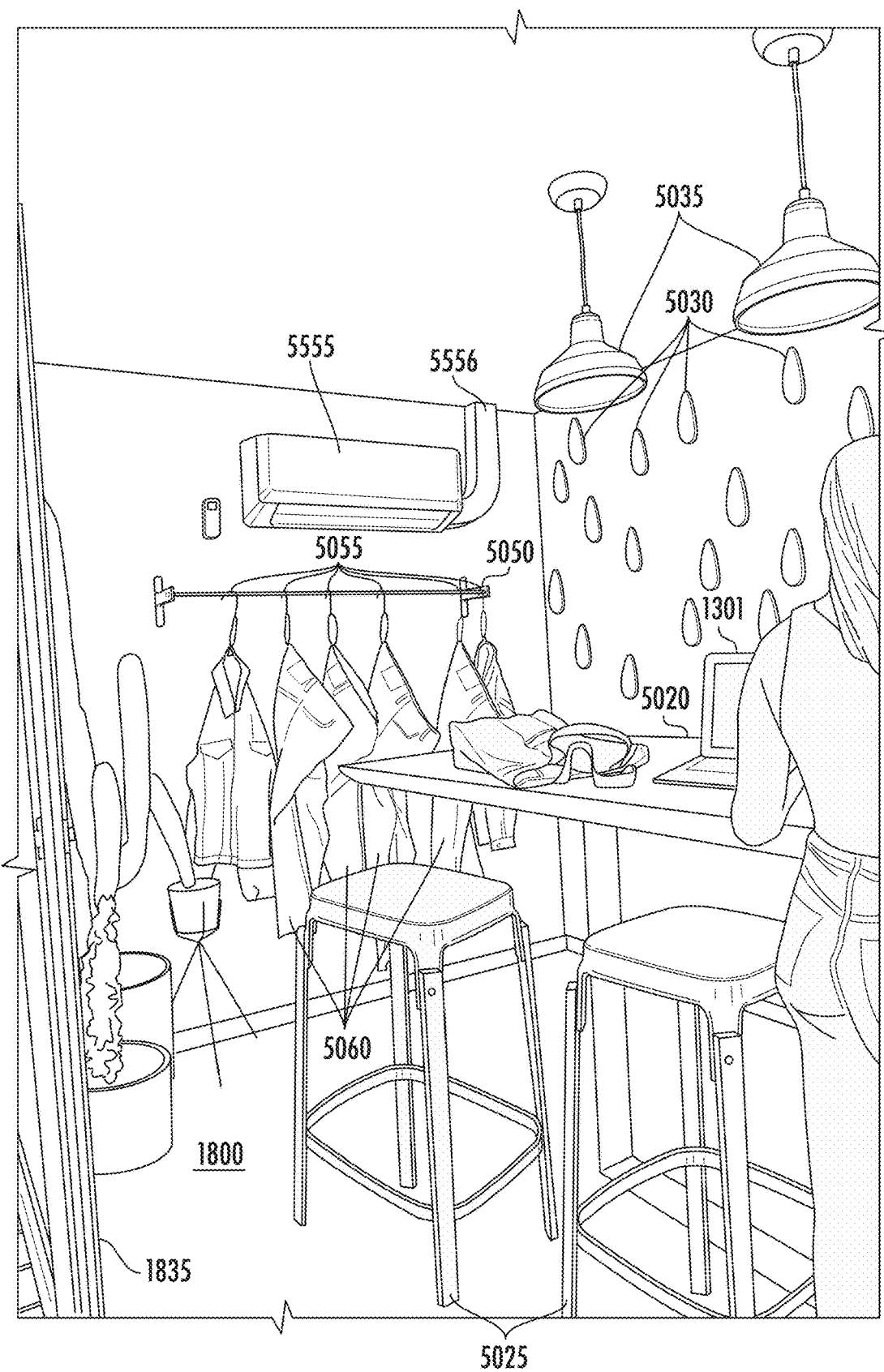
Figure 82:
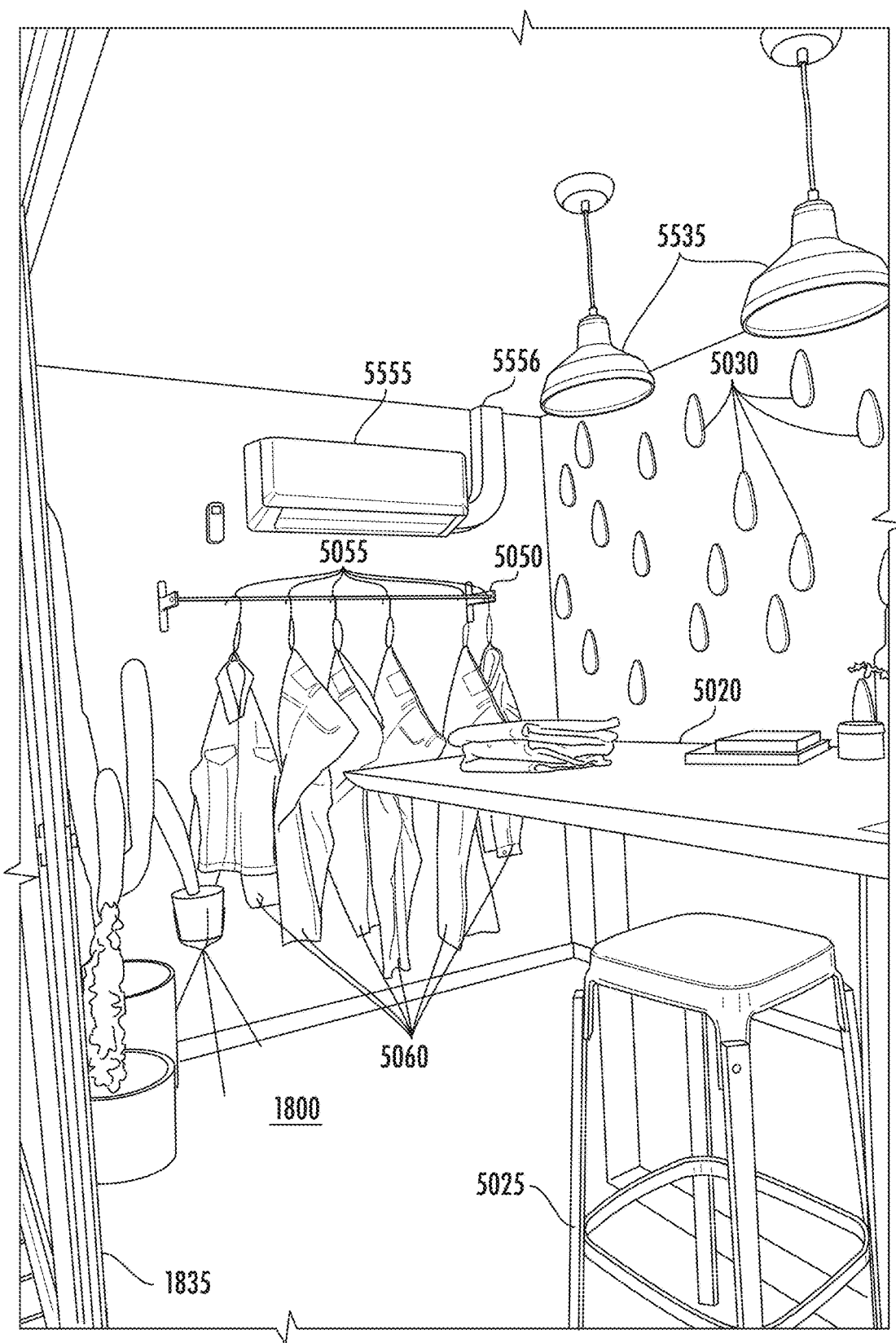
Figure 83:
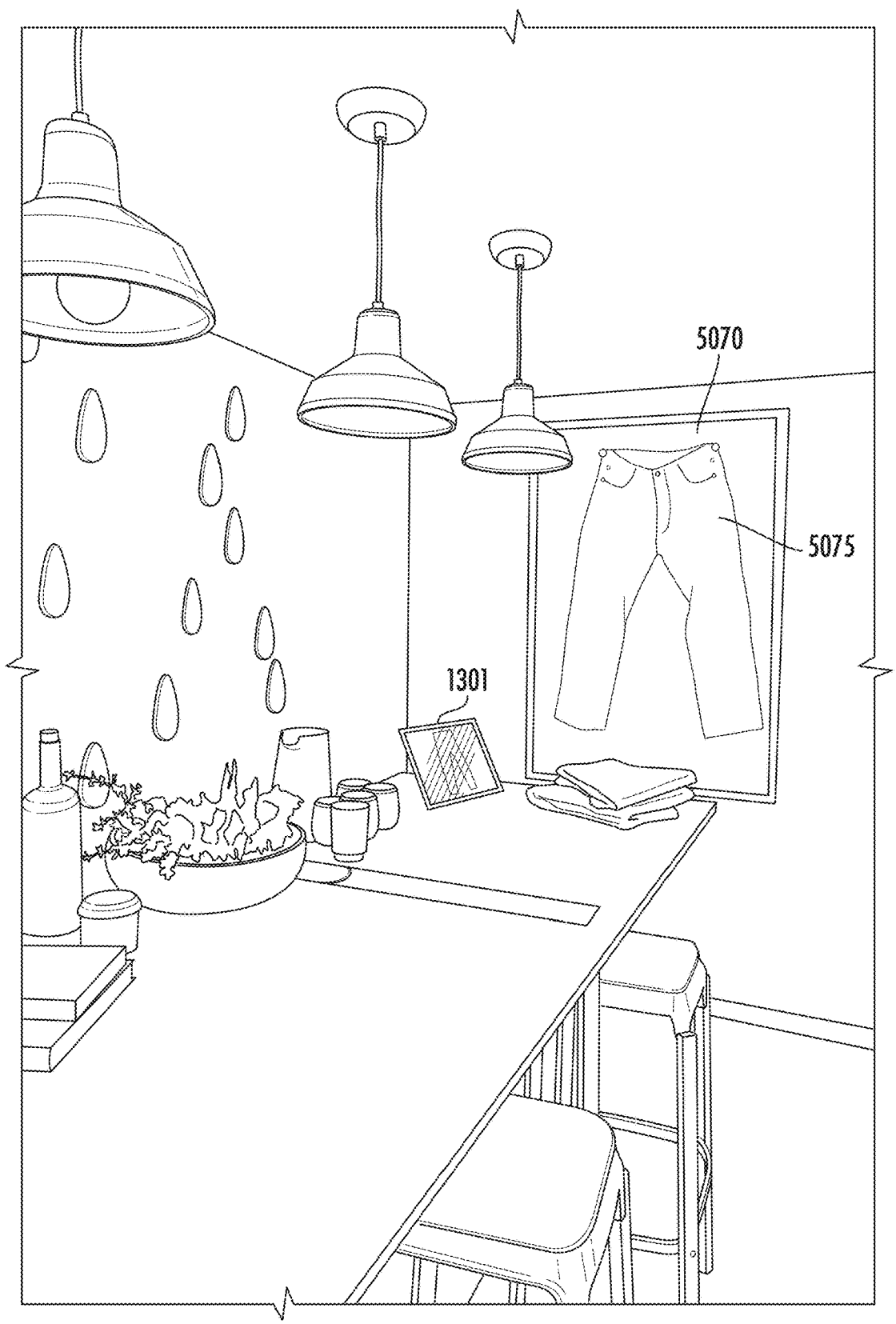

The showroom may include one or more air-conditioning units 5555 as shown in FIGS. 81-82. The air-conditioning unit may be a wall mounted unit, a ceiling mounted unit, or may be mounted on the top of the shipping container, or an outer wall of the shipping container. The air-conditioning unit may be connected to a vent 5556 that vents warm air out from the showroom. The vent may be routed through a false ceiling and the top of the shipping container.

Figure 84:
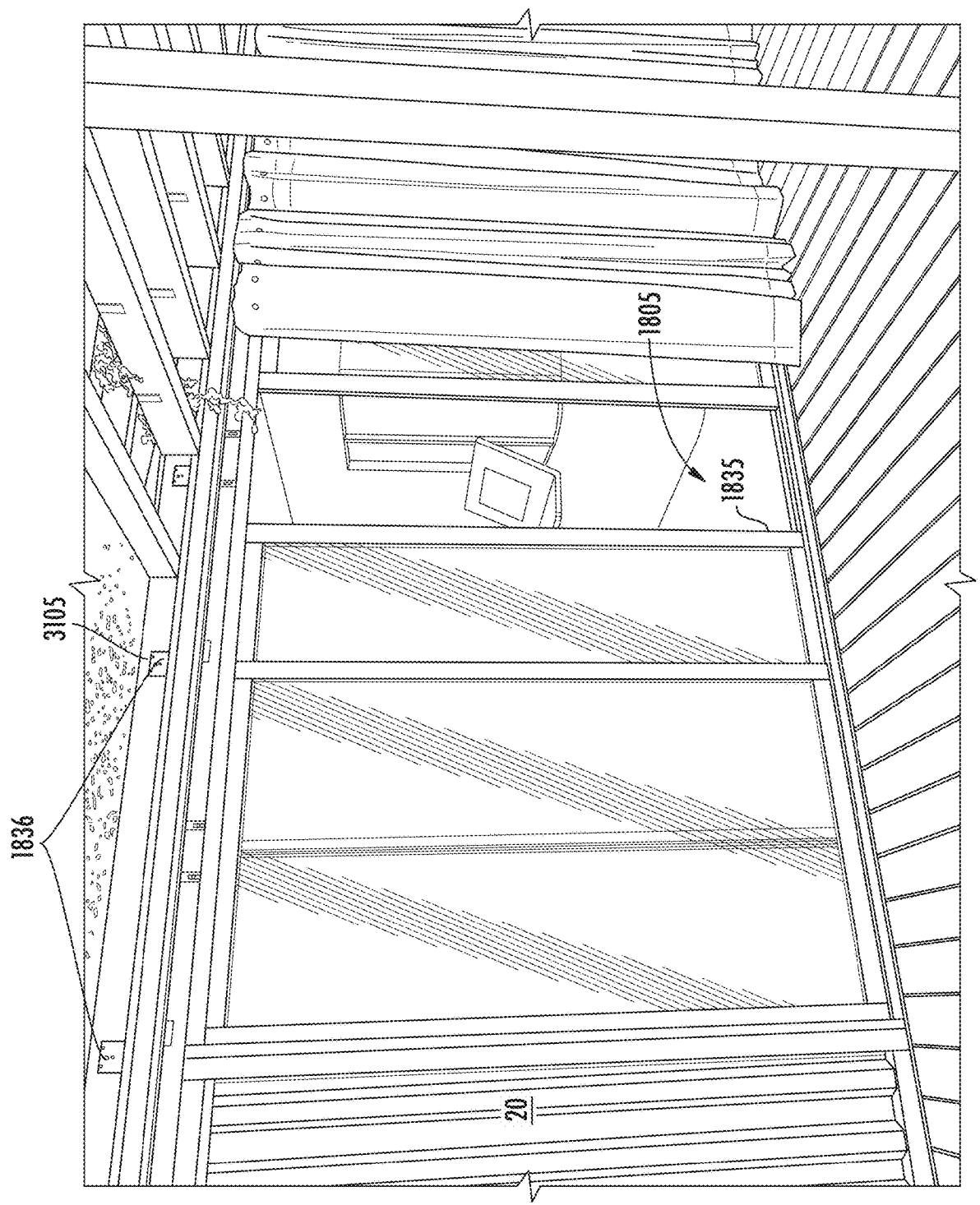
FIG. 84 shows an exterior view of the dry process room 1805 of one of the containers.

FIG. 84 shows an exterior view of the dry process room 1805. The dry process room includes one or more lasers for laser finishing garments. The curtains may be opened to allow customers to view their purchased garments while the garments are being laser finished to their specifications set using the digital design tool.

Figure 85:
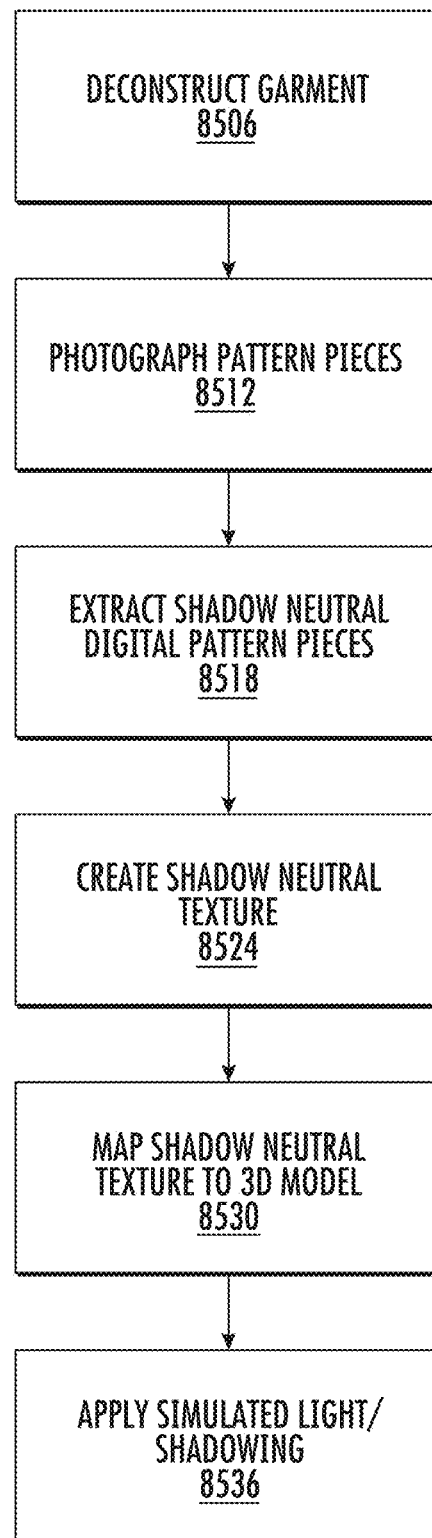
FIG. 85 shows an overall flow for creating a three-dimensional preview for an apparel product, such as a pair of jeans.
Figure 86C:
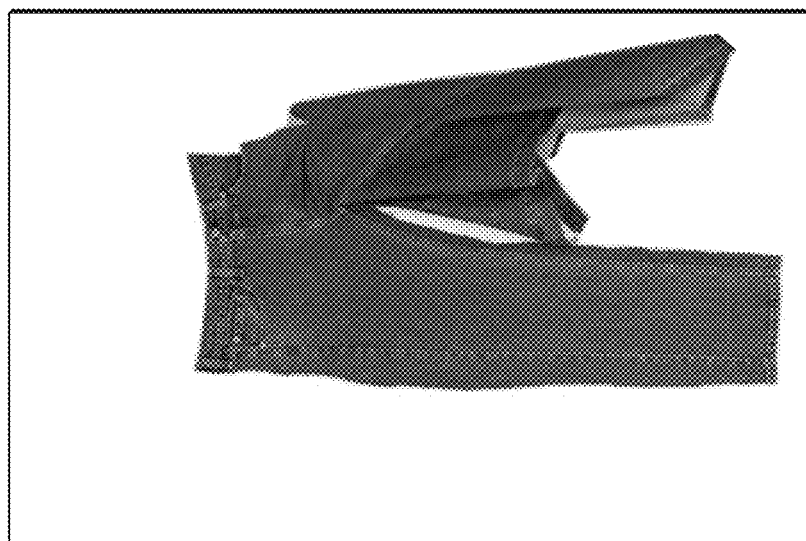
FIGS. 86A-86F show photographs of cutting a garment into pieces.
Figure 86B:
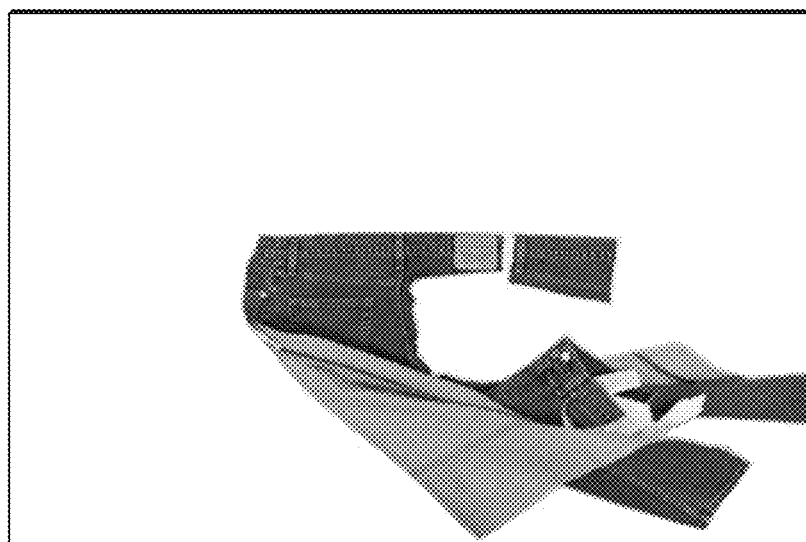
Figure 86A:
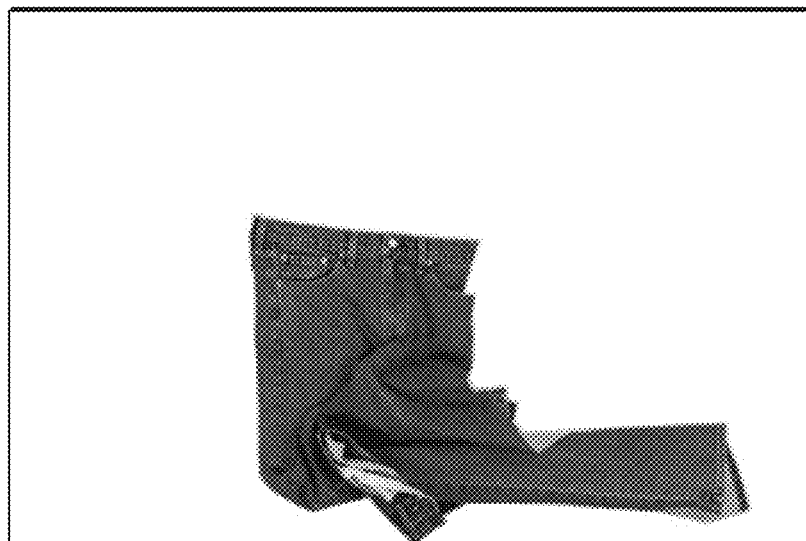
Figure 86F:
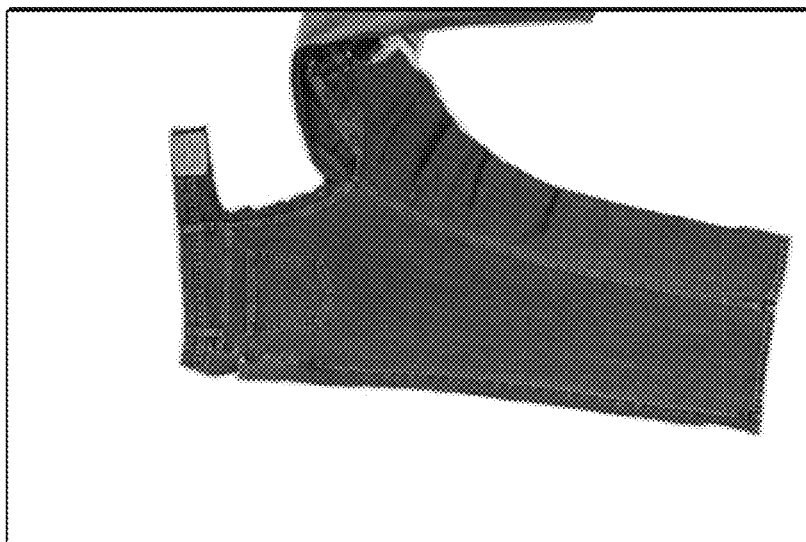
Figure 86E:
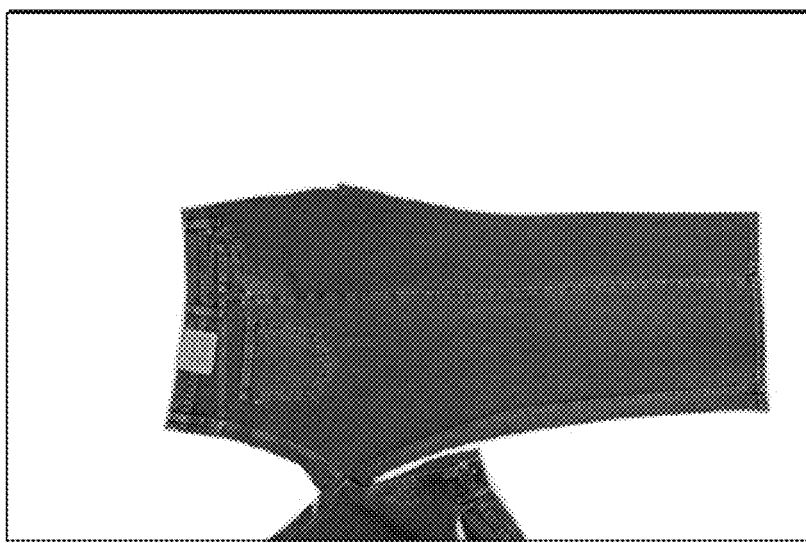
Figure 86D:
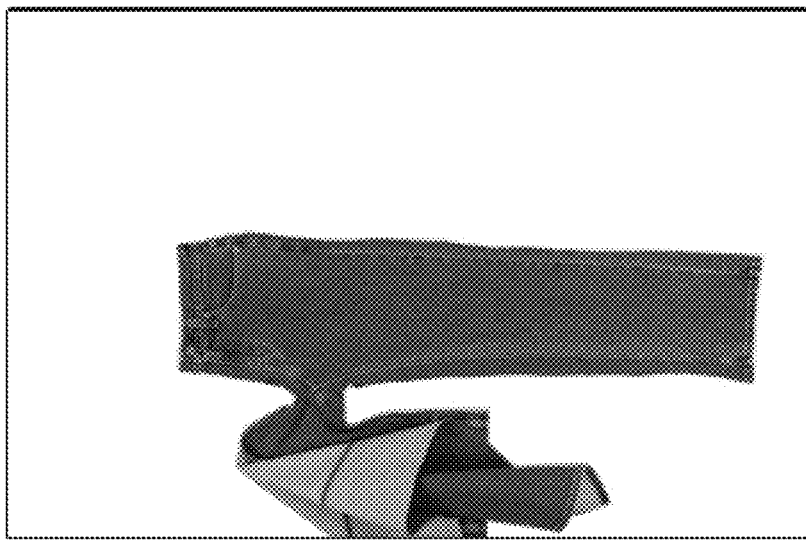

FIG. 85 shows an overall flow for creating a three-dimensional preview image for an apparel product, such as a pair of jeans. The three-dimensional preview images described above for use with preview tool 1703 and other tools are created and displayed according to the described flow, in an implementation. The flow includes:

1. A deconstruct garment step 8506. A garment is cut into separate pieces so the pieces can be photographed flat. The shape of the cut pieces are specifically sized and selected for ensuring a high quality three-dimensional preview.

2. A photograph pattern pieces step 8512. The pieces of the garment are photographed while flat on a surface. Compared to photographing the pieces while sewed together, where sections of the garment may be 3. An extract shadow neutral digital pattern pieces 8518.

4. A create shadow neutral texture pieces 8524.

5. A map shadow neutral texture to three-dimensional (3-D or 3D) model step 8530.

6. An apply simulated light or shadowing, or both, step 8536.

The following describes a specific implementation of deconstructing a garment 8506. FIGS. 86A-86F show photographs of cutting a garment into pieces. The photos are for a specific implementation where the garment is a pair or pants, and in particular, a pair of jeans. Not that the seams are not ripped or cut, but rather the cut pieces include the seams with thread. This ensures the three-dimensional preview will represent the seams properly. Also, the cut pieces do not necessarily correspond to the pattern panels used to contrast the garment. The cut pieces are cut into shapes that are appropriate for photographing flat and use in generating the three-dimensional preview.

The following describes a specific implementation of photograph pattern pieces 8512. A photograph of each deconstructed pattern pieces is taken. Each photograph can be stored in a digital file, such as a JPEG, high efficiency video coding (HVEC), or other image file format.

Figure 87:
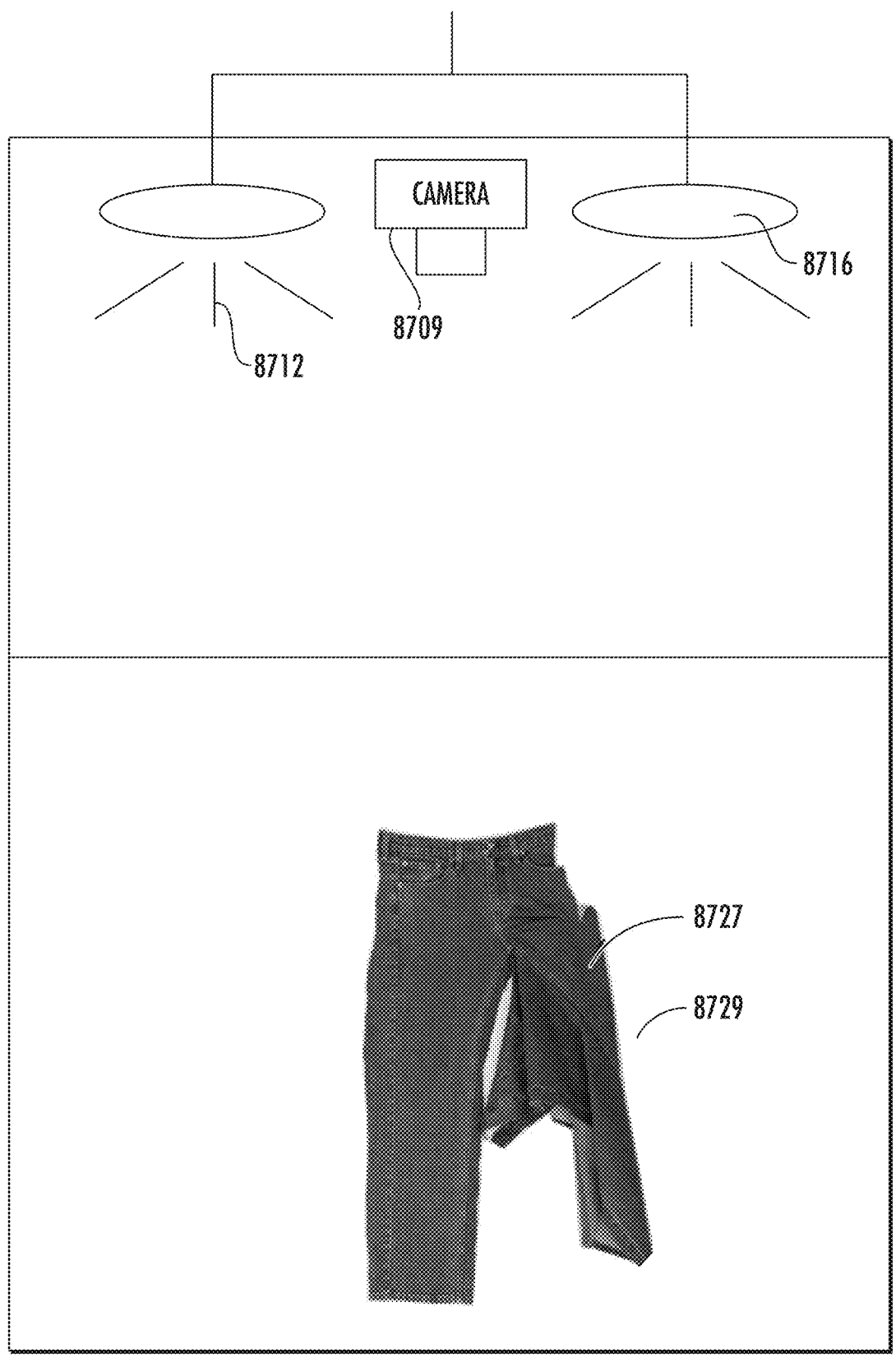
FIG. 87 shows a system for taking photographs of the garment pieces.

FIG. 87 shows a system for taking photographs of the garment pieces. The system includes a camera 8709 and lighting 8712 and 8716. Typically, the camera and lights are mounted or positioned against or near a wall or ceiling of a room, or on one side of room. A garment or garment pieces 8727 that are to be photographed are laid flat on a surface, facing the camera and lighting. In an implementation, the camera and lightning are positioned above a table or other work surface 8729, horizontally orientated, upon which the garment is placed.

Alternatively, the camera and lightning are positioned on a side, and the work surface is vertically orientated on another side facing the camera and lightning. The garment pieces that be attached, such as using glue, pins, or hook and loop fasteners, to the vertical work surface.

The room can be a light room or light box. The room and work surface are typically painted or colored a white color. For good or best results, the white color used should be consistently the same shade throughout the room. Then any white balance adjustment or correction made at the camera or digitally after the photographs are taken will be more precise.

The lights of the lightning are positioned laterally (e.g., distributed evenly along the same plane as the work surface, which can be referred as an X direction) to evenly illuminate the work surface. So, the garment will be evenly illuminated without noticeably or significantly brighter or darker areas or portions. The lightning is also positioned a distance above the work surface (which can be referred as a Y direction) to allow for more even illumination.

The lens of the camera is positioned above (in the Y direction) the lighting source, so that the camera does not cast a shadow on the work surface or garment (e.g., horizontally orientated). And the camera can be positioned in the X direction so that lights are arranged uniformly about the camera lens. For example, in FIG. 87, camera 8709 is between lights 8712 and 8716. Also the camera lens should be positioned directly over the garment (in the X direction) being photographed. This ensures the photographs taken will not be at an angle.

A specific example of extract shadow neutral digital pattern pieces 8518 follows. After the photographs are taken, each photograph is processed to extract neutral digital pattern pieces. In the extraction process, the background and shadowing, if any, is removed.

Figure 88A:
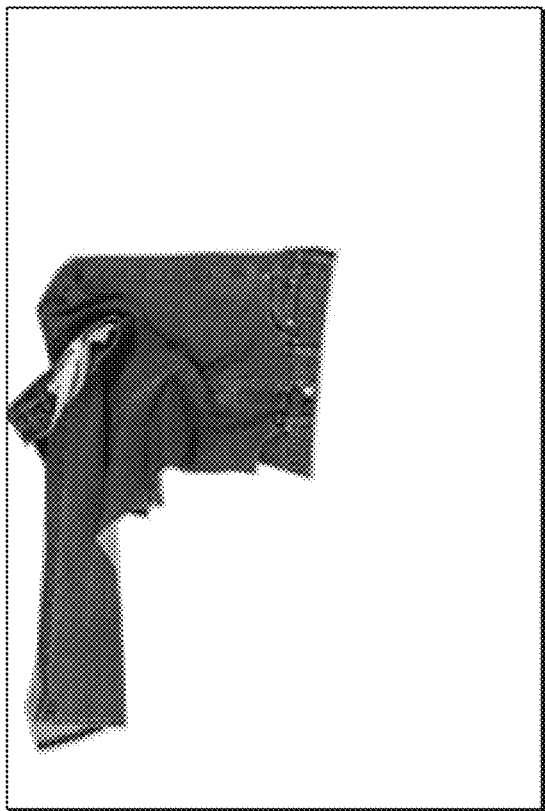
FIGS. 88A-88K show photographs of cut garment pieces and corresponding extracted neutral digital pattern pieces.
Figure 88B:
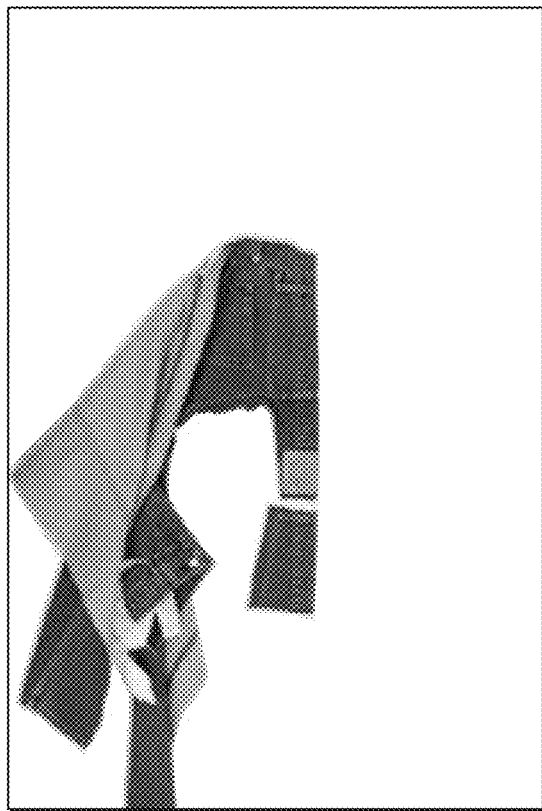
Figure 88C:
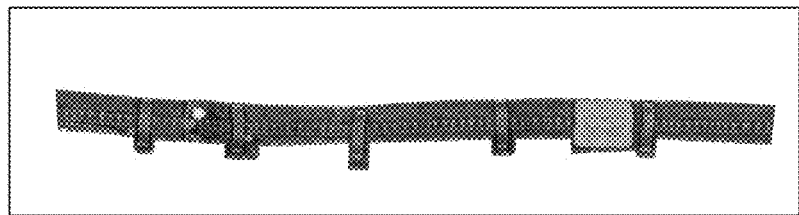

As examples, FIGS. 88A-88B show photographs of a waistband pieces on the work surface, and FIG. 88C shows the extracted neutral digital pattern piece for the waistband. The physical waistband may be cut into multiple pieces, and the photographs of the separate pieces can be digitally stitched together to create the complete extracted neutral digital waistband.

Figure 88D:
Figure 88F:
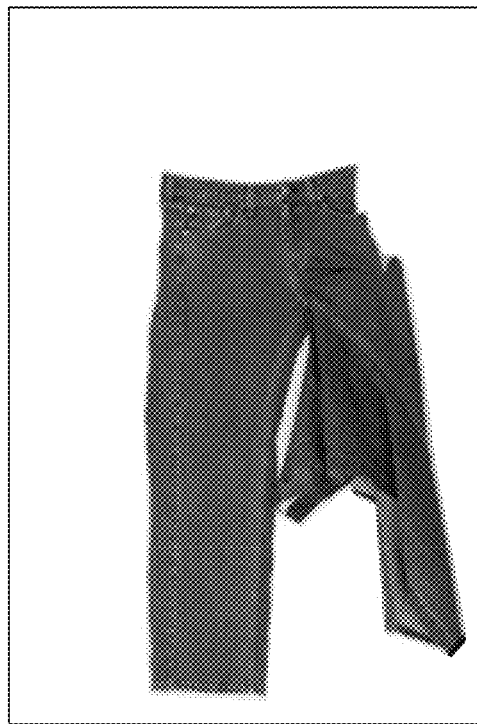
Figure 88E:
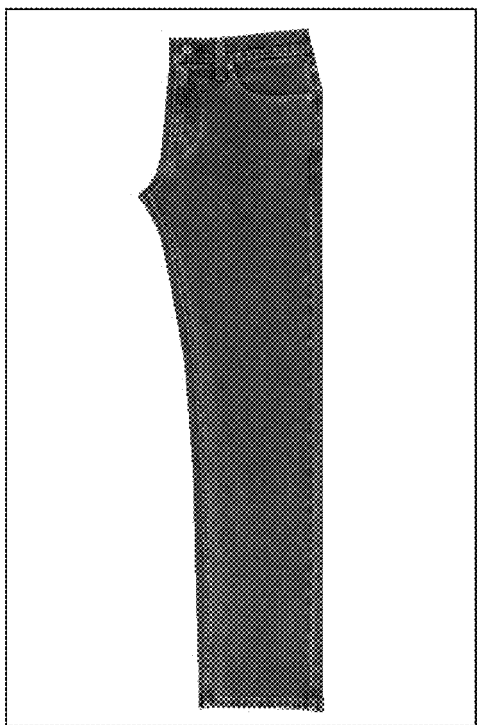
Figure 88G:
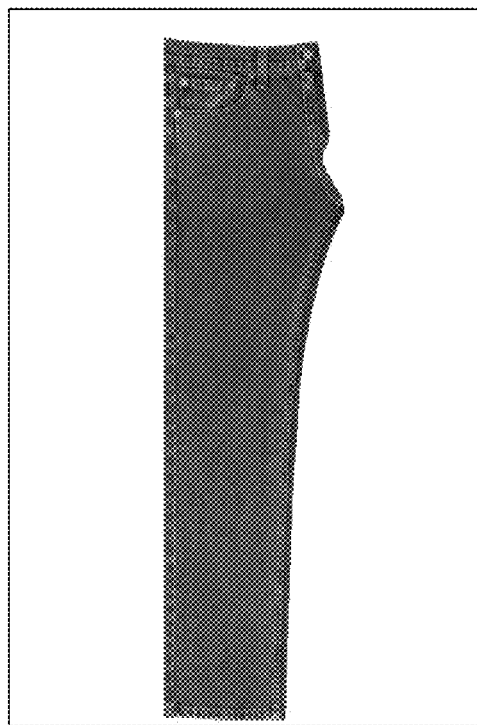

FIG. 88D shows a photograph of a left pant leg front of a pair of jeans with the background, and FIG. 88E shows the extracted neutral digital pattern piece for the left pant leg front. FIG. 88F shows a photograph of a right pant leg front of the jeans with the background, and FIG. 88G shows the extracted neutral digital pattern piece for the right pant leg front.

Figure 88H:
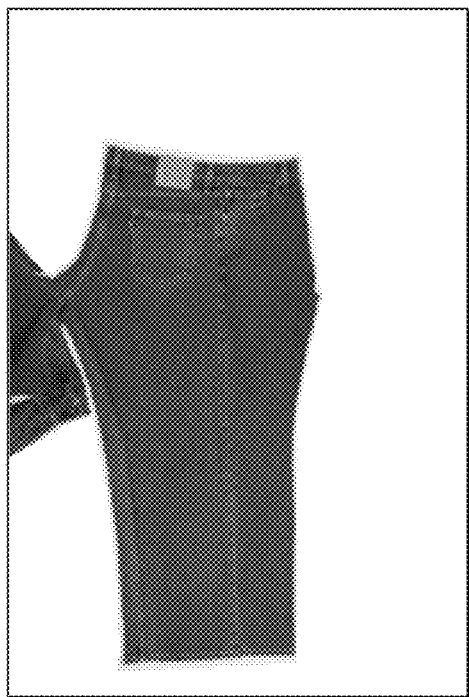
Figure 88J:
Figure 88I:
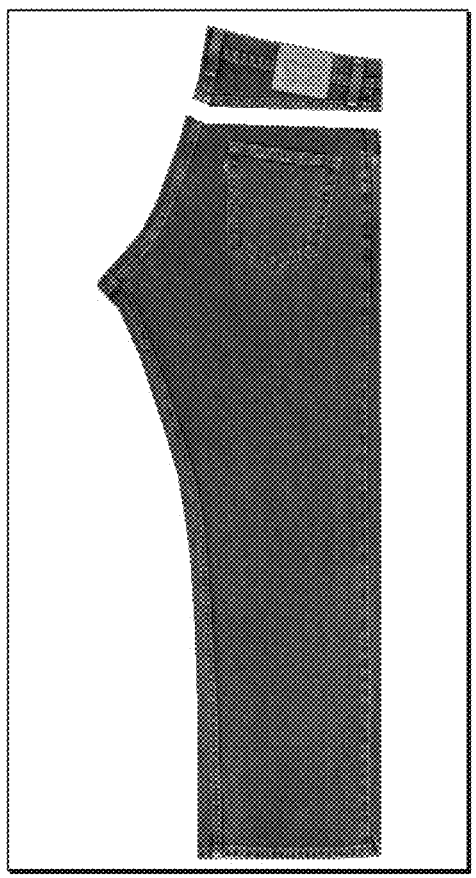
Figure 88K:
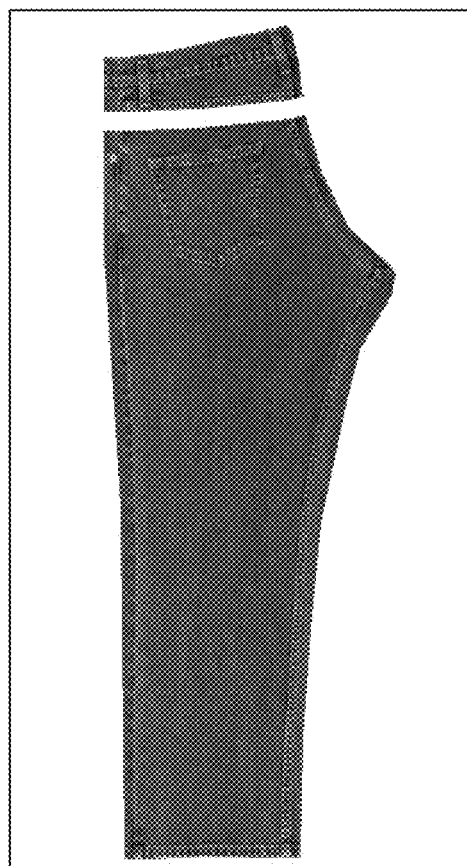

FIG. 88H shows a photograph of a right pant leg back or rear of the jeans with the background, and FIG. 88I shows the extracted neutral digital pattern piece for the right pant leg back. FIG. 88J shows a photograph of a left pant leg back or rear of the jeans with the background, and FIG. 88K shows the extracted neutral digital pattern piece for the left pant leg back.

The extracted pattern pieces are shadow neutral since the pattern pieces were photographed while flat. In contrast, for garments that are photographed or scanned while on a fit model or mannequin, the extracted pattern pieces would not be shadow neutral. The garment pieces based on curved surfaces, conforming to the shape of the fit model or mannequin. When the curved surfaces are flattened, there would be shadowing, such as wrinkles and other aberrations. So, when those nonshadow neutral extracted pattern pieces are used with a three-dimensional model to generate a preview, the preview will have an appearance that does not look natural, such as having unusual shadowing.

Figure 89C:
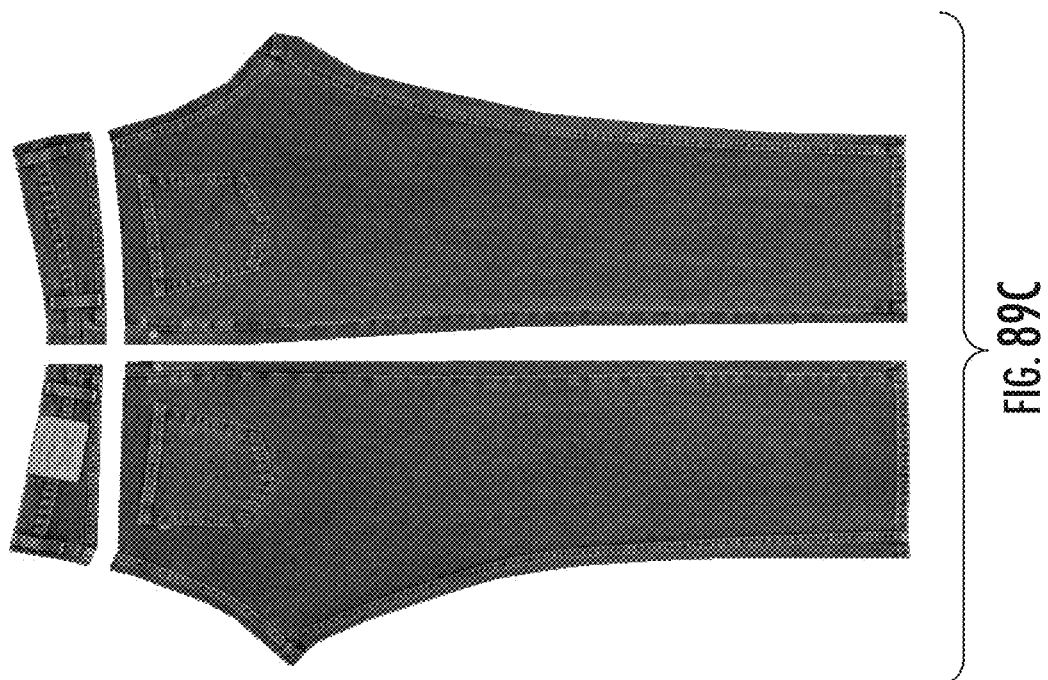
FIGS. 89A-89C show extracted shadow neutral pattern pieces.
Figure 89B:
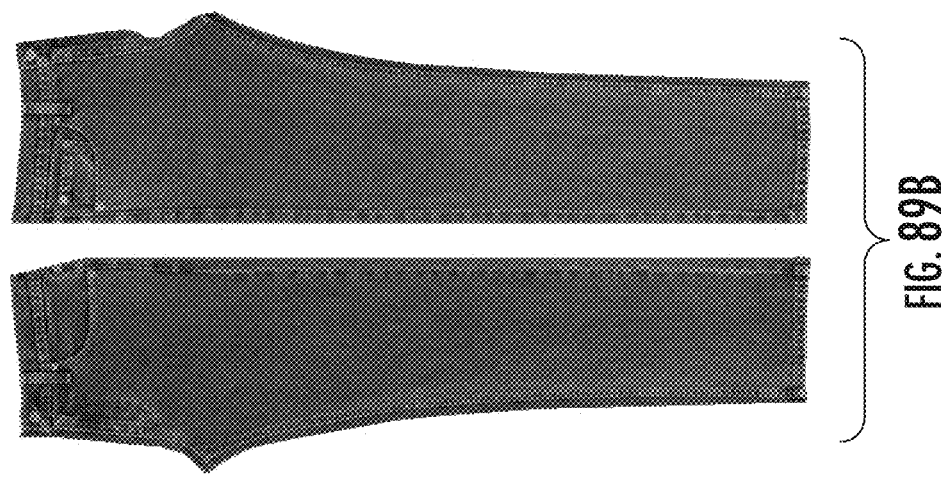
Figure 89A:
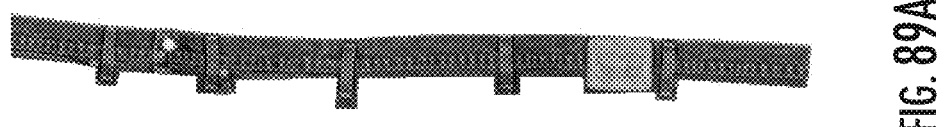
Figure 89D:
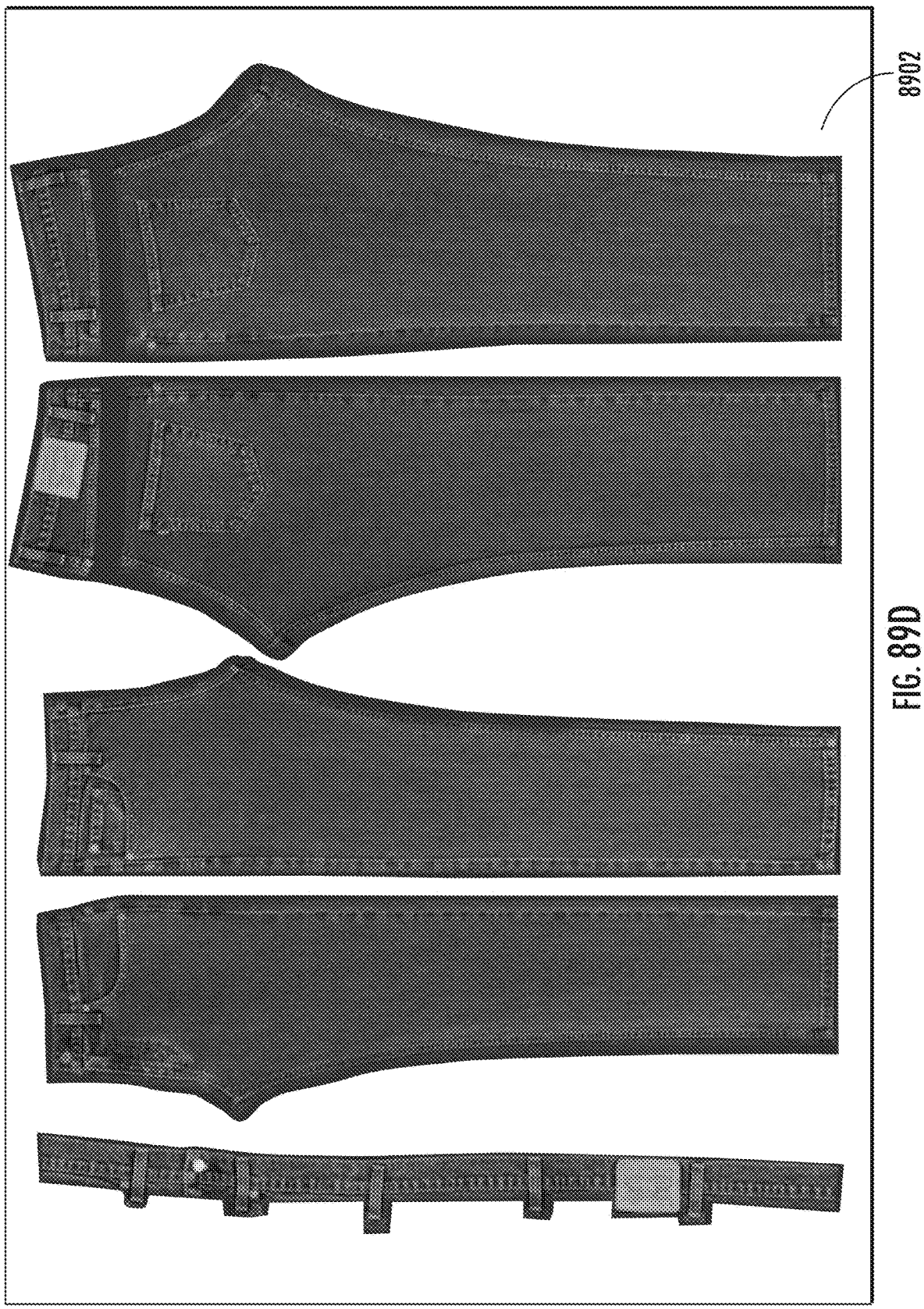
FIG. 89D shows a shadow neutral texture created using the extracted shadow neutral pattern pieces and a color layer.

A specific example of create shadow neutral texture pieces 8524 follows. FIGS. 89A-89C show the extracted shadow neutral pattern pieces. FIG. 89D shows a shadow neutral texture created using the extracted shadow neutral pattern pieces and a color layer 8902.

To create the shadow neutral texture, the extracted shadow neutral pattern pieces are combined with a color layer, which typically is a color which is close to that of a color the garment. For example, for blue jeans, the color layer used will be a similar shade of blue or indigo as on the blue jeans.

The color layer of the shadow neutral texture allows stitching together of the different neutral pattern pieces, when mapped to a three-dimensional model, such any potential gaps between the pattern pieces will appear seamless. For example, if a very different color is used for the color layer, such as white, than the jeans color, then gaps that do not exactly align may show this color (e.g., white line).

Figure 90A:
FIG. 90A shows a created shadow neutral texture.
Figure 90B:
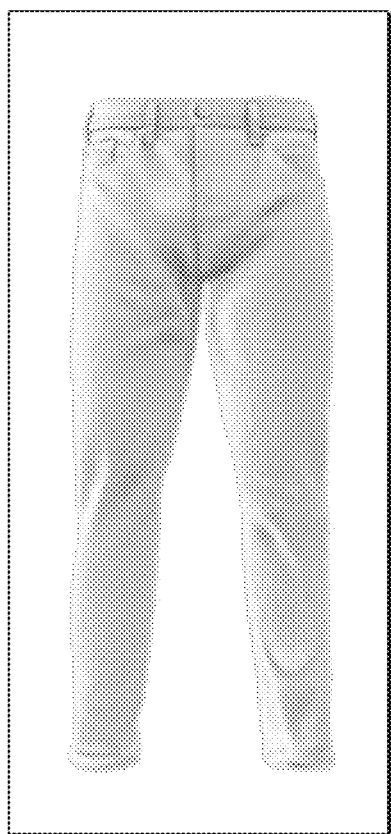
Figure 90C:
FIG. 90C shows a result of mapping the shadow neutral texture to the three-dimensional model.

A specific example of map shadow neutral texture to three-dimensional (3D) model 8530 follows. FIG. 90A shows a created shadow neutral texture 9007. FIG. 90B shows a front view of a three-dimensional model, which the shadow neutral texture will be applied or mapped to. FIG. 90C shows a result of mapping the shadow neutral texture to the three-dimensional model. This figure shows the front of the garment with the form and wrinkles resulting from the mapping to the three-dimensional model. This image can be used as a three-dimensional preview image.

Figure 90D:
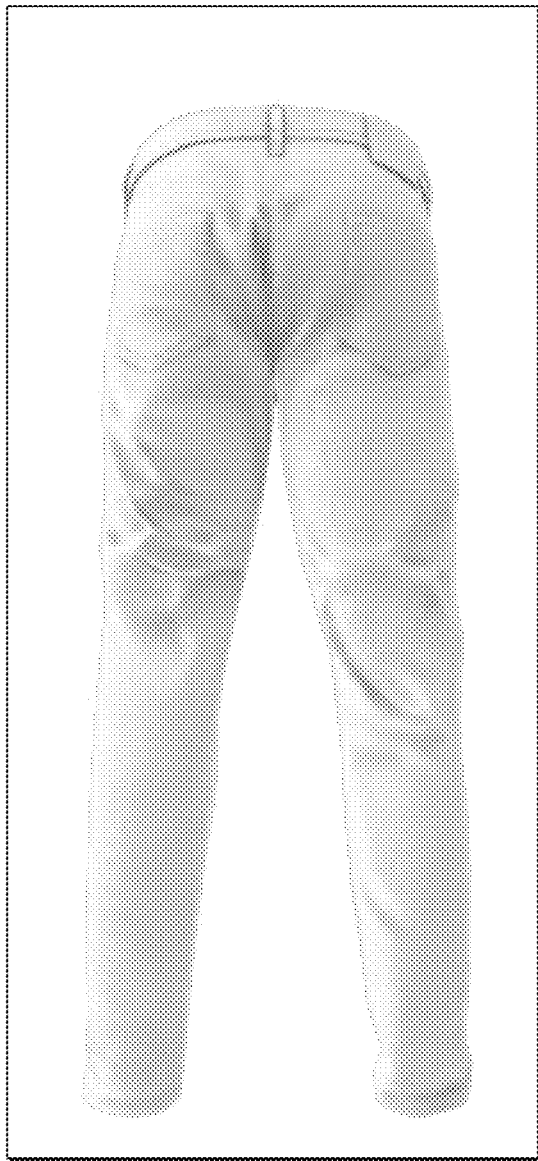
Figure 90E:
FIG. 90E shows a result of mapping the shadow neutral texture to the three-dimensional model.

Similarly, FIG. 90D shows a back or rear view of the three-dimensional model, which the shadow neutral texture will be applied or mapped to. FIG. 90E shows a result of mapping the shadow neutral texture to the three-dimensional model. This figure shows the back of the garment with the form and wrinkles resulting from the mapping to the three-dimensional model. This image can be used as a three-dimensional preview image.

There are various ways to generate a three-dimensional model. One technique is to generate a three-dimensional model from a scan of a physical three-dimensional object, such as a fit model or mannequin. Another technique to create a three-dimensional model from scratch using software. Such software can allow a designer to three-dimensional model analogous to using molding a clay sculpture. Another technique to create a three-dimensional model from software (e.g., computer aided design (CAD) or computer aided manufacturing (CAM) tool) where two-dimensional pattern pieces of a garment are converted into to three dimensions.

A specific example of apply simulated light or shadowing, or both, 8536 follows. A shadow neutral texture and three-dimensional model can be inputs to a rendering engine or software to render the preview image. Some examples of rendering engines include Google's ARCore, WebGL, and others.

With the rendering engine, an object such as the garment can be rendered or previewed with shadowing generated by the engine or software. The shadows will change based on a relative positioning of a simulated light source and object. Further, the rendering engine can change a camera position of point of view (POV) of the user, so that the preview will have the shadowing from that camera position.

In a specific implementation, a rendering engine maps the shadow neutral texture to the three-dimensional model, or preview image, and generates the preview image with shadowing based on a positioning of a simulated light source. The positioning of the light source can be changed or varied.

Figure 91C:
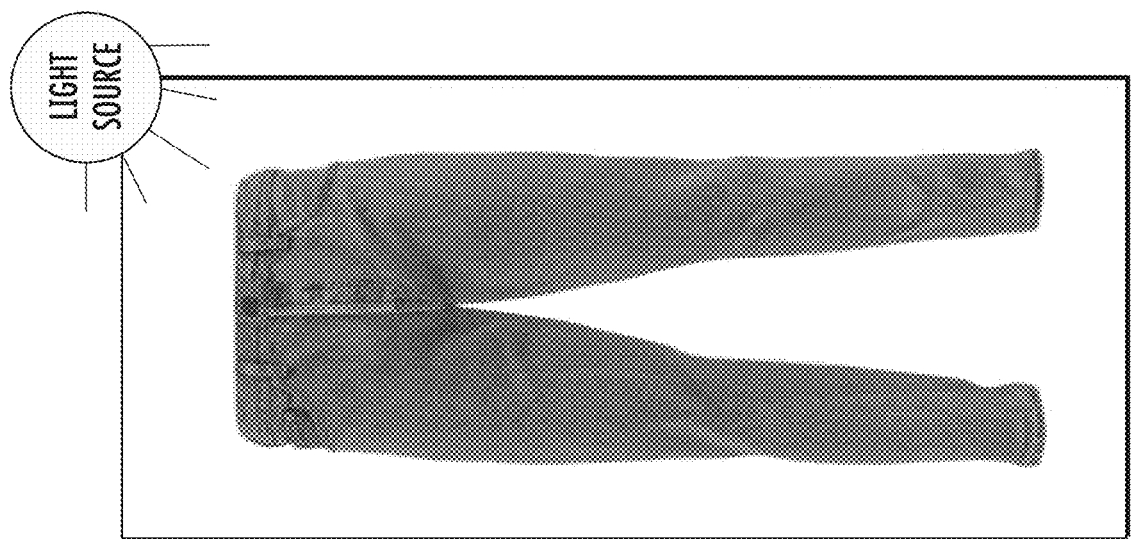
FIG. 91C shows an example of a simulated light source positioned to a left of and above the garment.
Figure 91B:
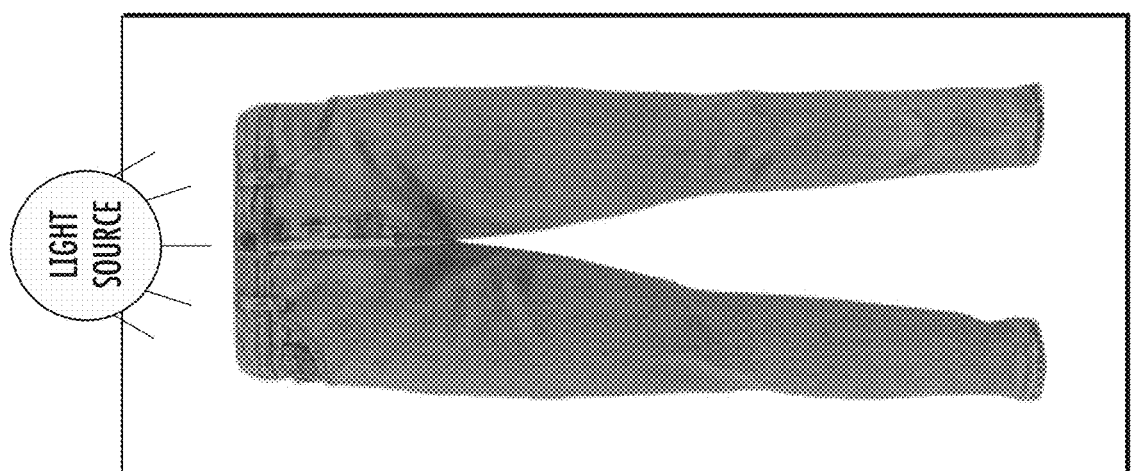
FIG. 91B shows an example of a simulated light source positioned directly above the garment.
Figure 91A:
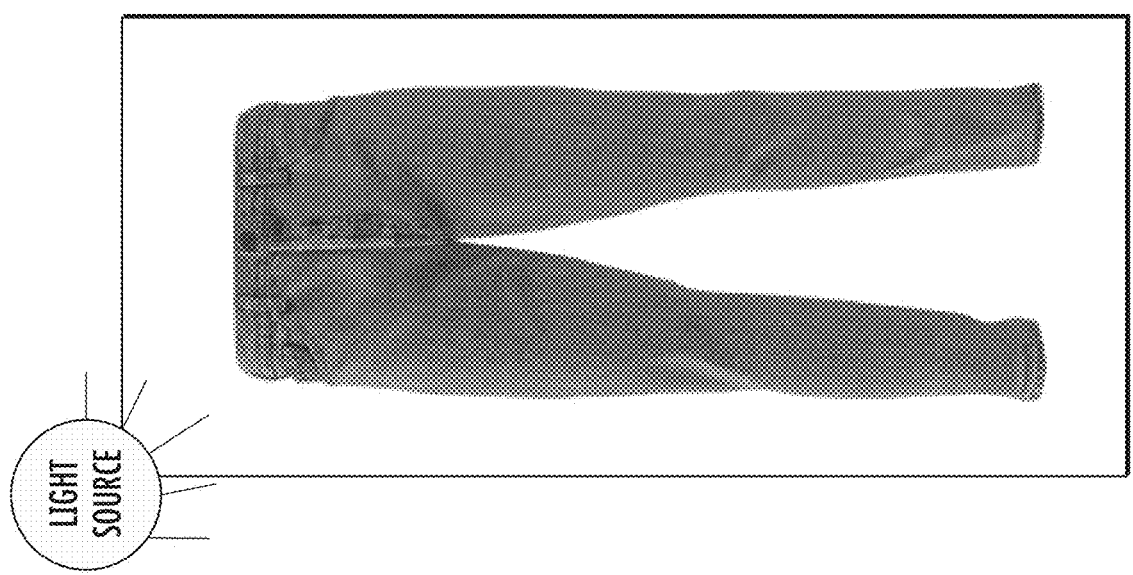
FIG. 91A shows an example of a simulated light source positioned to a right of and above the garment.

For example, FIG. 91A shows an example of a simulated light source positioned to a right of and above the garment. FIG. 91B shows an example of a simulated light source positioned directly above (e.g., centered) the garment. FIG. 91C shows an example of a simulated light source positioned to a left of and above the garment. The shadowing, wrinkles, and contours are shown in the preview image in accordance with positioning the simulated light source. The shadows are generated by the rendering software. This is in contrast to shadows that are present garment when the photographs or scans are taken, when a shadow neutral texture creation approach is not user.

Alternatively, the user can rotate or change the positioning of the garment, and the shadowing, wrinkles, and contours will be shown in accordance with the changed positioning. This is due to the change in the relative positioning between the garment and the light source. The shadows are generated by the rendering software.

Figure 92A:
FIGS. 92A-92E show how a single three-dimensional model can be used with multiple shadow neutral texture to generate a multiple preview images.
Figure 92B:
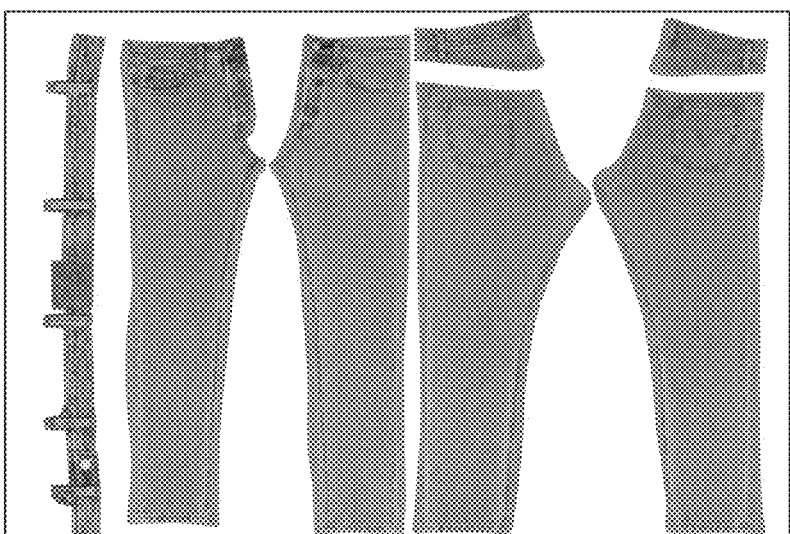
Figure 92C:
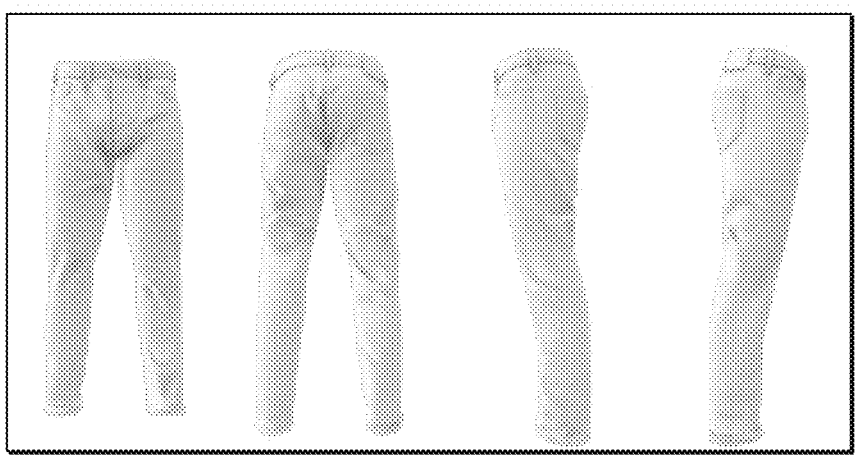

FIG. 92A shows an example of a first shadow neutral texture, which is a pair of jeans having a finish of a first shade. FIG. 92B shows an example of a second shadow neutral texture, which is a pair of jeans having a finish of a second shade. The second shade is different and lighter than the first shade. FIG. 92C shows various view of a three-dimensional model. There are front, back, left side, and right side views.

Figure 92D:
Figure 92E:

FIG. 92D shows of the first shadow neutral texture mapped to the three-dimensional model to generate a corresponding preview image. The figure shows various view of the preview image. FIG. 92E shows of the second shadow neutral texture mapped to the three-dimensional model to generate a corresponding preview image. The figure shows various view of the preview image.

FIGS. 92A-92E show how a single three-dimensional model can be used with multiple shadow neutral texture to generate a multiple preview images. This allows one three-dimensional model to be used with multiple shadow neutral textures to more easily and rapidly generate preview images with different finishes.

Furthermore, there can be multiple three-dimensional models, such as a first three-dimensional model and a second three-dimensional model. The different three-dimensional models may represent different fits or styles. Then a single shadow neutral texture can be mapped to the first three-dimensional model to generate a corresponding preview image. And the single shadow neutral texture can be mapped to the second three-dimensional model to generate a corresponding preview image.

This allows generating multiple previews from a single shadow neutral texture. For example, a first preview may be for a first fit or style in the finish of the shadow neutral texture. And a second preview may be for a second fit or style in the same finish. This technique allows for more a single shadow neutral texture to be used to more easily and rapidly generate preview images of different models, where models can represent different fits (e.g., Levi's 501, 502, 504, 505, 511, 512, 514, 541, 311, 710, or 711) or styles (e.g., skinny, boot cut, wide leg, straight, relaxed, super skinny, slim, tapered, athletic, boyfriend, wedgie, and others). The creation of three-dimensional preview images for apparel products, such as a pair of jeans, is described in U.S. patent application 62/774,127, filed Nov. 30, 2018 and U.S. patent application 62/877,830, filed Jul. 23, 2019. These applications are incorporated by reference.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a first space, wherein the first space comprises dimensions in a first direction, a second direction, and a third direction, a first length of the first space is in the first direction, a first width of the first space is in the second direction, a first height of the first space is in the third direction, the first, second, and third directions are transverse directions, the first length, the first width, and the first height are compliant with universal shipping container dimensions and configurations dictated by the International Organization for Standardization (ISO), and the first space is above a reference level;
providing a second space, wherein the second space comprises dimensions in a fourth direction, a fifth direction, and a sixth direction, a second length of the second space is in the fourth direction, a second width of the second space is in the fifth direction, a second height of the second space is in the sixth direction, the fourth, fifth, and sixth directions are transverse directions, the second length, the second width, and the second height are compliant with universal shipping container dimensions and configurations dictated by the International Organization for Standardization (ISO), and the second space is above the reference level;
positioning a first joist above the first space, wherein the first joist extends at least the first length in the first direction along a first edge of the first space, overlapping the first space, and extends a first extended length beyond a front edge of the first space;
positioning a second joist above the first space, wherein the second joist extends at least the first length in the first direction along a second edge of the first space, overlapping the first space, and extends a second extended length beyond the front edge of the first space;
coupling a third joist between the first and second joists, along the front edge of the first space;
coupling a fourth joist, coupled between the first and second joists, along a back edge of the first space;
positioning a fifth joist above the second space, wherein the fifth joist extends at least the second length in the fourth direction along a first edge of the second space, overlapping the second space, and extends a third extended length beyond a front edge of the second space;
positioning a sixth joist above the second space, wherein the sixth joist extends at least the second length in the fourth direction along a second edge of the second space, overlapping the second space, and extends a fourth extended length beyond the front edge of the second space;
coupling a seventh joist between the fifth and sixth joists, along the front edge of the second space;
coupling an eighth joist between the fifth and sixth joists, along a back edge of the second space;
coupling a first stud between the reference level and the first joist, wherein the first stud extends in the third direction, and the first stud is below the first joist at a position beyond the front edge of the first space; and
coupling a second stud between the reference level and the second joist, wherein the second stud extends in the third direction, and the second stud is below the second joist at a position beyond the front edge of the first space.

2. The method of claim 1 comprising:
positioning a ninth joist, above the first space and above the second joist, wherein the ninth joist extends at least the first length in the first direction along the second edge of the first space, overlapping the second joist, and extends a fifth extended length beyond the front edge of the first space; and
coupling a third stud between the second and ninth joists, wherein the third stud is above the first space.

3. The method of claim 2 comprising:
a tenth joist, above the second space and above the sixth joist, wherein the tenth joist extends at least the second length in the fourth direction along the second edge of the second space, overlapping the sixth joist, and extends in a sixth extended length beyond the front edge of the second space; and
a fourth stud, coupled between the sixth and tenth joists, wherein the fourth stud is above the second space.

4. The method of claim 2 comprising a first rafter coupled to the first and ninth joists above the first space.

5. The method of claim 4 comprising:
a second rafter coupled to the first and ninth joists above the first space; and
a canopy coupled between the first and second rafters, wherein the first and second rafters are at acute angles with respect to the reference level.

6. The method of claim 1 comprising:
comprising a ninth joist coupled between the first and fifth joists.

7. The apparatus of claim 6 comprising:
a tenth joist coupled between the first and fifth joists; and
a canopy coupled between the ninth and tenth joists.

8. The method of claim 1 wherein the first and fourth directions are the same direction, the second and fifth directions are the same direction, and the third and sixth directions are the same direction.

9. The method of claim 1 comprising:
a third space, below the first space, wherein the third space comprises a first distance above the reference level.

10. The method of claim 9 comprising:
a fourth space, below the second space, wherein the fourth space comprises a second distance above the reference level.

11. The method of claim 10 wherein the first distance is the same as the second distance.

12. The method of claim 10 wherein the first distance is different from the second distance.

13. The method of claim 1 comprising:
a deck, wherein the deck is between the first and second space, and an upper surface of the deck is above the reference level.

14. The method of claim 13 comprising:
a ramp, coupled to a front edge of the deck, wherein the ramp couples the upper surface of the deck to the reference level.

15. The method of claim 13 comprising:
a plurality of steps, positioned at a front edge of the deck, wherein a first step of the plurality of steps is at a first elevated level above the reference level and below the upper surface of the deck, and
a second step of the plurality of steps is at a second elevated level above first elevated level and below the upper surface of the deck.

16. The method of claim 14 comprising:
a plurality of steps, positioned at the front edge of the deck, wherein a first step of the plurality of steps is at a first elevated level above the reference level and below the upper surface of the deck, and
a second step of the plurality of steps is at a second elevated level above first elevated level and below the upper surface of the deck.

17. A method comprising:
providing a first space, wherein the first space comprises dimensions in a first direction, a second direction, and a third direction, a first length of the first space is in the first direction, a first width of the first space is in the second direction, a first height of the first space is in the third direction, the first, second, and third directions are transverse directions, the first length, the first width, and the first height are compliant with universal shipping container dimensions and configurations dictated by the International Organization for Standardization (ISO), and the first space is above a reference level;
providing a second space, wherein the second space comprises dimensions in a fourth direction, a fifth direction, and a sixth direction, a second length of the second space is in the fourth direction, a second width of the second space is in the fifth direction, a second height of the second space is in the sixth direction, the fourth, fifth, and sixth directions are transverse directions, the second length, the second width, and the second height are compliant with universal shipping container dimensions and configurations dictated by the International Organization for Standardization (ISO), and the second space is above the reference level;
positioning a first joist above the first space, wherein the first joist extends at least the first length in the first direction along a first edge of the first space, overlapping the first space, and extends a first extended length beyond a front edge of the first space;
positioning a second joist above the first space, wherein the second joist extends at least the first length in the first direction along a second edge of the first space, overlapping the first space, and extends a second extended length beyond the front edge of the first space;
coupling a third joist between the first and second joists, along the front edge of the first space;
coupling a fourth joist between the first and second joists, along a back edge of the first space;
positioning a fifth joist above the second space, wherein the fifth joist extends at least the second length in the fourth direction along a first edge of the second space, overlapping the second space, and extends a third extended length beyond a front edge of the second space;
positioning a sixth joist above the second space, wherein the sixth joist extends at least the second length in the fourth direction along a second edge of the second space, overlapping the second space, and extends a fourth extended length beyond the front edge of the second space;
coupling a seventh joist between the fifth and sixth joists, along the front edge of the second space;
coupling an eighth joist between the fifth and sixth joists, along a back edge of the second space; and
positioning a deck between the first and second space, wherein an upper surface of the deck is above the reference level.

18. The method of claim 17 comprising:
positioning a plurality of steps at a front edge of the deck, wherein a first step of the plurality of steps is at a first elevated level above the reference level and below the upper surface of the deck, and
a second step of the plurality of steps is at a second elevated level above first elevated level and below the upper surface of the deck.

19. The method of claim 18 comprising:
coupling a ramp to a front edge of the deck, wherein the ramp couples the upper surface of the deck to the reference level.

20. The method of claim 17 comprising:
coupling a ramp to a front edge of the deck, wherein the ramp couples the upper surface of the deck to the reference level.

21. The method of claim 17 comprising:
positioning a ninth joist above the first space and above the second joist, wherein the ninth joist extends at least the first length in the first direction along the second edge of the first space, overlapping the second joist, and extends a fifth extended length beyond the front edge of the first space; and
coupling a first stud between the second and ninth joists, wherein the first stud is above the first space.

22. The method of claim 21 comprising coupling a first rafter to the first and ninth joists above the first space.

23. The method of claim 21 comprising:
coupling a second stud between the reference level and the first joist, wherein the second stud extends in the third direction, and the first stud is below the first joist at a position beyond the front edge of the first space.

24. The method of claim 17 comprising:
coupling a first stud between the reference level and the first joist, wherein the first stud extends in the third direction, and the first stud is below the first joist at a position beyond the front edge of the first space.

25. A method comprising:
providing a first space, wherein the first space comprises dimensions in a first direction, a second direction, and a third direction, a first length of the first space is in the first direction, a first width of the first space is in the second direction, a first height of the first space is in the third direction, the first, second, and third directions are transverse directions, the first length, the first width, and the first height are compliant with universal shipping container dimensions and configurations dictated by the International Organization for Standardization (ISO), and the first space is above a reference level;

providing a second space, wherein the second space comprises dimensions in a fourth direction, a fifth direction, and a sixth direction, a second length of the second space is in the fourth direction, a second width of the second space is in the fifth direction, a second height of the second space is in the sixth direction, the fourth, fifth, and sixth directions are transverse directions, the second length, the second width, and the second height are compliant with universal shipping container dimensions and configurations dictated by the International Organization for Standardization (ISO), and the second space is above the reference level;

positioning a first joist above the first space, wherein the first joist extends at least the first length in the first direction along a first edge of the first space, overlapping the first space, and extends a first extended length beyond a front edge of the first space;

positioning a second joist above the first space, wherein the second joist extends at least the first length in the first direction along a second edge of the first space, overlapping the first space, and extends a second extended length beyond the front edge of the first space;

coupling a third joist between the first and second joists, along the front edge of the first space;

coupling a fourth joist between the first and second joists, along a back edge of the first space;

positioning a fifth joist above the second space, wherein the fifth joist extends at least the second length in the fourth direction along a first edge of the second space, overlapping the second space, and extends a third extended length beyond a front edge of the second space;

positioning a sixth joist above the second space, wherein the sixth joist extends at least the second length in the fourth direction along a second edge of the second space, overlapping the second space, and extends a fourth extended length beyond the front edge of the second space;

coupling a seventh joist between the fifth and sixth joists, along the front edge of the second space;

coupling an eighth joist between the fifth and sixth joists, along a back edge of the second space;

coupling a deck between the first and second space, wherein an upper surface of the deck is above the reference level;

positioning a plurality of steps at a front edge of the deck, wherein a first step of the plurality of steps is at a first elevated level above the reference level and below the upper surface of the deck, and a second step of the plurality of steps is at a second elevated level above first elevated level and below the upper surface of the deck;

coupling a ninth joist between the first joist and fifth joist, and above the deck;

coupling a tenth joist between the first joist and fifth joist, and above the deck; and coupling a canopy between the ninth and tenth joists.

26. The method of claim 25 comprising:

coupling a ramp to a front edge of the deck, wherein the ramp couples the upper surface of the deck to the reference level.

27. The method of claim 25 comprising:

positioning an eleventh joist above the first space and above the second joist, wherein the eleventh joist extends at least the first length in the first direction along the second edge of the first space, overlapping the second joist, and extends a fifth extended length beyond the front edge of the first space; and coupling a first stud between the second and eleventh joists, wherein the first stud is above the first space.

28. The method of claim 27 comprising:

coupling a first rafter to the first and eleventh joists above the first space, wherein the first rafter is at an acute angle with respect to the reference level.

29. The method of claim 25 comprising:

coupling a first stud between the reference level and the first joist, wherein the first stud extends in the third direction, and the first stud is below the first joist at a position beyond the front edge of the first space.

30. The method of claim 25 comprising:

positioning a third space below the first space, wherein the third space comprises a first distance above the reference level;

positioning a fourth space below the second space, wherein the fourth space comprises a second distance above the reference level.

31. The method of claim 30 wherein the first distance is the same as the second distance.

32. The method of claim 30 wherein the first distance is different from the second distance.

* * * * *